(12) United States Patent
Agbabian

(10) Patent No.: US 7,472,422 B1
(45) Date of Patent: Dec. 30, 2008

(54) SECURITY MANAGEMENT SYSTEM INCLUDING FEEDBACK AND CONTROL

(75) Inventor: Paul M. Agbabian, Los Angeles, CA (US)

(73) Assignee: Symantec Corporation, Cupertino, CA (US)

( * ) Notice: Subject to any disclaimer, the term of this patent is extended or adjusted under 35 U.S.C. 154(b) by 813 days.

(21) Appl. No.: 10/660,225

(22) Filed: Sep. 10, 2003

(51) Int. Cl.
*G06F 12/14* (2006.01)

(52) U.S. Cl. .................................................. 726/25
(58) Field of Classification Search .................. 726/25
See application file for complete search history.

(56) References Cited

U.S. PATENT DOCUMENTS

| | | | | |
|---|---|---|---|---|
| 5,317,741 | A | 5/1994 | Schwanke | 395/700 |
| 5,440,742 | A | 8/1995 | Schwanke | 395/650 |
| 5,649,200 | A | 7/1997 | Leblang et al. | 395/703 |
| 5,862,386 | A | 1/1999 | Joseph et al. | 395/712 |
| 5,893,083 | A | 4/1999 | Eshghi et al. | 706/45 |
| 5,898,872 | A | 4/1999 | Richley | 717/121 |
| 6,134,706 | A | 10/2000 | Carey et al. | 717/1 |
| 6,182,286 | B1 | 1/2001 | Sigal et al. | 717/122 |
| 6,223,342 | B1 | 4/2001 | George | 717/10 |
| 6,257,774 | B1 | 7/2001 | Stack | 717/110 |
| 6,266,773 | B1 | 7/2001 | Kisor et al. | 713/200 |
| 6,298,445 | B1 | 10/2001 | Shostack et al. | 713/201 |
| 6,321,338 | B1 | 11/2001 | Porras et al. | 713/201 |
| 6,484,203 | B1 | 11/2002 | Porras et al. | 709/224 |
| 6,601,234 | B1 | 7/2003 | Bowman-Amuah | 717/108 |
| 6,604,110 | B1 | 8/2003 | Savage et al. | 707/102 |
| 6,718,535 | B1 | 4/2004 | Underwood | 717/101 |
| 6,925,470 | B1 | 8/2005 | Sangudi et al. | 707/102 |
| 6,986,102 | B1 | 1/2006 | Baer et al. | 715/514 |
| 7,127,700 | B2 | 10/2006 | Large | 717/100 |
| 7,194,730 | B2 | 3/2007 | Pramberger | 717/120 |
| 7,272,815 | B1 | 9/2007 | Eldridge et al. | 717/101 |
| 2002/0019945 | A1 | 2/2002 | Houston et al. | |
| 2004/0193912 | A1* | 9/2004 | Li et al. | 713/200 |

OTHER PUBLICATIONS

Schill, A. et al., "Configuration Management for Distributed Object-Oriented Applications", IEEE CHI pp. 577-581, 1990.
D'Adderio, L. "Configuring software, reconfiguring memories: the influence of integrated systems on knowledge storage, retrieval and reuse", ACM SAC pp. 726.-731, 2002.
Render, H. et al., "An Object-Oriented Model of Software Configuration Management", ACM pp. 127-139, 1991.
Nguyen, T. et al., "An Infrastructure for Development of Object-Oriented Multi-level Configuration Management Services", ACM ICSE, pp. 215-224, 2005.
Barrus, J., "*Intrusion Detection in Real Time in a Multi-Node, Multi-Host Environment*", Master's Thesis, Naval Postgraduate School, Monterey, CA, i-xii, pp. 1-79, Sep. 1997.

(Continued)

*Primary Examiner*—Nasser Moazzami
*Assistant Examiner*—Brandon S Hoffman
(74) *Attorney, Agent, or Firm*—Gunnison, McKay & Hodgson, L.L.P.

(57) ABSTRACT

A system uses automatic feedback and control to secure a network infrastructure by iterative convergence of the network's security structure to meet a security policy. Following initialization, a security feedback control system of the security management system makes dynamic adjustments to the system using bi-directional services that are controlled via policy decision components, without user intervention.

16 Claims, 81 Drawing Sheets

OTHER PUBLICATIONS

"*SNIA CIM Interoperability Demonstration Backgrounder*", Storage Networking Industry Association, pp. 1-2, 2002.

"*SNIA Storage Management Initiative CIM/WBEM Technology Backgrounder*", Storage Networking Industry Association, pp. 1-2, 2002.

Hughes, K. and Wohlferd, D., "*Say Goodbye to Quirky APIs: Building a WMI Provider to Expose Your Object Info*", pp. 1-16 [online]. Retrieved on Dec. 24, 2002. Retrieved from the internet: URL:http://msdn.microsoft.com/msdnmag/issues/0500/wmiprov/print.asp.

"*Common Information Model (CIM) Specification*", Version 2.2, Distributed Management Task Force, Inc., Portland, OR, pp. I-VI, 1-97, Jun. 14, 1999.

Davis, J., "*WBEM Services Specification JSR-0048*", Java One, Sun's 2001 Worldwide Java Developer Conference, pp. 1-19, 2001.

Bhat, G., "*WBEM Services API and Examples*", Java One, Sun's 2001 Worldwide Java Developer Conference, pp. 20-29, 2001.

Westerinen, A., "*Modeling Information In CIM*", Java One, Sun's 2001 Worldwide Java Developer Conference, pp. 31-43, 2001.

Ptacek, T. and Newsham, T., "*Insertion, Evasion, and Denial of Service: Eluding Network Intrusion Detection*", Secure Networks, Inc., pp. 1-63, Jan. 1998.

Yang, J., Ning, P., Wang, X., and Jajodia, S., "*Cards: A Distributed System For Detecting Coordinated Attacks*", Center for Secure Information Systems, George Mason University, Fairfax, VA, pp. 1-10, no date.

Magers, D., "*Packet Sniffing: An Integral Part of Network Defense*", 9 pgs., May 9, 2002.

King, N. and Weiss, E., "*Network Forensics Analysis Tools (NFATs) Reveal Insecurities, Turn Sysadmins Into Systems Detectives*", Information Security, 8 pgs., Feb. 2002.

Trenum, G., "*Practical Requirement for Level 2 IDIC Exam*", 15 pgs., no date.

Shimomura, T., "Tsutomu Shimomura's Newsgroup Posting With Technical Detail of the Attack Described by Markoff in NYT", *Random Access,* 10 pgs., Oct. 12, 1997.

"*Dragon 5, An Intrusion Detection System for the Enterprise*", 5 pgs., no date.

Stevens, W., *The Protocols, TCP/IP Illustrated,* vol. 1, Addison Wesley Longman, Inc., Reading, MA, pp. vii-xii, 7, 8, 1994.

Sinclair, C., Pierce, L., and Matzner, S., "*An Application of Machine Learning to Network Intrusion Detection*", The University of Texas at Austin, Austin, TX, pp. 1-7, no date.

Butterworth, J., "*Practical Portion Of Intrusion Detection Immersion Curriculum*", 10 pgs., no date.

Kobi, H., "*Beyond SNMP: The Benefits of Collecting Network Event Logs*", Technical White Paper, Network Intelligence® Corporation, Walpole, MA, pp. 1-10, Jun. 2002.

Harp, S., Geib, C., Goldman, R., Heimerdinger, W., Thomas, V., and R.A. Kemmerer Associates, "*Argus: An Architecture for Cooperating Intrusion Detection and Mitigation Applications*", Honeywell Technology Center, 18 pgs., no date.

Barrus, J. and Rowe, N., "*Distributed Autonomous-Agent Network-Intrusion Detection and Response System*", Proceedings of the 1998 Command and Control Research and Technology Symposium, Monterey, CA, Jun.-Jul. 1998, 12 pgs.

Frincke, D., Tobin, D., McConnell, J., Marconi, J., and Polla, D., "*A Framework for Cooperative Intrusion Detection*", Center for Secure and Dependable Software, University of Idaho, Moscow, ID, 13 pgs, 1998.

"*Managing Your Network With HP OpenView Network Node Manager*", Hewlett-Packard Company, Fort Collins, CO, pp. 1-675, May 2002.

"*HP OpenView Communications Event Correlation Services Developer's Guide and Reference*", Hewlett-Packard Company, Fort Collins, CO, pp. 1-150, Apr. 2001.

"*HP OpenView Communications Event Correlation Services SNMP Module*", Hewlett-Packard Company, Fort Collins, CO, pp. 1-62, Apr. 2001.

"*HP OpenView Communications Event Correlation Services Administrator's Guide*", Hewlett-Packard Company, Fort Collins, CO, pp. 1-121, Apr. 2001.

Agbabian, P. et al., U.S. Appl. No. 10/660,422, filed Sep. 10, 2003, entitled "Configuration System and Methods Including Configuration Inheritance and Revisioning", 124 pgs.

\* cited by examiner

| FIELD_EVENT_ID |
| --- |
| FIELD_EVENTCLASS_ID |
| FIELD_PRODUCT_ID |
| FIELD_PRODUCT_VERSION |
| FIELD_SWFEATURE_ID |
| FIELD_MACHINE |
| FIELD_MACHINE_IP |
| FIELD_MACHINE_SUBNET |
| FIELD_MACHINEID |
| FIELD_MACHINE_MAC |
| FIELD_EVENT_DT |
| FIELD_CREATE_DT |
| FIELD_POST_DT |
| FIELD_LOGGED_DT |
| FIELD_DATE_ADJUST |
| FIELD_CATEGORY_ID |
| FIELD_SEVERITY |
| FIELD_DOMAIN |
| FIELD_USER_NAME |
| FIELD_EVENT_DESC |
| FIELD_ORGUNIT |
| FIELD_CONFIGURATION |
| FIELD_NETWORK_PROTOCOL_ID |
| FIELD_IP_TYPE_ID |
| FIELD_SOURCE_IP |
| FIELD_DESTINATION_IP |
| FIELD_SOURCE_PORT |
| FIELD_DESTINATION_PORT |
| FIELD_SOURCE_MAC |
| FIELD_DESTINATION_MAC |

15500 {
- FIELD_EVENT_ID
- FIELD_EVENTCLASS_ID
- FIELD_PRODUCT_ID
- FIELD_PRODUCT_VERSION
- FIELD_SWFEATURE_ID
- FIELD_MACHINE
- FIELD_MACHINE_IP
- FIELD_MACHINE_SUBNET
- FIELD_MACHINEID
- FIELD_MACHINE_MAC
- FIELD_EVENT_DT
- FIELD_CREATE_DT
- FIELD_POST_DT
- FIELD_LOGGED_DT
- FIELD_DATE_ADJUST
- FIELD_CATEGORY_ID
- FIELD_SEVERITY
- FIELD_DOMAIN
- FIELD_USER_NAME
- FIELD_EVENT_DESC
- FIELD_ORGUNIT
- FIELD_CONFIGURATION
}

19500 {
- FIELD_NETWORK_PROTOCOL_ID
- FIELD_IP_TYPE_ID
- FIELD_SOURCE_IP
- FIELD_DESTINATION_IP
- FIELD_SOURCE_PORT
- FIELD_DESTINATION_PORT
- FIELD_SOURCE_MAC
- FIELD_DESTINATION_MAC
}

Memory 21100

Fig. 21B_2
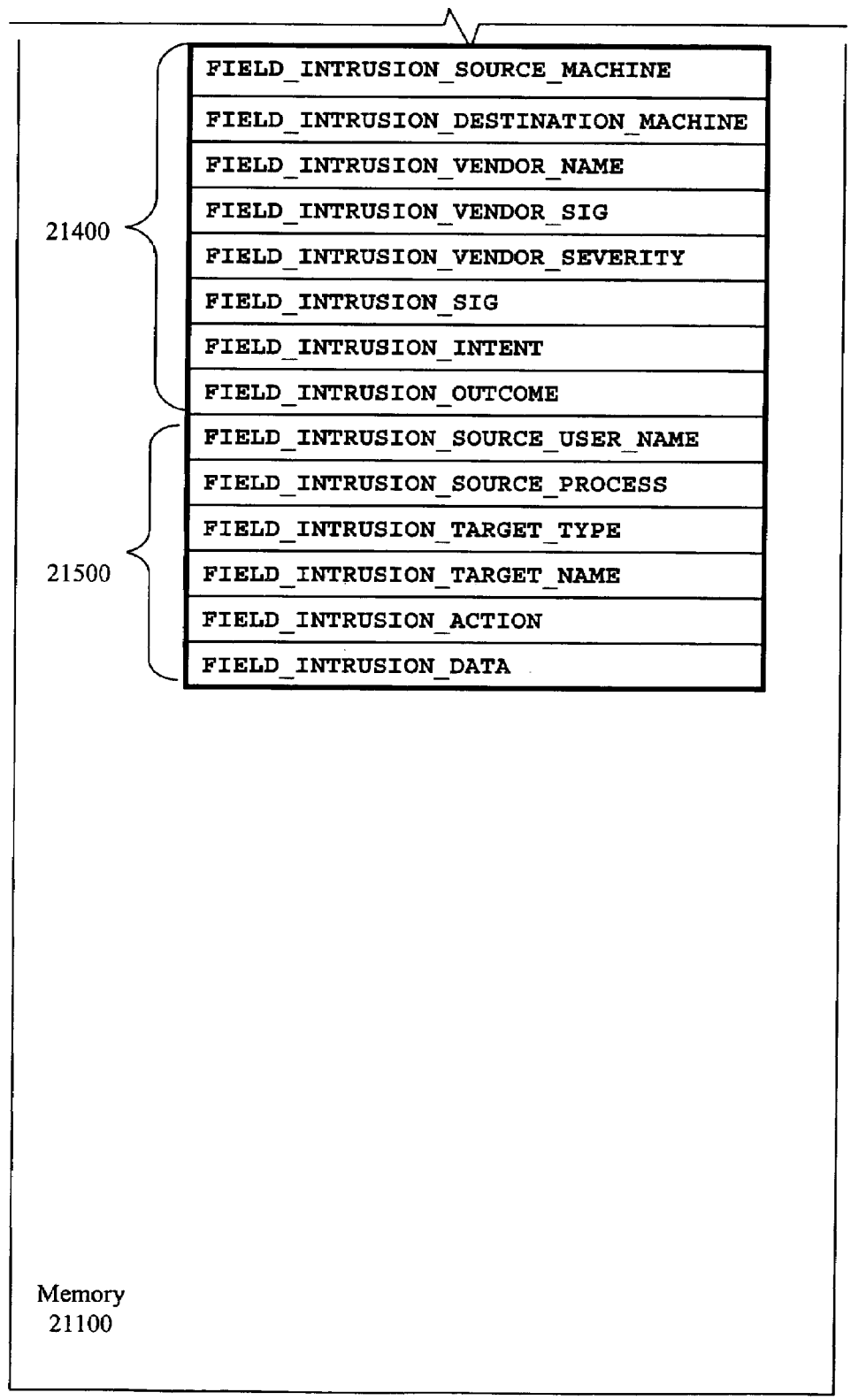

15500 {
- FIELD_EVENT_ID
- FIELD_EVENTCLASS_ID
- FIELD_PRODUCT_ID
- FIELD_PRODUCT_VERSION
- FIELD_SWFEATURE_ID
- FIELD_MACHINE
- FIELD_MACHINE_IP
- FIELD_MACHINE_SUBNET
- FIELD_MACHINEID
- FIELD_MACHINE_MAC
- FIELD_EVENT_DT
- FIELD_CREATE_DT
- FIELD_POST_DT
- FIELD_LOGGED_DT
- FIELD_DATE_ADJUST
- FIELD_CATEGORY_ID
- FIELD_SEVERITY
- FIELD_DOMAIN
- FIELD_USER_NAME
- FIELD_EVENT_DESC
- FIELD_ORGUNIT
- FIELD_CONFIGURATION

19500 {
- FIELD_NETWORK_PROTOCOL_ID
- FIELD_IP_TYPE_ID
- FIELD_SOURCE_IP
- FIELD_DESTINATION_IP
- FIELD_SOURCE_PORT
- FIELD_DESTINATION_PORT
- FIELD_SOURCE_MAC
- FIELD_DESTINATION_MAC

Memory 22100

Fig. 22B_2
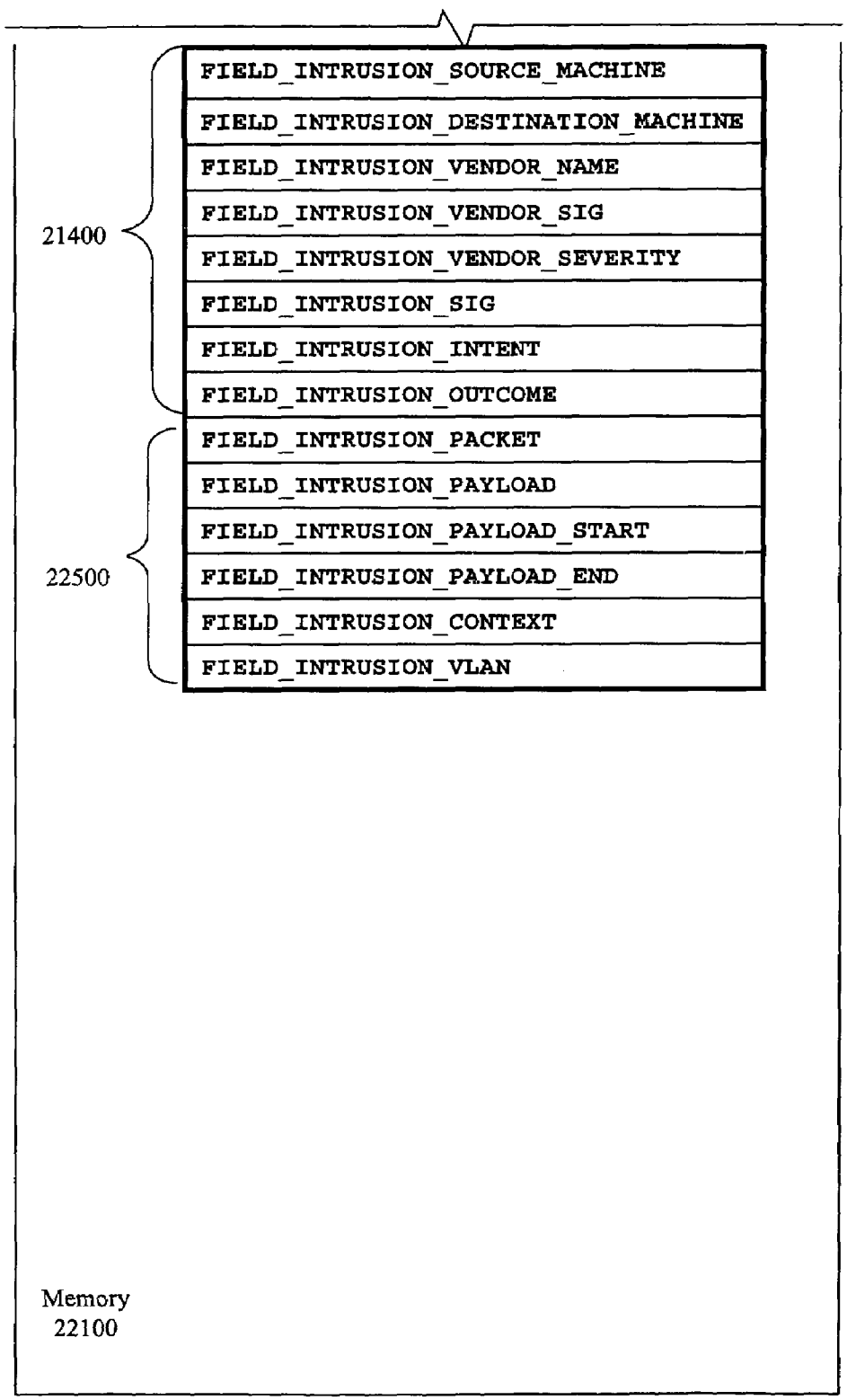

15500 {
- FIELD_EVENT_ID
- FIELD_EVENTCLASS_ID
- FIELD_PRODUCT_ID
- FIELD_PRODUCT_VERSION
- FIELD_SWFEATURE_ID
- FIELD_MACHINE
- FIELD_MACHINE_IP
- FIELD_MACHINE_SUBNET
- FIELD_MACHINEID
- FIELD_MACHINE_MAC
- FIELD_EVENT_DT
- FIELD_CREATE_DT
- FIELD_POST_DT
- FIELD_LOGGED_DT
- FIELD_DATE_ADJUST
- FIELD_CATEGORY_ID
- FIELD_SEVERITY
- FIELD_DOMAIN
- FIELD_USER_NAME
- FIELD_EVENT_DESC
- FIELD_ORGUNIT
- FIELD_CONFIGURATION

19500 {
- FIELD_NETWORK_PROTOCOL_ID
- FIELD_IP_TYPE_ID
- FIELD_SOURCE_IP
- FIELD_DESTINATION_IP
- FIELD_SOURCE_PORT
- FIELD_DESTINATION_PORT
- FIELD_SOURCE_MAC
- FIELD_DESTINATION_MAC

Memory 26100

Fig. 26C_2
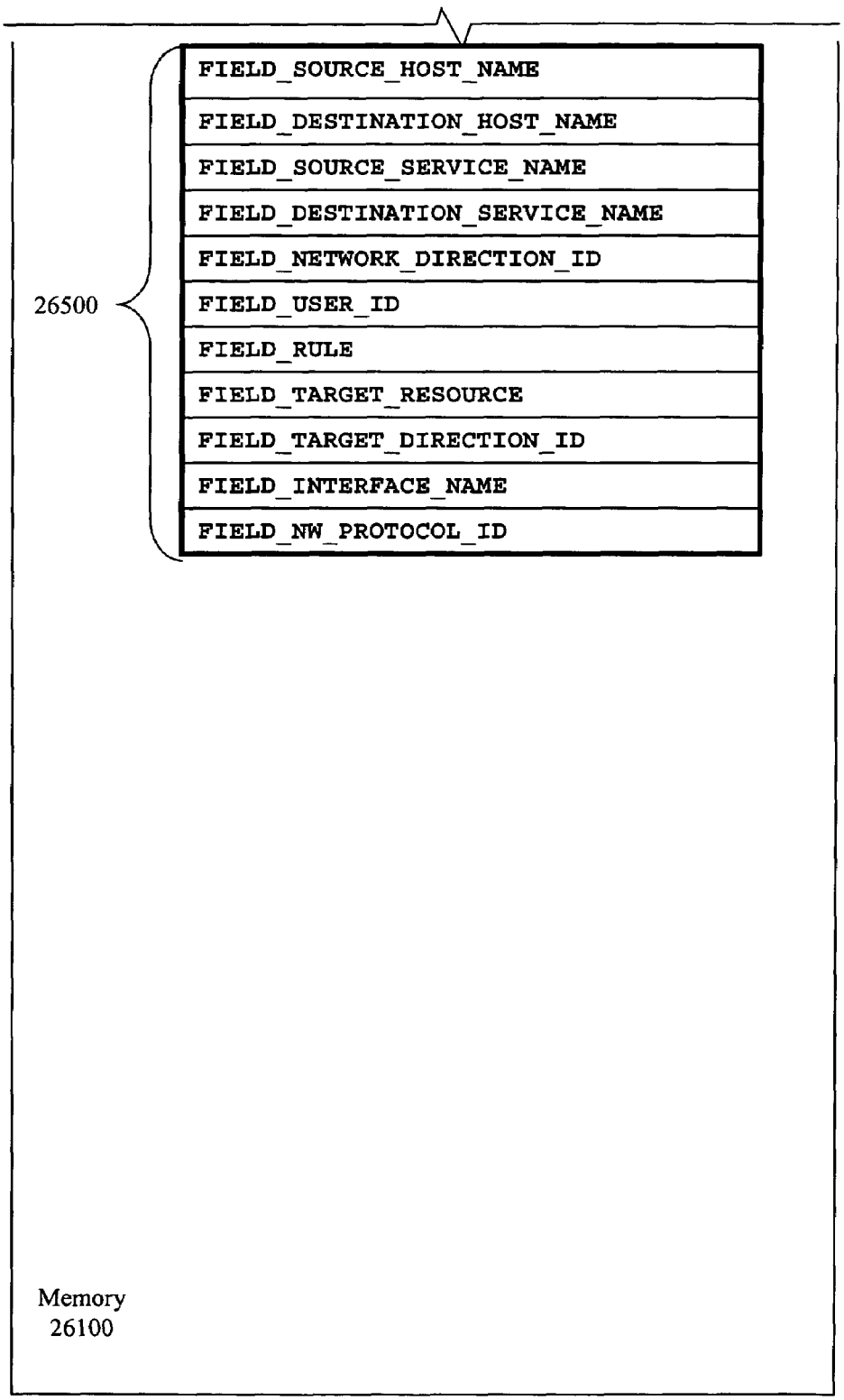

15500 {
- FIELD_EVENT_ID
- FIELD_EVENTCLASS_ID
- FIELD_PRODUCT_ID
- FIELD_PRODUCT_VERSION
- FIELD_SWFEATURE_ID
- FIELD_MACHINE
- FIELD_MACHINE_IP
- FIELD_MACHINE_SUBNET
- FIELD_MACHINEID
- FIELD_MACHINE_MAC
- FIELD_EVENT_DT
- FIELD_CREATE_DT
- FIELD_POST_DT
- FIELD_LOGGED_DT
- FIELD_DATE_ADJUST
- FIELD_CATEGORY_ID
- FIELD_SEVERITY
- FIELD_DOMAIN
- FIELD_USER_NAME
- FIELD_EVENT_DESC
- FIELD_ORGUNIT
- FIELD_CONFIGURATION
}

19500 {
- FIELD_NETWORK_PROTOCOL_ID
- FIELD_IP_TYPE_ID
- FIELD_SOURCE_IP
- FIELD_DESTINATION_IP
- FIELD_SOURCE_PORT
- FIELD_DESTINATION_PORT
- FIELD_SOURCE_MAC
- FIELD_DESTINATION_MAC
}

Memory 27100

Fig. 27B_2
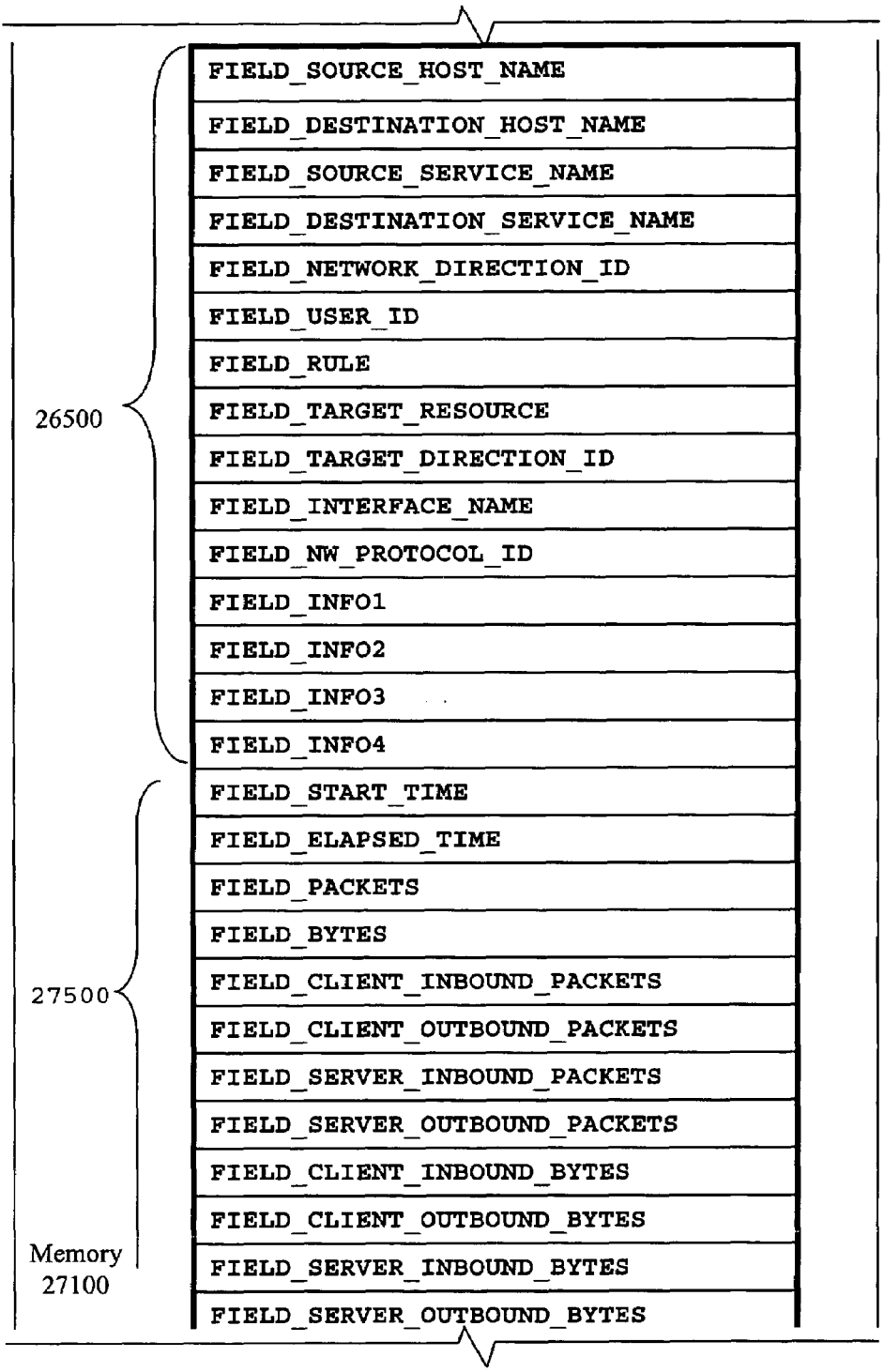

Fig. 27B_3
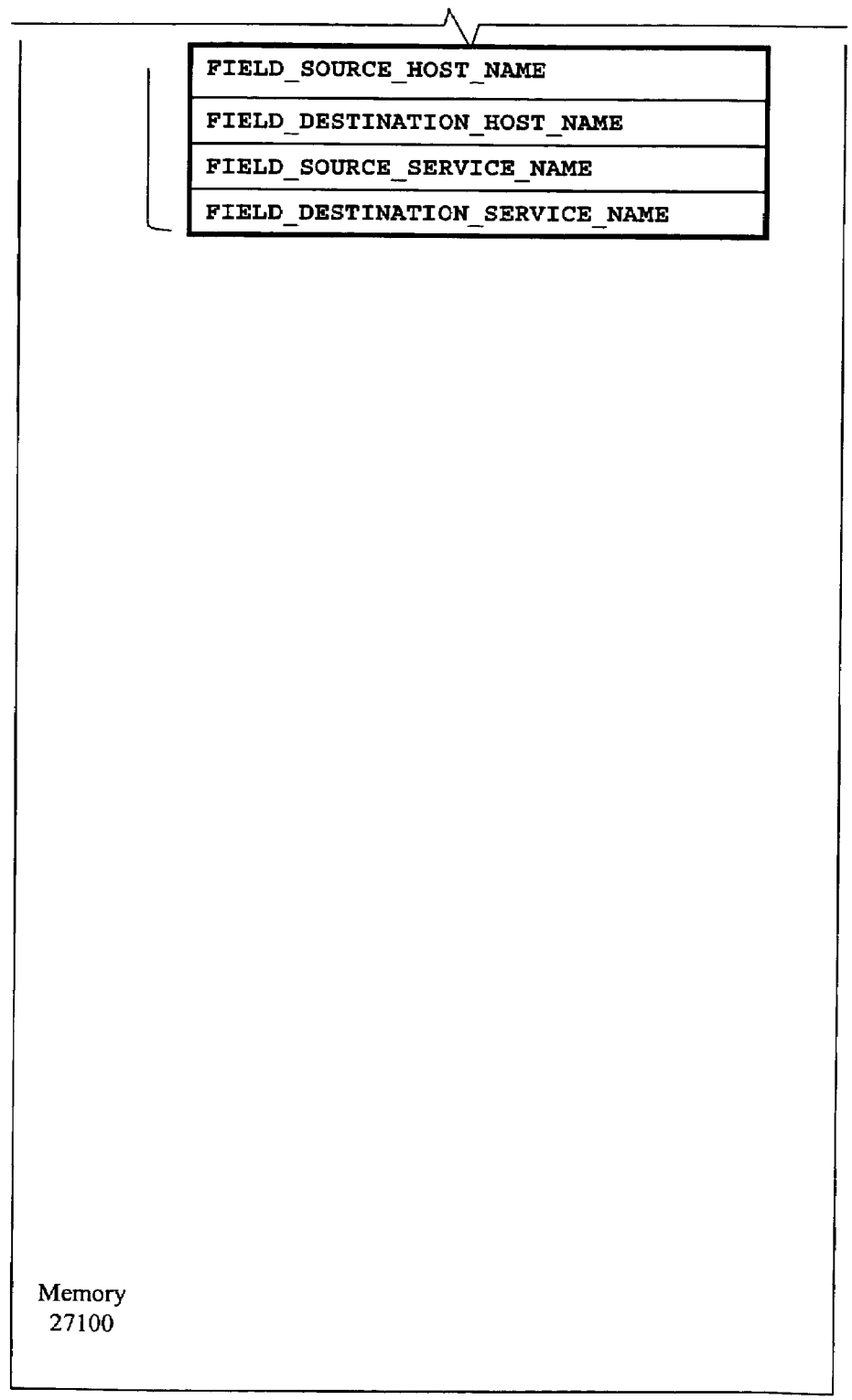

Fig. 30B_1
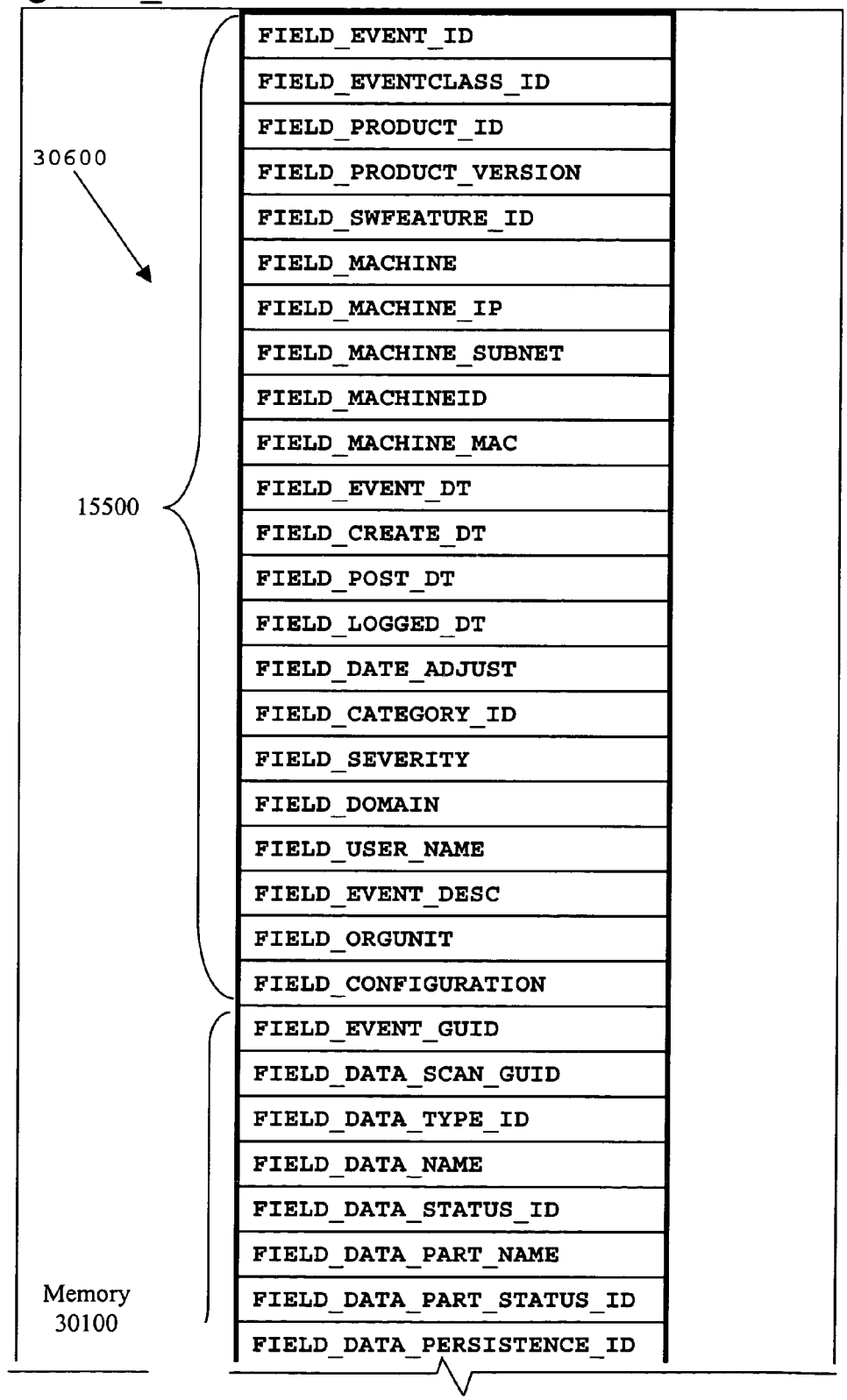

Fig. 30B_2
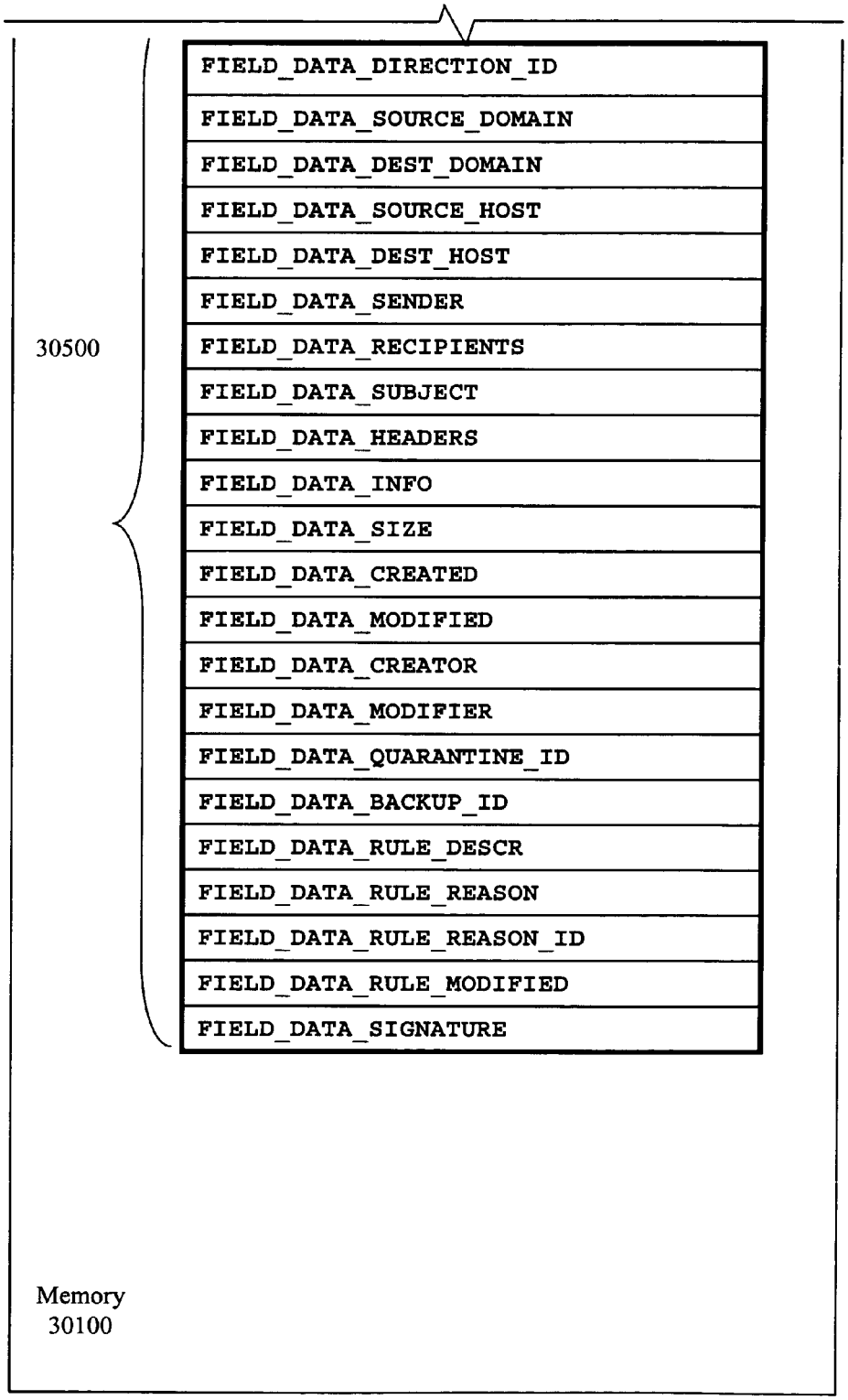

Fig. 31B_1
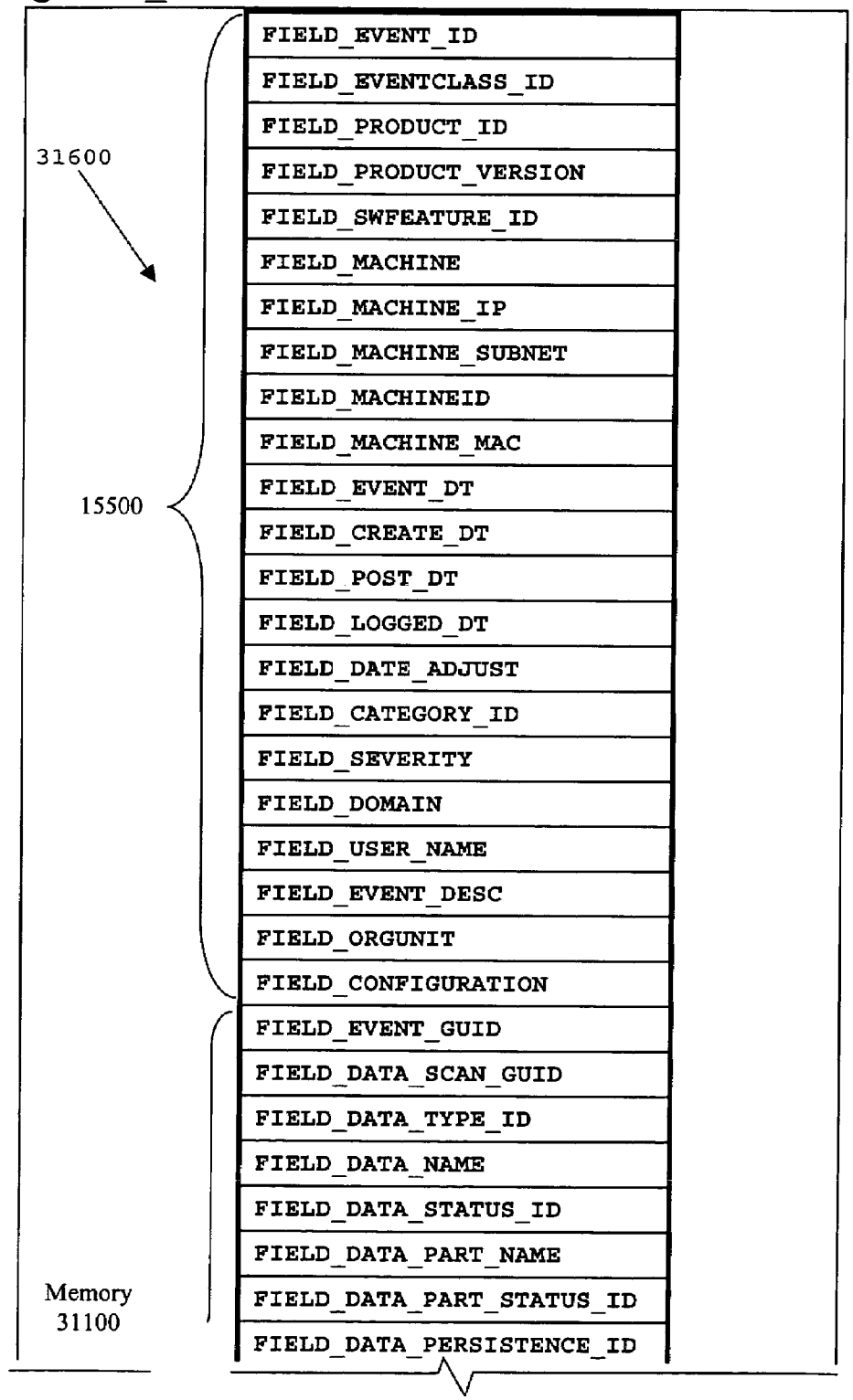

Fig. 31B_2
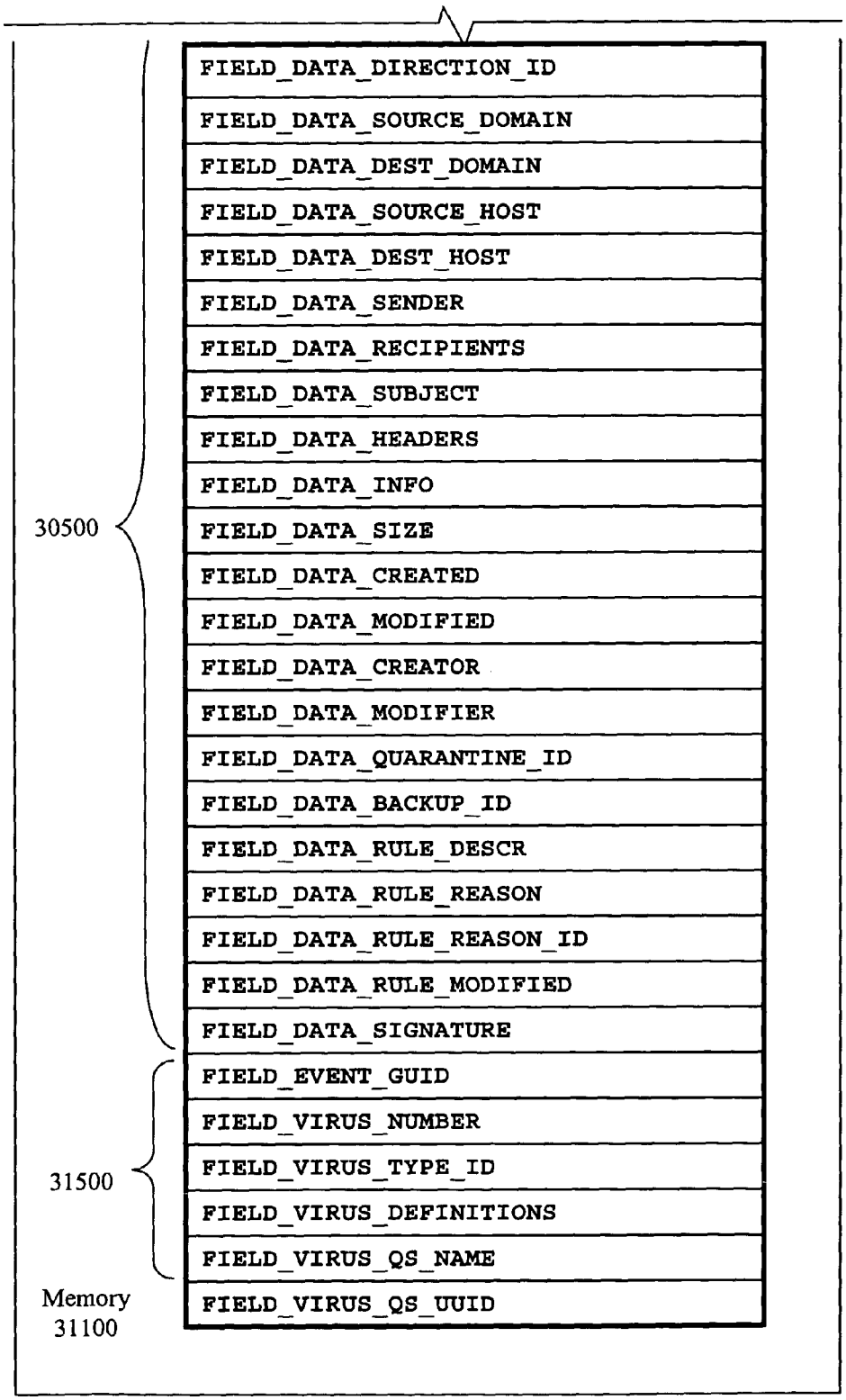

Fig. 39B_1
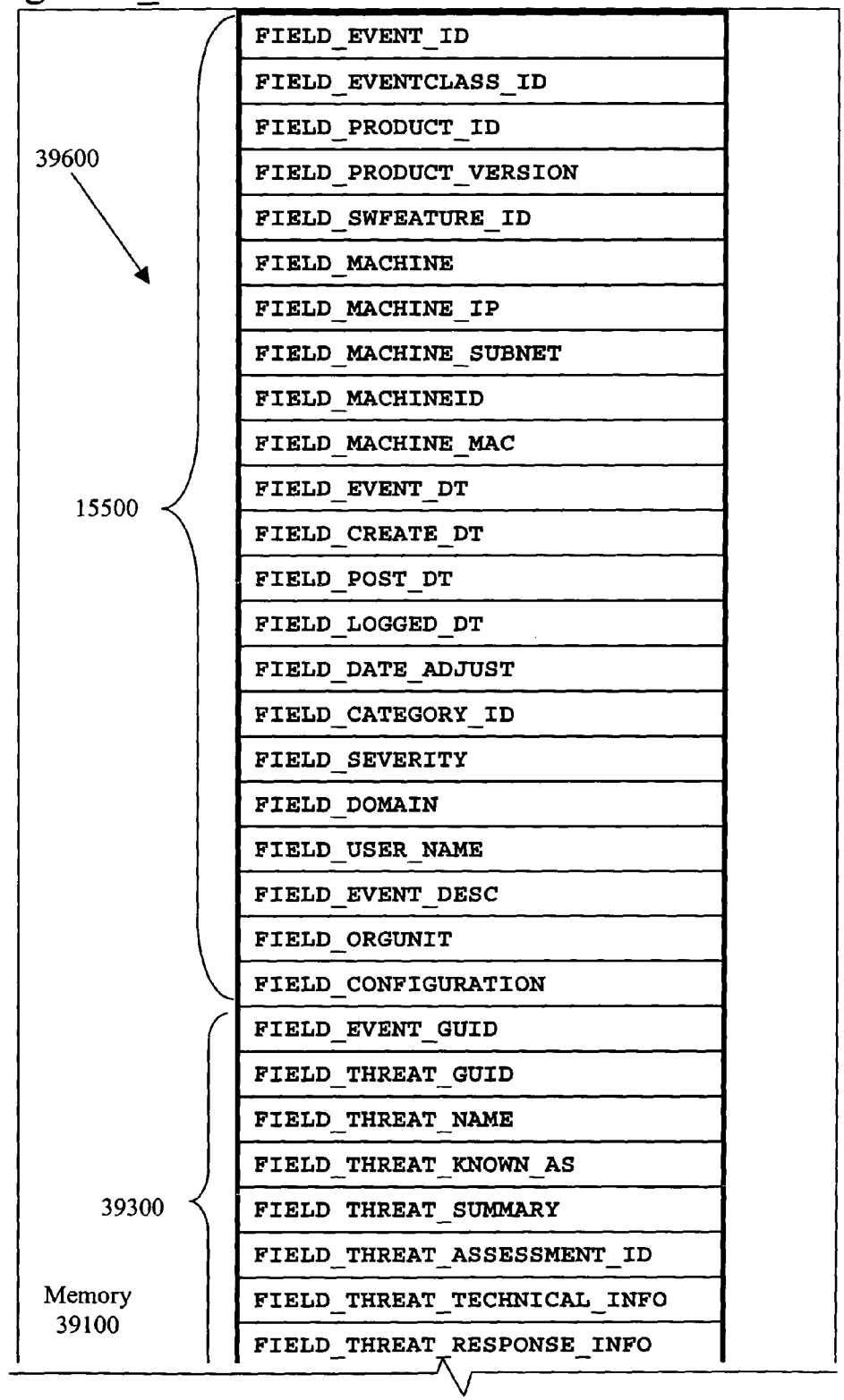

Fig. 39B_2
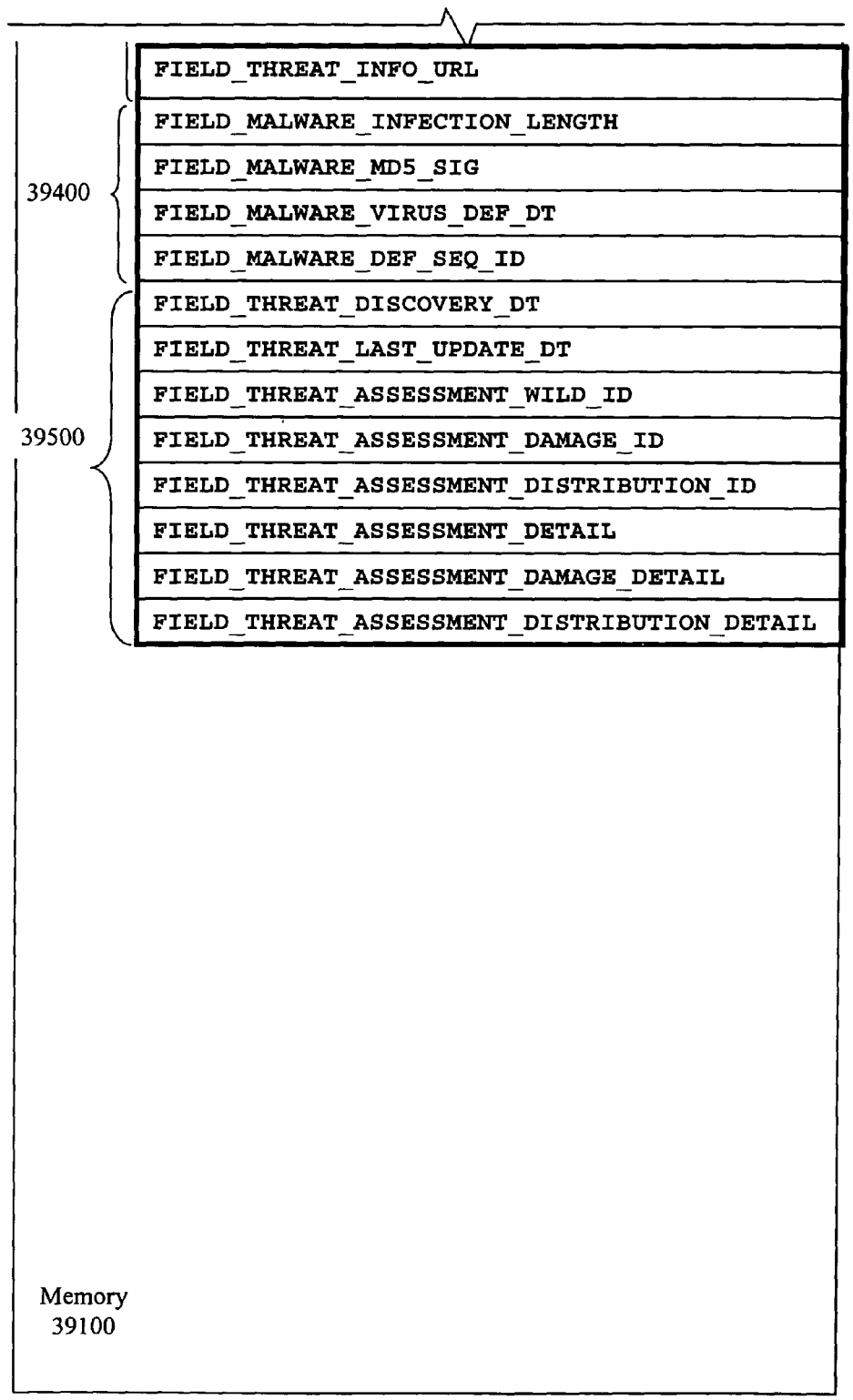

15500 {
- FIELD_EVENT_ID
- FIELD_EVENTCLASS_ID
- FIELD_PRODUCT_ID
- FIELD_PRODUCT_VERSION
- FIELD_SWFEATURE_ID
- FIELD_MACHINE
- FIELD_MACHINE_IP
- FIELD_MACHINE_SUBNET
- FIELD_MACHINEID
- FIELD_MACHINE_MAC
- FIELD_EVENT_DT
- FIELD_CREATE_DT
- FIELD_POST_DT
- FIELD_LOGGED_DT
- FIELD_DATE_ADJUST
- FIELD_CATEGORY_ID
- FIELD_SEVERITY
- FIELD_DOMAIN
- FIELD_USER_NAME
- FIELD_EVENT_DESC
- FIELD_ORGUNIT
- FIELD_CONFIGURATION

39300 {
- FIELD_EVENT_GUID
- FIELD_THREAT_GUID
- FIELD_THREAT_NAME
- FIELD_THREAT_KNOWN_AS
- FIELD_THREAT_SUMMARY
- FIELD_THREAT_ASSESSMENT_ID
- FIELD_THREAT_TECHNICAL_INFO
- FIELD_THREAT_RESPONSE_INFO

Memory 39100

Fig. 40B_2
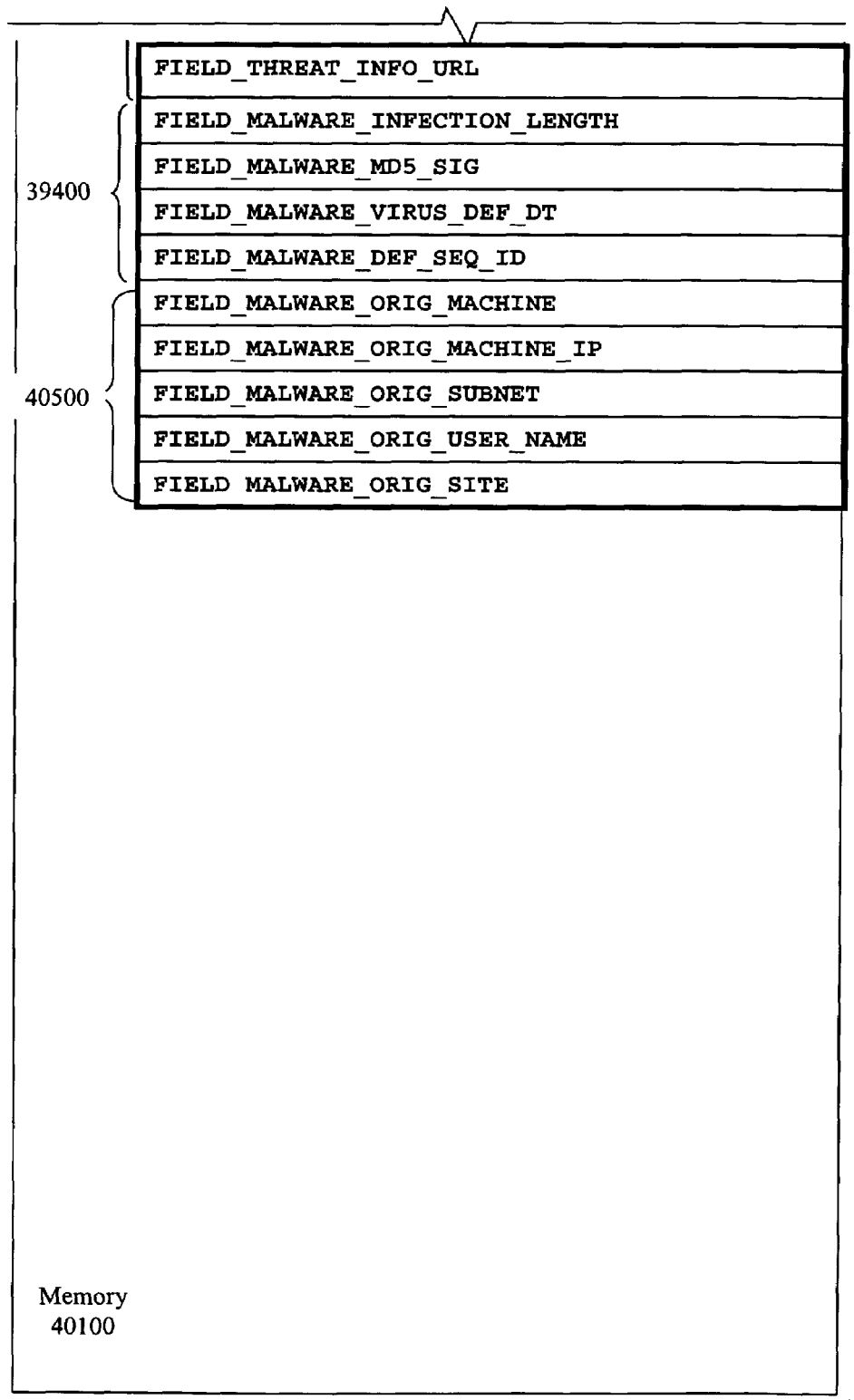

```xml
<?xml version="1.0" encoding="UTF-8" ?>
<SesaIntegrationData xmlns:xsi=
    "http://www.w3.org/2001/XMLSchema-instance"
    xsi:noNamespaceSchemaLocation="NabooBase.xsd">
  <SesaProductData>
    <Version>1.00</Version>
    <Author>ABC</Author>
    <Revision>0.01</Revision>
    <RevDate>Feb 15 2003</RevDate>
    <Product>
      <!-- Simple Sample Product  -->
      <!-- Product ID 3001  ==> Numbering
            Range [30,010,000 - 300,019,999]  -->
      <Product Id="3001">
        <Version>4.0</Version>
        <Vendor>Symantec Corporation</Vendor>
        <SKUNumber>1234</SKUNumber>
        <Caption>Sample Product</Caption>
        <Description>Simple Sample Product
            for NIK  </Description>
        <Name>Sample Product</Name>
        <DisplayName LangId="10001">
                Sample</DisplayName>
        <EventFamilyMembership Id="90000" />
        <DataDefinition>
          <!-- Software Feature Ids
                30,010,101-30,010,999 -->
          <SoftwareFeature Id="30010101">
            <Caption>Sample Software
                Feature </Caption>
            <Description>Sample Software
                Feature</Description>
            <Name>30010101</Name>
            <DisplayName LangId="10001">
                Sample Software Feature
                </DisplayName>
            <FeatureRole>SESA_LOGGING
                </FeatureRole>
          </SoftwareFeature>
        </DataDefinition>
      </Product>
  </SesaProductData>
</SesaIntegrationData>
```

Fig. 42

```
package com.symantec.management.example;

import java.io.*;
import java.util.*;
import java.net.*;

import org.snia.wbem.cim.CIMException;
import org.snia.wbem.cim.CIMNameSpace;
import org.snia.wbem.cim.CIMObjectPath;
import org.snia.wbem.cim.CIMValue;
import org.snia.wbem.client.CIMOMHandle;
import org.snia.wbem.client.CIMClient;

import com.symantec.management.providers.SESAProvider;
import com.symantec.management.providers.SymcObject;
import com.symantec.management.providers.SESAException;

/** example of the Agent/Provider extension interface
 */
public class ExampleProvider extends SESAProvider
{
        // product and feature IDs for the advanced sample
        public final int          ADV_SAMPLE_APP_PRODUCT_ID = 3002;
        public final int          ADV_SAMPLE_APP_FEATURE_ID = 30020101;

// constants for the config properties
        public final String       CFGPROP_POLLTIME = "PollTime";

public final String       PROVIDER_NAME =
"Symc_ExampleProvider";

// the local cache for your provider's configuration - name should be all lower case
        private final String   CONFIG_FILE_NAME = "exampleprovider.cfg";

private Properties        m_props = null;// holds the config properties private CIMObjectPath     m_cimPath = null;// object for the Example
Provider
        private CIMClient         m_cimClient = null;// communicate with the
CIMOM public ExampleProvider()
        {
            System.out.println("--inside the ExampleProvider() constructor");
        }

/* perform initialization of the provider<p>
            Any initialization should be done in here. It is not necessary to request
```

Fig. 43A

```
 * configurations from the Config Provider, as those are retrieved automatically
 * and sent to applyConfig().
 */
public void initialize(CIMOMHandle ch) throws CIMException
{
        System.out.println("\n***inside the Example Provider!\n");

// Any threads to be used should be created in here
        // Threads should be "daemon" so that the shutdown does not
        // have to wait on them too long.

try
        {
                loadConfigFile();
        }
        catch (CIMException e)
        {
                System.out.println("Could not load example provider's configuration file.");
        }

// There are other methods available in the Config Provider to get information
// about the machine and the Management Server. These are:
//      getMachineId() - the machine id from the bootstrap process
//      getDB() - get the DN, as used in the Directory
//      getDomain() - get the Domain that this machine was bootstrapped into
//      getOrgUnit() - get the OrgUnit the machine was bootstrapped into
//      getManagementServer() - returns a String for the URL to the Management Server
//      getManagementServerAddress() - returns the IP address of the Management Server
//      getManagementServerPort() - returns the port the Management Server listens on
//      getSecManagementServer() - returns a String for the URL to the Secondary Management Server
//      getSecManagementServerAddress() - returns the IP address of the Secondary Management Server
//      getSecManagementServerPort() - returns the port the Secondary Management Server listens on
//      getUseSSL() - returns true or false, whether or not to use SSL // There are also two more methods to retrieve configuration:
//      getConfig(int ProductId, int FeatureId)
//      getConfig(int ProductId, int FeatureIds[])
//      These methods both retrieve a String which contains the entire set of properties from
//      the Directory. The method illustrated below retrieves the same information, but the data
//      is parsed for you and returned in a HashMap that looks something like this:

// see the ConfigParser class for a description of what the HashMap returned from
// getConfigProperties looks like
```

/** shut down the provider
     */
    public void cleanup() throws CIMException
    {
            // destroy any threads created in initialize()
    }

/** get the Service object that relates to this Provider
     * @return Service
     */
    public SymcObject getService()
    {
            try
            {
                    if (m_Service == null)
                    {
                            // the file name referenced "ExampleProvider.svc" can be in mixed case
                            // as the constructor translates all file names to lower case.
                            // The physical file on disk must be in lower case (enforced by the Makefile)

m_Service = new SymcObject("Symc_Service", "ExampleProvider.svc");
                    }
            }
            catch (SESAException se)
            {
                    se.printStackTrace();
            }
            return (m_Service);
    }

/** the CIM invokeMethod call
     */
    public CIMValue invokeMethod(CIMObjectPath op, String name, Vector in, Vector out)
            throws CIMException
    {
            System.out.println("ExampleProvider.invokeMethod('" + name + "')");

CIMValue ret = new CIMValue("unrecognized method '" + name + "'");
```

Fig. 43C

```
        if (name.equalsIgnoreCase("getconfigdata"))
                ret = getConfigData(in, out);
        else if (name.equalsIgnoreCase("getconfigproperty"))
                ret = getConfigProperty(in, out);

return (ret);
}

/** obtains all config settings for the application
 */
public CIMValue getConfigData(Vector in, Vector out)
{
        if (m_props == null)
                return (new CIMValue(""));

String sRet = "";
        Enumeration enum = m_props.keys();
        while (enum.hasMoreElements())
        {
                String sKey = (String) enum.nextElement();
                String sVal = (String) m_props.get(sKey);
                if (sVal != null)
                        sRet += sKey + "=" + sVal + "\n";
        } if (sRet.length() == 0)
                sRet = "key=value\n";

System.out.println("\n*****Returning config data: '" + sRet + "'");
        return (new CIMValue(sRet));
}

/** obtains a specific, named config property
 */
public CIMValue getConfigProperty(Vector in, Vector out)
{
        if (m_props == null)
                return (new CIMValue(""));

String sParam = null;
        try
        {
                sParam = getParameterString(in, "propName");
        }
        catch (SESAException se)
```

Fig. 43D

```
        {
                return (new CIMValue(""));
        } if (sParam == null)
                return (new CIMValue(""));

// Looks in the private cache of properties to retrieve the value.
        String sVal = (String) m_props.get(sParam);
        if (sVal == null)
                sVal = "";

if (sVal.length() == 0)
                sVal = sParam + ".value";

System.out.println("\n***Returning config property '" + sParam + "' = '" + sVal + "'");
        return (new CIMValue(sVal));
}

/** Used for sending messages between Providers.<P>
 * This method is called from another Provider to inform this Provider of a specific
 * event. The string contains information that can be parsed.
 * @param msg The String representing the message.
 */
public void sendMessage(String msg)
{
}

/** get the name of the Provider
 * @return a string representing the name of this Provider
 */
public String getName()
{
        return (PROVIDER_NAME);
}

/** Informs the Provider of an updated configuration.<P>
 * This is called from the Configuration Provider when there is a new
 * configuration that the Provider should use.
 * @param newConfigs A HashMap representing the configuration properties that
 *              the Provider should use from this point forward. See the ConfigParser
 *              class for a description of the contents of the HashMap
 */
public void applyConfig(HashMap newConfigs)
{
```

Fig. 43E

```
                // Get the properties that we are interested in from the entire set.  The entire
set includes
                // all products and features.  We are interested only in our own application.
                Properties newProps = getCfgPropertySet(newConfigs,
ADV_SAMPLE_APP_FEATURE_ID, "SampleApplication");
                if (newProps == null)
                {
                        System.out.println("no properties found for SWF " +
getSoftwareFeatureId());
                        return;
                }
                // Private cache of properties.
                m_props = newProps;

String sVal = (String) m_props.get(CFGPROP_POLLTIME);
                if (sVal != null)
                {
                        try
                        {
                // Set the poll time in the instance so that the application can use the standard
CIM
                // call getProperty to retrieve it.  This also allows the poll time to become
part of
                // the application's set of state variables. You would put a property here only
if you
                // want it accessible through CIM. If not, keep it only in the private cache.
                                createCIMClient();
                                m_cimClient.setProperty( m_cimPath, "ProviderPollTime",
new CIMValue(sVal) );
                        }
                        catch (CIMException ce)
                        {
                                System.out.println("\n>>>>> Error setting property
ProviderPollTime in instance\n" );
                                System.out.println( ce.toString() );
                        }
                }

// update the local configuration file from the HashMap
                File fiConfig = new File(CONFIG_FILE_NAME);

FileOutputStream os = null;

try
                {
                        os = new FileOutputStream(fiConfig);
                        m_props.store(os, null);
                }
```

Fig. 43F

```
                catch (FileNotFoundException fnf)
                {
                }
                catch (IOException ioe)
                {
                } if (os != null)
                        try
                        {
                                os.close();
                        }
                        catch (IOException ioe)
                        {
                        }
```

// At this point the provider could communicate with its application to push the new configuration
// to the application. Alternatively, the application could poll for changes to the configuration
// file created above and read its configuration from the file.

```
// Check to see if the advanced sample application is listening on the pre-defined port
                try
                {
                        // The port is defined in the advanced sample app.
                        Socket sock = new Socket("127.0.0.1", 4990);

if (sock != null)
                        {
                        // If we're able to get a connection, then the advanced sample app is
running
                        // and waiting for a connection on localhost:4990. Attempt to write
out the data.
                        // The data will be the value that was assigned to "ProviderPollTime".
                        // Note that the data sent can also be custom xml settings that will get
parsed
                        // by the application.
                                BufferedOutputStream ostream = new BufferedOutputStream(sock.getOutputStream());

ostream.write(sVal.getBytes());

// Cleanup
                                ostream.close();
                                sock.close();
                        }
                }
```

Fig. 43G

```
                catch (UnknownHostException e)
                {
                }
                catch (IOException e)
                {
                }
                catch (Exception e)
                {
                }
        }

/** get the Product ID for this Provider
         * @return an integer representing the Product ID that this Provider is associated
with.
         */
        public int getProductId()
        {
                return (ADV_SAMPLE_APP_PRODUCT_ID);
        }

/** get the Software Feature ID
         * @return an integer representing the Software Feature ID that this Provider is
         *               associtated with, or 0 if the Provider is not associated with a
specific
         *               feature ID.
         */
        public int getSoftwareFeatureId()
        {
                return (ADV_SAMPLE_APP_FEATURE_ID);
        }

/** load the configuration file from disk
         */
        private void loadConfigFile() throws CIMException
        {
                File fiConfig = new File(CONFIG_FILE_NAME);
                if (!fiConfig.exists())
                        throw new CIMException("Symc_ExampleProvider: cannot find
config file '" + CONFIG_FILE_NAME + "'");

m_props = new Properties();
                try
                {
                        m_props.load(new FileInputStream(fiConfig));
                }
```

Fig. 43H

```
            catch (FileNotFoundException fnf)
            {
                    throw new CIMException("Symc_ExampleProvider: cannot load
config file '" + CONFIG_FILE_NAME + "'");
            }
            catch (IOException ioe)
            {
                    throw new CIMException("Symc_ExampleProvider: error reading
configuration file");
            }
    } private void createCIMClient() throws CIMException
    {
            if (m_cimPath == null)
            {
                    m_cimPath = new CIMObjectPath( PROVIDER_NAME );
                    m_cimPath.addKey( "CreationClassName", new CIMValue(
"Symc_Service" ) );
                    m_cimPath.addKey( "Name", new CIMValue(
"30020101.exampleprovider" ) );
                    m_cimPath.addKey( "SystemCreationClassName", new CIMValue(
"Symc_ComputerSystem" ) );
                    m_cimPath.addKey( "SystemName", new CIMValue( "localhost" ) );
            } if (m_cimClient == null)
            {
                    CIMNameSpace cns = new CIMNameSpace( "localhost", "root" );
                    m_cimClient = new CIMClient( cns, null, null, CIMClient.LOCAL );
            }
    }
}
```

SECURITY MANAGEMENT SYSTEM INCLUDING FEEDBACK AND CONTROL

BACKGROUND OF THE INVENTION

1. Field of the Invention

The present invention relates generally to network security, and more particularly to using feedback and control to enhance network security.

2. Description of Related Art

Network security is typically provided by multi-vendor security services and products. Each security service and product typically generates a security event in response to one or more specified detected actions and generates a log of the security events. Typically, each vendor for a security service and product utilizes a format for the security event that is unique to that vendor.

System administrators monitor the security events and/or logs to determine whether any modification to the security services and/or products are required to maintain network security. Unfortunately, in an enterprise network, the volume of security events makes it difficult to monitor the network security in real time. Thus, while there may be a well-defined security policy, assuring the policy is properly implemented at all times on the network is difficult, if not impossible.

This problem is exacerbated because there is not a common technique or structure for security events. Consequently, a system that attempts to monitor security events from multi-vendor security services and products is required to deal with the various formats, protocols, structures etc., associated with each security product and/or service on the network. For this reason, an integrated approach to network security management is a very complex and difficult to implement. Moreover, an approach developed for one enterprise network many not be applicable to another enterprise network due to the differences in the network structure, the security products and services, and the use of the network.

SUMMARY OF THE INVENTION

A service-oriented system includes a security management system. The security management system includes a network security feedback and control system. The security feedback and control system receives a plurality of normalized events and issues at least one normalized command in response to a predefined event in the plurality of normalized events.

The service-oriented system also may include, but is not limited to a service oriented architecture that includes any combination of a bootstrap service, an inventory service, an operational state service, a configuration service, a logging service, an alerting service, a command service, a notification service, and/or a heartbeat service.

In one embodiment, the network security feedback and control system includes a feedback and control manager. The feedback and control manager processes the at least one normalized event and generates the at least one normalized command.

The feedback and control manager includes, in one embodiment, at least one rules engine. The rules engine includes a rule having a condition object that uses information from the at least one normalized event.

The service-oriented system further includes, in one embodiment, a managed node coupled to the security management system. The managed node includes a security management agent, which in one embodiment, executes on the managed node.

In still another embodiment, the system includes at least one managed product coupled to the security management agent. The at least one managed product forwards at least one of the normalized events to the security management agent and receives normalized commands from the security management agent.

In another embodiment, a system includes an event subscription filter and a feedback and control manager coupled to the event subscription filter. The system further includes a knowledge database coupled to the feedback and control manager. The system also includes a directory coupled to the feedback and control manager. In one embodiment, the system includes a configuration adapter connected between the feedback and control manager and the directory.

A method, in one embodiment, includes receiving events from managed products by a network security feedback and control system, and using information in the events by the network feedback and control system in dynamically implementing a predefined security policy.

A computer-program product comprises a computer-readable medium containing computer program code for a method including:

receiving events from managed products by a network security feedback and control system; and
 using information in the events by the network feedback and control system in dynamically implementing a predefined security policy.

A structure includes:

means for receiving events from managed products by a network security feedback and control system; and
 means using information in the events by the network feedback and control system in dynamically implementing a predefined security policy. In another embodiment, a method includes:
 collecting events, from a plurality of managed products in a first tier, in a second tier object;
 forwarding the events to a third tier object; and
 routing the events to an event sink in the third tier object for processing.

In one embodiment of this method, the event sink includes a security feedback and control system. The second tier object includes a security management agent. The third tier object includes a security management server.

In another embodiment, a computer-program product comprises a computer-readable medium containing computer program code for a method including:

collecting events, from a plurality of managed products in a first tier, in a second tier object;
 forwarding the events to a third tier object; and
 routing the events to an event sink in the third tier object for processing.

Hence, in this embodiment, a structure includes:

means for collecting events, from a plurality of managed products in a first tier, in a second tier object;
 means for forwarding the events to a third tier object; and
 means for routing the events to an event sink in the third tier object for processing.

Another method includes:

collecting security events having predefined structures from a plurality of managed products by a security management agent;
 forwarding the security events to a security management system upon a connection to the security management system being available; and
 forwarding the security events to a network management application upon the connection to the security management system being unavailable.

Accordingly, a computer-program product comprises a computer-readable medium containing computer program code for a method comprising:

collecting security events having predefined structures from a plurality of managed products by a security management agent;

forwarding the security events to a security management system upon a connection to the security management system being available; and forwarding the security events to a network management application upon the connection to the security management system being unavailable.

Also, a structure includes:

means for collecting security events having predefined structures from a plurality of managed products by a security management agent;

means for forwarding the security events to a security management system upon a connection to the security management system being available; and means for forwarding the security events to a network management application upon the connection to the security management system being unavailable.

In a further embodiment, a method includes:

issuing a command for a security managed product wherein the issuing the command is performed on a first computer system;

pinging a security management agent following the issuing the command wherein the security management agent is executing on a second computer system coupled to the first computer system; and downloading the command securely by the security management agent following the pinging the security management agent.

For this embodiment, a computer-program product includes a computer-readable medium containing computer program code for a method including:

issuing a command for a security managed product wherein the issuing the command is performed on a first computer system;

pinging a security management agent following the issuing the command wherein the security management agent is executing on a second computer system coupled to the first computer system; and downloading the command securely by the security management agent following the pinging the security management agent.

A structure, for this embodiment, includes:

means for issuing a command for a security managed product wherein the issuing the command is performed on a first computer system;

means for pinging a security management agent following the issuing the command wherein the security management agent is executing on a second computer system coupled to the first computer system; and means for downloading the command securely by the security management agent following the pinging the security management agent.

In a still further embodiment, a method includes:

specifying a plurality of hierarchical security event structures for use by heterogeneous security managed products; and including in the plurality of hierarchical event structures information for security management of the heterogeneous security managed products.

For this embodiment, a computer-program product includes a computer-readable medium containing computer program code for a method including:

specifying a plurality of hierarchical security event structures for use by heterogeneous security managed products; and including in the plurality of hierarchical event structures information for security management of the heterogeneous security managed products.

A structure, for this embodiment, includes:

means for specifying a plurality of hierarchical security event structures for use by heterogeneous security managed products; and means for including in the plurality of hierarchical event structures information for security management of the heterogeneous security managed products.

A memory structure includes a security event structure. The security event structure includes an event identifier field, an event class identifier field, and a category field. The security event structure further includes severity field, and a software feature identifier field.

In still yet a further embodiment, a method includes:

collecting security events having predefined structures from a plurality of managed products by a security management agent; and queuing the security events by the security management agent.

For this embodiment, a computer-program product includes a computer-readable medium containing computer program code for a method including:

collecting security events having predefined structures from a plurality of managed products by a security management agent; and queuing the security events by the security management agent.

For this embodiment, a structure includes:

means for collecting security events having predefined structures from a plurality of managed products by a security management agent; and means for queuing the security events by the security management agent.

In another embodiment, a method includes:

collecting security events having predefined structures from a plurality of managed products by a security management agent;

queuing only security events of the security that are not alert events transferring the alert events to an output buffer without queuing the alert events.

BRIEF DESCRIPTION OF THE DRAWINGS

FIG. 19B is an illustration of a network event memory structure that is used for the object of the network event class of FIG. 19A according to one embodiment of the present invention.

FIGS. 21B_1 and 21B_2 are an illustration of a host intrusion event memory structure that is used for the object of the host intrusion event class of FIG. 21A according to one embodiment of the present invention.

FIGS. 22B_1 and 22B_2 are an illustration of a network intrusion event memory structure that is used for the object of the network intrusion event class of FIG. 22A according to one embodiment of the present invention.

FIGS. 26C_1 and 26C_2 are an illustration of a firewall network event memory structure that is used for the objects of the firewall event class of FIGS. 26A and 26B according to one embodiment of the present invention.

FIGS. 27B_1, 27B_2 and 27B_3 are an illustration of a firewall connection statistics event memory structure that is used for the object of the firewall connection statistics event class of FIG. 27A according to one embodiment of the present invention.

FIGS. 30B_1 and 30B_2 are an illustration of a data incident event memory structure that is used for the objects of the data incident event class of FIG. 30A according to one embodiment of the present invention.

FIGS. 31B_1 and 31B_2 are an illustration of a data virus incident event memory structure that is used for the object of the data virus incident event class of FIG. 31A according to one embodiment of the present invention.

FIGS. 39B_1 and 39B_2 are an illustration of a malware advisory event memory structure that is used for the objects of the malware advisory event class of FIG. 39A according to one embodiment of the present invention.

FIGS. 40B_1 and 40B_2 are an illustration of a malware activity event memory structure that is used for the objects of the malware advisory event class of FIG. 40A according to one embodiment of the present invention.

FIG. 42 is an example of XML code in a PIX file for a simple sample managed product according to one embodiment of the present invention.

FIGS. 43A to 43I are an example of a provider implemented in the JAVA programming language according to one embodiment of the present invention.

Figure 1:
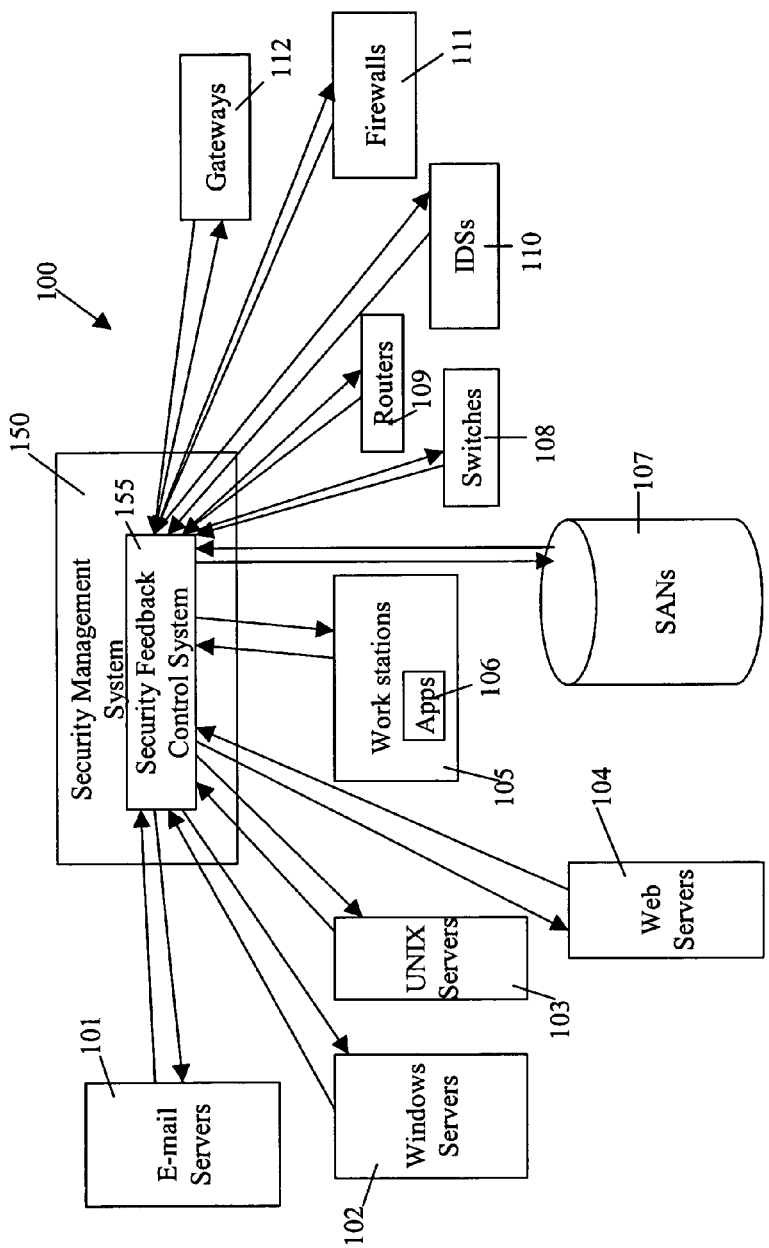
FIG. 1 is a high level diagram of a system that includes a security management system having a security feedback and control system that dynamically implements a security policy for the system according to one embodiment of the present invention.

In the drawings and the following detailed description, elements with the same reference numeral are the same or equivalent elements. Also, for three digit reference numerals, the first digit of the reference numeral is the figure number in which the corresponding element first appears. For four digit and five digit reference numerals, the first two digits of the reference numeral are the figure number in which the corresponding element first appears.

DETAILED DESCRIPTION

System 100 uses automatic feedback and control in a heterogeneous environment, in one embodiment, and in a homogeneous environment, in another embodiment, to secure a network infrastructure by iterative convergence of the network's security structure to meet a security policy. Following initialization, security feedback control system 155 of security management system 150 makes dynamic adjustments to system 100, using bi-directional services that are controlled via policy decision components, without user intervention.

Unlike prior art systems that presented information to a console for analysis by a security expert, and relied upon the security expert to initiate appropriate actions, security feedback and control system 155 analyzes security event data directly and initiates appropriate actions. The actions are not limited to reconfiguring firewalls and/or intrusion detection systems. The actions may include scanning storage devices, isolating devices, isolating users, isolating information, isolating programs, reconfiguring applications and/or operating systems, updating applications and/or operating systems, and other operations required to maintain the security of system 100 according to the specified security policy.

Moreover, security feedback and control system 155 is not limited to implementing single acts in response to a particular security threat or attack. Rather, system 155 dynamically monitors and tightens the security of system 100 over and above the capabilities of any individual security service. Security feedback and control system 155 monitors and tracks the current state of the network environment and continuously adjusts security sensors and security enforcement points to converge on a steady secure state.

Security feedback and control system 155 receives security events from a variety of devices including email servers 101, WINDOWS servers 120 (WINDOWS is a trademark of Microsoft Corp. of Redmond, Wash.), UNIX servers 103 (UNIX is a trademark of American Telephone and Telegraph Company Corporation, New York, N.Y.), Web servers 104, workstations 105, applications 106, storage area networks 107, switches 108, routers 109, intrusion detection systems 110, firewalls 111, gateways 112, and any other elements, hardware or software, included in a computer network that are associated with the security of the network over which the elements communicate. In FIG. 1, servers 102 and 103 are characterized by the operating system and servers 101 and 104 are characterized by the function performed. These examples are illustrative only of servers in general and are not intended to limit the invention to the specific embodiments of servers illustrated. FIG. 1 illustrates the heterogeneous nature of system 100.

As, explained more completely below, the security events are normalized security events, i.e., have a hierarchical structure that includes at least a base security event, so that security and feedback control system 155 is extensible without concern to the particular type or manufacturer of products controlled by security management system 150. In particular, each security sensor and security enforcement point, independent of vendor, operating system, etc., utilizes security events that include at least a predefined security base event.

Security feedback and control system 155 analyses information in the security events and automatically generates normalized control instructions. The normalized control instructions are provided to appropriate products in system 100 to implement the security policy embedded in security feedback and control system 155.

As used herein, a security event includes a raw security event, a security alert event, sometimes called alert, and a security incident event, sometimes called incident. In the following description, reference to an event, an alert, or an incident should be interpreted as a security event, a security alert, or a security incident, respectively. Herein, a security event is an event associated with a security aspect of a network that includes at least information in the security base event.

Hence, in one embodiment, security and feedback control system 155 processes raw events, in another embodiment processes alerts, in yet another embodiment processes incidents, and in still another embodiment processes any desired combination of raw events, alerts, and incidents and generates, in each instance, appropriate control instructions, e.g., a command or a configuration change.

The products in system 100 receiving the control instructions act upon the instructions. A product, typically, at least generates a normalized security event that indicates whether the control instructions were executed successfully. In response to these successful or unsuccessful normalized security events, feedback and control system 155 may invoke further control instructions for the same, or other products. This iterative process of feedback and control is used to converge on a steady security state for the network.

As explained more completely below, the managed products integrate their security event streams via an extensible security management agent. The security management agent forwards the event streams to a middle tier of servers in security management system 150.

This middle tier of servers routes the events to other servers including for example security feedback and control system 155, which are event sinks. The middle tier of servers also removes the requirement that a managed product know the location of a service supported by security management system 150. The security management agent also submits queries to the middle tier of servers that in turn route the query to the appropriate event sink, and receives responses to the queries on behalf of the managed products associated with the security management agent.

Hence, one service provided by security management system 150 is feedback and control service for network security management. While network security management, and in particular computer network security management are used to illustrate an embodiment of this invention, the feedback and control service is not limited to only network security. For example, a similar system could be implemented with a distributed database system and used to monitor and control queries on the database. As explained more completely below, in addition to the feedback and control service, in one embodiment, security management system 150 also includes other services and functions such as product registration and discovery, product policy configuration management, incident data collection and management, security event and alert logging, alert notification management, file transfer and remote task invocation on behalf of a product, and security management console operations.

Figure 2:
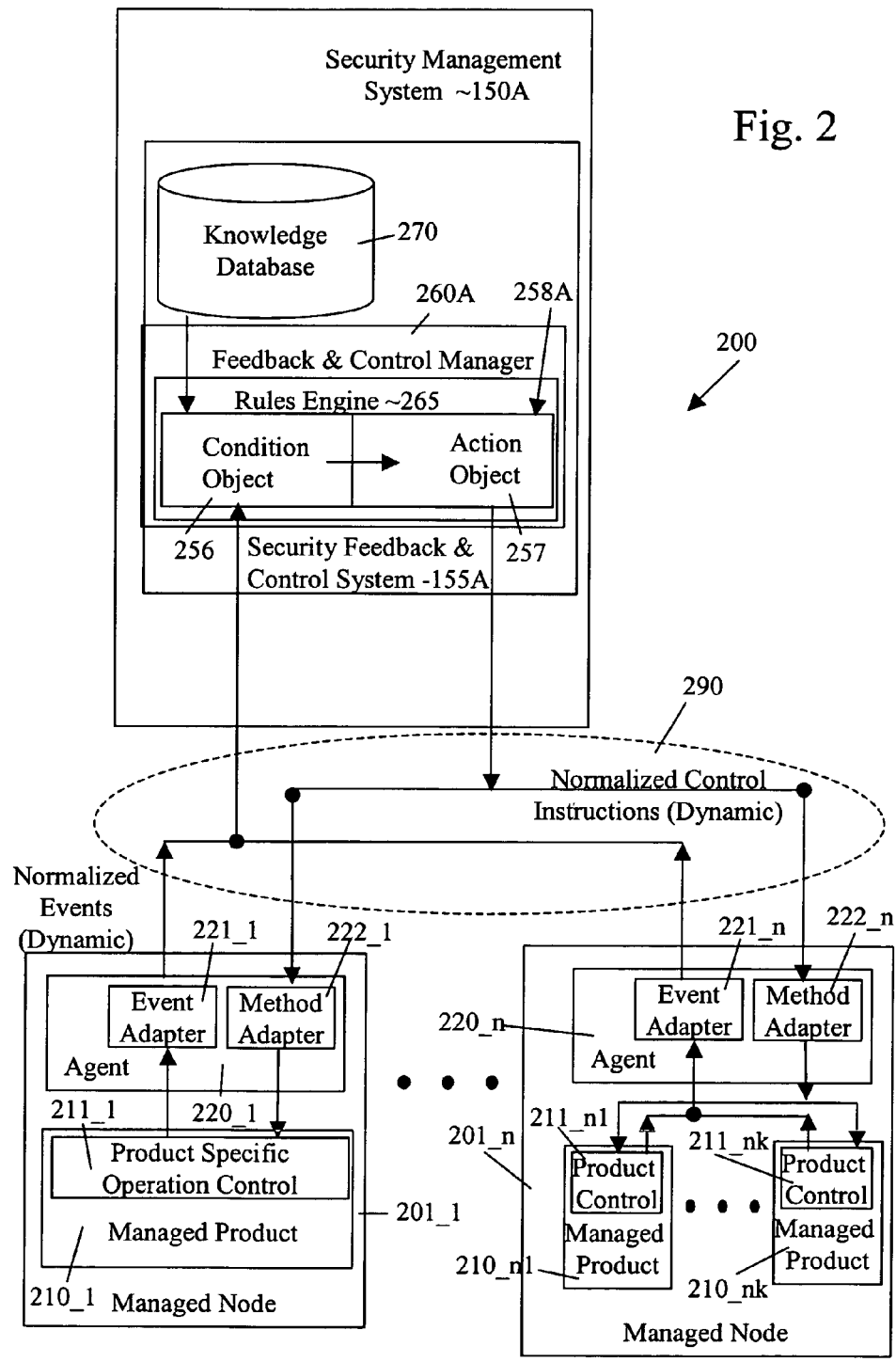
FIG. 2 is a more detailed diagram of one embodiment of the system of FIG. 1 according to one embodiment of the present invention.

FIG. 2 is a more detailed block diagram of one embodiment of security management system 150, i.e., security management system 150A in a network system 200. In this embodiment, devices 101 to 112 are represented by managed nodes 201_1 to 201_n, where n is an integer indicating a number of security management agents 220_1 to 220_n coupled to security feedback and control system 155A. Typically, each managed node 201_i includes at least one managed product 210_j.

A managed product 210_j is used in a generic sense and can be a physical device or computer program code in the form of an application or an operating system, for example. Sometimes a managed product is referred to as an application. In one embodiment, managed products include but are not limited to any one of, or any combination of anti-virus applications, firewalls, intrusion detection systems, vulnerability assessment applications, hubs, routers, switches, computers including servers, workstations, and personal computers, and access control lists.

In the example of FIG. 2, managed node 201_1 includes a single managed product 210_1, while managed node 201_n includes k managed products, where k is an integer. Each managed product 210_j, where j ranges from one to the total number of managed products, includes a product specific operation control module 211_j that is used in communicating with managed product 210_j and with a security management agent 220_m, where m ranges from one to n in FIG. 2.

As explained more completely below, each managed product 210_j registers with security management agent 220_m and with security management system 150A. Managed product 201_j provides security management system 150A with specified information such as identification and configuration data. In one embodiment, this information is provided using a schema in the eXtensible Markup Language (XML), hereinafter XML.

Product specific control module 211_j for managed product 210_j has a security event package that includes a security event class or security event classes needed to communicate with security feedback and control system 155A. In general, if the product has a library for the security event package, the product has the security event package natively integrated. Alternatively, the product can be coupled to an event collector that provides the security event package. As explained more completely below, in one embodiment, a security event is generated in the form of fields in table where each field stores specified information. The table format facilitates storing the security events in a database.

Security management agent 220_m has standardized programmatic interfaces for receiving normalized command instructions from security control system 155A and for transmitting normalized events to security feedback and control system 155A. In the embodiment of FIG. 2A, the standardized interface for transmitting events to security feedback and control system 155A is included in an event adapter 221_i. The standardized interface for receiving normalized command instructions is included in a method adapter 222_i.

As explained more completely below, when a security related action occurs, product specific control module 211_j generates a security event having a predefined structure and content, and forwards the security event to security management agent 220_m. Security management agent 220_m adds information to the security event. In one embodiment, depending upon the information in the security event, e.g., did product specific control module 211_j mark the event as an alert, security management agent 220_m either transmits the event directly to security feedback and control system 155A via network 290, or queues the event for subsequent transfer to security feedback and control system 155A over network 290.

Thus, security management agent 220_m acts as a collector of events for managed products and as an interface to security management system 150A. The collection of events is independent of the particular types of managed products coupled to security management agent 220_m. Consequently, the problem of controlling a system with multi-vendor security products and/or services is minimized through the use of security events having predefined structures and content.

In one embodiment, security management agent 220_m maintains a queue for each managed product 210_j registered with security management agent 220_m. In another embodiment, security management agent 220_m maintains a single queue for all managed products 210_j registered with security management agent 220_m. Security management agent 220_m flushes each queue to security management system 150 according to one or more predefined criterion.

Upon receipt of an event from security management agent 220_m, security management system 150 logs the event, in one embodiment, and transfers the event to security feedback and control system 155A. As explained more completely below, in one embodiment, not every event is passed to security feedback and control system 155A. Rather, only events that are processed by security feedback and control manager 260A are passed to security feedback and control system 155A.

In one embodiment, security feedback and control manager 260A includes at least one rules engine 265. However, in other embodiments, security feedback and control manager 260A includes a plurality of rules engines where each rules engines process security information. For example, one rules engine processes a set of raw events, while another rules engine processes alerts.

The rules engine processing alerts could, for example, eliminate false alerts and pass the remaining valid alerts to yet another rules engine for analysis. Hence, the plurality of rules engines can act independently, or can be cascaded in one embodiment.

In the example of FIG. 2, rules engine 265 is a dynamic decision point that implements a security policy. Rules are information structures in the form of cascaded condition-action object pairings, e.g., condition object 256 and action object 257 of rule 258A. Dynamic input to condition object 256 is information from an event, or other security information derived from an event or events. Static or pseudo-static inputs to the condition and action objects are from a knowledge base 270 with generic knowledge of the security enforcement and detection points. For example, security enforcement and detection point knowledge base 270A, in one embodiment, includes known validated security threats, demographic and geographic information about the managed products.

As an example, consider the embodiment where managed product 210_j is an anti-virus application that has detected and quarantined an unknown virus and has sent an event to rules engine 265. At least the fields of the security base event that are inherited by the event are generic and do not depend upon the specific characteristics of managed product 210_j. However, information in these fields is managed product specific, such as an identifier assigned to managed product 210_j. As explained more completely below, managed product 210_j can define a custom event that adds fields to the fields for the security base event, for example. The additional fields in the custom event could be specific to managed product 210_j only, but the format and information in each field is predefined. Herein, when it is stated that information in a field is predefined, it means that the information to be supplied in the field is predefined, but the actual value of the information is determined at the time the information is supplied in the event.

When rules engine 265 receives the event from managed product 210_j, the information in the event is tested in the condition objects. A condition object that corresponds to the event for a detected and quarantined virus in rules engine 265 is true and so the corresponding action object is executed.

In one embodiment, the action is to send a command to each method adapter 222_m in a security management agent 220_m that has an anti-virus application registered. The command is to run a method that reloads the anti-virus definitions, e.g., get the latest version of the anti-virus definitions, and load them.

In another embodiment, the command is sent to the specific security management agent 2220_m that transmitted the original event. In another example, the command is sent to all security management agents that support an anti-virus application that has not updated the virus definitions within a predefined period.

When method adapter 222_m receives the command, method adapter 222_m transfers the command to product specific operation control module 211_j for managed product 210_j, which in this example is an anti-virus application. Product specific operation control module 211_j translates the reload virus definitions command into a command that can be executed by managed antivirus product 210_j and sends the translated command to managed product 210_j.

Upon completion of execution of the translated command, managed product 210_j returns either a success or failure to product specific operation control module 211_j. Product specific operation control module 211_j builds a command completion status event indicating the success of failure of the command to reload the anti-virus definitions and sends the command completion status event to event adapter 221_m that in turn sends the event to security management system 150.

The completion status event is sent to rules engine 265. If the completion status is successful, a command object for successful completion of the reload anti-virus definition command is true. The action object for that condition object is executed. In this example, the action object is to send a rescan volume command to security management agent 220_m.

Conversely, if the completion status is unsuccessful, a command object for unsuccessful completion of the reload anti-virus definition command is true. The action object for that condition object is executed. In this example, the action object is to isolate managed node 201_m containing managed product 210_j and to send a notification to the system administrator for managed node 201_m.

In either case, the appropriate command is transmitted to the appropriate method adapter and to a product specific operation control module and ultimately to a managed product. The success or failure of execution of the command is reported back to rules engine 265. Thus, security management system 150A has automatically configured the appropriate managed node or nodes appropriately for the original security event, without waiting for a system administrator to detect the problem and initiate an appropriate response.

Figure 3:
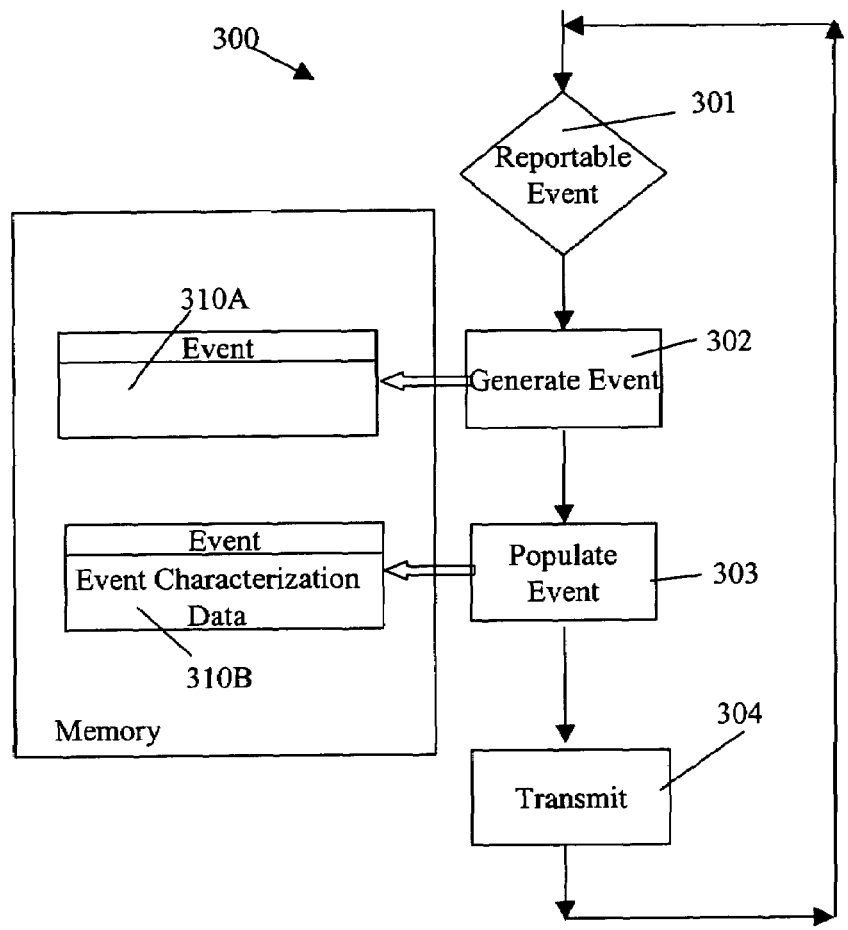
FIG. 3 is a process flow diagram for generating and populating a normalized security event structure, e.g., a predefined structure for storing predefined information, by a managed product according to one embodiment of the present invention.

FIG. 3 is a process flow diagram an event generation process 300 according to one embodiment of the present invention. When a security-related action occurs, product specific operation control module 211_j transfers from reportable event check operation 301 to generate event operation 302. Generate event operation 302 creates an event 310A in a memory 330 and transfers processing to populate event 303.

Populate event operation 303 adds event characterization data 310B to event 310A. In one embodiment, operations 302 and 303 are performed using an interface that includes a plurality of methods. When a method in the interface is called, the method adds a field to the event structure that includes the information associated with that field. Hence, in this embodiment, the generation and population of the event are not discrete operations.

Also, in one embodiment, the interface used to generate the event examines a locale parameter and based upon the locale parameter correctly converts event data to a UTF-8 format. In this embodiment, both Unicode and multi-byte event data strings are converted to the UTF-8 format. The UTF-8 format encoding is the encoding in which event data is sent to security management system 150A. The use of UTF-8 encoding is known to those of skill the art. For example, see F. Yergeau, "UTF-8, a transformation format of ISO 10646," RFC 2279, January 1998, which is incorporate herein by reference as evidence of the level of skill in the art.

Typically, event characterization data 310B includes: an event identifier, a class identifier, a product version string, a software feature ID, a computer name of the computer on which the managed product is running, a computer IP address, a computer IP subnet, an identifier for the computer on which the managed product is running, a MAC address of the network card in the computer, an event category, and an event severity as explained more completely below. Upon completion, populate event operation 303 transfers processing to transmit operation 304.

Transmit operation 304 transfers event 310A to security management agent 220_m. In one embodiment, the transfer uses XML over HTTP to transfer event 310A. Before initiation of process, 300, communication with agent 220_m is established, e.g., a handshake with agent 220_m is initialized to establish a connection. When managed product 210_j closes, all connections with agent 220_m are closed using, in one embodiment, a shutdown method.

Upon receipt of event 310A, process 400 (FIGS. 4A and 4B) that is executed by security management agent 220_m transitions from event available check operation 401 to valid event check operation 402.

Valid event check operation 402 determines whether event 310A is a valid event. In one embodiment, valid event check operation 402 determines whether event 310A contains bad data, e.g., invalid data, no application identifier, no software feature identifier, an unknown event type, no product version, or an invalid locale. If any one of these is missing or invalid, event 310A is considered invalid. If event 310A is valid, processing transfers to populate event operation 404 and otherwise transfers to send error operation 403.

In send error operation 403, an appropriate error identifier is returned to product specific control module 211_j. Upon completion, send error operation 403 returns to event available check operation 401.

Populate event operation 404 adds time stamp and location data 410A to event 310A. Typically, time stamp data includes a time the event was created and a time the event was logged by security management agent 220_m. Location data includes a domain of the computer running managed product 210_j, a user name, and an organizational unit of the computer, as explained more completely below. In one embodiment, upon completion, populate event operation 404 transfers processing to transfer direct check operation 405.

As used herein, an event includes raw events, alert events, and incident events. Raw events are events that are not either alert events or incident events.

In one embodiment, managed product 210_j marks a field in event 310A to request direct transfer of event 310A through security management agent 220_m to security feedback and control system 155A. In another embodiment, when a managed product 210_j registers with security management agent 220_m, managed product 210_j defines severity codes that correspond to events, alert events and incident events.

In addition, or alternatively, a combination of events can be part of an alert configuration. Security management agent 220_m knows these events are in the alert configuration, but when these events occur, security management agent 220_m expedites delivery of the events by sending these events, one by one, since the events may happen over time, in direct mode, rather than queueing the events for delivery. The logging service also knows these are events that take part in an alert configuration, so the logging service passes the information to the alert service. The alert service generates an alert, when any or all of the events that make up a given alert configuration are received within the proper frame of time, or number.

In this embodiment, events in an alert configuration, alert events and incidents are transferred directly through security management agent 220_m to security and feedback control system 155A. In either embodiment, raw events are placed in a queue for subsequent transfer to security feedback and control system 155A.

Hence, if event 310A is an event in an alert configuration, an alert event or an incident event, transfer direct operation 405 transfers to transmit operation 406 and otherwise transfers to queue full check operation 407. Transmit operation 406 places event 310A in an output buffer for transfer via a secure transfer methodology over network 190 to security feedback and control system 155A. In one embodiment, the event is transferred using Web Based Enterprise Management (WBEM) compliant XML over HyperText Transport Protocol (HTTP).

In one embodiment, if a connection is not available with security management system 150A, transmit operation 406 places event 310A in a queue for managed product 210_j, if a queue exists. If no queue exists, event 310A is discarded and an error condition is logged. An alternative embodiment is described below with respect to operations 413, 416, 417, and 418.

If event 310A is a raw event, queue full check operation 407 determines whether the event queue for managed product 210_j is full. If the event queue is full, check operation 407 transfers to send error operation 408 and otherwise transfers to queue event operation 409.

Send error operation 408 sends a message to managed product 210_j indicating that security management agent 220_m is not accepting events. In one embodiment, the message includes an identifier indicating the event queue is full. Upon completion, send error operation 408 transfers to event available check operation 401.

Queue event operation 409 places event 310A in a queue for managed product 210_j and transfers processing to transfer queue check operation 410. The specific implementation of transfer queue check operation 410 depends upon the queuing method utilized by security management agent 220_m. For example, in a first embodiment, security management agent 220_m has a separate queue for each managed product registered with security management agent 220_m. In another embodiment, security management agent 220_m includes a single queue for all managed products registered with security management agent 220_m, i.e., a queue for the managed node.

In each embodiment, the basic operations performed in transfer queue check operation 410 are equivalent, but the flush criteria considered and the setting of the parameters defining the flush criteria may be different if multiple queues are implemented.

Figure 4A:
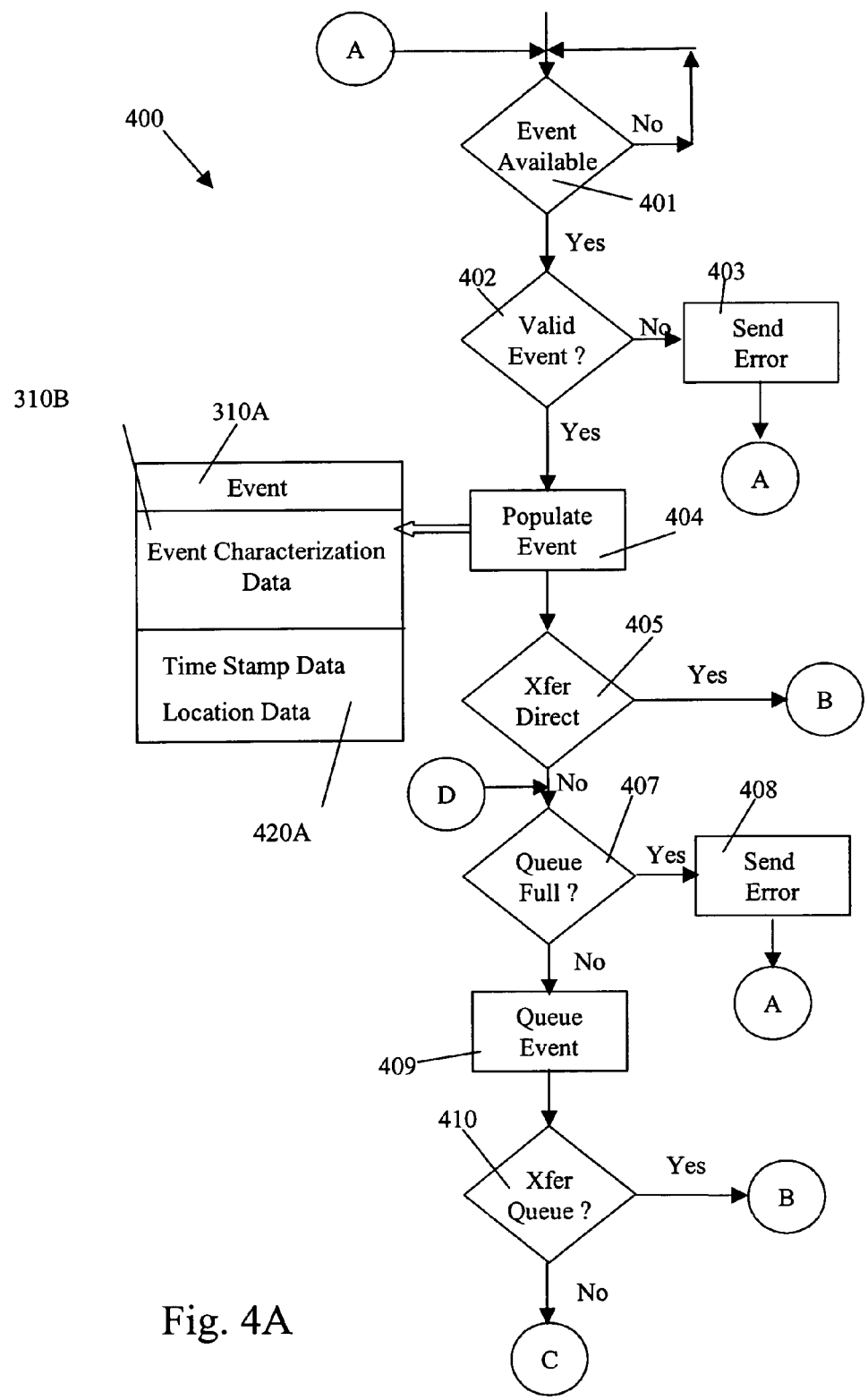
FIGS. 4A and 4B are a process flow diagram for collecting and forwarding security events by a security management agent according to one embodiment of the present invention.
Figure 4B:
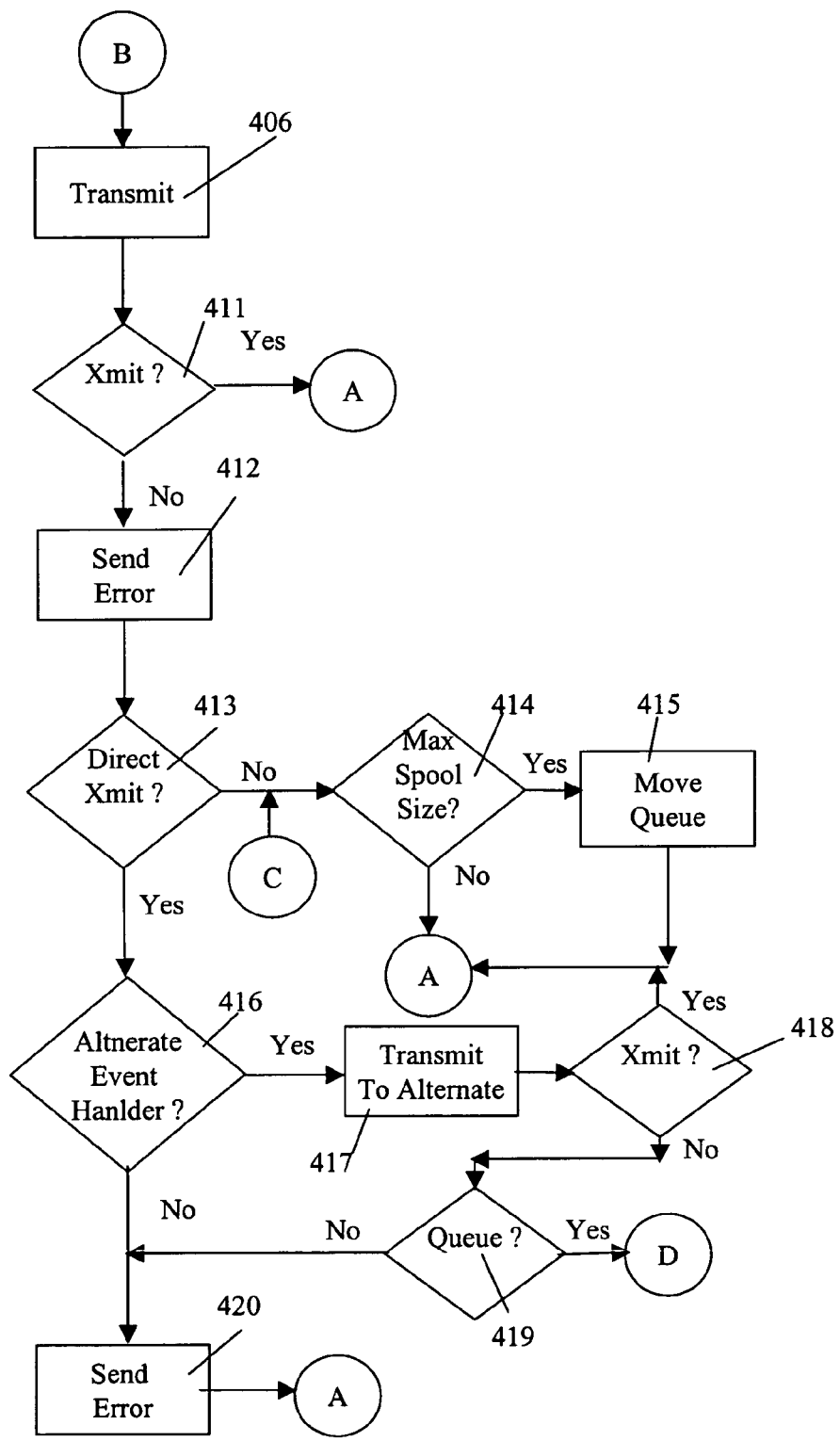

In general, there is at least one flush criterion associated with each queue maintained by security management agent 220_m. However, a plurality of flush criterion can be associated with a queue. If any flush criterion is true, transfer queue check operation 410 transfers to transmit operation 406 and otherwise transfers to maximum spool size check operation 414 (FIG. 4B).

In this embodiment, transfer queue check operation 410 (FIG. 4A) is one method for assuring that each managed product 210_j, if multiple queues are used, and/or each managed node, if a single queue is used, has access to security feedback control system 155A. This method eliminates the complexity of implementing a round robin queue scheme or other fairness protocol and assures that the connection to security feedback and control system 155A is available to all managed products.

Figure 5A:
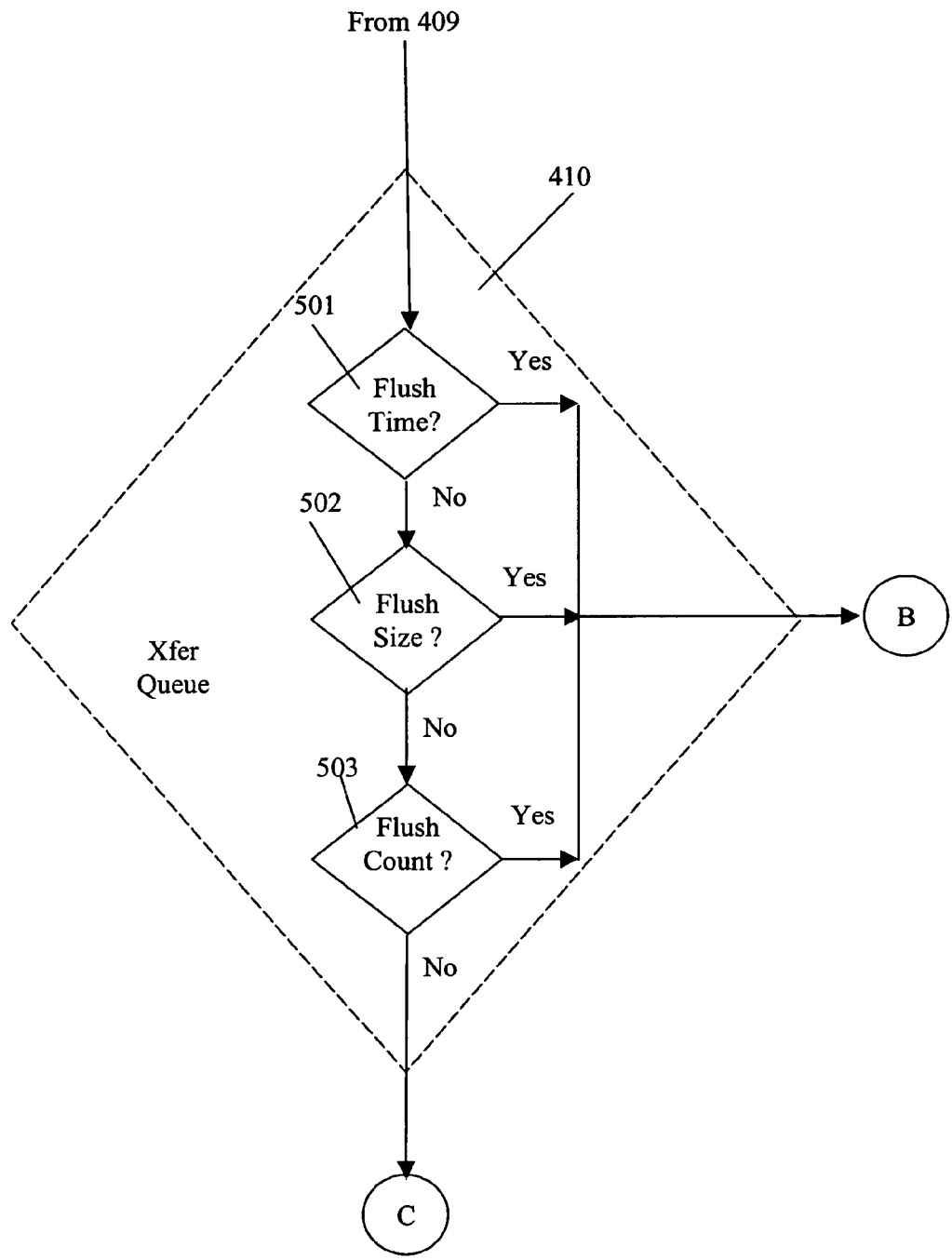
FIG. 5A is a more detail process flow diagram of the transfer queue check operation of FIG. 4 according to one embodiment of the present invention.
Figure 5B:
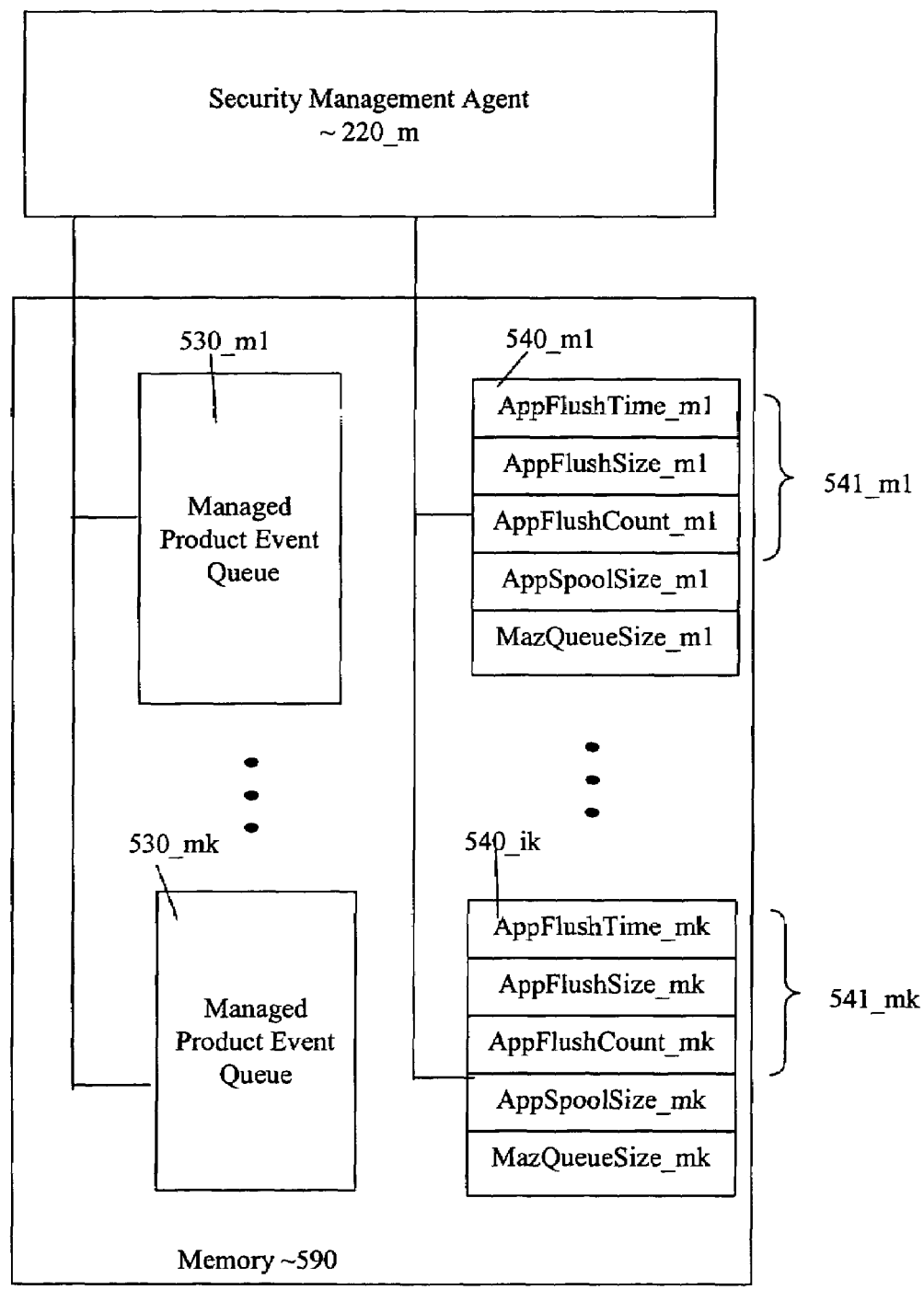
FIG. 5B is a diagram of a memory including managed product security event queues and stored queue management parameters according to one embodiment of the present invention.

One embodiment of transfer queue check operation 410 is illustrated in FIG. 5A. In this embodiment, security management agent 220_m (FIG. 5B) has k managed products and so maintains k managed product queues 530_m1 . . . 530_mk, one for each managed product in this example.

In this example, security management agent 220_m has a set of queue parameters 540_m1 . . . 540_mk for each managed product queue 530_m1 . . . 530_mk, respectively. In the embodiment of FIG. 5A, three queue flush criterion are used. Each criterion is defined by a flush parameter.

While in this embodiment, each managed product queue has three queue flush criterion, this is illustrative only and is not intended to limit the invention to this specific number of criteria, or to limit the invention to having the same number of criterion for each managed product queue.

Thus, each set of queue parameters 540_mr, where r can be any of 1 to k, includes a set of flush parameters 541_mr. The flush parameters are product flush time AppFlushTime_mr, product flush size AppFlushSize_mr, and product flush count AppFlushCount_mr, each of which is described more completely below.

For convenience, different reference numerals AppFlushTime_mr, AppFlushSize_mr, and AppFlushCount_mr are used in each set of flush parameters 541_mk. This is for reference purposes only and should not be interpreted as defining any relationship between the flush parameters in the various sets of flush parameters.

Product flush time AppFlushTime_mr is the number of seconds that security management agent 220_m queues events for managed product 210_mr before attempting to send the events on to security and feedback control system 155A. In one embodiment, product flush time AppFlushTime_mr is an integer in the range of 10 (10 seconds) to 43,200 (12 hours), and has a default value of 300 (300 seconds).

Product flush size AppFlushSize_mr is a size, in kilobytes, of events in managed product queue 530_mr that security management agent 220_m holds before attempting to send at least that size of the events on to security and feedback control system 155A. In one embodiment, product flush size AppFlushSize_mr is an integer in a range of 3 to 1000, and has a default of 50, e.g., 50 KB.

Product flush count AppFluBhCount_mr is a number of events in managed product queue 530_mr that causes security management agent 220_m to attempt to send at least that number of events on to security and feedback control system 155A. In one embodiment, product flush count AppFlushCount_mr is an integer in a range of 20 and 2000, and has a default value of 35.

Product spool size AppSpoolSize_mr is a size in kilobytes of managed product queue 530_mr that security management agent 220_m holds in a volatile memory. If the size of managed product queue 530_mr exceeds product spool size AppSpoolSize_mr, managed product queue 530_mr is moved from a volatile memory to a non-volatile memory, e.g., a hard disk drive, in one embodiment. In one embodiment, product spool size AppSpoolSize_mr is an integer in a range of 0 to 1000, and a default value is 100, e.g., 100 KB.

A queue on a non-volatile memory is much slower to access that the same queue in volatile memory, because all queue information is encrypted as the information is written to the non-volatile. Hence, in some embodiments, when the queue size in the volatile memory reaches product spool size AppSpoolSize_mr, the queue information is written to the non-volatile memory and new events are stored in managed product queue 530_mr in volatile memory. Thus, part of the queue is volatile memory and part is in non-volatile memory.

The queue in volatile memory is appended to the queue in non-volatile memory when the queue size again reaches product spool size AppSpoolSize_mr. This process continues until either the queue is transmitted in transmit operation 406, or the size of the queue exceeds product maximum queue size MaxQueueSize_mr.

Product maximum queue size MaxQueueSize_mr is the maximum size in kilobytes of managed product queue 530_mr. Once managed product queue 530_mj reaches this size any future events from managed product 210_j are refused in queue full check operation 407 (FIG. 4A). Each of the other managed products may continue to log events until its queue reaches product maximum queue size MaxQueueSize_mr for that queue. The most likely cause for managed product queue 530_mr to reach this size is if feedback and control system 155A cannot be contacted. In one embodiment, product maximum queue size MaxQueueSize_mr is an integer in a range of 60 to 10000, and has a default value of 2000, e.g., 2000 KB.

Returning to the embodiment of transfer queue check operation 410 (FIGS. 4A and 5A), flush time check operation 501 determines whether the time elapsed either from the logging of the first event in managed product queue 530_mr, after either generation of managed product queue 530_i or after the last flush of managed product queue is equal to or greater than product flush time AppFlushTime_mr. If the elapsed time is equal to or exceeds product flush time AppFlushTime_mr, flush time check operation 501 transfers to transmit operation 406 (FIG. 4B) and otherwise to flush size check operation 502.

Flush size check operation 502 determines whether the size of the information in managed product queue 530_mr is greater than or equal to product flush size AppFlushSize_mr. If the size of the information is equal to or exceeds product flush size AppFlushSize_mr, flush size check operation 502 transfers to transmit operation 406 (FIG. 4B) and otherwise to flush count check operation 503.

Flush count check operation 503 determines whether the number of events in managed product queue 530_mr is greater than or equal to product flush count AppFlushCount_mr. If the number of events is equal to or exceeds product flush count AppFlushCount_mr, flush count check operation 503 transfers to transmit operation 406 (FIG. 4B) and otherwise to maximum spool size check operation 414 (FIG. 4B), which is described more completely below.

Transmit operation 406 places a single event in an output buffer for transfer to security and feedback control system 155A if processing transferred to transmit operation 406 from transfer direct check operation 405 (FIG. 4A). Transmit operation 406 (FIG. 4B) places a queue of events in the output buffer for transfer to security and feedback control system 155A if processing transferred to transmit operation 406 from transfer queue check operation 410.

In one embodiment, transmit operation 406 first determines whether a connection if available to security and feedback control system 155A over network 290. If a connection is unavailable, transmit operation 406 does not place any information in the output buffer and instead transfers directly to transmit check operation 406. If a connection is available, and the connection is secure, transmit operation 406 places the events in the output buffer as described above. If a connection is available and the connection is un-secure, the event data is encrypted before being placed in the output buffer. Thus, the events are transmitted in a secure manner in transmit operation 406. Upon completion of transmit operation 406, operation 406 also transfers to transmit check operation 411.

Transmit check operation 411 determines whether transmit operation 406 had a connection available. If a connection was available, transmit check operation 411 transfers to event available check operation 401 and otherwise transfers to send error operation 412

Send error operation 415 sends an error message to managed product 210_j indicating that feedback and control system 155A is unavailable, and transfers processing to direct transmit check operation 413.

Recall that security management agent 220_m transmits an event directly, either when managed product 210_j placed information in the event indicating that the event required immediate processing by feedback and control system 155A, or when an event was included in an alert configuration. Hence, if direct transmit check operation 412 determines that security management agent 220 attempted to transfer the event directly, check operation 412 transfers to alternate event handler check operation 416 and otherwise to maximum spool size check operation 414.

Alternate event handler check operation 416 determines whether security management agent 220_m can redirect the event to another event handler, e.g., a SNMP manager that directs the event to an application that can process the event.

If an alternate event handler is available, alternate event handler check operation 416 transfers processing to transmit to alternate operation 417 and otherwise transfers to send error operation 420. Transfer to alternate operation 417 passes either the event or information from the event to the alternate event handler. Operation 417 transfers to transfer check operation 418.

If the alternate event handler is successful in transmitting the event, check operation 418 transfers to event available check operation 401 and otherwise to queue available check operation 419. If security management agent 220_m has a queue for managed product 210_j, queue available check operation 419 transfers to queue full check operation 407 (FIG. 4A) and otherwise to send error operation 420.

Send error operation 420 sends an error message to managed product 210_j indicating that transmission of the event was unsuccessful to both feedback and control system 155A and to any alternate event handling application. Send error operation 420, upon completion, transfers to event available check operation 401.

Returning to direct transmit check operation 413, if transmit operation 406 failed to find a connection for a flush of a managed product queue, direct transmit check operation 413 transfers to maximum spool size check operation 414, as indicated above.

Maximum spool size check operation 414 determines whether the managed product queue 530_mj that received the last event has a size greater than product spool size AppSpool-Size_mj that was described above. If the size of managed product queue 530_mj exceeds product spool size AppSpool-Size_mj, maximum spool size check operation 414 transfers to move queue operation 415 and otherwise returns to event available check operation 401.

In move queue operation 415, managed product queue 530_mj is moved from a volatile memory to a non-volatile memory, e.g., a hard disk drive, in one embodiment. Upon completion of move queue operation 415, operation 415 also transfers processing to event available check operation 401.

When security management system 150A receives an event or events from security management agent 220_m, event available check operation 601 (FIG. 6) transfers to valid event check operation 602. Valid event check operation 602 analyzes the content of event to ascertain whether the event contains appropriate information, or whether the event is unrecognized, is missing information, contains inconsistent information, or contains invalid information. As explained more completely below, each event has a standard format that can be recognized by security management system 150A and certain fields contain information that must be one of a set of enumerated values. In one embodiment, security management systems 150A determines whether the event is a valid event by ascertaining whether information in the event is internally consistent, and whether the information is consistent with a managed product and agent registered with security management system 150A.

If the event is a valid event, valid event check operation 602 transfers processing to log event 604 operation and otherwise to send error operation 603. Send error operation 603 informs security management agent 220_m of the invalid event. The techniques used to transmit information to security management agent 220_m are the same as those described more completely below for send method operation 611.

Log event operation 604 enters the valid event in an event database, e.g., forwards the event to a database server that in turn logs the event in an event database. Log event operation 604 transfers to an optional preprocess event check operation 605. If preprocess event check operation is not used, log event operation 604 transfers to condition object check operation 607.

In one embodiment, preprocess event check operation 605 is performed by security feedback and control system 155A. Thus, security feedback and control system 155A is an event sink for valid logged events, in this embodiment.

Preprocess event check operation 605 determines whether security feedback and control system 155A is preprocessing events to generate additional information for use by security feedback and control manager 260A. If security feedback and control system 155A is preprocessing events, preprocess event check operation 605 transfers to process event operation 606, and otherwise to condition check operation 607.

The operations performed in process event operation 606 depend upon the information stored in processed event database 670 and/or the information needed to evaluate one or more rules. For example, if counts based upon characteristics of events or other characterization of events is being stored, process event operation 606 updates the information in processed event database 606 appropriately.

Alternatively, process event operation 606 could be one or more filters and the output of the filter or filters are stored in processed event database 670. In still another embodiment, process event operation 606 could perform a statistical analysis either to generate baseline values for characteristics of events, or to identify particular types of activity or activities. In this embodiment, processed event database 670 enhances the robustness of security feedback and control manager 260A without requiring an increased load on feedback and control manager 260A to generate the information stored in preprocessed event database 670.

In this embodiment, feedback and control manager is a rules based system where each rule 258A includes a condition object 256 and action object 257 pairing, Rules are information structures in the form of cascaded condition-action object pairings. Dynamic input to the condition object is in the form of events flowing in via event adaptors. Static or pseudo-static inputs to the condition and action objects are in the form of a knowledge base 270A with generic knowledge of the security enforcement and detection points and optionally an event knowledge base 670.

Hence, condition check operation 607 determines whether a condition object of a current rule is true. If the condition object is false, condition check operation 607 transfers to done check operation 608.

Done check operation 608 determines whether there is at least one additional rule to evaluate. If there is another rule to evaluate, processing returns to condition check operation 607 and otherwise returns to event available check operation 601.

Figure 6:
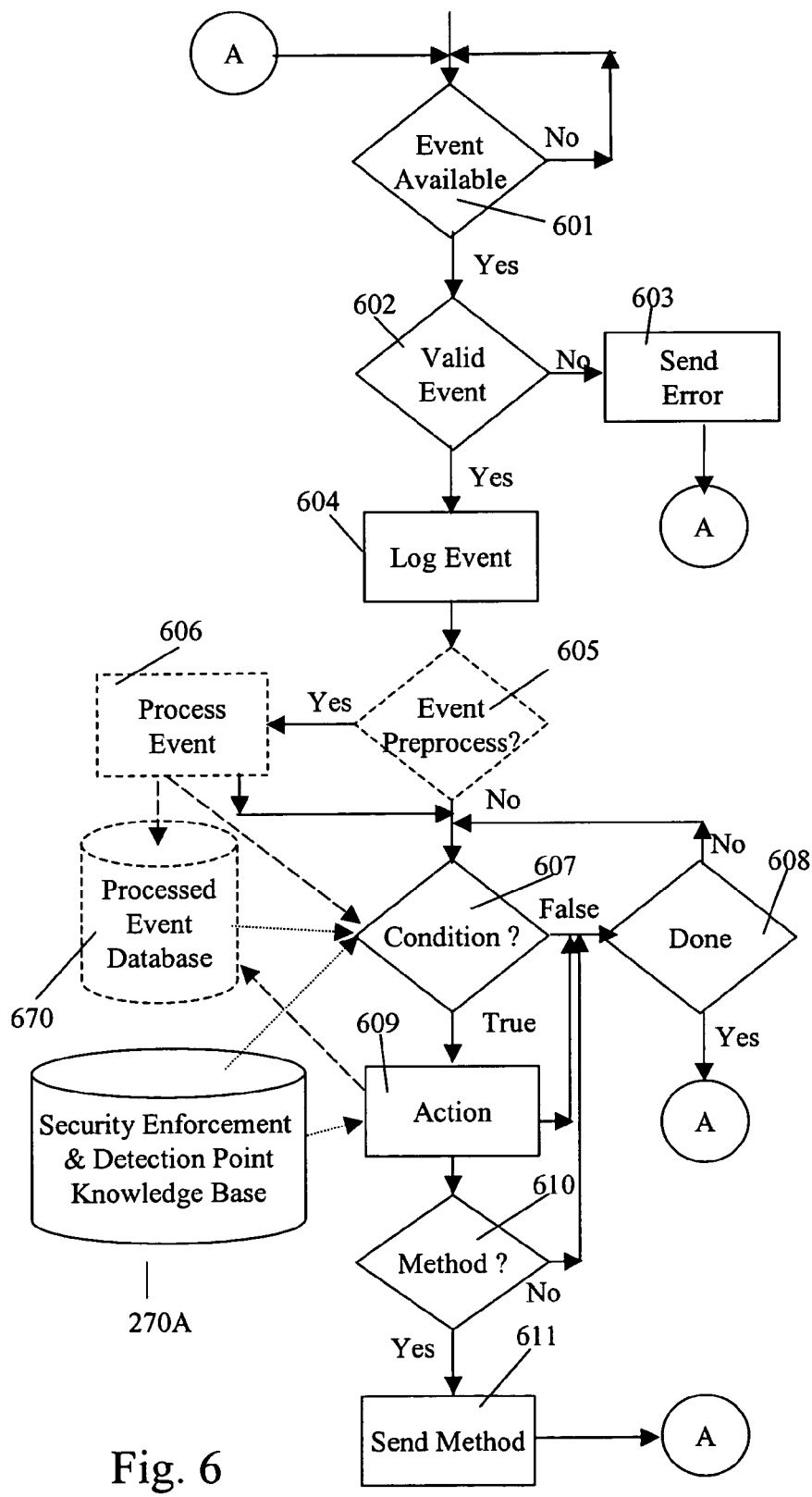
FIG. 6 is a process flow diagram for processing of a security event by the security management system according to one embodiment of the present invention.
Figure 7:
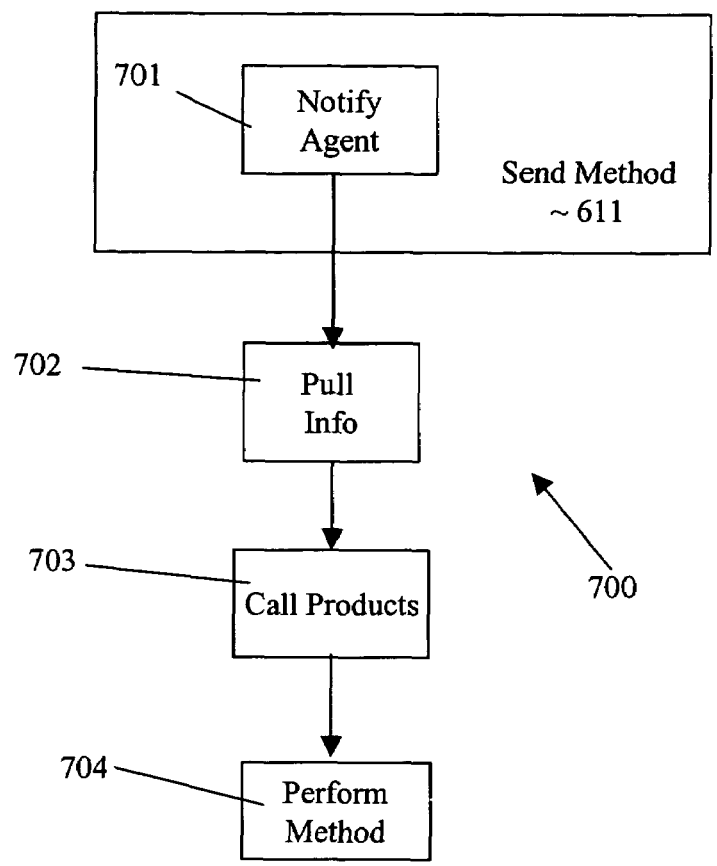
FIG. 7 is a process flow diagram for pinging an agent, and the response to the pinging according to one embodiment of the present invention.

As illustrated in FIG. 6, a condition object can use information from the current event and/or information from preprocessed event database 670 and/or information from security enforcement and detection point knowledge base 270A. For example, security enforcement and detection point knowledge base 270A, in one embodiment, includes known validated security threats, demographic and geographic information about the managed products.

When a condition object is true, condition check operation 607 transfers to action operation 609. Action object operation 609 performs the specified operation for the true condition object. This action could be writing information to processed event data base 670. This action could also to transmit a method call in a particular managed product interface to one or more managed products. The action could be to set a flag or parameter and to continue processing additional rules.

In general, as explained above, each condition object and associated action object are designed to detect particular security issues and issue instructions to address those particular security issues. Thus, both the command object and the action object depend upon the particular event or events processed by rules engine 265 and the security policy associated with that event or events.

For example, certain events may match conditions that trigger actions that would reconfigure an Internet gateway firewall to block certain IP addresses and ports, and invoke a method that rescans files that may have previously passed through the firewall. Events that indicate files are infected or worms are installed may trigger other rules that reconfigure client firewalls on the infected hosts so that programs cannot send outbound traffic. Infected files may be submitted to an analysis center after another method is invoked against a quarantine system on the infected host.

In one embodiment, a plurality of generic interfaces for managed products is defined for use by action objects in the rules of rules engine 265. The generic interfaces include an antivirus managed product interface, an intrusion detection system managed product interface, a vulnerability assessment managed product interface, an access control list managed product interface, and a router/switch managed product interface.

In this embodiment, the antivirus managed product interface includes a scan volume method and a reload virus definitions method. The intrusion detection system managed product interface includes a reload IDS signatures method. The vulnerability assessment managed product interface includes a run checks method. The access control list managed product interface includes grant access method and a deny access method. Both methods have arguments: principal, resource and permissions, in one embodiment. The routers/switches managed interface includes a shunt traffic to subnet method, a reroute traffic method, a stop services method, a disable port method and an enable port method. The name of each of these methods is indicative of the function performed by the method.

The methods and the interfaces are illustrative only, and are not intended to limit the invention to the specific methods described. In view of this disclosure, those of skill in the art can define generic interfaces for managed products of interest. These methods are referred to as generic because the methods are independent of any particular managed product and so apply to the family of managed products in general. It is the responsibility of product specific control module 211_j to translate the generic method call into a method call for managed product 210_j.

In FIG. 6, operation 609 is shown as branching to both done check operation 608 and to method check operation 610. Method check operation 609 determines whether the action object called a method in a managed product generic interface. If a method is called, processing transfers to send method operation 611 and otherwise to done check operation 608.

Done check operation 608 determines whether all rules have been processed and whether further processing of rules has been terminated. If either condition is true processing transfers to event available check operation 601 and otherwise to condition check operation 607.

Send method operation 611 notifies the security management agent or security management agents identified by the action object that resulted in the method call for the managed product. The security management agent(s) notified can be the agent at the managed node where the event originated, or perhaps a broader set of agents, e.g., agents for the same managed product at other managed nodes, all agents, particular agents associated with groupware or servers, etc. The LDAP directory includes the service access point for each agent. Send method operation 611 can be accomplished in a variety of ways. In one embodiment, a secure push operation is used to send the method call.

In another embodiment, the method call is stored in a predefined location for managed product 210_j and security management agent(s) 220_m is pinged in a notify agent operation 701. ("Ping," as used here, is a small innocuous transmission without a specific instruction.) A ping is interpreted by method adapter 222_m as a request to query.

Hence, in response to being pinged, method adapter 222_m of security management agent 220_m accesses the predefined storage location in memory of security management system 150A and securely pulls down the information sent by rules engine. In one embodiment, this is a generic XML command such as a call to a reload configuration method.

This method is particularly advantageous for transmitting information from security management system 150C to security management agents and is particularly secure, because if an interloper were to see a security management agent being pinged and tried to replicate the action, the security management agent would access security management system 150C. Consequently, the interloper obtains no useful information by replicating the observed ping action.

After method adapter 222_m receives the method call, method adapter 222_m transmits the method call to product control module 211_j for the specified managed product 210_j in call product operation 703. In operation 704, product control module 211_j maps the generic method call into a method call appropriate for managed product 210_j and issues that call.

Figure 8:
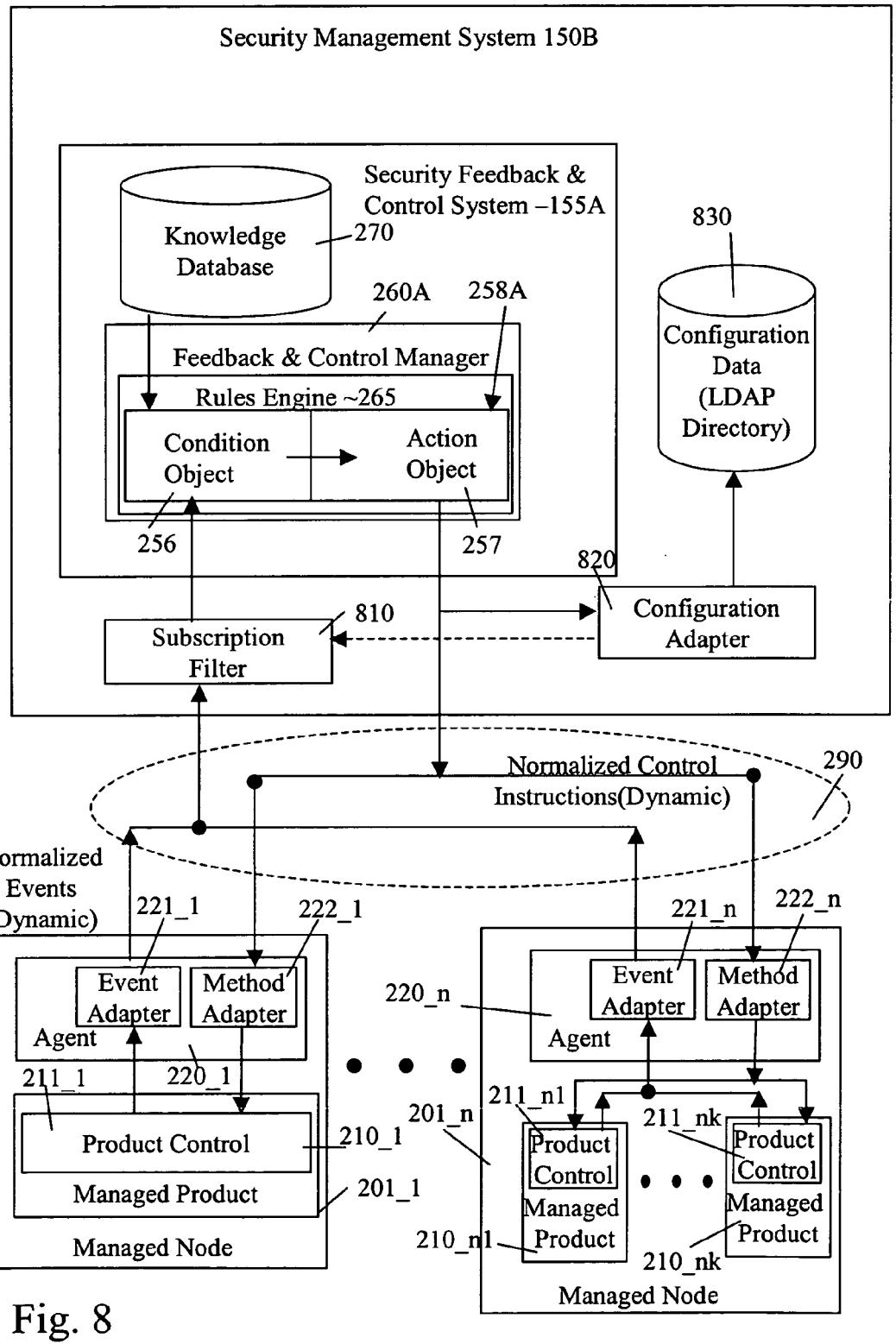
FIG. 8 is another more detailed diagram of one embodiment of the system of FIG. 1 according to one embodiment of the present invention.

FIG. 8 is a more detailed diagram of another embodiment of security management system 150B. In this embodiment, security feedback and control system 155A is equivalent to that described above for FIG. 2 and that description is incorporated herein by reference. However, in this embodiment, only selected events, e.g., events marked as alerts, are processed by security feedback and control system 155A. Security feedback and control system 155A registers with subscription filter 810 for events that can be processed by system 155A.

Event subscription filter 810 analyzes incoming events to security management system 150B and only passes those events for which system 155A registered to system 155A. In one embodiment, subscription filter 810 is implemented as a management server that logs valid events and forwards valid events to event sinks that have registered for particular events, e.g., places the events in a queue for the event sink. Hence, feedback and control system 155A is an event sink.

Security management system 150B, in one embodiment, makes a distinction between a generic command and a generic setting change by an action object in a rule for rules engine 265. A generic command is implemented as described above using a generic method call on a standardized generic interface. A generic setting change is made via a setting change request on a standardized interface and is directed to configuration adapter 820.

In this embodiment, each managed product is registered with security management system 150B and configuration data for each managed product is stored in a directory 830, as described more completely below. Hence, when configuration adapter 820 receives a generic setting change, e.g., close a port on all firewall managed products, configuration adapter 820 queries configuration data to identify all managed products affected by the generic setting change, and then appropriately changes the data in configuration data for the appropriate managed products in directory 830.

When the configuration data in directory 830 is updated, in one embodiment, configuration adapter 820 sends a successful setting change event to subscription filter 810 that in turn forwards the event to feedback and control manager 260A. The condition object that has a test for a successful setting change event has an action object that issues a load configuration method call to the appropriate security management agent 220_m for managed product 210_j for which the configuration setting was changed.

As described above, security management agent 220_m is pinged, and upon accessing the load configuration command, queries directory 830 to obtain the configuration data. The configuration data is securely downloaded, and the load configuration command is forwarded to control module 211_j for managed product 210_j.

While in this embodiment, feedback and control manager 260A was described in terms of a rules engine 265 that processed rules having condition object 256 and action object 257 pairings, in more general terms, feedback and control manager 260A is a dynamic security policy decision point that can be implemented as either an expert system or a rules engine.

Figure 9:
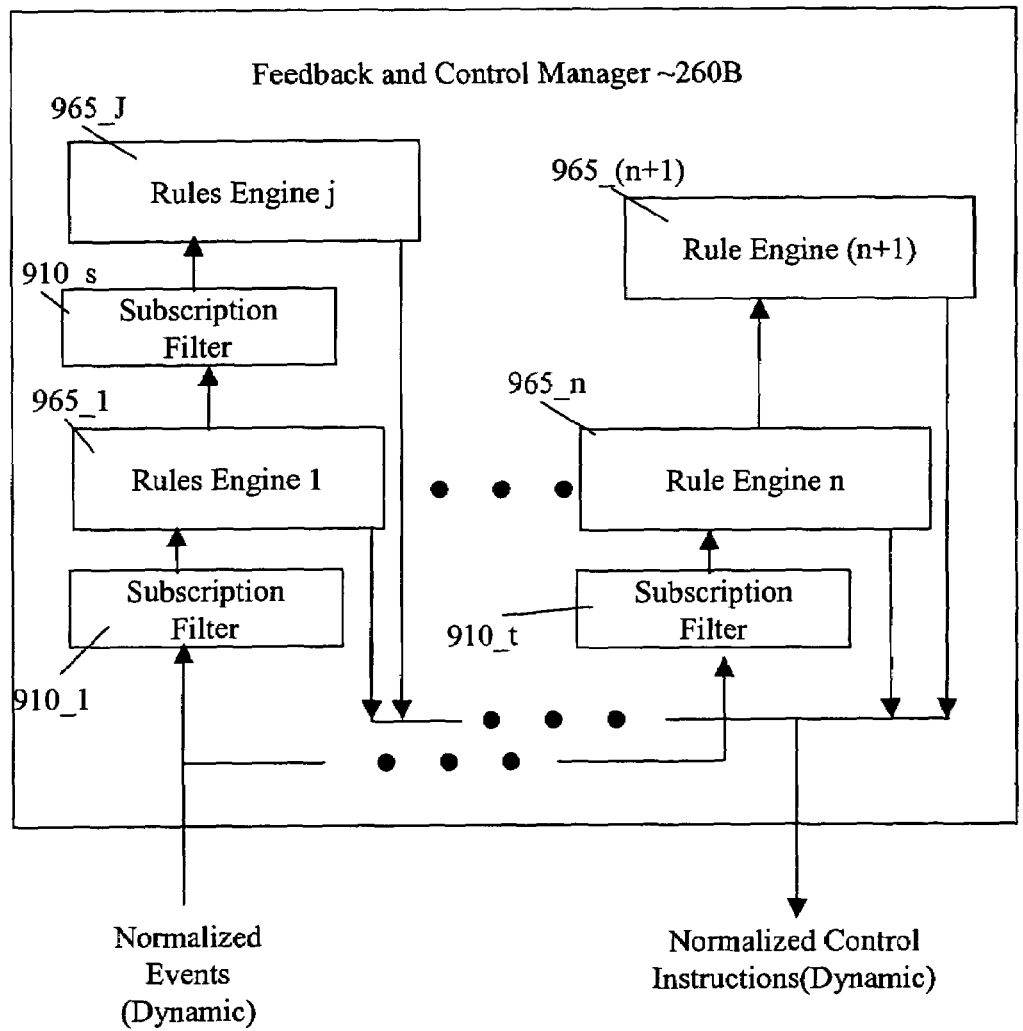
FIG. 9 is an illustration of the feedback and control manager including a plurality of rules engines according to one embodiment of the present invention.

Also, rules engine 265, while shown as a single entity, may be configured to include any desired combination of rules engines. For example, in FIG. 9, feedback and control manager 260B includes a plurality of rules engines 965_1 to 965_(n+1).

A plurality of subscription filters 910_1 to 910_t are also used, where each subscription filter subscribes to specific information, e.g., a set of events. For example, one subscription filter could subscribe to an antivirus incident family of events, a content filtering incident family of events, or a network intrusion family of events, etc. See for example FIGS. 23 and 32. Subscription filter 910_s filters information that is output form rules engine 965_1. Hence, subscription filters are used not only to select events, but also to select other information.

Figure 10:
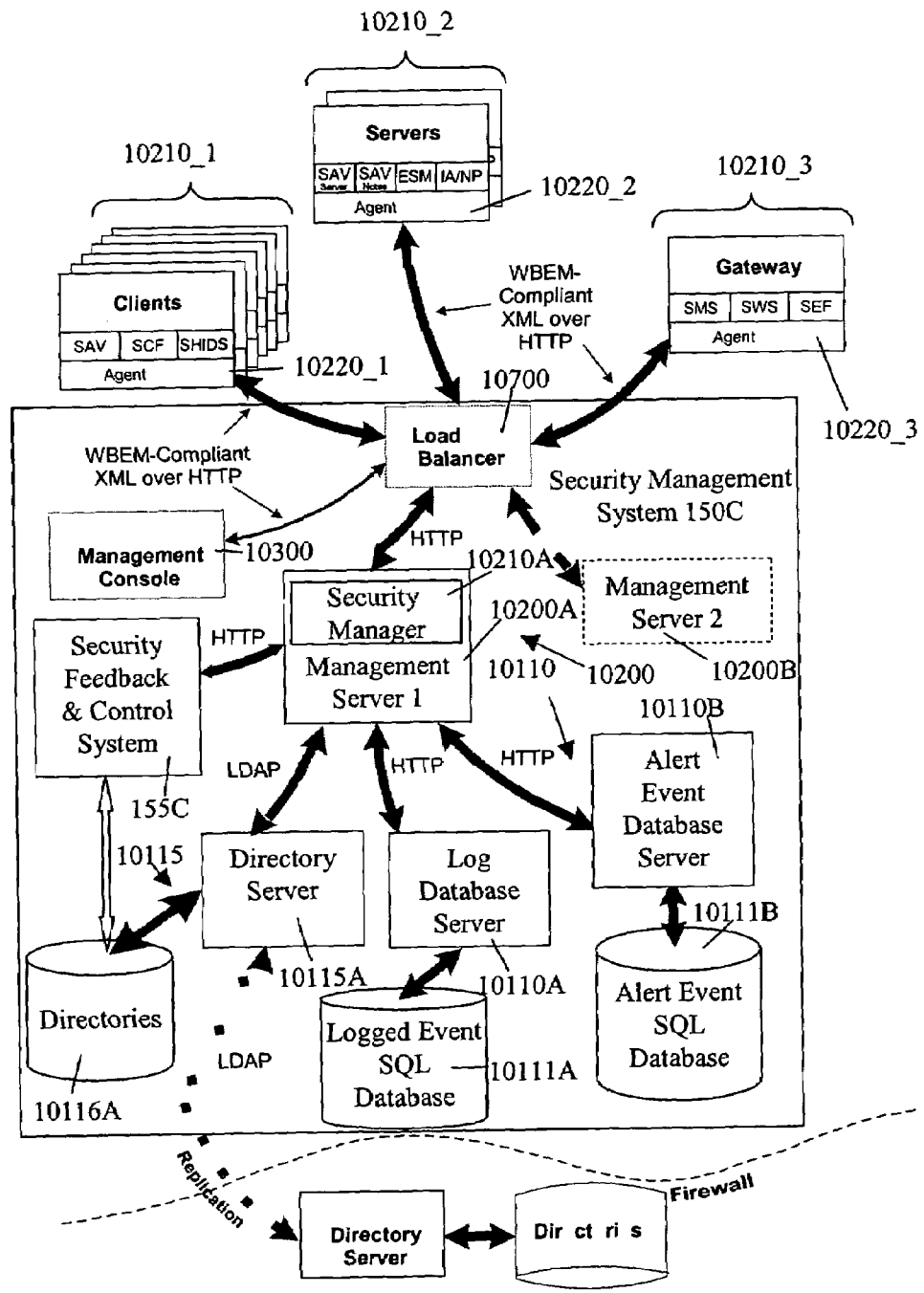
FIG. 10 is yet another more detailed diagram of one embodiment of the system of FIG. 1 that includes an N-tier architecture according to one embodiment of the present invention.

In one embodiment, security management system 150 is implemented using an N-tiered architecture. FIG. 10 is a diagram of an embodiment of security management system 150 (FIG. 1), e.g., security management system 150C, implemented in an N-tiered architecture.

In this embodiment, there are at least two database server tiers. A first database tier 10110 manages repositories for incident data, logging and alerts. First database tier 10110 includes a log database server 10110A with a logged event SQL database 10111A and an alert event database server 10110B with alert event SQL database 10111B.

A second database tier 10115 is a directory tier, where managed product registration, configuration and security policy information is maintained. Second database tier 10115 is completely independent from first database tier 10110 providing different services and using completely different methods and data management tools.

A middle tier 10200 of the N-tiered architecture includes at least one management server 10200A that brokers requests for services made by managed products installed on the network. Middle tier 10201, in some embodiments includes a plurality of management servers 10200A, 10200B.

Management server 10200A receives, interprets and serializes all the service requests made via events from managed products and routs the events to the appropriate event sink or sinks, e.g., a database server, whether it is a directory server 10115A, log database server 101A, an alert event database server 10110B, and/or security and feedback control system 155C. In this embodiment, management server 10200A performs the function of subscription filter 810 (FIG. 8).

Management server 10200A contains the logic for answering all of the "what," "where," and "how" questions related to the requested service. This means that the calling managed product has been completely freed from needing to know anything about the location and implementation of the service being called. Thus, a separate middleware tier has been established.

Figure 11:
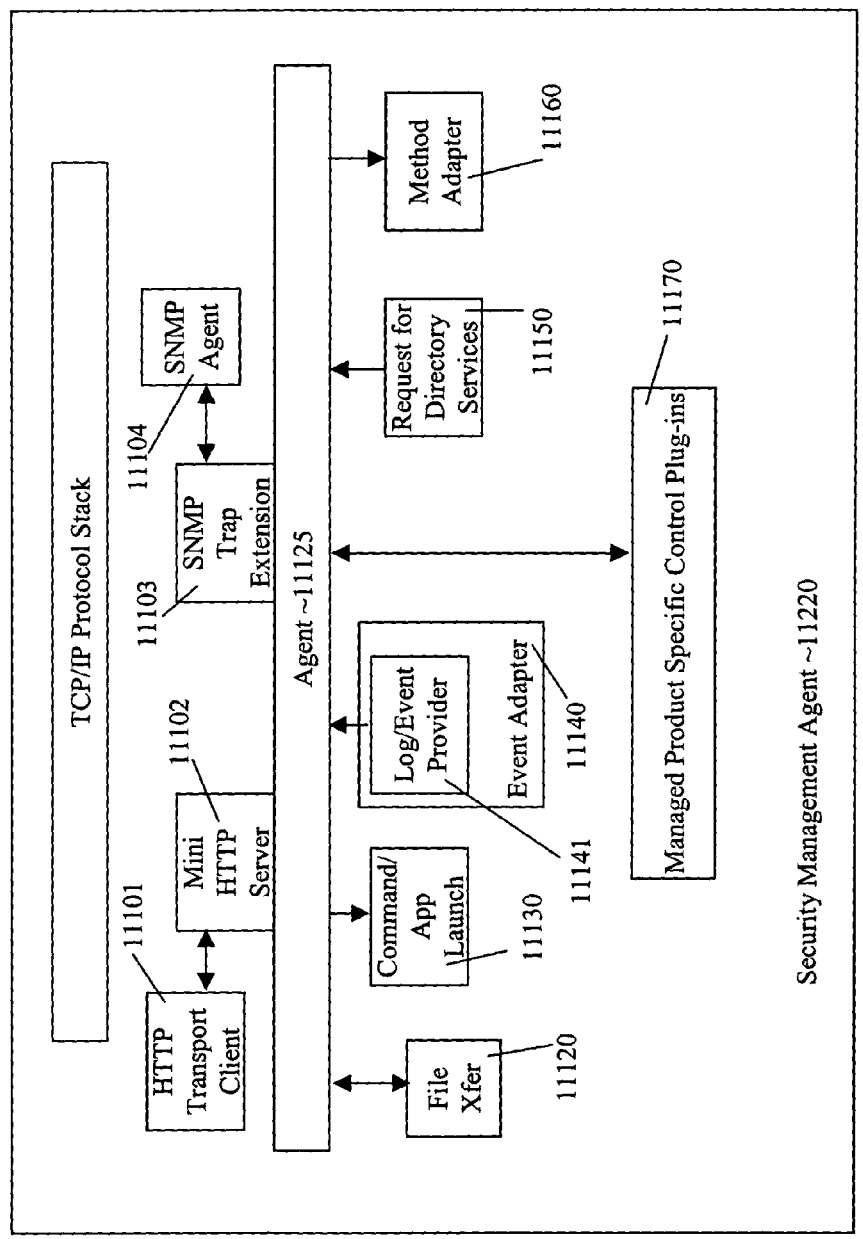
FIG. 11 is a block diagram of the security management agent according to one embodiment of the present invention

Yet another tier in the N-tiered architecture further separates managed products from management operations. This tier is the security management agent tier 10200 that includes a first plurality of security management agents 10220_1, a second plurality of security management agents 10220_2 and security management agent 10220_3. Each security management agent 10220_i of the security management agents are similar to the security management agents described above. See also, FIG. 11 and the description of FIG. 11 below.

In this example, there is a plurality of client managed nodes 10210_1 and each client managed node includes one security management agent 10220_1i in first plurality of security management agents 10220_1. The managed products in at least one client node include managed product SAV, managed product SDF, and managed product SHIDS. An example of managed product SAV is an enterprise antivirus client. An example of managed product SCF is a client firewall application, and an example of managed product SHIDS is a host intrusion detection system.

In this example, there also is a plurality of server managed nodes 10210_2 and each server managed node includes one security management agent 10220_2i in second plurality of security management agents 10220_2. The managed products in at least one server node include managed product SAV_Server, managed product SAV_Notes managed product ESM, and managed product IA/NP. An example of managed product SAV_Server is an enterprise antivirus server. An example of managed product SAV_Notes is an enterprise antivirus server for the IBM Notes product. An example of managed product ESM is an enterprise security manager, and an example of managed product IA/NP is an intruder alert and net prowler application.

Also, in this example, there is a gateway managed node 10210_3 that includes security management agent 10220_3. The managed products in this example for managed node 10210_3 include managed product SMS, managed product SWS, and managed product SEF. An example of managed product SMS is a mail security application. An example of managed product SWS is a web security application, and an example of managed product SEF is an enterprise firewall application.

Each security management agent 10220_i in agents 10220_1, 10220_2, 10220_3 is a thin, extensible UI-less process that is co-located on every host system, i.e., managed node, where managed products are installed. As described above and more completely below, each security management agent 10220_i receives all service requests and events from all managed products running on the same managed node and routes the service requests and events to the appropriate management server. Security management agent 10220_i likewise passes responses back to the calling managed product.

Yet another tier in N-tier security system management architecture is a management console 10300 that provides administrators with navigation, configuration and reporting capabilities needed to administer all managed products installed on the network. In one embodiment, a web browser-based user interface is supplied for management console 10300. Management console 10300 runs independently from all other security management system elements and communicates directly with directory 10116A containing product policy and configuration data and with the log and alert event databases 10110A, 10110B.

In one embodiment, administrative operations available through management console 10300 include (1) browsing and selective viewing of managed objects, including systems on the network, sometimes called managed nodes, on which one or more managed products has been installed, (2) changing policies and configuration for deployed managed products, (3) performing queries and generating reports on managed objects, including managed products, and (4) browsing and selectively viewing log and alert events generated from managed products, including the query and reporting capability associated with logging and event services.

The user interface for management console 10300 is easy-to-use, supplies rapid and flexible navigation capabilities, and includes operations that permit administrators to operate on all members of selected collections of managed objects using a single, simple transaction dialog. View and command scope are available based on the authorizations granted to an administrator.

Because, in one embodiment, HTTP is used for all communication between managed products and services provided by security management system 150C, e.g., security feedback and control system 155C, one or more web servers are used in every interaction between a managed products and security management system 150C. This is yet another tier in the architecture of security management system 150C.

The N-tier architecture of security management system 150C has at its core a communication infrastructure comprised of (1) an extensible security management agent that resides on each system that hosts at least one managed product and (2) one or more management servers distributed around the target network environment that, as mentioned above, broker the requests for services sent by security management agents on behalf of managed products.

In this embodiment, security management agent 11220 (FIG. 11) handles all of the data and command traffic between managed products installed on the local system and security management services on system 150C. Security management agent 11220 packages and forwards requests for services and/or events received from local managed products using mini HTTP server 11102 and HTTP transport client 11101.

Conversely, security management agent 11220 routes data and commands from security management server 10200A to the local managed products. In one embodiment, security management agent 11220 also includes an extension, file transfer plug-in 11120, that supports a standard file transfer protocol for both point-to-point file uploading and downloading, as well as multicast file download operations.

Security management agent 11220 is installed along with a first managed product installed on any system, i.e., any managed node, connected to the network. In fact, managed products are installed as extensions 11170, or plug-ins, to an agent module 11125 of security management agent 10220_i.

Other extensions to agent module 11125 are added to security management agent 11220 for other purposes. In fact, security management system 150C itself supplies agent extensions for key management service functions, such as logging and alerting extension 11141, file transfer extension 11120, and an application launch extension 11130. Managed products may also supply applets for launch or agent extensions of their own.

Agent module 11125 of security management agent 11220 is started at computer boot up time, since security management agent 11120 is available to process commands from security management system 150C as well as service extension requests. In this embodiment, agent module 11125 maintains a key/value configuration database (flat file) that can be used by extensions of agent module 11125, as well as by agent module 11125 itself, to store configuration parameters.

One of the uses of this storage is to store a prioritized list of directory addresses within security management services. This list can be edited by the administrator at the time security management agent 11220 is deployed, and thereafter via the agent's entries in the directory, or by direct communication to security management agent 11220 itself, i.e., security management agent 11220 is effectively a managed product. Security management agent 11220 connects to the list of directory addresses and, among other things, gets the address of one or more logging and event servers to which security management agent 11220 posts information on behalf of managed product plug-ins.

Each managed product, sometimes called application, is assigned an application ID. When agent module 11125 starts up, agent module 11125 looks in the configuration database, which is in agent support files that include product provider registrations, for the names and locations of agent extensions and associates each agent extension with an application ID assigned to that agent extension. Commands received by agent module 11125 are routed to the target extension via the application ID.

In one embodiment, agent module 11125 is based on the CIMOM (Common Information Model Object Manager) architecture that is implemented using the JAVA programming language in one embodiment. (JAVA is a trademark of Sun Microsystems, of Santa Clara, Calif., USA.) With the CIMOM architecture, security management agents are extensible by means of a well-documented interface for the creation of providers. Providers can be implemented to perform various operations.

The Common Information Model (CIM), published by the Distributed Management Task Force (DMTF), is an information model that covers all network objects and collections involved in managing distributed systems. In one embodiment, CIM is at version 2.2 and version 2.6 for the specification and schema, respectively, was used.

See for example, *Common Information Model Specification*, Ver. 2.2, Distributed Management Task Force, Inc., Portland, Oreg., Jun. 14, 1999, which is incorporated herein by reference to demonstrate the level of skill in the art. As is known to those of skill in the art, CIM is, first of all, a declarative modeling language, and secondly, a set of core and common schema for network management entities ranging from systems and devices to networks, users, policies, events and methods. In this embodiment, CIM is used as the foundation of the management model of security management system 150C.

In addition to CIM, Web Based Enterprise Management (WBEM) and Directory Enabled Networks (DEN) are utilized. Before considering FIG. 10 in further detail, CIM, WBEM, and DEN are briefly described.

WBEM uses CIM as its information model, along with its schema, and defines CIM mappings on XML and the transport of these CIM mappings using XML over HTTP. This allows managed entities to inter-operate in heterogeneous environments. In this embodiment, WBEM is used in all security management services applications, and for management console 10300, in particular.

Web-Based Enterprise Management (WBEM) is a set of management and Internet standard technologies that have been defined and developed to unify the management of enterprise computing environments. A core set of standards that make up WBEM. These standards include (1) the Common Information Model (CIM) standard already described above; (2) an encoding specification, the "xmlCIM Encoding Specification;" and (3) a transport mechanism, "CIM Operations over HTTP."

The CIM schema developed in one embodiment of this invention includes models for systems, applications, networks (LAN) and devices. The CIM schema enables applications from different developers on different platforms to describe management data in a standard format so that it can be shared among a variety of management applications. Specifically, in one embodiment, the CIM modeling language is used to create new hierarchical event structures for security events as described more completely below.

The xmlCIM Encoding Specification defines XML elements, written in Document Type Definition (DTD), which can be used to represent CIM classes and instances. The CIM Operations over HTTP specification defines a mapping of XML-encoded CIM operations onto HTTP that allows implementations of CIM to interoperate in an open, standardized manner and completes the technologies that support WBEM.

Most operating systems, and their management tools, support CIM and WBEM. For example, Microsoft Corp. delivers a CIM object manager with its WINDOWS operating systems as part of its Windows Management Instrumentation (WMI) implementation of CIM. The CIM object manager supports a provider architecture where in-process COM servers (DLLs) that are mated to the CIM descriptions for a product or service are loaded into the WMI object manager. A managed product group would write the COM server that knows how to communicate with the managed product either directly, or with the managed product's native configuration format.

Similarly, Sun Microsystems provides a WBEM SDK and object manager for the Solaris operating systems. Tivoli is planning to ship its own object manager with future versions of TME. The Sun and Tivoli provider architectures are Java based, while Microsoft uses a COM provider architecture. Note that CIM 2.3 and higher includes a set of classes that map CIM objects to an LDAP directory as part of the DEN initiative. In this embodiment, each product specific operation control module includes CIM client capability.

In the embodiment of FIG. 10, for registration, policy and configuration data management for managed products, directory services are used. The Lightweight Directory Access Protocol (LDAP) specification is used to implement directory services. The DEN includes a set of mappings CIM objects into the object classes and hierarchical structures used by LDAP directories.

DEN also specifies a way to configure and maintain network nodes using standard directory services. Hence, in the embodiment of FIG. 10 security management system 150C uses the following widely-used standards-based models and implementations:

CIM for information modeling (including CIM mappings to LDAP);
LDAP for directory access and directory schema;
SQL Database for logging and alert event recording;
WBEM for remote method invocation, point-to-point configuration, and events;
HTTP and XML for multi-platform interoperability and WBEM compliance;
Internet standard protocols for discovery; and a web-based administrative console.

Hence, in this embodiment, the event hierarchy, written using the CIM modeling language, is be used for tier 10110, the alert event and logging system of security management system 150C, and the settings and configuration schema for product configuration.

Typically, administrators manage users and machines. For users, administrators manage authentication, authorizations and policies, most often by way of user groups and roles. The machines administrators manage include client systems, file and application servers, gateways and the array of commonly-used network devices, including but not limited to routers, switches, hubs, etc. Security management system 150C is flexible and versatile so that groups of users, groups of servers, groups of both, and groups of groups can be maintained and managed. CIM encompasses this diversity and provides for user-based management where appropriate and for machine-based management where appropriate.

CIM is also leveragable. CIM is extended by managed products for use in implementing product-specific management components.

Security management systems 150C provides a unified policy configuration management system that is used across all managed products. The term, policy, generally includes (1) a set of managed objects, or types of objects, to which the policy applies, (2) a set of specific conditions under which the policy applies and (3) the specific rules or actions to be applied when these conditions are either met, or not met, as the case may be.

In another embodiment, policy configuration management is based on a simpler definition of policy. In this embodiment, "policy" simply means a named information structure that (1) applies to one policy group only and (2) specifies one or more product services, along with the configurations and permissions for those product services, to be applied to members of the target policy group.

A configuration is defined as a named aggregate of settings for one particular product, feature or service. While CIM can incorporate settings from multiple products into a single configuration, security management system 150C, in this embodiment, limits configurations to settings for a single product.

Hence, a policy group is simply a collection of managed objects, usually users or systems, which can be managed under the same policy. Any defined collection of managed objects is called a group in CIM, and may be a collection of users, systems, configurations, a combination of these elements, or even other groups. There are virtually no restrictions in CIM for defining a group of managed objects. However, for security management system 150A, policy groups do have definite rules. A policy group cannot contain other policy groups and a particular managed object can belong to one and only one policy group.

For example, a company might have a policy group named Santa Monica Human Resources. This policy group could be associated with a higher level human resources group, but in security management system 150C, cannot be contained by the higher level human resources group. For this policy group there might be a policy named Security_A. Security_A might specify the set of security products that must be installed on a managed computer contained in the Santa Monica HR policy group, and would specify the configurations that are enforced for these products. (Note that the policy group in this example is composed of managed computers. Alternatively, a policy group could contain users and a policy for this group might define the products that must be installed on a computer logged into by a user in the policy group.)

This definition of policy is very simply structured and lends itself to simple implementation. It does not include the concept of conditions under which the policy is to be applied. Instead, a security management system policy, in this embodiment, applies unconditionally to one policy group. Since there are no conditions associated with policies, a rules-based approach to defining or implementing policies is not supported. However, with security feedback and control system 155C, conditions under which a policy is implemented can be considered and implemented.

In this embodiment, distributed directories are used for managing users and policies. The Internet standard in distributed directories is Lightweight Directory Access Protocol (LDAP) compliant directories. Security management system 150C, in this embodiment, uses a LDAP directory-based architecture.

In this embodiment, LDAP directories are used for managed object database server functions. Managed objects in these directory services include systems, software products and services, policies, configurations, users and groups of these managed objects. Security management system services and managed products use these directories, for example, to do software registration, software configuration, system and software discovery, and user authentication and authorization.

Directory 10116A provides fast access to data that is used frequently but is not changed often. Directory 10116A provide for immediate and continuous availability of data through replication. Directory 10166A supports partitioning of information to enable load balancing and scaling, and to accommodate differences in network bandwidth and connectivity over geographically separate parts of an enterprise.

As stated above, DEN includes a set of classes for mapping CIM objects to LDAP directories. These mappings are used by security management system directory-based services.

Security management system services use CIM-based LDAP directories for managed collection data. The term for a managed collection is simply "group." The primary client of this schema is middleware services that are described more completely below and management console 10300.

From management console 10300, managed groups are created and deleted. Entries are added, changed, moved from one group to another, etc. In addition, data is imported from existing directories. For example, existing WINDOWS NT Domains can be used to populate security management system directories with initial user groups and to synchronize changes.

Managed products also use CIM-based LDAP directories for user and application policy data. The primary clients of this schema are the security management tools, including those within managed products, that can set or edit policies, and the managed products that can query and apply policies in their own operations, e.g., security feedback and control system 155C or for the users that attach to those products, if they are user-based.

For more volatile data, usually stored in databases or other proprietary formats, pointers are placed in the directory rather than the data itself. Conversely, tags can be placed in existing customer directories for objects that are managed by security management system 150C. Rapidly changing and transaction-type data are stored in a SQL database. For security management system 150C, log and alert data in particular are better suited to SQL databases than to directories. Log and alert data is being continuously written in significant volumes and the read-versus-write ratio is much lower than is normally associated with directories.

Furthermore, reports across managed groups, and managed products can be created easily using standard reporting tools if product logs and alert events are being written or forwarded to an SQL database. Databases can be replicated using their built-in replication facilities (these are non-standard) for consolidation or for wider and more immediate availability. Managed products can use these databases for their own purposes as well.

Figure 12A:
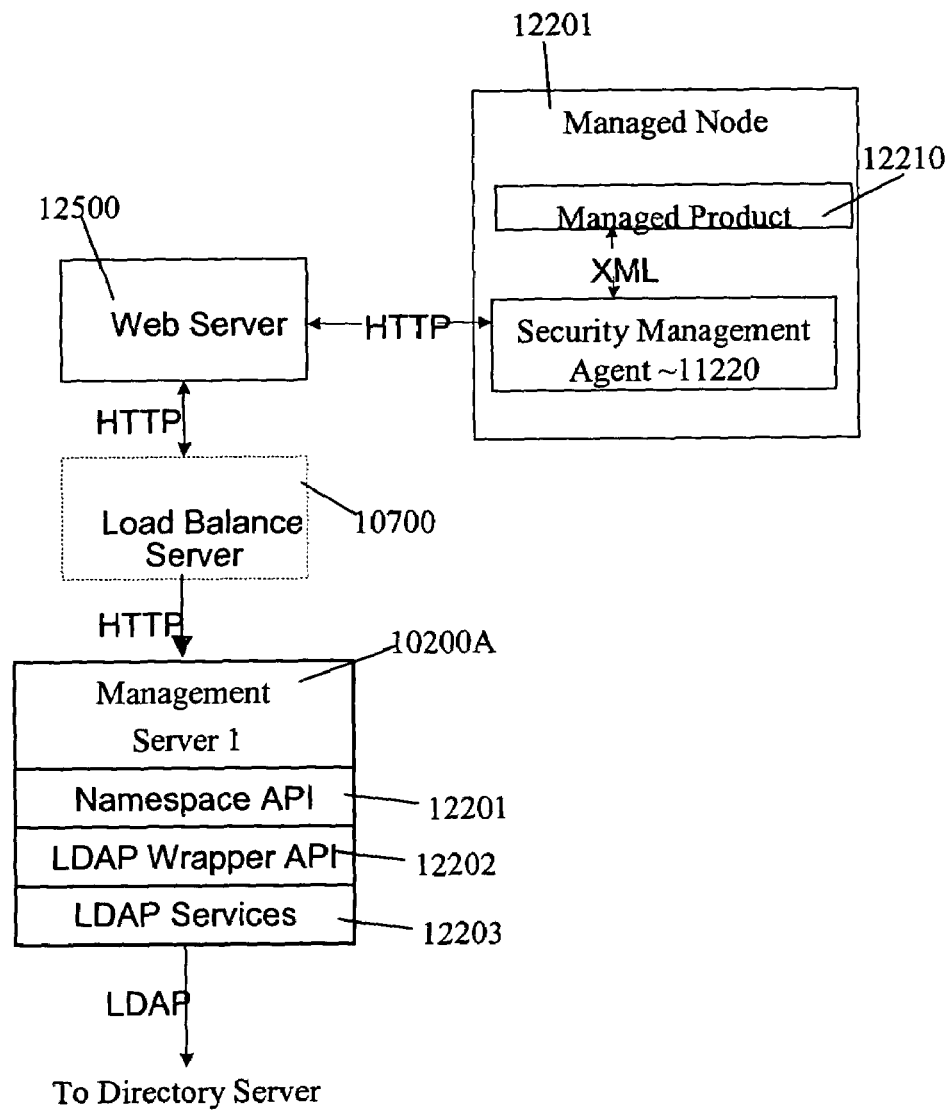
FIG. 12A is an illustration of an architecture implemented in a management server for utilizing an LDAP directory according to one embodiment of the present invention.

FIG. 12 is a more detailed illustration of one embodiment of a portion of security management system 150C. As described above, managed product 1210 does not send service requests directly to management server 10200A. Rather, the request is sent via a security management agent 12220 to one web server 12500 of a number of web servers. Web server 12500 forwards the request to a security management server 10220A that "brokers" service requests on behalf of calling managed product 12210. Security management server 10200A (FIGS. 10 and 12A) then sends each request to the appropriate database server, whether it is a directory in directory 10116A, logging database 10111A, or an alert notification system.

An optional load balancing server 10700 is positioned between web server 12500 and management server 10200A. This is a deployment option that balances the processing of service requests across a specified set of management servers, thus assuring the most rapid processing possible for requests for services.

As mentioned above, management servers "broker" all requests for security management services. Management server 10200A selects the actual server to be used to provide the desired service. In addition, management server 10200A supplies all of the information concerning where on the network the desired server is located, what internal naming conventions are to be used for objects stored in directories and other any parametric, location and the services they are requesting.

In one embodiment, for directory 10116A, a namespace application programming interface (API) layer 12201 actually defines the physical location of directory objects, and the related naming conventions (relative distinguished name) for these objects, and automatically provides the linkage to them for calling applications. In one embodiment, namespace API layer 12201 is a set of classes implemented in the JAVA programming language that abstract all of the lower-level methods for the CIM-LDAP mapping classes. Namespace API layer 12201 is exposed to the security management agents, e.g., security management agent 12220, and shields security management agent 12220, and consequently, managed product 12210, from having to know any of the "where," "what" and "how" of the services that are requested. Namespace API layer 12201 actually defines the physical location and the related naming conventions (relative distinguished name) for new directory objects.

Below namespace API layer 12201 is another API layer, a LDAP wrapper API layer 12202. LDAP wrapper API layer 12202 wraps the actual program code that interprets requests for services and transforms the requests into lower-level calls used to actually access the CIM-based LDAP directories. "Wrapping" in this context means providing simplified access to a complex set of services where this simplified access method has been tailored for a specific type or set of applications. In one embodiment, security management agents or managed products do not use this wrapper layer directly, but circumstances may arise that require this use. LDAP wrapper API layer 12202 is also built on a set of classes implemented in the JAVA programming language.

A third layer is the actual LDAP access code, a LDAP services layer 12203, which performs the low-level calls to CIM-LDAP directory server 10115A. In this embodiment, the access to LDAP directories is on a round robin basis. Direct calls to the directory server are physically possible, but in one embodiment are not permitted. Hence, in this embodiment, management server 10220A accesses directory services using three distinct functional layers to complete a service request.

Figure 12B:
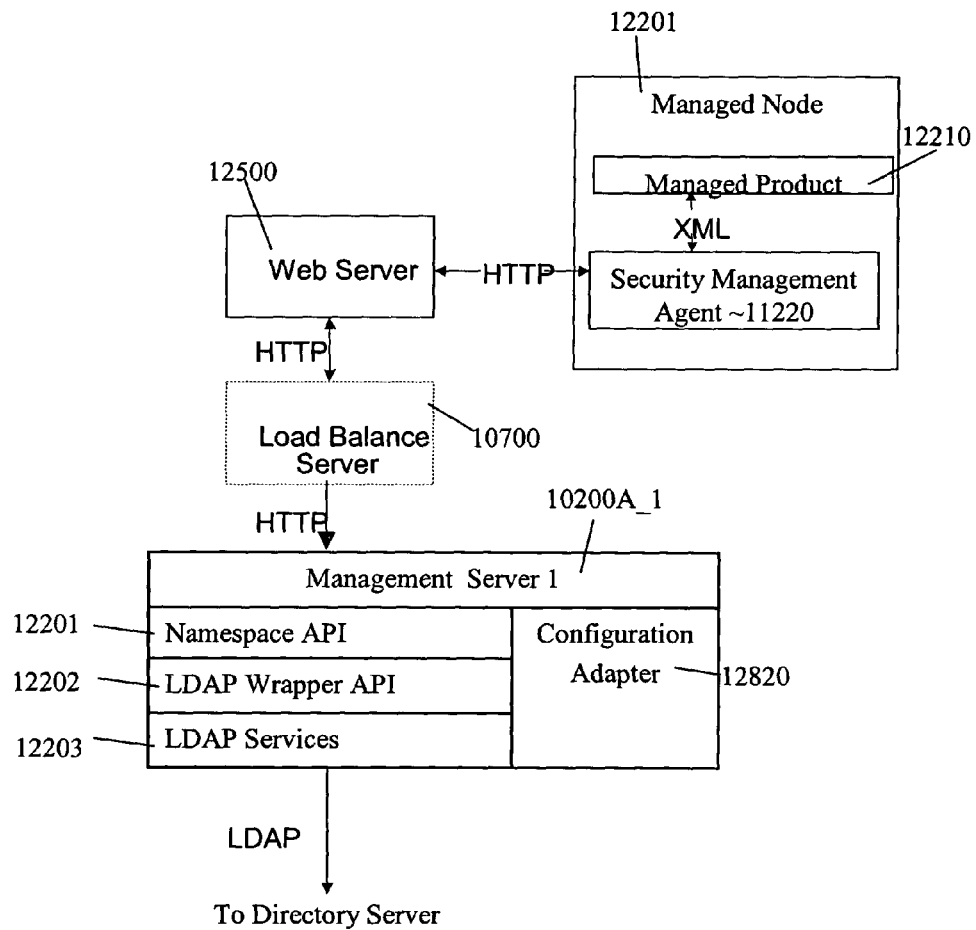
FIG. 12B is an illustration of an architecture implemented in a management server for utilizing an LDAP directory in management of managed product configuration information according to one embodiment of the present invention.

In the embodiment of FIG. 12B, layers 12201 to 11203 are the same as described for FIG. 12A and that description is incorporated herein by reference. However, in this embodiment, configuration adapter 820 (FIG. 8) is shown as configuration adapter 12820. Configuration adapter 12820 utilizes layers 12201, 12202, and 12203 as needed to modify configuration information in the LDAP directories.

In addition to feedback and control service 155C and the directory service, another service provided by security management system 150C is a logging and alerting service. In this embodiment, the security management agent on each managed node on the network includes a client service extension that provide a common logging and alerting function for all managed products associate with that security management agent. See FIG. 11.

Logging and event service requests sent by security management agents (FIG. 10), as described above, are also brokered by a management server, e.g., server 10200A and sent to the servers performing these services, e.g., server 10110A or 10110B. In this embodiment, all security management services are designed to be stateless. Neither the security management agent nor management server 10200A maintains any state-related information on behalf of either managed products or security management services. State information is maintained by the directory and the database.

As explained more completely below, a minimum schema (database tables, and table fields) required for a managed product to participate in the common logging and alerting system is defined by a security base event package. A managed product may define product specific additional fields, if necessary, for its own purposes via a custom event that extends a security base event. In most cases, the standard schema suffices for any managed application.

In this embodiment, all events are posted by way of HTTP POST directives sent by logging and alerting extension 11141 (FIGS. 11 and 13) to a management server 10200A that is an extension of web server 12500. Suitable web servers for use in this embodiment include the IIS web server, the Apache web server, or any other full-featured web server. Web server 12500 receives the relatively short (1-3 KB) events and routes the events to either or both of an alert event database server 10110B, which in this embodiment is implemented as alert servlet 13110B and logging database server 10110A, which is implemented as logging servlet 13110A.

In one embodiment, servlets 13110A and 13110B are implemented as JAVA 2 Enterprise Edition (J2EE) servlets as part of a web application. Logging servlet 13100A processes the events received and writes the events to the appropriate tables in the designated SQL database 10111A.

In one embodiment, database 10111A resides on the same server as logging servlet 13110A, which is a minimum installation. Typically, multiple managers are located on different systems and these different systems are different from the system having the database.

Events that are marked as alert events are also sent by alert servlet 13110B to an alert notification manager 13600, which, in this embodiment, is also running on management server 10200A. Managed product 12210 can mark certain events as alert-able, and can supply information about the severity of the event, based on configurable settings. Likewise, based on configurable settings, alert notification manager 13600 can assign the type of notification associated with events of a particular severity, or from a particular managed product at a specified severity level.

For inter-operability as well as redundancy, security management agent 11220 supports the firing of Simple Network Management Protocol (SNMP) traps, as does alert notification manager 13600, in this embodiment. This allows managed products, e.g., managed product 12210, installed with security management agent 11220 to operate in a standalone manner. This means that, during failures or maintenance of security management system servers, e.g., server 10200A, log and alert messages are still sent directly to an alert management system such as any SNMP manager that collects traps.

In this embodiment, a Management Information Base (MIB) is defined and loaded into the database of system 13800 so that system 13800 recognizes traps sent from security management agent 11220 and understands their information structure. Traps are sent for conditions where no manager connection is available, and subsequently for events having a predefined severity. For example, for these events, the event ID and severity code are sent.

Thus, when agent 11125 of security management agent 11220 receives an alert, for example, from managed product 12210 via log/event provider 11141 and a connection with web server 12500 is unavailable, agent 11125 passes the alert to SNMP trap extension 11103. SNMP trap extension 11103 forwards the alert to SNMP agent 11104 that in turn transfers the alert to SNMP manager 13800. SNMP manager 13800 forwards the alert to any SNMP manager that collects traps, such as HP OpenView ITO system 13900. Hence, these messages bypass management servers and related brokering services of security management system 150C. Accordingly, the SNMP infrastructure provides a back-up system for managed product 12210. The SNMP, SNMP agents, SNMP managers, MIBs, and systems that utilize SNMP, such as HP OpenView ITO are known to those of skill in the art and so are not considered further.

Each managed product, e.g., managed product 12210 may create its own database table, distinct from other managed products, within central database 10111A. Alternatively, a managed product extends an existing schema for a reporting family. The table stores tokens sent from the logging and alerting provider 11141 on behalf of managed product 12210 to logging servlet 13110A. In addition, language translation tables for the tokens are created for each translated language. In one embodiment, a key to a local definition table includes a language identifier and an event type identifier. The language is used to select a local definition table, and the event type identifier is use to select a particular item in the local definition table. At report generation time, SQL views are populated that query one or more product token and translation tables for a report in a particular language. These views and queries may be stored as for future reporting.

For example, an antivirus application SAV for Microsoft WINDOWS NT Server has a table that has fields for its product ID, platform ID, server group, host machine, log messages, virus events, etc. An antivirus application for Microsoft Exchange has a different table with similar information. All of these tables have the same table schema. Hence, a report can be later generated that indicates the number of virus events across both products, for a particular week, or for a particular server group.

The logging and event API for a managed product can be relatively simple, with delimited fields within a line-feed terminated record passed to the logging and alerting provider 11141 in security management agent 11220. The mandatory fields in the event are parsed in a particular order, including a time stamp, before any optional fields defined by the managed product.

Among the mandatory fields are an assigned application ID and log record ID scoped within the package ID. These log record IDs must be unique within the package ID scope and are part of table indexes created for the token and translation tables in the database. This allows management console 10330 the ability to provide some rudimentary event correlation configuration by assigning particular alert-able records with a certain severity level to a specific notification action. It also allows translation of the log into a spoken language on the fly using the language identifier and event type identifier described above.

For example, a severity 5 alert-able event for one product might require an email to a different person than the same type of event for a different product. At a more granular level, each event for a particular managed product corresponds to an alert-able record with a specific ID, each of which could be handled separately.

In one embodiment, a security base event package 14000 (FIG. 14) includes events that are likely to be common to all vendor products managed by security management system 150, 150A, 150B, 150C. These events include simple events like Application Stop, Application Start, Application Update, Configuration Update, etc.

In the following description of one embodiment of hierarchical event structure suitable for use with this invention, security management system 150 is used as a shorthand for security management system 150, 150A, 150B, 150C, and should be interpreted as indicating that the hierarchical event structure is suitable for use with all embodiments of the security management system.

Similarly, reference numerals from FIG. 2 are used to relate the description to the drawings. Again, this is illustrative only and is not intended to limit the use of the events to the embodiment of FIG. 2. In view of the following description, the hierarchical event structure can be implemented in any desired network, system, or application to transfer information in a structured platform independent manner in addition to the various embodiments of the security management system described herein.

Security Base Event Package P A security base event package 14000 (FIG. 14) contains a security base event class CLASS_BASE. In this embodiment, all other event classes extend security base event class CLASS_BASE. This means that the fields in security base event class CLASS_BASE are common to all events in security management system 150. Upon the creation of an event by a product specific operation control module 211_*j*, module 211_*j* first populates the security base event class fields, then adds the data to populate additional fields specific to the event class instantiated for the managed product.

Figure 14:
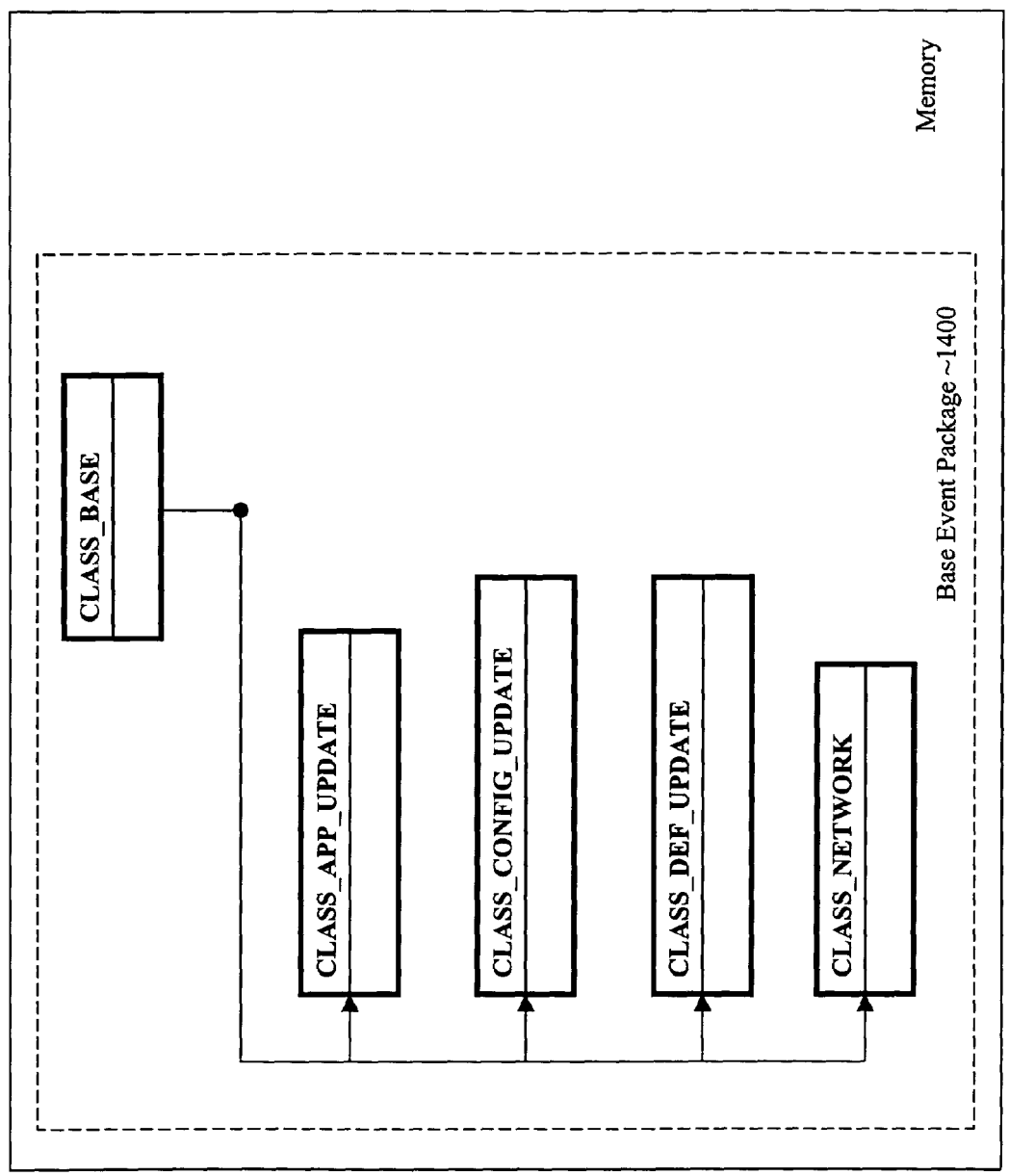
FIG. 14 is a diagram of a security base event package memory structure that includes a plurality of predefined hierarchical class structures according to one embodiment of the present invention.

TABLE 1 and FIG. 14 present one embodiment of a base class hierarchy in security base event package 14000 and event IDs used for objects of each class in the hierarchy. Herein, and in security management system 150, event IDs are used to distinguish between events and to uniquely name each event.

TABLE 1

| Event Class | Event IDs |
|---|---|
| CLASS_BASE | EVENT_APPLICATION_START |
|  | EVENT_APPLICATION_STOP |
| CLASS_APP_UPDATE | EVENT_APPLICATION_UPDATE |
|  | EVENT_APPLICATION_UPDATE_FAILED |
| CLASS_CONFIG_UPDATE | EVENT_CONFIGURATION_CHANGE |
|  | EVENT_CONFIGURATION_CHANGE_FAILED |
| CLASS_DEF_UPDATE | EVENT_VIRUS_DEFINITION_UPDATE |
|  | EVENT_FIREWALL_RULE_UPDATE |
|  | EVENT_VULNERABILTIY_DEFINITION_UPDATE |
|  | EVENT_DICTIONARY_UPDATE |
|  | EVENT_LIST_UPDATE |
|  | EVENT_VIRUS_DEFINITION_UPDATE_FAILED |
|  | EVENT_FIREWALL_RULE_UPDATE_FAILED |
|  | EVENT_VULNERABILTIY_DEFINITION_ |

TABLE 1-continued

| Event Class | Event IDs |
| --- | --- |
| | UPDATE_FAILED |
| | EVENT_DICTIONARY_UPDATE_FAILED |
| | EVENT_LIST_UPDATE_FAILED |
| CLASS_NETWORK | EVENT_NETWORK_EVENT |

In this embodiment, for each event class, an instance of the event class includes a corresponding event identifier (ID), an event category and an event severity. An embodiment of the event classes and events, in a plurality of event packages, including descriptions and data types of the fields for each event class is presented below. The names of the event classes, events, and data types as well as the identifiers for each are illustrative only and are not intended to limit the invention to the specific names and identifiers used herein.

Moreover, each table that presents the fields included in a particular event class represents a structure in a memory for each instance of the class. The memory-based structure contains information for a particular event. Moreover, the various views presented below also represent memory structures with information that can be used to generate displays or can be used as input to rules engines, for example, for feedback and control, or for further processing of the security information.

Security Base Event Class

Figure 15A:
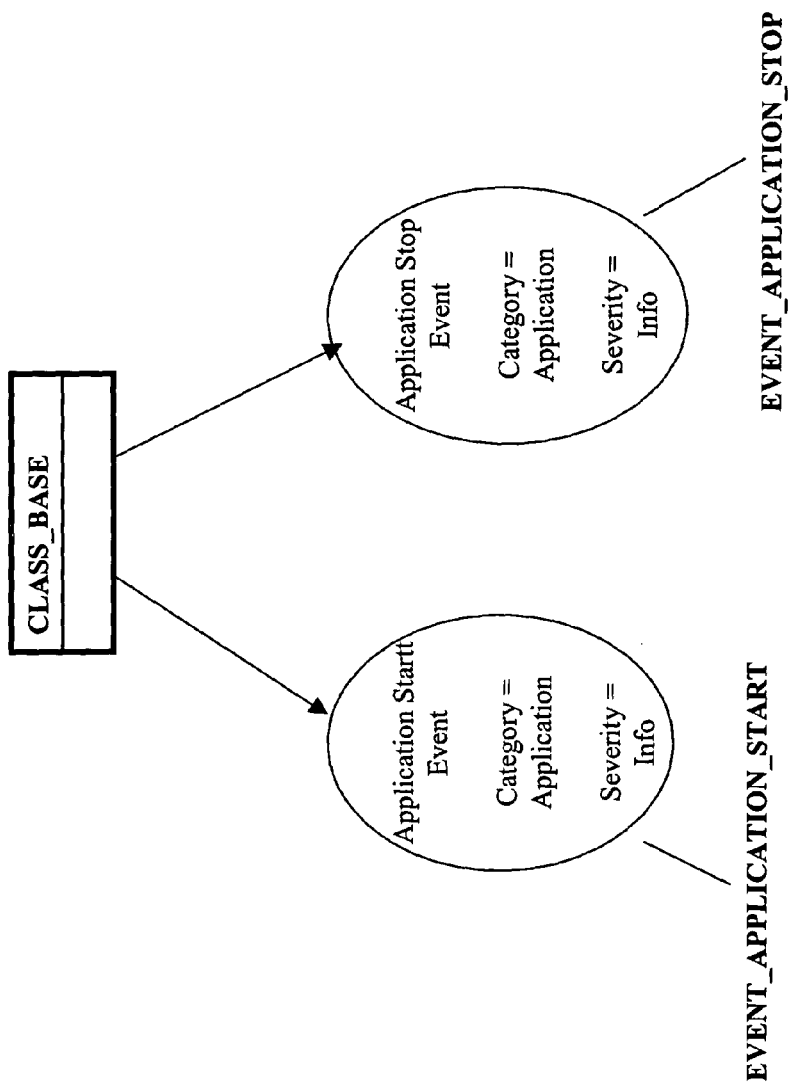
FIG. 15A is an illustration of objects that are instantiations of the security base event class of FIG. 14 according to one embodiment of the present invention.
Figure 15B:
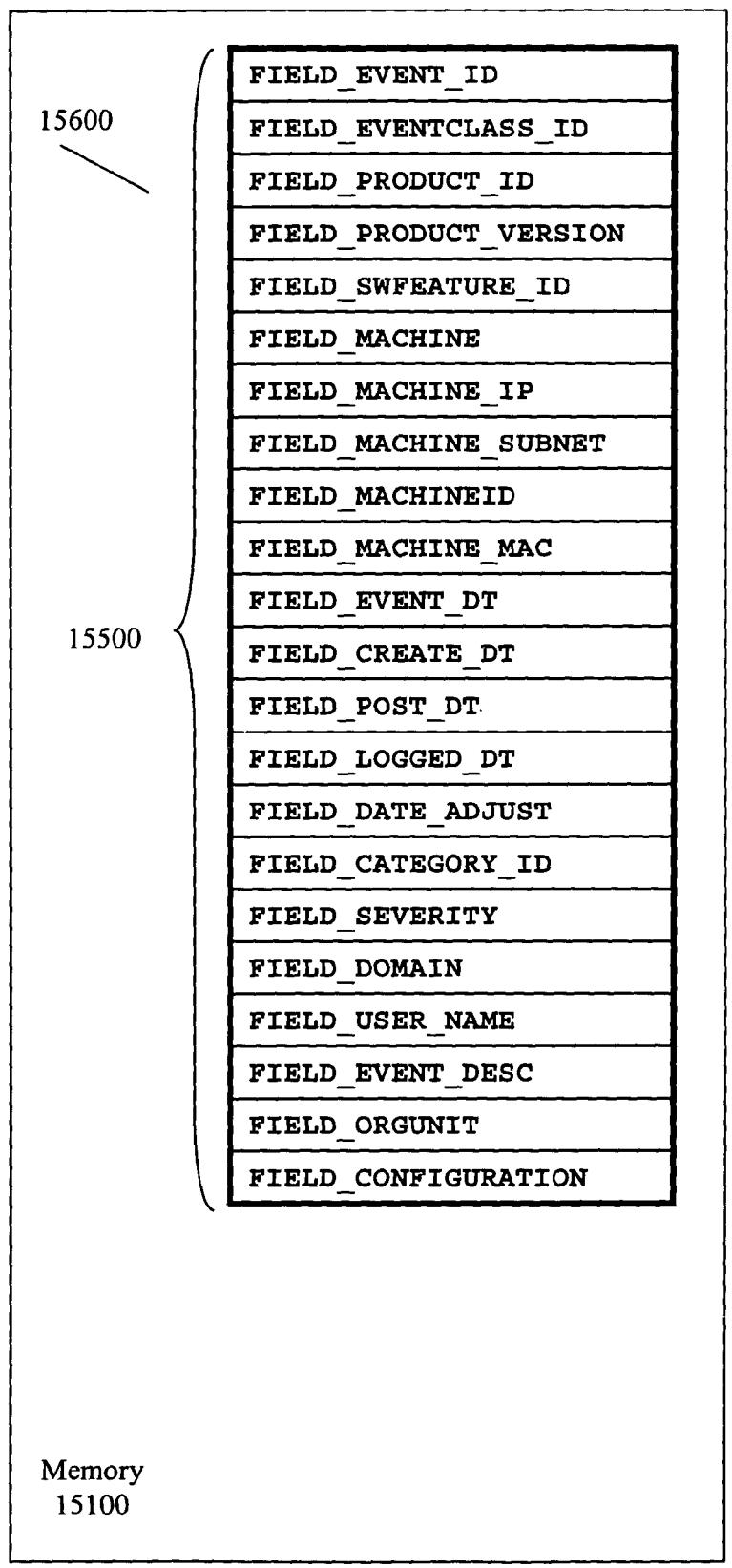
FIG. 15B is an illustration of a security base event memory structure that is used for each of the objects of the security base event class of FIG. 15A according to one embodiment of the present invention.

Security base event class CLASS_BASE has, in this embodiment, a predefined event class identifier, e.g., 91000. Event objects, that are instantiations of security base event class CLASS_BASE include event EVENT_APPLICATION_START (FIG. 15A), an application start event; and event EVENT_APPLICATION_STOP, an application stop event. (Here and below, the event ID is used as a reference numeral for the event.) The event category for both events is category CAT_APPLICATION. The event severity for both events is severity SEV_INFORMATIONAL Base Class Fields TABLE 2 presents one embodiment of the fields in security base event class CLASS_BASE. The type of each field also is presented in TABLE 2. A description of the value in each field follows TABLE 2. FIG. 15B illustrates a security base event memory structure 15600 stored in a memory 15100 that includes fields 15500 of TABLE 2. Memory structure 15600 is illustrative only and is not intended to represent that the structure is stored in any particular way in memory 15100.

TABLE 2

| Field Name | Type |
| --- | --- |
| FIELD_EVENT_ID | id |
| FIELD_EVENTCLASS_ID | id |
| FIELD_PRODUCT_ID | id |
| FIELD_PRODUCT_VERSION | version |
| FIELD_SWFEATURE_ID | id |
| FIELD_MACHINE | info |
| FIELD_MACHINE_IP | info |
| FIELD_MACHINE_SUBNET | info |
| FIELD_MACHINEID | info |
| FIELD_MACHINE_MAC | info |
| FIELD_EVENT_DT | date |
| FIELD_CREATE_DT | date |
| FIELD_POST_DT | date |
| FIELD_LOGGED_DT | date |
| FIELD_DATE_ADJUST | date |
| FIELD_CATEGORY_ID | id |
| FIELD_SEVERITY | int |

TABLE 2-continued

| Field Name | Type |
| --- | --- |
| FIELD_DOMAIN | info |
| FIELD_USER_NAME | info |
| FIELD_EVENT_DESC | info |
| FIELD_ORGUNIT | info |
| FIELD_CONFIGURATION | info |

An event identifier value is stored in an event identifier field FIELD_EVENT_ID. In one embodiment, the event identifier value is supplied using a create event function in an API that creates an event in base class package 14000, or alternatively another event that inherits from security base event class CLASS_BASE, but is not included in base class package 14000.

A class identifier is stored in an event class identifier field FIELD_EVENTCLASS_ID. In this embodiment, the class ID is defined in a header file for the event package containing the event. The class ID value is supplied by the create event function. A product version string is stored in a product version field FIELD_PRODUCT_VERSION. This is the initial managed product version in most instances.

A software feature ID is stored in a software feature identifier field FIELD_SWFEATURE_ID. The software feature ID is defined in header file for managed product 201_*j* in one embodiment. Each managed product 210_*j* has at least one software feature ID defined for logging and configuration purposes. Additional software feature IDs can be defined within an ID range for managed product 210_*j*. In one embodiment, the value of the software feature ID is supplied by managed product 210_*j* using a client initialization function.

A computer name of the computer on which managed product 210_*j* is running and/or operating, e.g., a name of the managed node, is stored in a machine field FIELD_MACHINE. The computer IP address on which managed product 210_*j* is running and/or operating is stored in a machine address field FIELD_MACHINE_IP. A computer IP subnet, to which the computer on which managed product 210_*j* is running and/or operating belongs, is stored in a machine subnet field FIELD_MACHINE_SUBNET.

An identifier for the computer on which managed product 210_*j* is running and/or operating is stored in a machine identifier field FIELD_MACHINEID. The identifier stored in field FIELD_MACHINEID is used by security management system 150. A MAC address of the network card in the computer on which managed product 210_*j* is running and or operating is stored in a machine MAC address field FIELD_MACHINE_MAC.

Field FIELD_EVENT_DT stores the date and time the event is received by security management agent 220_*m*. The date and time is considered the data and time that the event occurred.

Filed FIELD_CREATE_DT is the date and time agent 220_*m* created its own record for the event. This data is supplied by agent 220_*m*.

Field FIELD_POST_DT stores the date and time the event was cached by the logging service on the server, i.e., posted.

Field FIELD_LOGGED_DT stores the date and time the event was logged, i.e., put in the database by the logging service on the server.

Figure 13:
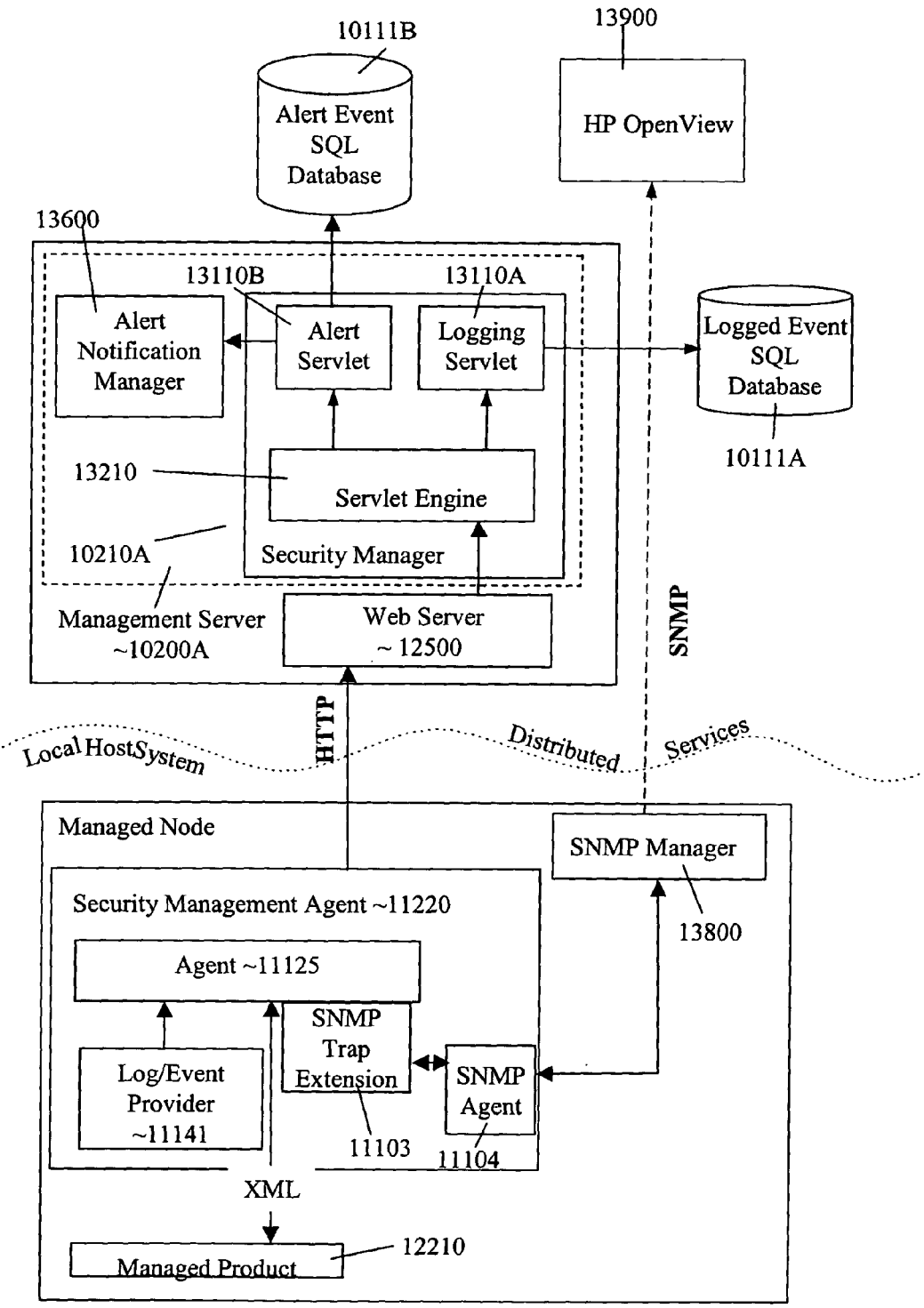
FIG. 13 is a more detailed diagram of a portion of the N-tier system of FIG. 10 that includes an alternative network management application that is utilized when a connection to the management server is unavailable according to one embodiment of the present invention.

Data adjust field FIELD_DATE_ADJUST stores a number of seconds that the values stored in fields FIELD_EVENT_DT and FIELD_CREATE_DT were adjusted to normalize the client date with the date of security manager 10210A. In the embodiment of FIG. 13, this data is supplied by logging servlet 13110A.

Event category identifier field FIELD_CATEGORY_ID stores a category of the event. A category value is supplied by managed product 210_*j* using a create event function. In one embodiment, the event category is represented by an enumerated value that in turn represents one of the categories in TABLE 3. In this embodiment, the categories include application, communication, quality of service, device, environment, security and diagnostic.

The categories presented in TABLE 3 are illustrative only and are not intended to limit the invention to this specific set of categories. In view of this disclosure, those of skill in the art can define a set of categories suitable for use with a particular embodiment of security management system 150.

TABLE 3

| Category Value | Description |
| --- | --- |
| CAT_APPLICATION | Application activities including software or processing faults. |
| CAT_COMMUNICATIONS | Procedures and or processes required to convey information from one point to another |
| CAT_QOS | Degradation or errors in performance or function. |
| CAT_DEVICE | Equipment or hardware fault. |
| CAT_ENVIRONMENT | Condition relating to an enclosure in which hardware resides or other environmental considerations. |
| CAT_SECURITY | Security violations, detection of viruses, and similar issues. |
| CAT_DIAGNOSTIC | Software application operation tracing and debugging. Severity is understood to mean trace level. |

Event severity field FIELD_SEVERITY (TABLE 2) stores a severity of the event. The event severity is supplied by managed product 210_*j* using a create event function. In one embodiment, the event severity is represented by an enumerated value that in turn represents one of the severities in TABLE 4. In this embodiment, the severities include informational, warning, minor, major, critical, and fatal.

The severities presented in TABLE 4 are illustrative only and are not intend to limit the invention to this specific set of severities. In view of this disclosure, those of skill in the art can define a set of severities suitable for use with a particular embodiment of security management system 150.

TABLE 4

| Severity Value | Description |
| --- | --- |
| SEV_INFORMATIONAL | Purely informational event |
| SEV_WARNING | Feedback and control system, or alternatively, user decides if action is needed |
| SEV_MINOR | Action needed but situation not serious at this time |
| SEV_MAJOR | Action needed NOW |
| SEV_CRITICAL | Action needed NOW and the scope is broad. |
| SEV_FATAL | Error occurred but too late to take remedial action |

Domain field FIELD_DOMAIN (TABLE 2) stores a domain of a computer running managed product 210_*j*. The value stored in field FIELD_DOMAIN is supplied by the managed product. In another embodiment (not shown), both the domain of the managed product and the domain of the security agent are stored in the base event. User name field FIELD_USER_NAME stores a user name of a user logged on to the computer. This value stored in FIELD_USER_NAME is also supplied by security agent 220_*m*.

A description of the event, if needed, is stored in an event description field FIELD_EVENT_DESC. An organizational unit of the machine on which managed product 210_*j* is running is stored in organizational unit field FIELD_ORGUNIT. The information stored in organizational unit field FIELD_ORGUNIT is provided by security management agent 220_*m*.

Configuration field FIELD_CONFIGURATION is an additional field provided for storing information indicating the configuration name (HR settings, Marketing settings.) used by the managed product at the time of the event. The information in this field is used for reporting purposes, in one embodiment. As explained more completely in copending, commonly filed and commonly assigned U.S. patent application Ser. No. 10/660,422, entitled "Configuration System and Methods Including Configuration Inheritance and Revisioning," of Paul M. Agbabian and David R. Hertel, which is incorporated herein by reference in its entirety, for an event, the information in this field is used to cross-reference into a configuration revision history and if available, an inheritance tree at the time of the event to determine the effective configuration.

Application Update Class

Application update class CLASS_APP_UPDATE (FIG. 14) inherits from security base event class CLASS_BASE. In this embodiment, application update class CLASS_APP_UPDATE has a predefined event class identifier, e.g., 91001 Event objects, that are instantiations of application update class CLASS_APP_UPDATE include event EVENT_APPLICATION_UPDATE (FIG. 16A), an application update succeeded event; and event EVENT_APPLICATION_UPDATE_FAILED, an application update failed event.

For event EVENT_APPLICATION_UPDATE, the event category is category CAT_APPLICATION (See TABLE 3). The event severity is severity SEV_INFORMATIONAL. (See TABLE 4).

For event EVENT_APPLICATION_UPDATE_FAILED, the event category is category CAT_APPLICATION. The event severity is severity SEV_WARNING.

In addition to the fields presented in TABLE 2 for security base event class CLASS_BASE, application update event class CLASS_APP_UPDATE adds the fields presented in TABLE 5 to the fields for security base event class CLASS_BASE. The type of each field also is presented in TABLE 5. A description of the value in each field follows TABLE 5.

Figure 16A:
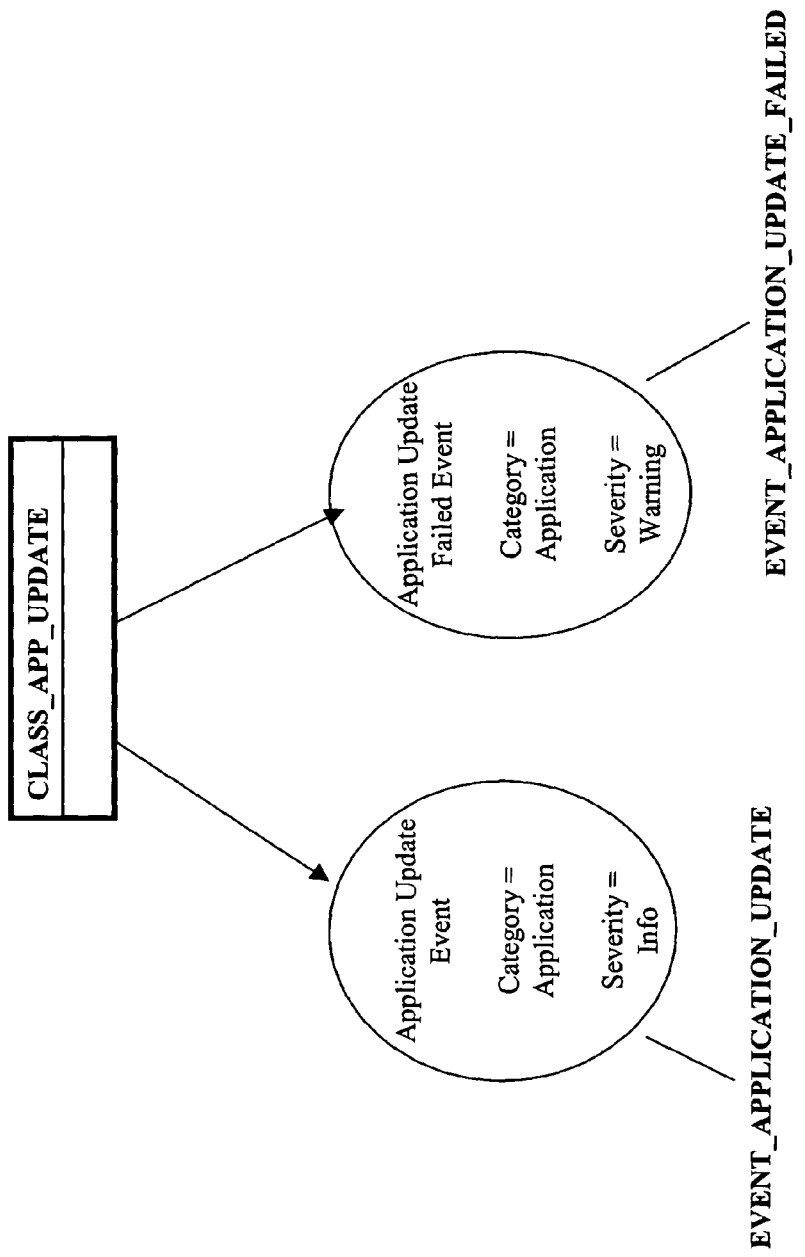
FIG. 16A is an illustration of objects that are instantiations of the application update event class of FIG. 14 according to one embodiment of the present invention.
Figure 16B:
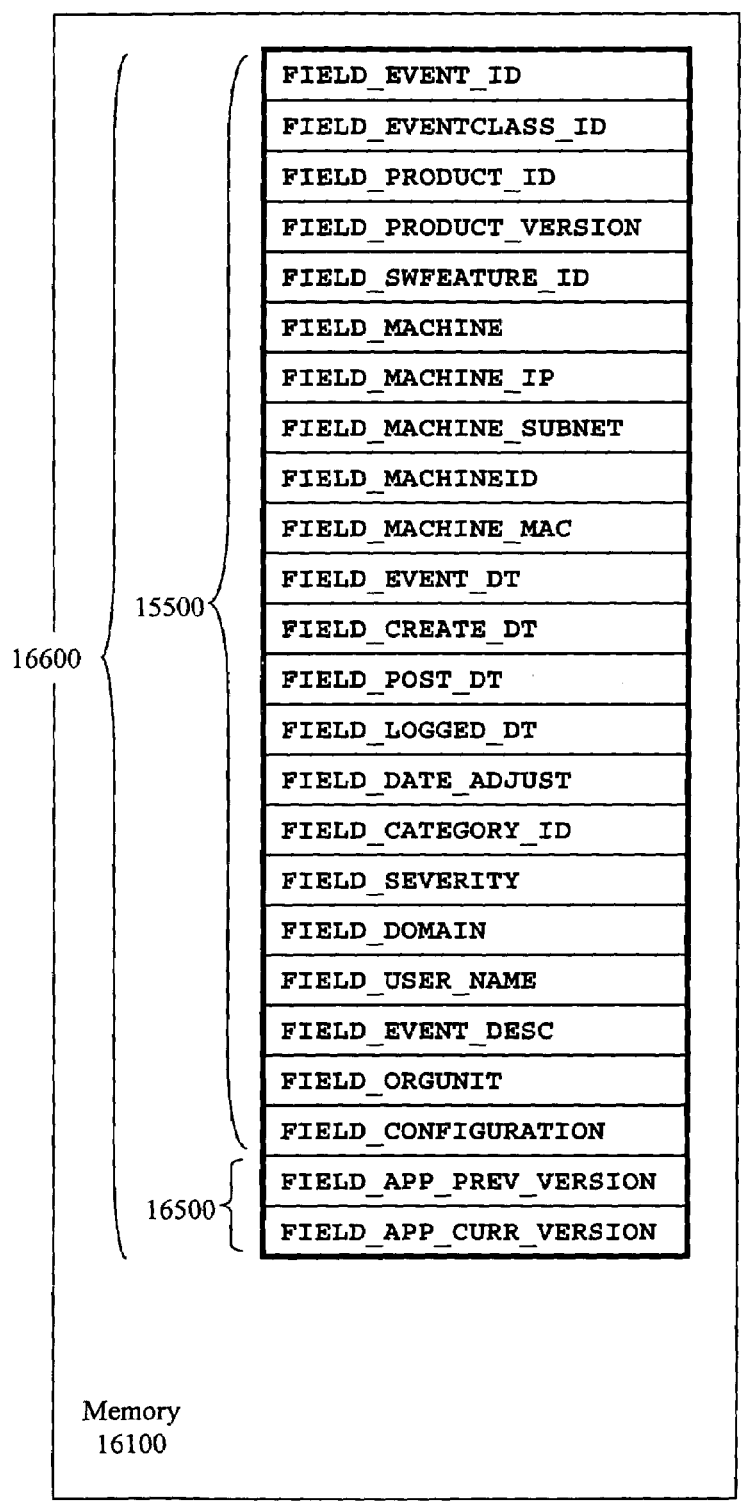
FIG. 16B is an illustration of an application update event memory structure that is used for each of the objects of the application update event class of FIG. 16A according to one embodiment of the present invention.

FIG. 16B illustrates an application update event memory structure 16600 stored in memory 16100. Structure 16500 includes security base event fields 15500 and two additional fields 16500 of TABLE 5. Memory structure 16600 is illustrative only and is not intended to represent that the structure is stored in any particular way in memory 16100.

TABLE 5

| Field Name | Type |
| --- | --- |
| FIELD_APP_PREV_VERSION | Version |
| FIELD_APP_CURR_VERSION | Version |

A previous version number of managed product 201_j is stored in an application previous version field FIELD_APP_PREV_VERSION. (TABLE 5) A current version number of managed product 201_j is stored in an application current version field FIELD_APP_CURR_VERSION.

In one embodiment, an application update event is used for revision updates. For example, an application continues to report 1.0 in field FIELD_PRODUCT_VERSION as its base version, reports 1.0.1 in field FIELD_APP_PREV_VERSION as its previous version, and reports 1.0.2 in field FIELD_APP_CURR_VERSION as its current version.

Figure 16C:
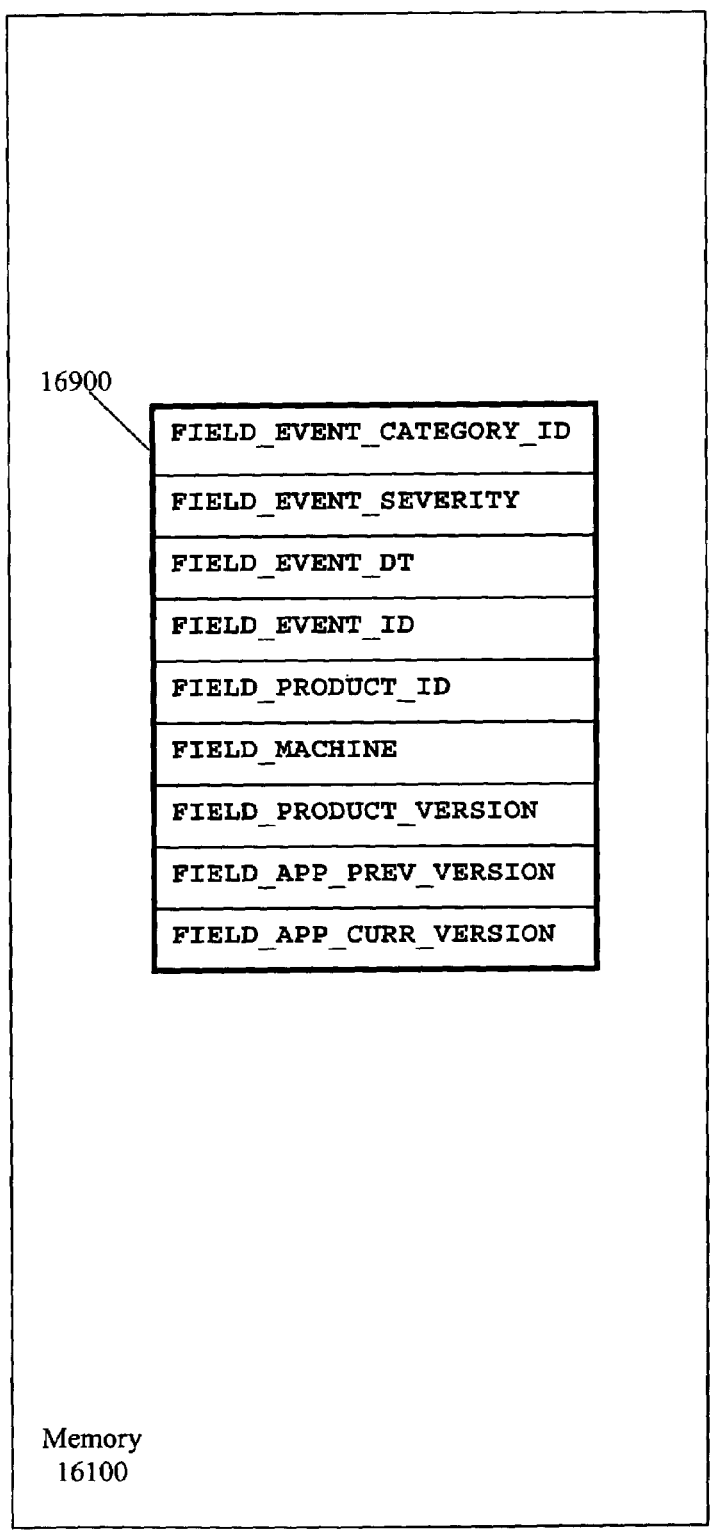
FIG. 16C is an illustration of an application update event view object for a database according to one embodiment of the present invention.

TABLE 6 is an example of a view 16900 (FIG. 16C) that uses the information in application update event 16500 (FIG. 16B). A view is a database object that is defined for an event class by a managed product 201_j, as described more completely below. View 16900, which is stored in memory 16100, can be used to retrieve information for display, or a report, or input, for example, to a rules engine as illustrated in TABLE 6.

TABLE 6

| Field Name | Sample Data Retrieved with View |
| --- | --- |
| FIELD_CATEGORY_ID | Application |
| FIELD_SEVERITY | 1 |
| FIELD_EVENT_DT | Mar. 11, 2003, 1:20:23 PM |
| FIELD_EVENT_ID | Application Update Succeeded |
| FIELD_PRODUCT_ID | SAV |
| FIELD_MACHINE | Bluegill |
| FIELD_PRODUCT_VERSION | 1.0 |
| FIELD_APP_PREV_VERSION | 1.0.1 |
| FIELD_APP_CURR_VERSION | 1.0.2 |

Configuration Update Class

Configuration update class CLASS_CONFIG_UPDATE (FIG. 14) inherits from security base event class CLASS_BASE. In this embodiment, configuration update class CLASS_CONFIG_UPDATE has a predefined event class identifier, e.g., 91002.

Figure 17A:
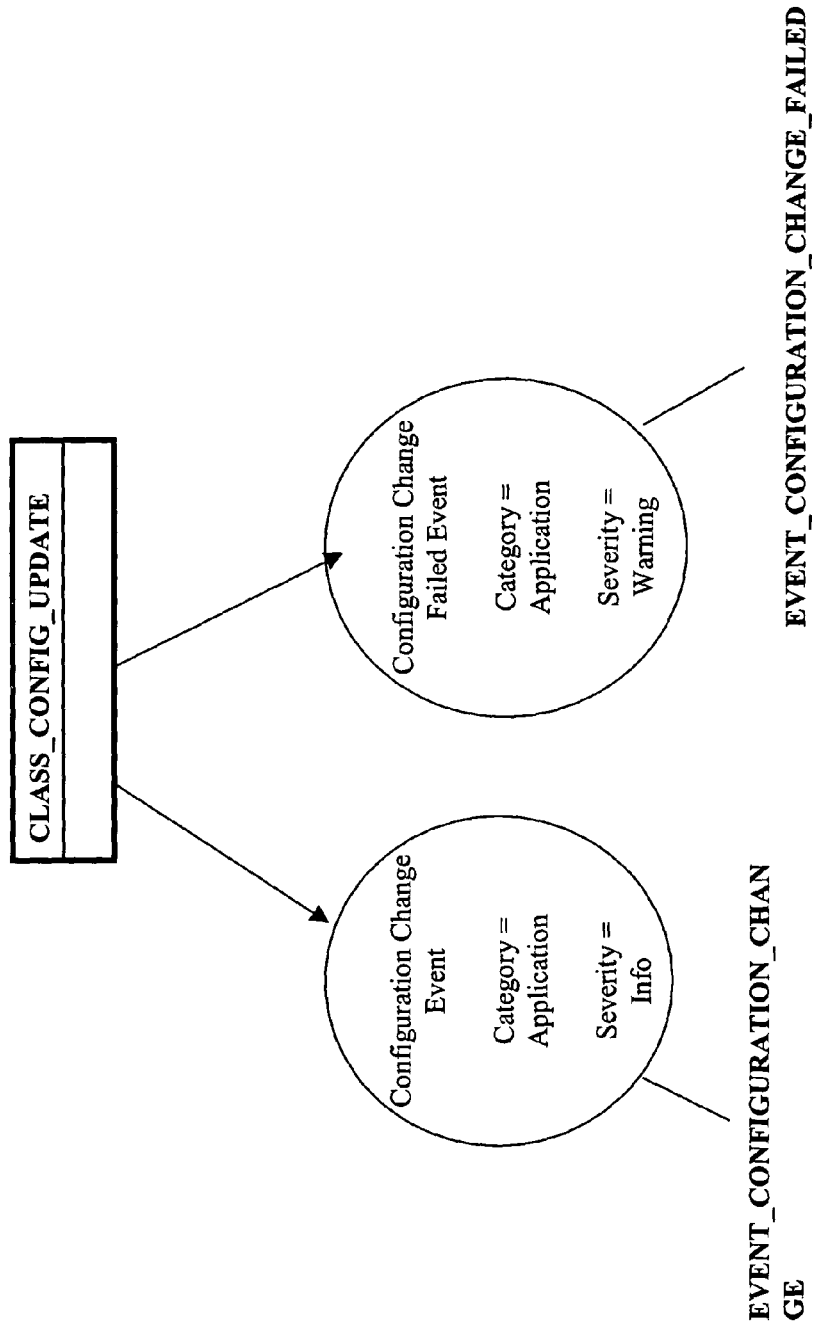
FIG. 17A is an illustration of objects that are instantiations of the configuration update event class of FIG. 14 according to one embodiment of the present invention.

Event objects, which are instantiations of configuration update class CLASS_CONFIG_UPDATE, include event EVENT_CONFIGURATION_CHANGE (FIG. 17A), a configuration change succeeded event; and event EVENT_CONFIGURATION_CHANGE_FAILED, a configuration change failed event.

For event EVENT_CONFIGURATION_CHANGE, the event category is category CAT_APPLICATION. (See TABLE 3.) The event severity is severity SEV_INFORMATIONAL. (See TABLE 4.)

For event EVENT_CONFIGURATION_CHANGE_FAILED, the event category is category CAT_APPLICATION. The event severity is severity SEV_WARNING.

In addition to the fields presented in TABLE 2 for security base event class CLASS_BASE, configuration update event class CLASS_CONFIG_UPDATE (FIG. 17A) adds the fields presented in TABLE 7 to the fields for security base event class CLASS_BASE. The type of each field also is presented in TABLE 7. A description of the value in each field follows TABLE 7.

Figure 17B:
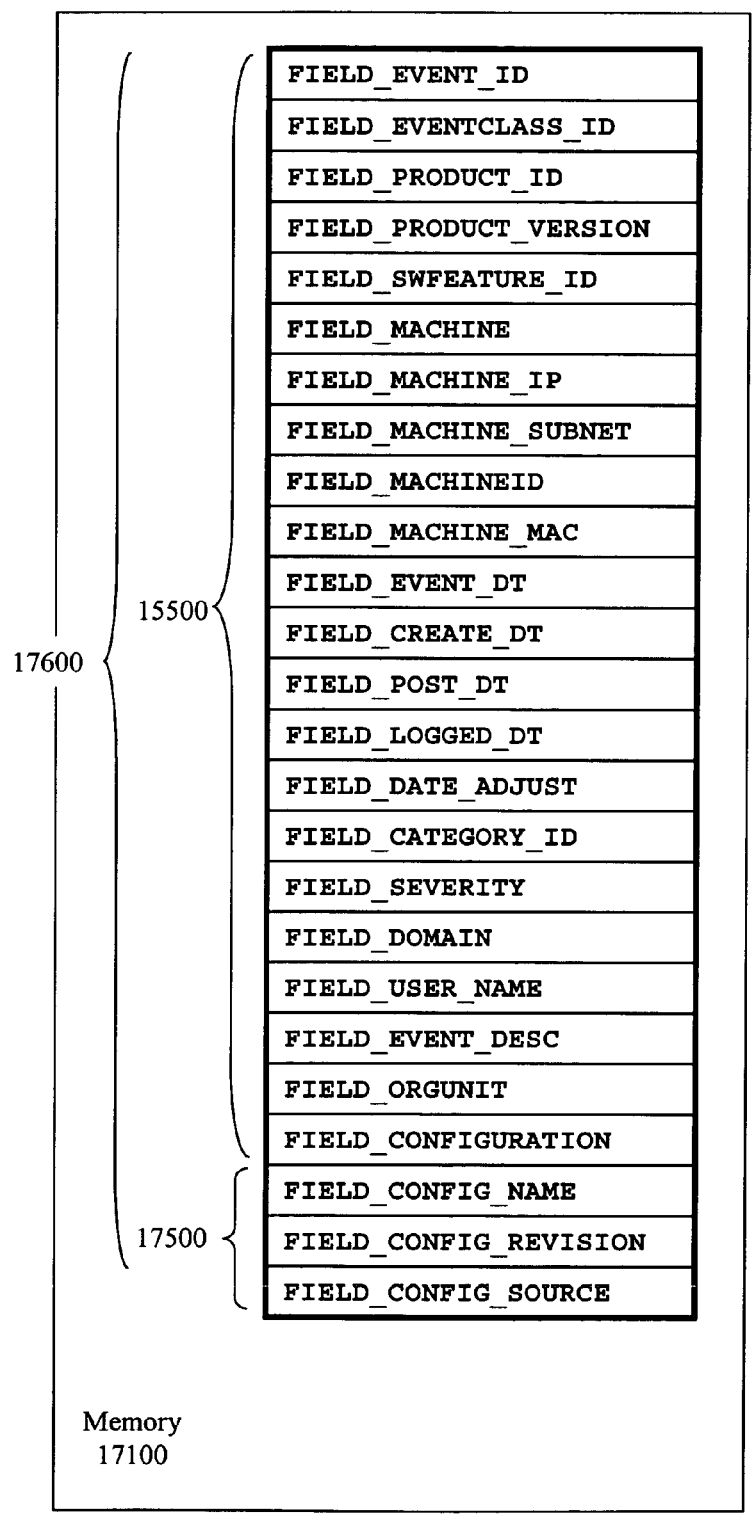
FIG. 17B is an illustration of a configuration update event memory structure that is used for each of the objects of the configuration update event class of FIG. 17A according to one embodiment of the present invention.

FIG. 17B illustrates a configuration update event memory structure 17600 stored in memory 15100. Structure 17600 includes security base event memory structure 15500 and fields 17500 that are presented in TABLE 7. Memory structure 17600 is illustrative only and is not intended to represent that the structure is stored in any particular way in memory 17100.

TABLE 7

| Field Name | Type |
| --- | --- |
| FIELD_CONFIG_NAME | info |
| FIELD_CONFIG_REVISION | info |
| FIELD_CONFIG_SOURCE | info |

A name of the configuration is stored in a configuration name field FIELD_CONFIG_NAME. A revision indicator for the configuration of managed product 210_j is stored in a configuration revision field FIELD_CONFIG_REVISION. A source of the configuration change is stored in configuration source field FIELD_CONFIG_SOURCE. For example, the source can be security management system 150, security feedback and control system 155, a GUI for managed product 201_j, or some other mechanism.

Definition Update Class

Definition update class CLASS_DEF_UPDATE (FIG. 14) inherits from security base event class CLASS_BASE. In this embodiment, configuration update class CLASS_DEF_UPDATE has a predefined event class identifier, e.g., 91003.

Figure 18A:
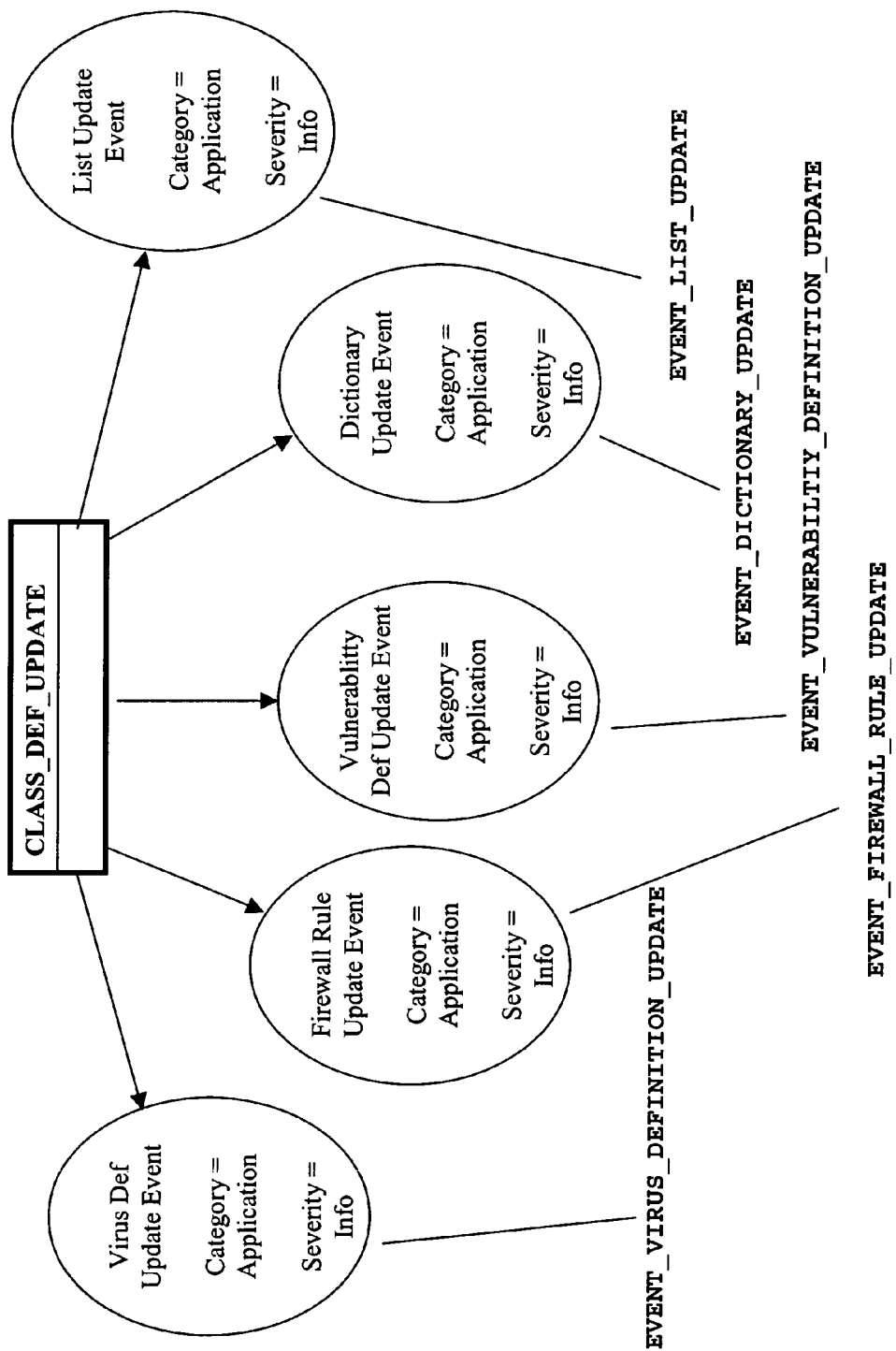
FIGS. 18A and 18B are an illustration of objects that are instantiations of the definition update event class of FIG. 14 according to one embodiment of the present invention.
Figure 18B:
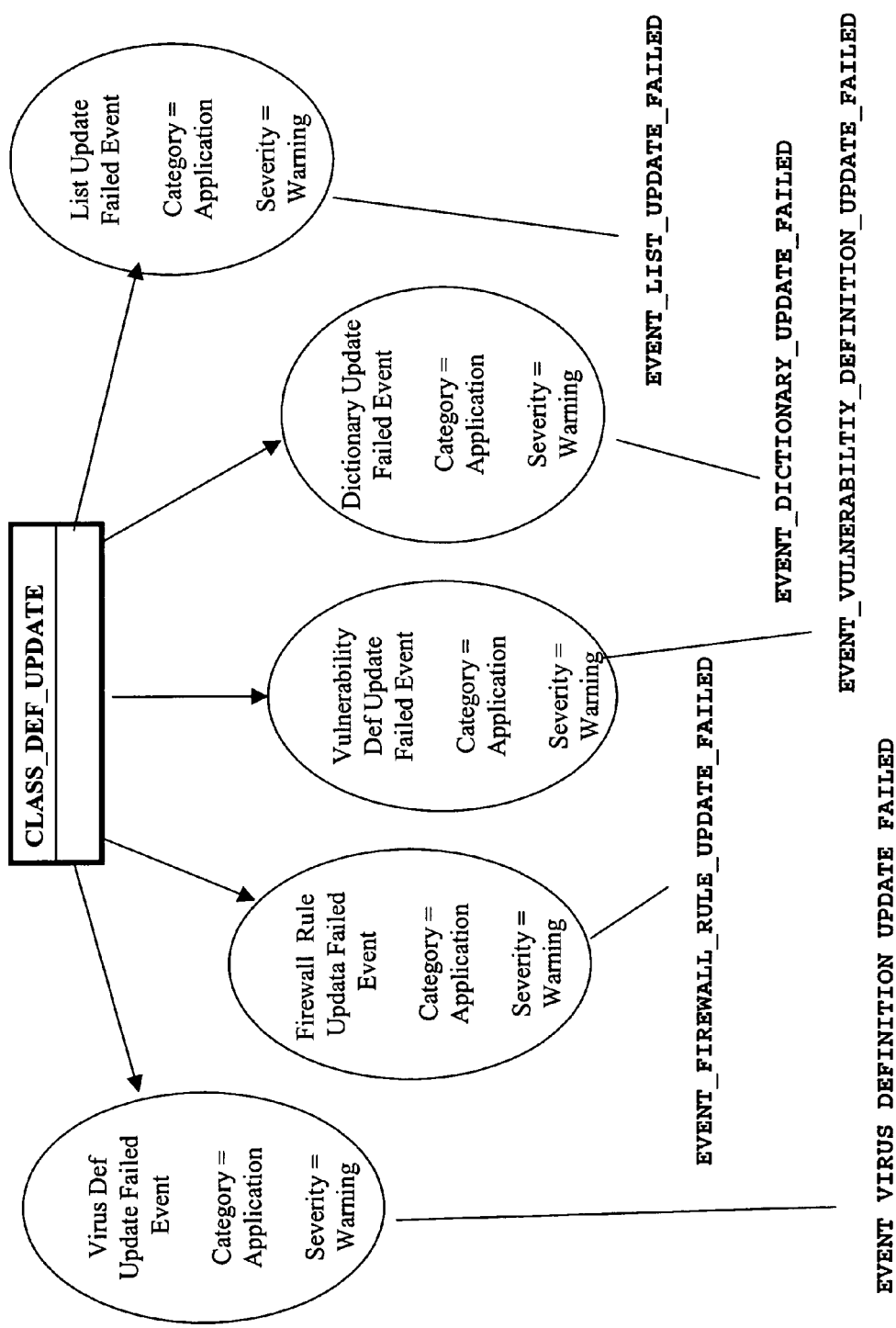

Event objects, which are instantiations of configuration update class CLASS_DEF_UPDATE, include:
event EVENT_VIRUS_DEFINITION_UPDATE (FIG. 18A), a virus definition update succeeded event;
event EVENT_FIREWALL_RULE_UPDATE, a firewall rule update succeeded event;
event EVENT_VULNERABILTIY_DEFINITION_UPDATE, a vulnerability update succeeded event;
event EVENT_DICTIONARY_UPDATE, a dictionary update succeeded event;
event EVENT_LIST_UPDATE, a list update succeeded event;
event EVENT_VIRUS_DEFINITION_UPDATE_FAILED (FIG. 18B), a virus definition update failed event;
event EVENT_FIREWALL_RULE_UPDATE_FAILED, a firewall rule update failed event;
event EVENT_VULNERABILTIY_DEFINITION_UPDATE_FAILED, a vulnerability update failed event;
event EVENT_DICTIONARY_UPDATE_FAILED, a dictionary update failed event; and
event EVENT_LIST_UPDATE_FAILED, a list update failed event.

For events EVENT_VIRUS_DEFINITION_UPDATE, EVENT_FIREWALL_RULE_UPDATE, EVENT_VULNERABILTIY_DEFINITION_UPDATE, EVENT_DICTIONARY_UPDATE, and EVENT_LIST_UPDATE, the event category is category CAT_APPLICATION. (See TABLE 3.) The event severity is severity SEV_INFORMATIONAL. (See TABLE 4.)

For events EVENT_VIRUS_DEFINITION_UPDATE_FAILED, EVENT_FIREWALL_RULE_UPDATE_FAILED, EVENT_VULNERABILTIY_DEFINITION_UPDATE_FAILED, EVENT_DICTIONARY_UPDATE_FAILED, and EVENT_LIST_UPDATE_FAILED, the event category is category CAT_APPLICATION. The event severity is severity SEV_WARNING.

In addition to the fields presented in TABLE 2 for security base event class CLASS_BASE, configuration update event class CLASS_DEF_UPDATE (FIG. 14, 18A, 18B) adds the fields presented in TABLE 8 to the fields for security base event class CLASS_BASE. The type of each field also is presented in TABLE 8. A description of the value in each field follows TABLE 8.

Figure 18C:
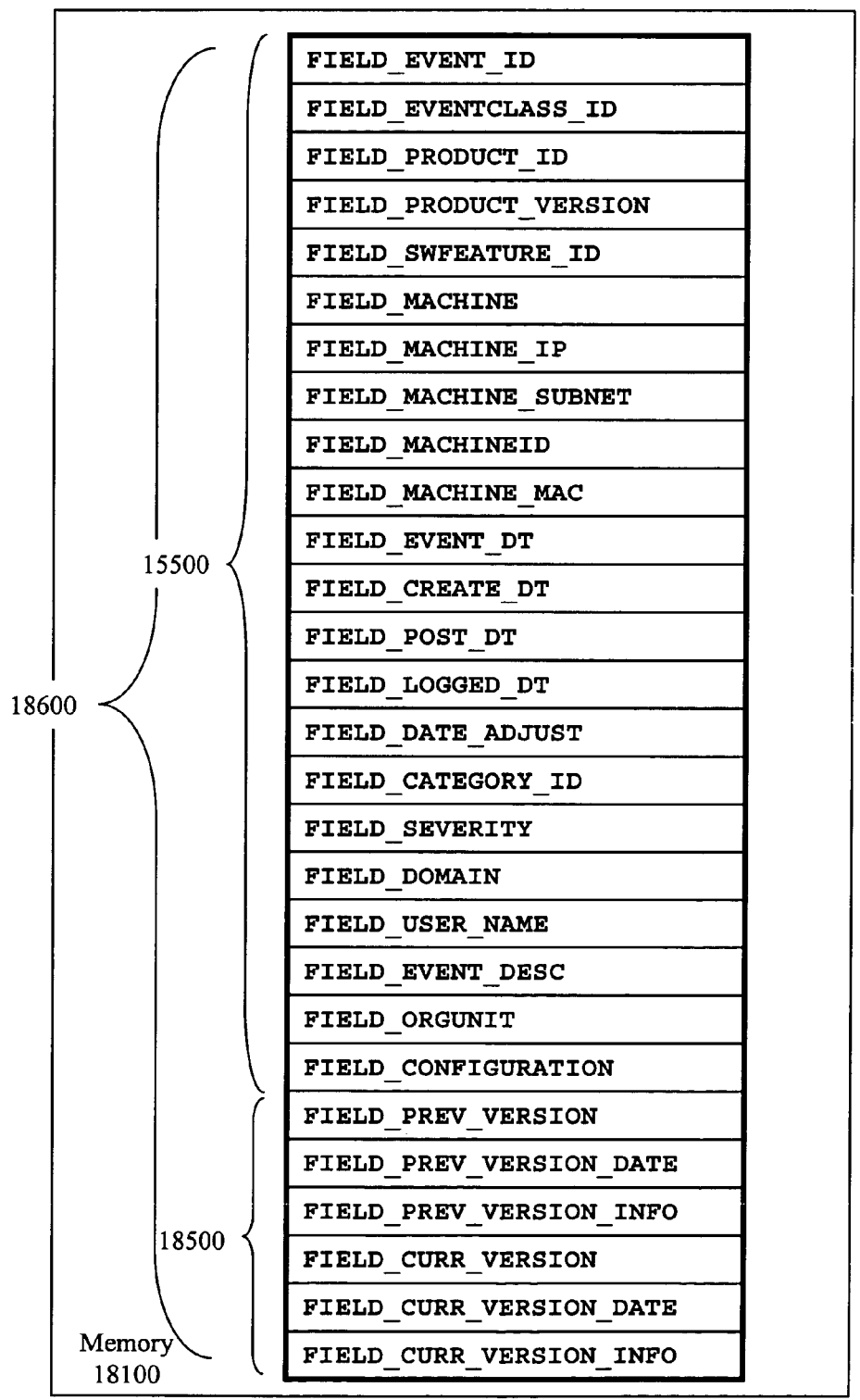
FIG. 18C is an illustration of a definition update event memory structure that is used for each of the objects of the definition update event class of FIGS. 18A and 18B according to one embodiment of the present invention.

FIG. 18C illustrates an application update event memory structure 18600 stored in memory 18100. Structure 18600 includes security base event fields 15500 and six additional fields 18500 of TABLE 8. Memory structure 18600 is illustrative only and is not intended to represent that the structure is stored in any particular way in memory 18100.

TABLE 8

| Fields | Type |
| --- | --- |
| FIELD_PREV_VERSION | version |
| FIELD_PREV_VERSION_DATE | date |
| FIELD_PREV_VERSION_INFO | info |
| FIELD_CURR_VERSION | version |
| FIELD_CURR_VERSION_DATE | date |
| FIELD_CURR_VERSION_INFO | info |

A previous version of the definition is stored in a previous version definition field FIELD_PREV_VERSION. In one embodiment, the format of this field is YYYYMMDD.RRR, where YYYY is the year, MM is the month, DD is the day and RRR is the number of the previous version of the definition.

A date associated with the previous version, if any, is stored in a date of previous version definition field FIELD_PREV_VERSION_DATE. Typically, a previous version number is stored in a previous version definition info field FIELD_PREV_VERSION_INFO. The previous version number, e.g., the number of the previous revision, is in the RRR portion of the value stored in field FIELD_PREV_VERSION. If the version numbering scheme does not include revision numbers, the previous version string itself is stored in this field. This field is not translated.

A current version of the definition is stored in a current version definition field FIELD_CURR_VERSION. In one embodiment, the format of this field is YYYYMMDD. RRR, where YYYY is the year, MM is the month, DD is the day and RRR is the number of the current version of the definition.

A date associated with the current version, if any, is stored in a current version definition date field FIELD_CURR_VERSION_DATE. Typically, a current version number is stored in a current version definition info field FIELD_CURR_VERSION_INFO. The current revision number is in the RRR portion of the value stored in field FIELD_CURR_VERSION. If the version numbering scheme does not include revision numbers, the current version string itself is stored in this field. This field is not translated.

Figure 18D:
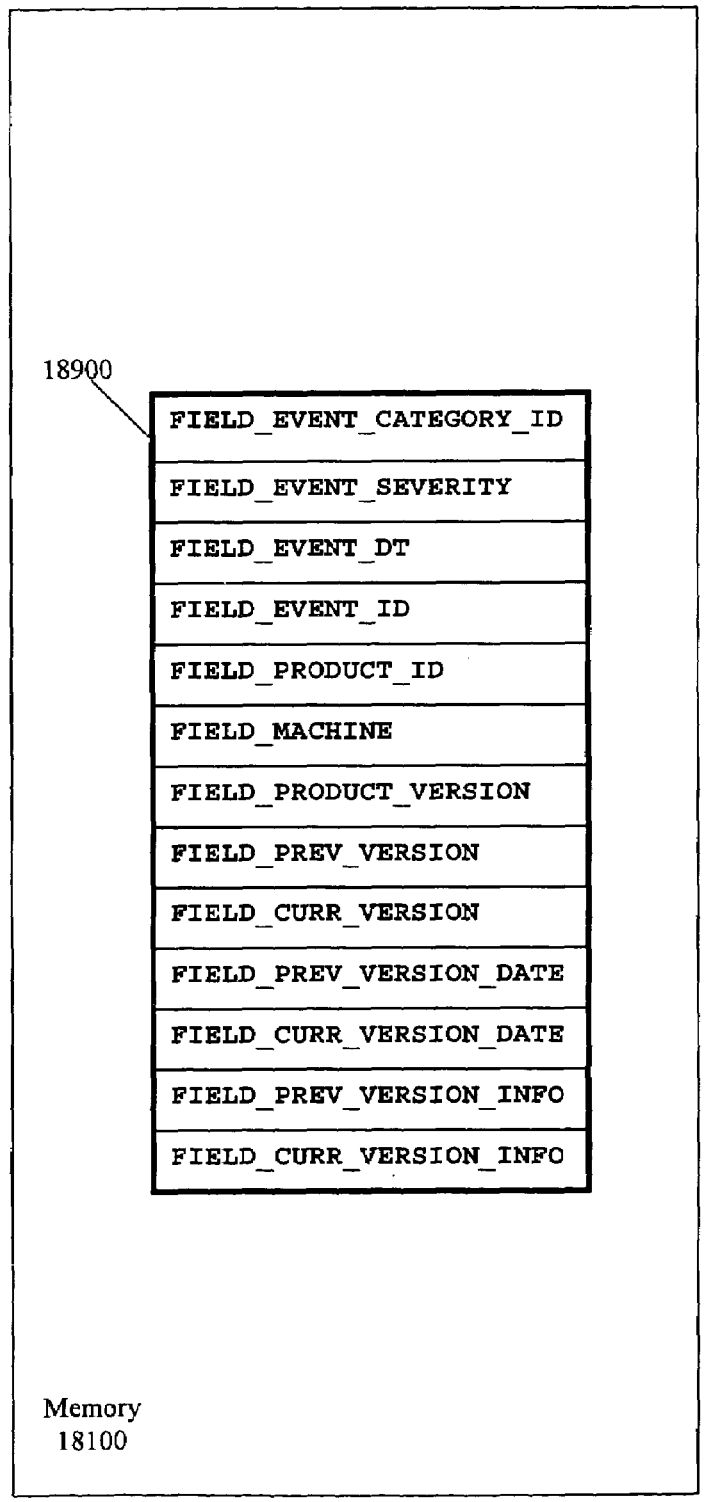
FIG. 18D is an illustration of a definition update event view object for a database according to one embodiment of the present invention.

TABLE 9 is an example of a view 18900 (FIG. 18D) that can be used to extract information in application update event 18600 (FIG. 18C), when that event is for example a virus definition update event EVENT_VIRUS_DEFINITION_UPDATE. View 18900, which is stored in memory 18100, can be used to retrieve information for display or a report or input, for example, to a rules engine as illustrated in TABLE 9.

TABLE 9

| Field Name | Sample Retrieved field Value |
| --- | --- |
| FIELD_CATEGORY_ID | Application |
| FIELD_SEVERITY | 1 |
| FIELD_EVENT_DT | Jan. 11, 2000, 1:20:23 PM |
| FIELD_EVENT_ID | Virus Definition Update Succeeded |
| FIELD_PRODUCT_ID | SAV |
| FIELD_MACHINE | Bluegill |
| FIELD_PRODUCT_VERSION | 1.0 |
| FIELD_PREV_VERSION | 19981230.002 |
| FIELD_CURR_VERSION | 19991231.021 |
| FIELD_PREV_VERSION_DATE | Dec. 30, 1998, 11:20:00 PM |
| FIELD_CURR_VERSION_DATE | Dec. 31, 1999, 1:20:00 AM |
| FIELD_PREV_VERSION_INFO | 002 |
| FIELD_CURR_VERSION_INFO | 021 |

Network Class

Network CLASS_NETWORK (FIG. 14) inherits from security base event class CLASS_BASE. In this embodiment, application network class CLASS_NETWORK has a predefined event class identifier, e.g., 161000.

Figure 19A:
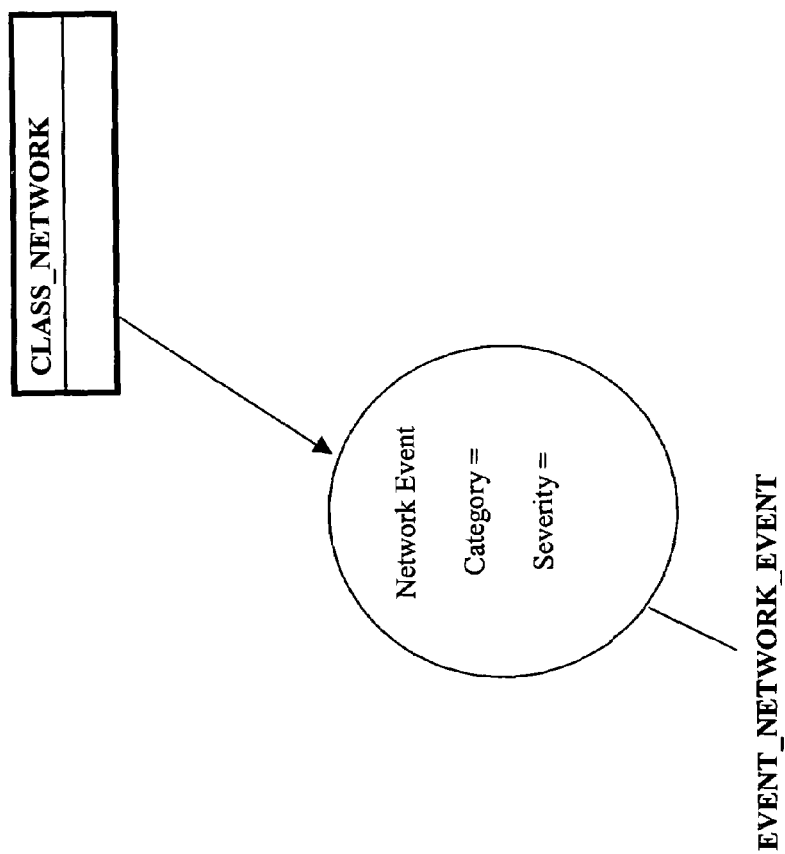
FIG. 19A is an illustration of an object that is an instantiation of the network event class of FIG. 14 according to one embodiment of the present invention.

Event objects, that are instantiations of network class CLASS_NETWORK include event EVENT_NETWORK_EVENT (FIG. 19A). For event EVENT_NETWORK_EVENT, the event category is category CAT_SECURITY. The event severity can be any of the severity levels in TABLE 4.

In addition to the fields presented in TABLE 2 for security base event class CLASS_BASE, network class CLASS_NETWORK extends security base event class CLASS_BASE, in one embodiment, with the fields presented in TABLE 10. The type of each field also is presented in TABLE 10. A description of the value in each field follows TABLE 10.

FIG. 19B illustrates a network event memory structure 19600 stored in memory 19100. Structure 19600 includes security base event fields 15500 and eight additional fields 19500 of TABLE 10. Memory structure 19600 is illustrative only and is not intended to represent that the structure is stored in any particular way in memory 18100.

TABLE 10

| Field Name | Type |
| --- | --- |
| FIELD_NETWORK_PROTOCOL_ID | id |
| FIELD_IP_TYPE_ID | id |
| FIELD_SOURCE_IP | info |
| FIELD_DESTINATION_IP | info |
| FIELD_SOURCE_PORT | count |
| FIELD_DESTINATION_PORT | count |
| FIELD_SOURCE_MAC | info |
| FIELD_DESTINATION_MAC | info |

A type of network protocol used on the network is stored in a network protocol field FIELD_NETWORK_PROTOCOL_ID. In one embodiment, the entry in network protocol field FIELD_NETWORK_PROTOCOL_ID is selected from TABLE 11

TABLE 11

| Network Protocol ID Value |
| --- |
| NETWORK_PROTOCOL_UNKNOWN |
| NETWORK_PROTOCOL_ARP |
| NETWORK_PROTOCOL_TCP |
| NETWORK_PROTOCOL_UDP |
| NETWORK_PROTOCOL_ICMP |
| NETWORK_PROTOCOL_IGMP |

As will be recognized by those of skill in the art, the last portion of the last five values in TABLE 11 is well-known network protocols. The protocols listed in TABLE 11 are illustrative only and not intended to limit the invention to this specific set of protocols. In view of this disclosure, a set of protocols can be defined that are useful for a particular embodiment of security management system 150.

A type of IP address is stored in a network IP type field FIELD_IP_TYPE_ID. In one embodiment, the entry in network IP type field FIELD_IP_TYPE_ID is selected from TABLE 12

TABLE 12

| IP Type ID Value |
| --- |
| NETWORK_IP_TYPE_UNKNOWN |
| NETWORK_IP_TYPE_IPV4 |
| NETWORK_IP_TYPE_IPV6 |

As will be recognized by those of skill in the art, the last portion of the last two values in TABLE 12 is an indicator for commonly used versions of the Internet Protocol. The versions used in TABLE 12 are illustrative only and are not intended to limit the invention to the specific versions cited.

An IP address of the source host is stored in a source IP field FIELD_SOURCE_IP. The local host may be the source or destination. This field can also be used to identify the starting point for a range of addresses, such as a filter range. The IP version can be IPv4 or IPv6 based on the value in network IP type field FIELD_IP_TYPE_ID.

An IP address of the destination host is stored in a destination IP field FIELD_DESTINATION_IP. The local host may be the source or destination. This field can also be used to identify the endpoint for a range of addresses, such as a filter range. The IP version can be IPv4 or IPv6 based on the value in IP type field FIELD_IP TYPE_ID.

A port of the source host is stored in a source port field FIELD_SOURCE_PORT. The value in source IP field FIELD_SOURCE_IP is interpreted in conjunction with the value in source port field FIELD_SOURCE_PORT.

A port of the destination host is stored in a destination port field FIELD_DESTINATION_PORT. The value in destination IP field FIELD_DESTINATION_IP is interpreted in conjunction with the value in destination port field FIELD_DESTINATION_PORT.

A source MAC address is stored in a source MAC address field FIELD_SOURCE_MAC. A destination MAC address is stored in a source MAC address field FIELD_DESTINATION_MAC.

Intrusion Detection Package

In this embodiment, the intrusion detection package 2000 (FIG. 20) is relatively simple, and is not intended to capture all details from an IDS event log. If desired, this package can be expanded with subclasses. In particular, a subclass for network-detected intrusions may be added.

Figure 20:
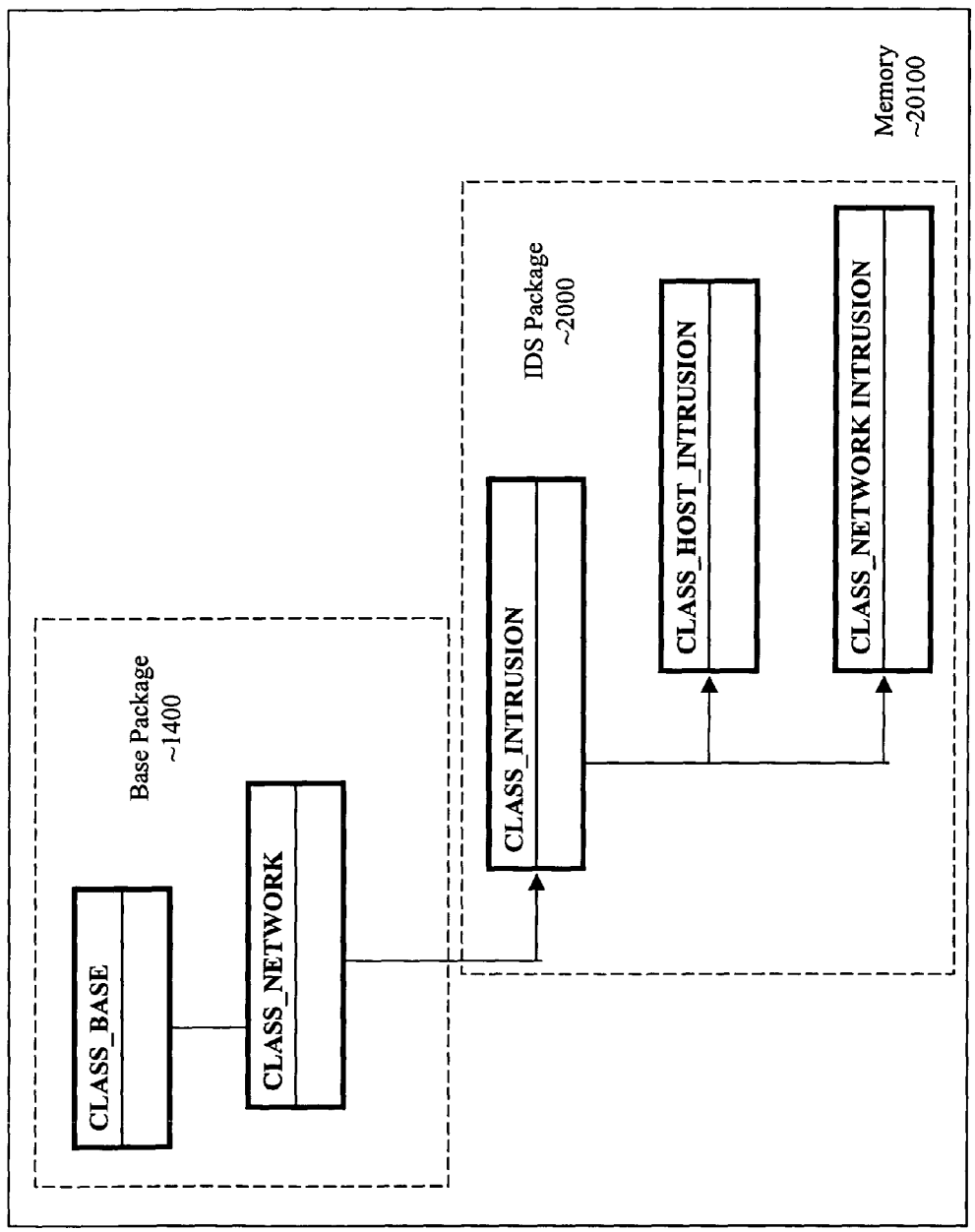
FIG. 20 is a diagram of an intrusion detection system event package memory structure that includes a plurality of predefined hierarchical class structures according to one embodiment of the present invention.

In this embodiment, the event schema of intrusion detection package 2000 introduces two classes CLASS_HOST_INTRUSION and CLASS_NETWORK_INTRUSION that extend intrusion class CLASS_INTRUSION. Intrusion class CLASS_INTRUSION extends network event class CLASS_NETWORK that in turn extends security base event class CLASS_BASE. In one embodiment, the event class hierarchy for intrusion detection package 2000 is stored in a memory as illustrated in FIG. 20.

An IDS event may be instantiated on the machine on which the event occurred, or alternatively, the data may be collected by a managed product 201_j on a different machine. In the first embodiment, the base class event information is instantiated using the API for the security base event class. In the second embodiment, some data in the base class event information concerns the machine on which the event occurred. Under these circumstances, the fields are filled in differently. The methods in the API that would normally provide information concerning the machine on which managed product 201_j is executing are not called and instead methods are called to provide information concerning the machine on which the intrusion detection event occurred.

Consequently, the information entered in the fields of security base event class CLASS_BASE and the fields of network event class CLASS_NETWORK depends upon which of the embodiments is active. Therefore, before considering the extensions to these classes, consideration in populating the fields in base class event (TABLE 2) and network class event (TABLE 10) are considered.

Use of Base Class

A managed product 201_j logging an intrusion event populates machine field FIELD_MACHINE, machine address field FIELD_MACHINE_IP, machine subnet field FIELD_MACHINE_SUBNET, machine identifier field FIELD_MACHINEID, machine MAC address field FIELD_MACHINE_MAC, and user name field FIELD_USER_NAME with the appropriate information for the computer on which the intrusion activity occurred or was detected if managed product 210_j is executing on that machine. The values in machine field FIELD_MACHINE, machine address field FIELD_MACHINE_IP, machine subnet field FIELD_MACHINE_SUBNET, and machine MAC address field FIELD_MACHINE_MAC should all be for the same computer. Thus, as described, a collector managed product should specify the values of the computer on which the intrusion activity occurred and for which managed product 210_j is collecting the events so that a security base event view shows not the collector machine information, but the information of the machine where the intrusion activity took place or was detected.

In one embodiment, the value in machine identifier field FIELD_MACHINEID must contain an identifier of a computer registered with security management system 150. Thus, if the machine on which the collector managed product is running, the collector machine, is registered, but the computer on which the intrusion activity took place or was detected is not registered, the value in field FIELD_MACHINEID is the identifier for the collector machine.

If managed product 210_j is collecting intrusion events from another machine or machines, the date and time when the intrusion activity was logged by the other machine is entered in field FIELD_CREATE_DT. If this cannot be determined, this field is populated in the normal manner. Similarly, the date and time when the intrusion activity was first detected is entered in field FIELD_EVENT_DT. This value may be the same as in field FIELD_CREATE_DT.

A so-called "natively integrated" managed product should allow the security management agent to populate these fields using the information the agent collects from the computer both the agent and product are running on. Natively integrated means the product makes API calls directly, rather than via a collector. Normally, these fields are automatically populated using the same time for native events, but for a collector, the times are usually different, since the product already had logged the event before the collector picked up the event.

Some IDS products may log events for activities that are not (or probably are not) attacks. An example is a product that logs all user login attempts, whether successful or not. The severity of events that are (probably) not attempted attacks is, in one embodiment, SEV_INFORMATIONAL. (See TABLE 4.) The category for intrusion detection system events, in this embodiment, is CAT_SECURITY. (See TABLE 3.)

For a collector managed product, the other fields in security base event class CLASS_BASE are populated as described above.

Use of Network Class

In populating the fields of network class CLASS_NETWORK that were described above, the source is the source of the threat or the attacker, if known. If the information is not known, the fields are left blank. The host is the target of the threat, or the target.

Intrusion Class

As described above, intrusion class CLASS_INTRUSION extends network event class CLASS_NETWORK that in turn extends security base event class CLASS_BASE. In addition to the fields for security base event class CLASS_BASE and network event class CLASS_NETWORK, class CLASS_INTRUSION (FIG. 20) includes fields presented in TABLE 13. The type of each field also is presented in TABLE 13. A description of the value in each field follows TABLE 13. In this embodiment, intrusion class CLASS_INTRUSION is an abstract class and so no events are defined for this class.

TABLE 13

| Field Name | Type |
| --- | --- |
| FIELD_INTRUSION_SOURCE_MACHINE | info |
| FIELD_INTRUSION_DESTINATION_MACHINE | info |
| FIELD_INTRUSION_VENDOR_NAME | intl_varstr (32) |
| FIELD_INTRUSION_VENDOR_SIG | intl_varstr (64) |
| FIELD_INTRUSION_VENDOR_SEVERITY | intl_varstr (16) |
| FIELD_INTRUSION_SIG | intl_varstr (64) |
| FIELD_INTRUSION_INTENT | id |
| FIELD_INTRUSION_OUTCOME | id |

A computer name of the computer from which the attack originated is stored in an intrusion source machine field FIELD_INTRUSION_SOURCE_MACHINE. field FIELD_INTRUSION_SOURCE_MACHINE is left blank if the computer name is unknown or not applicable for the attack. The value should be a host computer name, but may be another kind of name, e.g., "PDR-DHERTEL1," or "pdr-dhertel1.Corp.Symantec.Com."

A computer name of the computer at which the attack was directed, the target machine, is stored in intrusion destination machine field FIELD_INTRUSION_DESTINATION_MACHINE. Field FIELD_INTRUSION_DESTINATION_MACHINE is left blank if the computer name is unknown or not applicable for the attack. The value should be a host computer name, but may be another kind of name, e.g., "PDR-DHERTEL1," or "pdr-dhertel1.Corp.Symantec.Com."

A string that identifies a naming standard used in field FIELD_INTRUSION_VENDOR_SIG is stored in an intrusion vendor name field FIELD_INTRUSION_VENDOR_NAME. The string, in one embodiment is the name of a vendor or product that detected the intrusion. The purpose of the value in this field is to scope the value of the vendor signature to prevent naming collisions and other problems. For example, an event with vendor name "ProductX" and vendor signature "100" may describe a completely different attack than an event with vendor name "ProductY" and vendor signature "100." Examples of strings that might be used in this field are "IntruderAlert," or "Entercept."

A string that uniquely identifies the intrusion activity, as it is known by the event creator, is stored in an intrusion vendor signature field FIELD_INTRUSION_VENDOR_SIG. In one embodiment, the string is specified using the naming standard specified by the vendor identified in field FIELD_INTRUSION_VENDOR_NAME. This string is often called the attack signature (not to be confused with the specific detection technique of pattern matching). The value in this field may be blank if unknown or not applicable. Examples of strings entered in this field include "File Tampering," or "1234."

A string that identifies the severity of the intrusion activity, as it is known by the event creator, is stored in vendor intrusion severity code field FIELD_INTRUSION_VENDOR_SEVERITY. This string is the vendor or product specific severity code that is associated with the value of in field FIELD_INTRUSION_VENDOR_SIG. This string may useful to an administrator viewing the event details or to security feedback and control system 155 that includes product ID aware rules. Because there is no standard format for this string, the string is not useful for reporting or correlation purposes. In particular, different vendors may use different numeric scales and directions, for example, 1 may mean low or high. This field is left blank if the value is unknown or not applicable. Examples of strings used in this field include "1," "low," or "high."

A name of the attack, as defined by security management system 150, is stored in a security system intrusion signature field FIELD_INTRUSION_SIG. If the attack is unknown, or the data in this field is not applicable to the intrusion, field FIELD_INTRUSION_SIG is left blank. The name in field FIELD_INTRUSION_SIG provides the same information as the combination of the information in fields FIELD_INTRUSION_VENDOR_SIG and FIELD_INTRUSION_VENDOR_SIG, but the name has a format that maps multiple vendor signatures representing the same activity into one normalized signature for correlation and reporting purposes. In one embodiment, this field is populated by security management agent 220_m. However, as the set of attack signatures grows, assignment of this field can be performed at a management server of security management system 150, not by security management agent 220_m.

A string stored in intrusion intent field FIELD_INTRUSION_INTENT indicates the overall intent of the attempted intrusion activity. In one embodiment, the value entered in this field is one of a set of predefined entries presented in TABLE 14.

TABLE 14

Entries for field FIELD_INTRUSION_INTENT
INTRUSION_INTENT_NONE
INTRUSION_INTENT_OTHER
INTRUSION_INTENT_UNKNOWN
INTRUSION_INTENT_ACCESS
INTRUSION_INTENT_INTEGRITY
INTRUSION_INTENT_DEGRADATION
INTRUSION_INTENT_RECON The last portion of each entry in TABLE 14 gives the intent associated with that entry. See also, TABLE 20 below. In this embodiment, the intent of the intrusion is one of NONE, OTHER, UNKNOWN, ACCESS, INTEGRITY, DEGRADATION, and RECON. Thus, a value of NONE, i.e., INTRUSION_INTENT_NONE, indicates the intrusion activity had no intent. However, it should be possible to characterize nearly any intrusion activity with one of ACCESS, INTEGRITY, DEGRADATION (including denial of service), or RECON (including pre-attack probes). A value of OTHER is for the case where the intent is known, but not one of the specific predefined values.

A string stored in intrusion outcome field FIELD_INTRUSION_OUTCOME indicates an outcome of the attempted intrusion activity. In one embodiment, the value entered in this field is one of a set of predefined entries presented in TABLE 15.

TABLE 15

Entries for field FIELD_INTRUSION_OUTCOME
INTRUSION_OUTCOME_NONE
INTRUSION_OUTCOME_OTHER
INTRUSION_OUTCOME_UNKNOWN
INTRUSION_OUTCOME_SUCCEEDED
INTRUSION_OUTCOME_FAILED
INTRUSION_OUTCOME_PREVENTED The last portion of each entry in TABLE 15 gives the outcome associated with that entry. See also, TABLE 20 below. In this embodiment, the outcome of the intrusion is one of NONE, OTHER, UNKNOWN, SUCCEEDED, FAILED, and PREVENTED.

If value in field FIELD_INTRUSION_INTENT is INTRUSION_INTENT_NONE, the value in field FIELD_INTRUSION_OUTCOME should be INTRUSION_OUTCOME_NONE. It is unlikely that the value in this field would ever be set to INTRUSION_OUTCOME_OTHER, but the value is available for the sake of completeness, in this embodiment.

The attack signatures used by a managed IDS product often have static information associated with them. This information may include alternate names for the attack, short and long summaries, technical information, recommended responses, links to additional information, attack categories and subcategories, related Bugtraq and CVE vulnerability identifiers, and so on. Because of its length, in this embodiment, the static data is unsuitable for repeated inclusion in each event describing an instance of that attack.

Thus, in one embodiment, a database within security management system 155 holds this data. In this embodiment, the data is based upon a predefined attack signature set so that the data is independent of any particular managed product data. For example, the data is queried based upon the value in security system intrusion signature field FIELD_INTRUSION_SIG to obtain further information concerning the attack. The database does not hold actual events. The IDS events are useful both with and without this static database.

Class Host Intrusion

Host intrusion event class CLASS_HOST_INTRUSION extends intrusion class CLASS_INTRUSION (FIG. 20) with information specific to activity detected at a host. Host intrusion event class CLASS_HOST_INTRUSION has a predefined event class identifier.

Figure 21A:
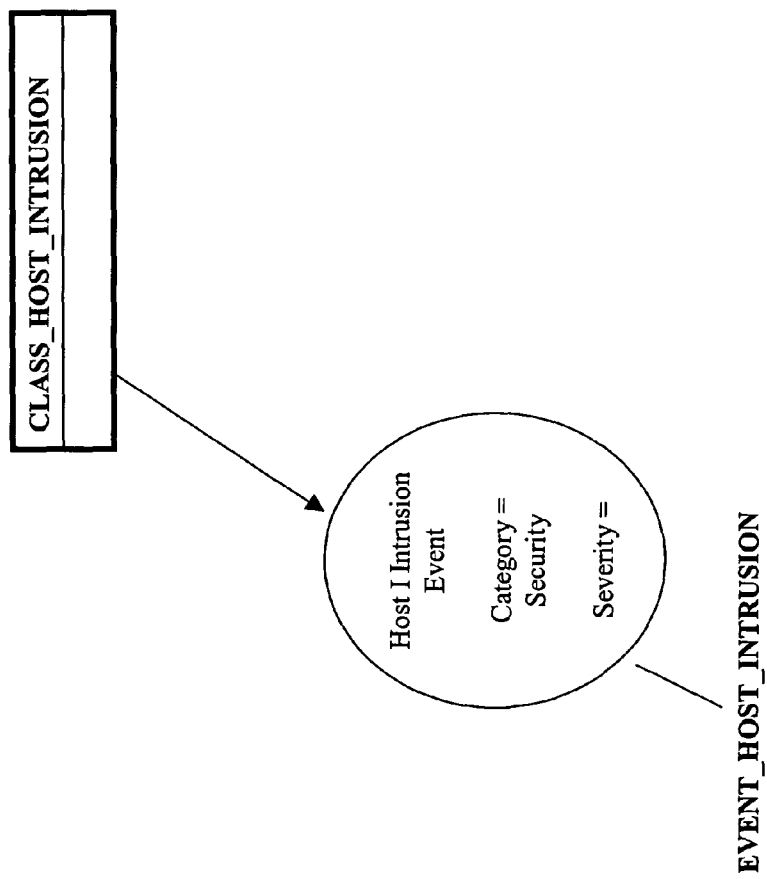
FIG. 21A is an illustration of an object that is an instantiation of the host intrusion event class of FIG. 20 according to one embodiment of the present invention.

Event objects, that are instantiations of host intrusion event class CLASS_HOST_INTRUSION include event EVENT_HOST_INTRUSION (FIG. 21A), a host intrusion event that is logged when intrusion behavior is detected using host IDS examination techniques. For event EVENT_HOST_INTRUSION, the event category is category CAT_SECURITY. The event severity is determined by the event creator based upon the intrusion.

In addition to the fields 15500 (FIG. 21B_1) for security base event class CLASS_BASE, fields 19500 for network event class CLASS_NETWORK, and fields 21400 (FIG. 21B_2) for class CLASS_INTRUSION, host intrusion event class CLASS_HOST_INTRUSION (FIGS. 20 and 21A) adds fields 21500 presented in TABLE 16 for a host intrusion detection event 21600. The type of each field also is presented in TABLE 16. A description of the value in each field follows TABLE 16.

FIGS. 21B_1 and 21B_2 illustrate a host intrusion event memory structure 21600 stored in memory 21100. Memory structure 21600 is illustrative only and is not intended to represent that the structure is stored in any particular way in memory 21100.

TABLE 16

| Field Name | Type |
| --- | --- |
| FIELD_INTRUSION_SOURCE_USER_NAME | info |
| FIELD_INTRUSION_SOURCE_PROCESS | info |
| FIELD_INTRUSION_TARGET_TYPE | id |
| FIELD_INTRUSION_TARGET_NAME | info |
| FIELD_INTRUSION_ACTION | Id |
| FIELD_INTRUSION_DATA | intl_varstr (2048) |

A user name of the attacker is stored in a source user name field FIELD_INTRUSION_SOURCE_USER_NAME. If this information is not applicable to the intrusion attack, this field is left blank. Examples of possible entries for this field include "baduser" or "SYSTEM."

A process name of the attacker is stored in a source process field FIELD_INTRUSION_SOURCE_PROCESS. The information in this field may be a user-friendly name or the name of an image file with or without a path. If this information is not applicable to the intrusion attack, this field is left blank. Examples of possible entries for this field include: "Service Control Manager," "Security," "IEXPLORER.EXE," and "c:\temp\temp.exe"

A value stored in intrusion target type field FIELD_INTRUSION_TARGET_TYPE indicates the type of the attacker's target. In one embodiment, the value is selected from TABLE 17.

TABLE 17

Intrusion Target Type Value

INTRUSION_TARGET_NONE
INTRUSION_TARGET_OTHER
INTRUSION_TARGET_UNKNOWN

TABLE 17-continued

Intrusion Target Type Value

INTRUSION_TARGET_OS_SESSION
INTRUSION_TARGET_USER_SESSION
INTRUSION_TARGET_FILE
INTRUSION_TARGET_DIRECTORY
INTRUSION_TARGET_LINK
INTRUSION_TARGET_PROCESS
INTRUSION_TARGET_SERVICE
INTRUSION_TARGET_PORT
INTRUSION_TARGET_URL
INTRUSION_TARGET_USER_ACCOUNT
INTRUSION_TARGET_USER_INFO
INTRUSION_TARGET_USER_PRIVS
INTRUSION_TARGET_USER_POLICY
INTRUSION_TARGET_GROUP
INTRUSION_TARGET_REGISTRY
INTRUSION_TARGET_REGISTRY_KEY
INTRUSION_TARGET_REGISTRY_VALUE
INTRUSION_TARGET_REGISTRY_DATA
INTRUSION_TARGET_OS_CONFIG
INTRUSION_TARGET_APP_CONFIG
INTRUSION_TARGET_NETWORK_PROTOCOL
INTRUSION_TARGET_NETWORK_STACK
INTRUSION_TARGET_NETWORK_DATA
INTRUSION_TARGET_NETWORK_SECURITY
INTRUSION_TARGET_HARDWARE

The values listed in TABLE 17 are illustrative only and are not intended to limit the invention to the specific values presented. One of skill in the art can use less than these values, or can add different values as appropriate. See TABLE 20 below for an interpretation of the items in TABLE 17.

A name of the attacker's target is stored intrusion target name field FIELD_INTRUSION_TARGET_NAME. The name entered in this field is a name of an object of the type specified by field FIELD_INTRUSION_TARGET_TYPE. If this information is not applicable to the intrusion attack, this field is left blank. Examples of possible entries for this field include: "c:\program files\Symantec\criticalprogram.exe," and "HKEY_CURRENT_USER\Software\Micrsoft\Windows\CurrentVersion\Runonce."

A value stored in intrusion action field FIELD_INTRUSION_ACTION indicates an action attempted by the intrusion attacker. In one embodiment, the value is selected from TABLE 18.

TABLE 18

Intrusion Action Value

INTRUSION_ACTION_NONE
INTRUSION_ACTION_OTHER
INTRUSION_ACTION_UNKNOWN
INTRUSION_ACTION_CREATE
INTRUSION_ACTION_ACCESS
INTRUSION_ACTION_MODIFY
INTRUSION_ACTION_DELETE
INTRUSION_ACTION_COPY
INTRUSION_ACTION_MOVE
INTRUSION_ACTION_LINK
INTRUSION_ACTION_START
INTRUSION_ACTION_RESTART
INTRUSION_ACTION_STOP
INTRUSION_ACTION_LOGIN
INTRUSION_ACTION_LOGOUT
INTRUSION_ACTION_EXECUTE
INTRUSION_ACTION_EXECUTE_PRIVILEGED
INTRUSION_ACTION_CRASH
INTRUSION_ACTION_MISUSE

The values listed in TABLE 18 are illustrative only and are not intended to limit the invention to the specific values presented. One of skill in the art can use less than these values, or can add different values as appropriate. See TABLE 20 below for an interpretation of the items in TABLE 18.

A string containing additional data specific to this event is stored in an intrusion data field FIELD_INTRUSION_DATA. This field may be used to store text captured from system logs, or other details useful to an administrator viewing the event details. Because there is no standard format for this text, the information in this field is not useful for reporting or correlation purposes. This field may be left blank.

Class Network Intrusion

Network Intrusion Event class CLASS_NETWORK_INTRUSION extends intrusion class CLASS_INTRUSION (FIG. 20) with information specific to activity detected at a network level. Network intrusion event class CLASS_NETWORK_INTRUSION has a predefined event class identifier.

Figure 22A:
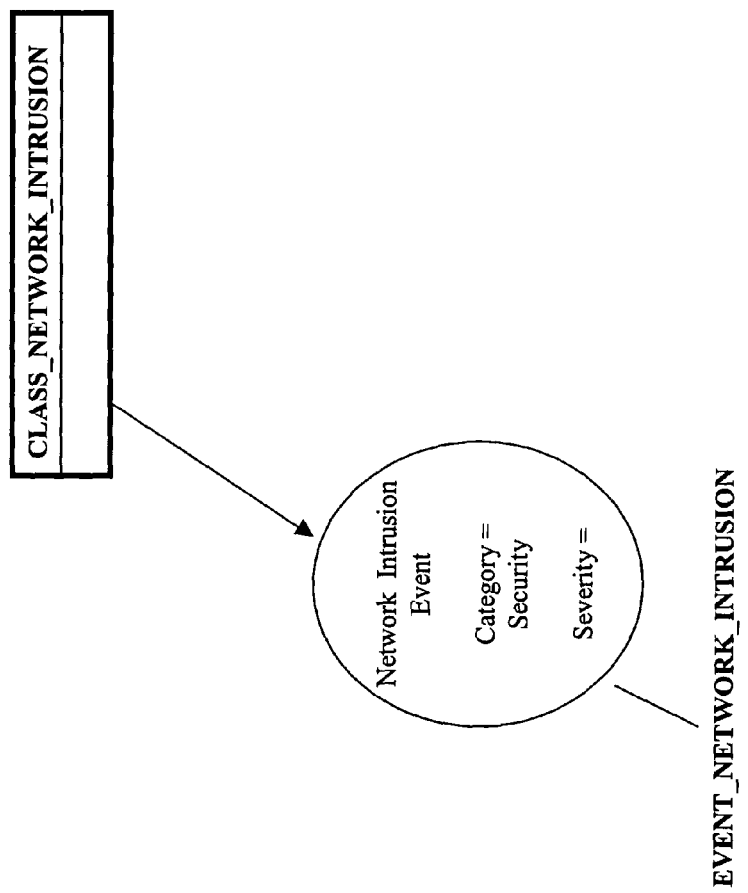
FIG. 22A is an illustration of an object that is an instantiation of the network intrusion event class of FIG. 20 according to one embodiment of the present invention.

Event objects, that are instantiations of network intrusion event class CLASS_NETWORK_INTRUSION include event EVENT_NETWORK_INTRUSION (FIG. 22A), a network intrusion event is logged when intrusion behavior is detected using network IDS examination techniques. For event EVENT_NETWORK_INTRUSION, the event category is category CAT_SECURITY. The event severity is determined by the event creator based upon the intrusion.

In addition to fields 15500 (FIG. 22B_1) for security base event class CLASS_BASE, fields 19500 for network event class CLASS_NETWORK, and fields 21400 (FIG. 22B_2) for class CLASS_INTRUSION, network intrusion event class CLASS_NETWORK_INTRUSION (FIGS. 20 and 22A) adds fields 22500 of TABLE 19 for a network intrusion detection event 22600. The type of each field also is presented in TABLE 19. A description of the value in each field follows TABLE 19.

FIGS. 22B_1 and 22B_2 illustrate a network intrusion event memory structure 22600 stored in memory 22100. Memory structure 22600 is illustrative only and is not intended to represent that the structure is stored in any particular way in memory 22100.

TABLE 19

| Field Name | Type |
|---|---|
| FIELD_INTRUSION_PACKET | varstr (4096) |
| FIELD_INTRUSION_PAYLOAD | varstr (1024) |
| FIELD_INTRUSION_PAYLOAD_START | Count |
| FIELD_INTRUSION_PAYLOAD_END | Count |
| FIELD_INTRUSION_CONTEXT | intl_varstr (512) |
| FIELD_INTRUSION_VLAN | Count |

An entire IP packet including headers, which was being examined when the attack was detected, is stored in an intrusion packet field FIELD_INTRUSION_PACKET.

Usually, this field contains the entire payload or a portion of the entire payload. The packet is stored as a hex string with no spaces in one embodiment. This field may be blank.

A portion of the application-layer datastream, which contains the offending bytes, padded by the bytes which came before and after in the stream is stored in an intrusion payload field FIELD_INTRUSION_PAYLOAD. The offending bytes are highlighted using the payload start and payload end indexes. The data is stored as a hex string with no spaces in one embodiment. This field may be blank.

A byte offset to the start of the offending bytes (anomaly or signature) in the payload is stored in an intrusion payload start field FIELD_INTRUSION_PAYLOAD_START. This field may be blank if the payload in field FIELD_INTRUSION_PAYLOAD is blank. The value in this field is the byte offset, and not an index into the hex string. Multiply the value in this field by two to obtain the hex string index.

A byte offset to the start of the offending bytes (anomaly or signature) in the payload is stored in an intrusion payload start field FIELD_INTRUSION_PAYLOAD_END. This field may be blank if the payload in field FIELD_INTRUSION_PAYLOAD is blank. The value in this field is the byte offset, and not an index into the hex string. Multiply the value in this field by two to obtain the hex string index.

Supplemental information about the session, in which the attack was detected, is store in intrusion context field FIELD_INTRUSION_CONTEXT. For example, for an exploit against an FTP server, this field may contain the username, and for one against an HTTP server, the field may contain the URL. The data is stored as a normal string. This field may be blank.

An ID of the VLAN on which the attack was detected is stored in an intrusion virtual local area network field FIELD_INTRUSION_VLAN. This field may be blank.

In some embodiments, there may be limitations on the amount of data that can be stored in a single event. For example, binary large object (BLOB) fields may not be supported, and/or second, the total size of an event may be limited by a maximum row size in the database used to store events. In such situations, as a general rule, fields in an event should not be larger than two to four Kbytes, depending on the number of other large fields in the class and super classes. Storing packet payloads in an event presents a problem because the payloads can be up to 64K in length (128K if encoded in hex), though typical TCP/IP packets are from one half to two Kbytes.

One way to address these issues is to support a facility for attaching an arbitrary number of key/value pairs to an event, which are then stored in a special event extension table. The extension table supports all types of values including BLOB values. This facility provides a good alternative to the size-limited field FIELD_INTRUSION_PAYLOAD.

Figure 23:
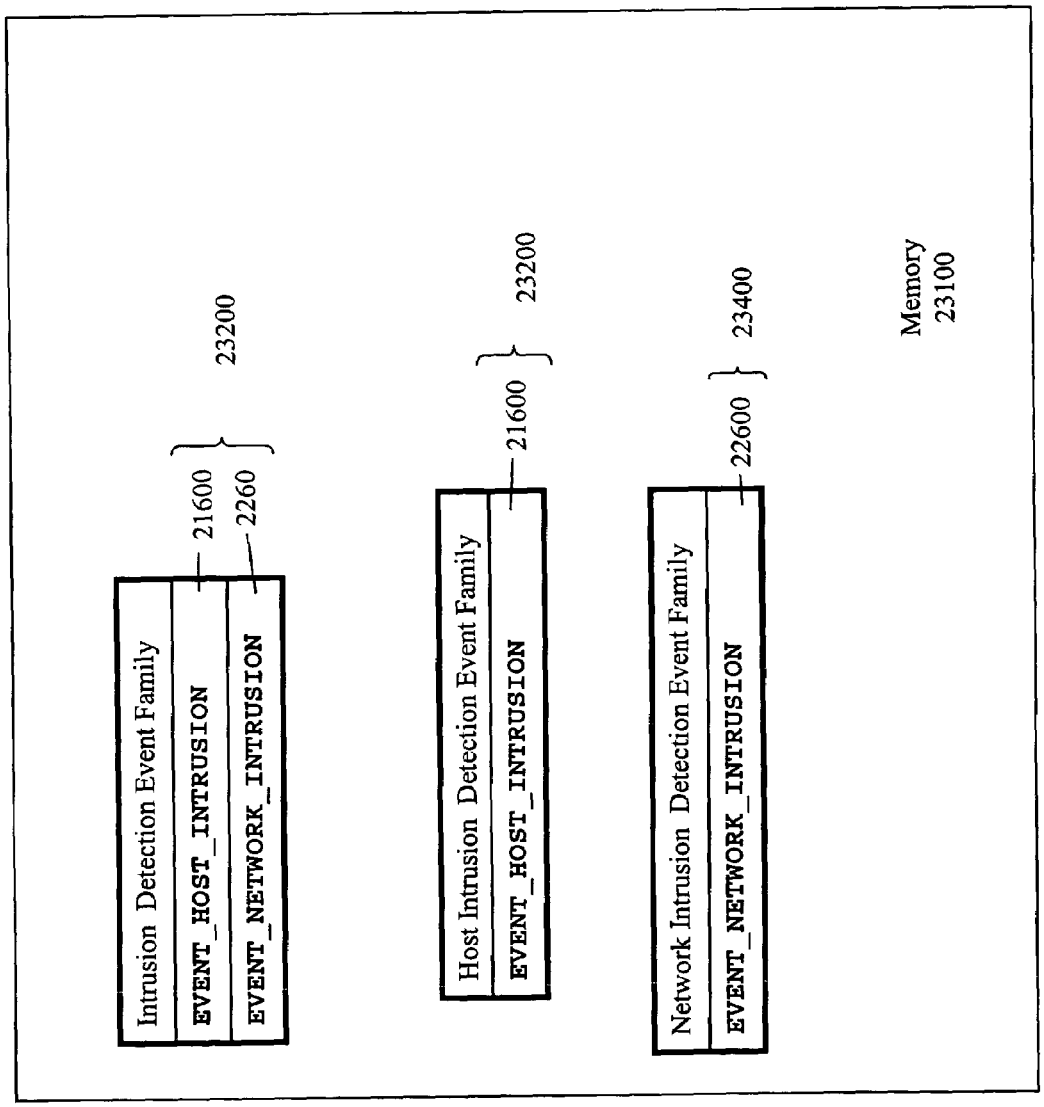
FIG. 23 is an illustration of event family memory structures that include the event memory structures of FIGS. 21_B1 and 21B_2 and/or FIGS. 22B_1 and 22B_2 according to one embodiment of the present invention.

In one embodiment, as illustrated in FIG. 23, three event families for all intrusion detection events are defined. Intrusion detection event family 23200 includes events EVENT_HOST_INTRUSION and EVENT_NETWORK_INTRUSION. Host intrusion detection event family 23300 includes event EVENT_HOST_INTRUSION. Network intrusion detection event family 23400 includes event EVENT_NETWORK_INTRUSION. In FIG. 23, the event ID is used as reference numeral to represent the event memory structure having that event ID as described above, and incorporated herein by reference. These families may also include other intrusion events that are defined from the classes described above, or from classes that are added. In general, an event family is a group of associated events, and may include events from different classes. A unique identifier is assigned to each event family.

TABLE 20 gives the English translation of all event IDs and event field string value IDs used in the intrusion classes.

TABLE 20

| Event/Value ID | English Translation |
|---|---|
| Events | |
| EVENT_HOST_INTRUSION | Host Intrusion Event |
| EVENT_NETWORK_INTRUSION | Network Intrusion Event |
| Target Types | |
| INTRUSION_TARGET_NONE | None |
| INTRUSION_TARGET_OTHER | Other |

TABLE 20-continued

| Event/Value ID | English Translation |
|---|---|
| INTRUSION_TARGET_UNKNOWN | Unknown |
| INTRUSION_TARGET_OS_SESSION | OS Session |
| INTRUSION_TARGET_USER_SESSION | User Session |
| INTRUSION_TARGET_FILE | File |
| INTRUSION_TARGET_DIRECTORY | Directory |
| INTRUSION_TARGET_LINK | Link |
| INTRUSION_TARGET_PROCESS | Process |
| INTRUSION_TARGET_SERVICE | Service |
| INTRUSION_TARGET_PORT | Port |
| INTRUSION_TARGET_URL | URL |
| INTRUSION_TARGET_USER_ACCOUNT | User Account |
| INTRUSION_TARGET_USER_INFO | User Information |
| INTRUSION_TARGET_USER_PRIVS | User Privileges |
| INTRUSION_TARGET_USER_POLICY | User Policy |
| INTRUSION_TARGET_GROUP | Group |
| INTRUSION_TARGET_REGISTRY | Registry |
| INTRUSION_TARGET_REGISTRY_KEY | Registry Key |
| INTRUSION_TARGET_REGISTRY_VALUE | Registry Value |
| INTRUSION_TARGET_REGISTRY_DATA | Registry Data |
| INTRUSION_TARGET_OS_CONFIG | OS Configuration |
| INTRUSION_TARGET_APP_CONFIG | Application Configuration |
| INTRUSION_TARGET_NETWORK_PROTOCOL | Network Protocol |
| INTRUSION_TARGET_NETWORK_STACK | Network Stack |
| INTRUSION_TARGET_NETWORK_DATA | Network Data |
| INTRUSION_TARGET_NETWORK_SECURITY | Network Security |
| INTRUSION_TARGET_HARDWARE | Hardware |
| Actions | |
| INTRUSION_ACTION_NONE | None |
| INTRUSION_ACTION_OTHER | Other |
| INTRUSION_ACTION_UNKNOWN | Unknown |
| INTRUSION_ACTION_CREATE | Create |
| INTRUSION_ACTION_ACCESS | Access |
| INTRUSION_ACTION_MODIFY | Modify |
| INTRUSION_ACTION_DELETE | Delete |
| INTRUSION_ACTION_COPY | Copy |
| INTRUSION_ACTION_MOVE | Move |
| INTRUSION_ACTION_LINK | Link |
| INTRUSION_ACTION_START | Start |
| INTRUSION_ACTION_RESTART | Restart |
| INTRUSION_ACTION_STOP | Stop |
| INTRUSION_ACTION_LOGIN | Login |
| INTRUSION_ACTION_LOGOUT | Logout |
| INTRUSION_ACTION_EXECUTE | Execute |
| INTRUSION_ACTION_EXECUTE_PRIVILEGED | Execute Privileged |
| INTRUSION_ACTION_CRASH | Crash |
| INTRUSION_ACTION_MISUSE | Misuse |
| Intents | |
| INTRUSION_INTENT_NONE | None |
| INTRUSION_INTENT_OTHER | Other |
| INTRUSION_INTENT_UNKNOWN | Unknown |
| INTRUSION_INTENT_ACCESS | Access |
| INTRUSION_INTENT_INTEGRITY | Integrity |
| INTRUSION_INTENT_DEGRADATION | Degradation |
| INTRUSION_INTENT_RECON | Reconnaissance |
| Action Outcomes | |
| INTRUSION_OUTCOME_NONE | None |
| INTRUSION_OUTCOME_OTHER | Other |
| INTRUSION_OUTCOME_UNKNOWN | Unknown |
| INTRUSION_OUTCOME_SUCCEEDED | Succeeded |
| INTRUSION_OUTCOME_FAILED | Failed |
| INTRUSION_OUTCOME_PREVENTED | Prevented |

TABLE 21 shows several kinds of reports that can be generated using intrusion events. These reports are for illustrative purposes only and are not intended to limit the invention to the specific reports presented herein.

TABLE 21

| Report Title | Type | Key Field |
|---|---|---|
| All IDS Events | List | most |
| IDS Events: By Vendor Name | Pie Chart | FIELD_INTRUSION_VENDOR_NAME and FIELD_INTRUSION_VENDOR_SIG |
| IDS Events: By Symantec Name | Pie Chart | FIELD_INTRUSION_SIG |
| IDS Events: By Severity | Pie Chart | FIELD_SEVERITY |
| IDS Events: By Intent | Pie Chart | FIELD_INTRUSION_INTENT |
| IDS Events: By Threat Source | Pie Chart | FIELD_SOURCE_IP |
| IDS Events: By Threat Target | Pie Chart | FIELD_DESTINATION_IP |
| IDS Events: By Service | Pie Chart | FIELD_DESTINATION_PORT |
| IDS Events: Last 24 hours | Line Graph (need hourly or even finer granularity) | FIELD_EVENT_DT |

Figure 24:
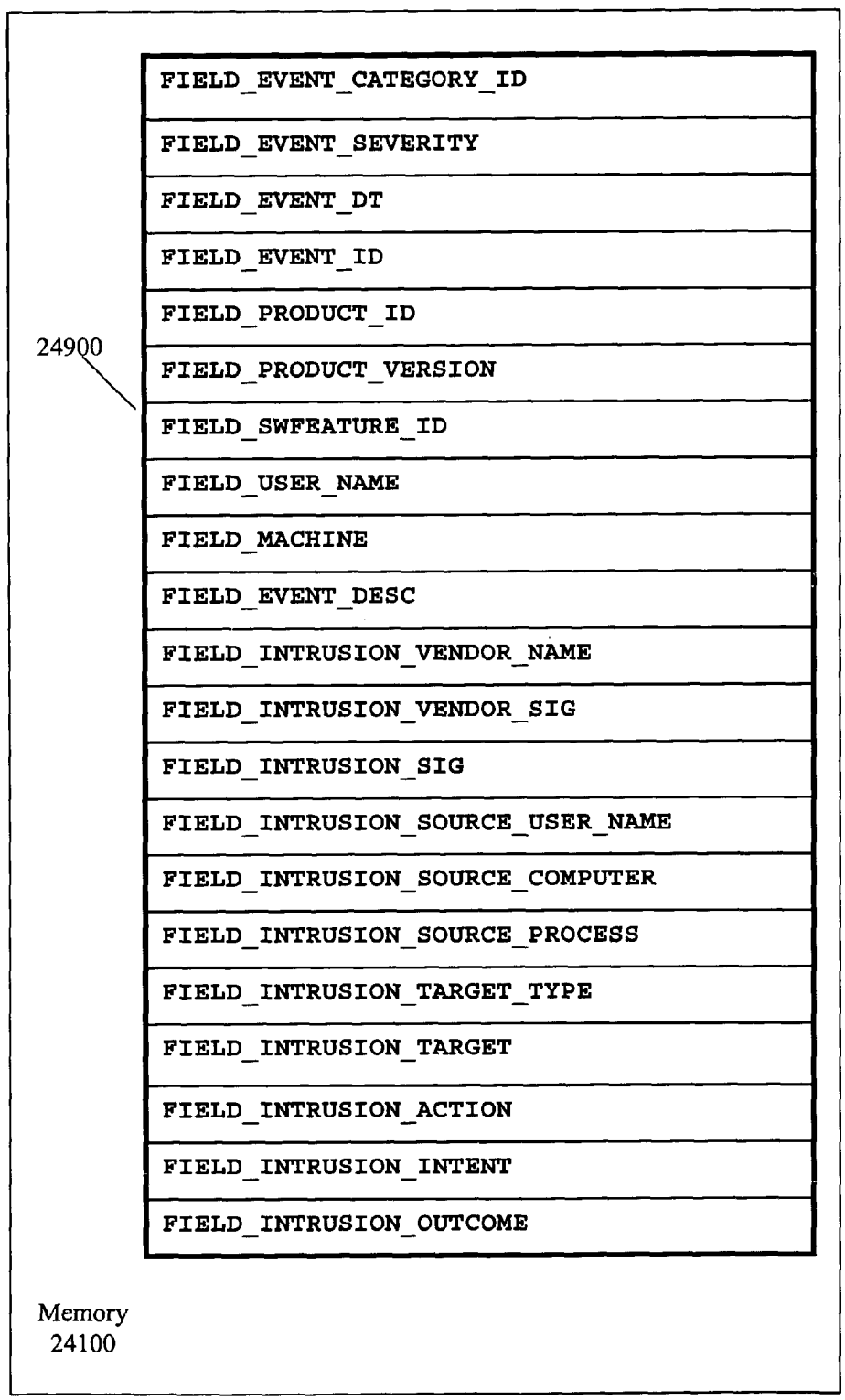
FIG. 24 is an illustration of an intrusion detection system event class view object for a database according to one embodiment of the present invention.

TABLE 22 is a view 24900 (FIG. 24) for one host intrusion event, e.g., a file tampering event, which is detected by an IDS. The information retrieved from host intrusion events 21600 using view 24900 may be formatted for printing of a list report, for display, or for further processing, for example, by security feedback and control system 155. As explained above, a view is a database object that is defined for an event class by a managed product 201_j, as described more completely below. View 24900 is stored in memory 24100.

TABLE 22

| Field Name | Sample Column Label for Display | Sample Display Value |
|---|---|---|
| FIELD_CATEGORY_ID | Category | Security |
| FIELD_SEVERITY | Severity | 2 - Warning |
| FIELD_EVENT_DT | Event Date | Jan. 1, 2003, 12:00:00 AM |
| FIELD_EVENT_ID | Event Type | Host Intrusion Event |
| FIELD_PRODUCT_ID | Product | Acme Security |
| FIELD_PRODUCT_VERSION | Product Version | 1.0 |
| FIELD_SWFEATURE_ID | Software Feature | Acme HIDS Event Collector |
| FIELD_USER_NAME | User Name | SYSTEM |
| FIELD_MACHINE | Machine | troubledhost |
| FIELD_EVENT_DESC | Description | File Tampering |
| FIELD_INTRUSION_VENDOR_NAME | Vendor Signature Type | Acme |
| FIELD_INTRUSION_VENDOR_SIG | Vendor Signature | Rule5689 |
| FIELD_INTRUSION_SIG | Symantec Signature | |
| FIELD_INTRUSION_SOURCE_USER_NAME | Acting User | administrator |
| FIELD_INTRUSION_SOURCE_MACHINE | Acting Computer | troubledhost |
| FIELD_INTRUSION_SOURCE_PROCESS | Acting Process | rogueapp.exe |
| FIELD_INTRUSION_TARGET_TYPE | Target Type | File |
| FIELD_INTRUSION_TARGET_NAME | Target | c:\winnt\system32\file.dll |
| FIELD_INTRUSION_ACTION | Action | Delete |
| FIELD_INTRUSION_INTENT | Intent | Integrity |
| FIELD_INTRUSION_OUTCOME | Outcome | Succeeded |

TABLE 23 is another example of a view similar to view 24900 (FIG. 24) for another host intrusion event, e.g., a login event, which is detected by an IDS. The information retrieved from login events may be formatted for printing of a list report, for display, or for further processing, for example, by security feedback and control system 155. In the displayed or printed report, the field name may be replaced by the English equivalent, or not included in the report.

TABLE 23

| Field | Sample Column Label | Sample Display Value |
|---|---|---|
| FIELD_CATEGORY_ID | Category | Security |
| FIELD_SEVERITY | Severity | 2 - Warning |
| FIELD_EVENT_DT | Event Date | Jan. 1, 2003, 12:00:00 AM |
| FIELD_EVENT_ID | Event Type | Host Intrusion Event |
| FIELD_PRODUCT_ID | Product | Acme Security |
| FIELD_PRODUCT_VERSION | Product Version | 1.0 |
| FIELD_SWFEATURE_ID | Software Feature | Acme HIDS Event Collector |
| FIELD_USER_NAME | User Name | SYSTEM |
| FIELD_MACHINE | Machine | troubledhost |
| FIELD_EVENT_DESC | Description | Failed Login Attempt |
| FIELD_INTRUSION_VENDOR_NAME | Vendor Signature Type | Acme |
| FIELD_INTRUSION_VENDOR_SIG | Vendor Signature | Rule5699 |
| FIELD_INTRUSION_SIG | Symantec Signature | |
| FIELD_INTRUSION_SOURCE_USER_NAME | Acting User | smith |
| FIELD_INTRUSION_SOURCE_MACHINE | Acting Computer | troubledhost |
| FIELD_INTRUSION_SOURCE_PROCESS | Acting Process | |
| FIELD_INTRUSION_TARGET_TYPE | Target Type | None |
| FIELD_INTRUSION_TARGET_NAME | Target | |
| FIELD_INTRUSION_ACTION | Action | Login |
| FIELD_INTRUSION_INTENT | Intent | Access |
| FIELD_INTRUSION_OUTCOME | Outcome | Failed |

Firewall Event Package

Firewalls have the capacity to generate very large numbers of events, but only a relatively small subset is useful for security management ("relatively" being the operative word here—it can still amount to dozens of discrete events). In this embodiment, the firewall event classes have been designed around the information necessary to produce useful reports. Two event classes a firewall network class and a firewall connection statistics class, (FIG. 25) have been defined.

As explained more completely below, the firewall network class contains information useful for determining nodes, protocols and rules being used, common events such as denied connections, VPN connections, and user authentication events. Firewall-specific classes for additional information or events that may be unique to a specific firewall can added to extend these classes.

The firewall connection statistics class focuses on information relating to traffic through firewalls. This includes the information in the firewall network class, plus volume and duration information.

Since security management system 150 has an open interface for logging events, events from firewalls of many brands and varieties are logged. One of the key benefits of a centralized event logging system is an ability to extract useful information from that event database. Thus, there is a need to present information drawn from events from a heterogeneous set of firewalls in a single report.

To do this with consistency and efficiency, the most common information is gathered in a single event for all the different firewalls. Two event classes have been devised for logging firewall events. Although not all firewall events relate to network connections, the events that are of greatest interest generally are.

All network- or connection-related events that provide more product-specific detail are derived from the firewall network class. All firewall products should log their connection-related statistics (byte/packet counts, durations, etc.) using firewall connection statistics events, or their own event that is derived from this package.

Reports that span different types of firewalls allow a concise global view of firewall activity in a network. This is the main purpose of having a single common event class for logging the common network-related information for firewall events. It is not intended that the firewall network class be able to contain all the information for any event a firewall generates. When the event data overlaps the fields in the firewall network class, these events are logged as firewall network class events, or a class derived from the firewall network class.

The firewall network class defines several events. These events can be used at "face value," or these events can be used as a category of events when a firewall generates many different events that comprise these types (from a reporting perspective). It is important that the firewalls make use of the event IDs defined whenever appropriate in order to provide the best reporting and security feedback and control possible from the event database.

Figure 25:
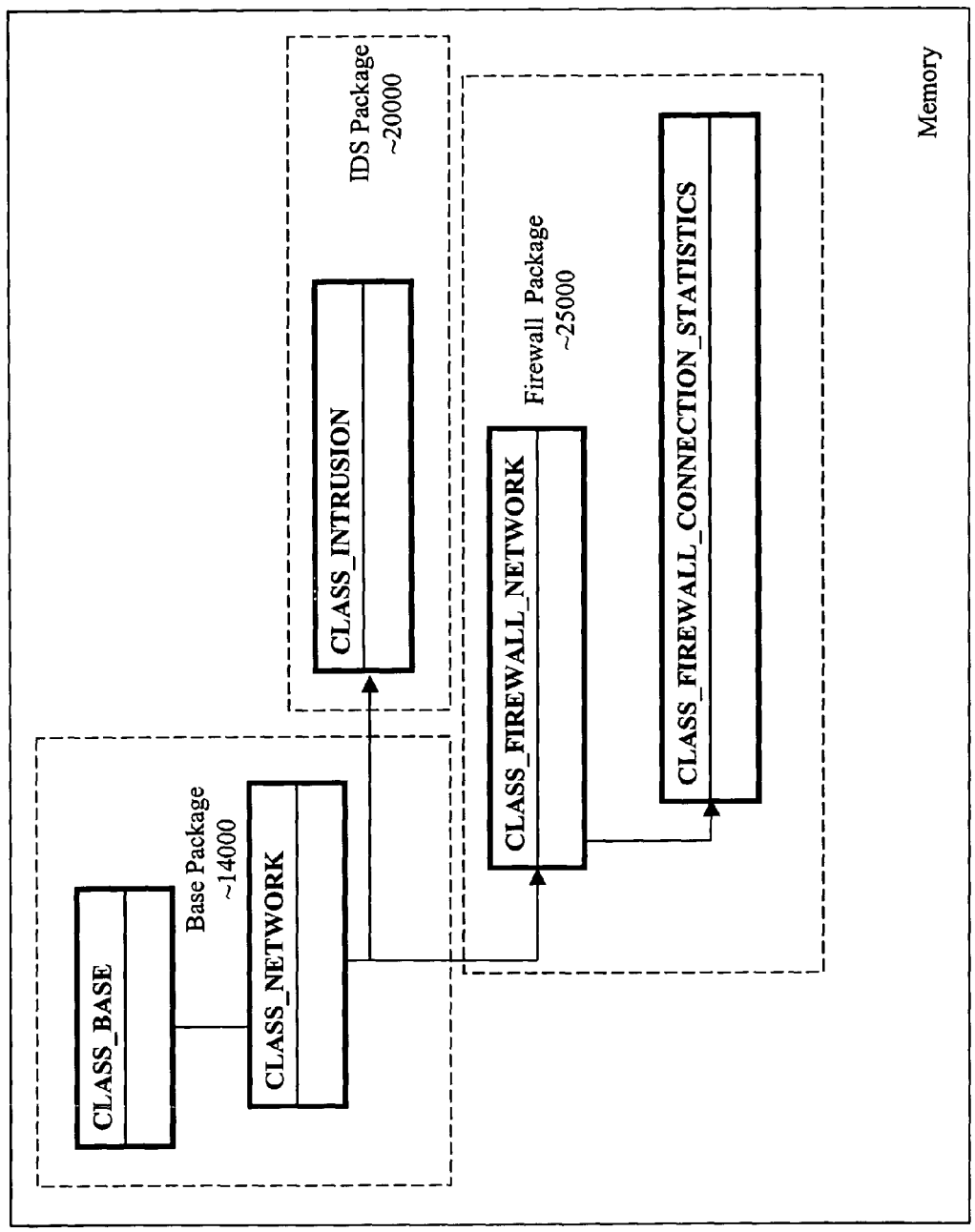
FIG. 25 is a diagram of a firewall event package memory structure that includes a plurality of predefined hierarchical class structures according to one embodiment of the present invention.

In this embodiment, the event schema of firewall event package 25000 introduces CLASS_FIREWALL_CONNECTION_STATISTICS that extends firewall network class CLASS_FIREWALL_NETWORK. Firewall network class CLASS_FIREWALL_NETWORK extends network event class CLASS_NETWORK that in turn extends security base event class CLASS_BASE. One embodiment of the event class hierarchy for firewall event package 25000 stored in a memory is illustrated in FIG. 25.

Firewall Network Class

Firewall network class CLASS_FIREWALL_NETWORK provides a base set of fields to allow common data to be logged by all firewalls in a consistent manner. This single consistent table of data allows for common reporting and processing of many events across different firewall products, which helps improve firewall management by providing a single view of information.

As described above, firewall network class CLASS_FIREWALL_NETWORK extends network event class CLASS_NETWORK that in turn extends security base event class CLASS_BASE. In this embodiment, firewall network class CLASS_FIREWALL_NETWORK has a predefined event class identifier.

Figure 26A:
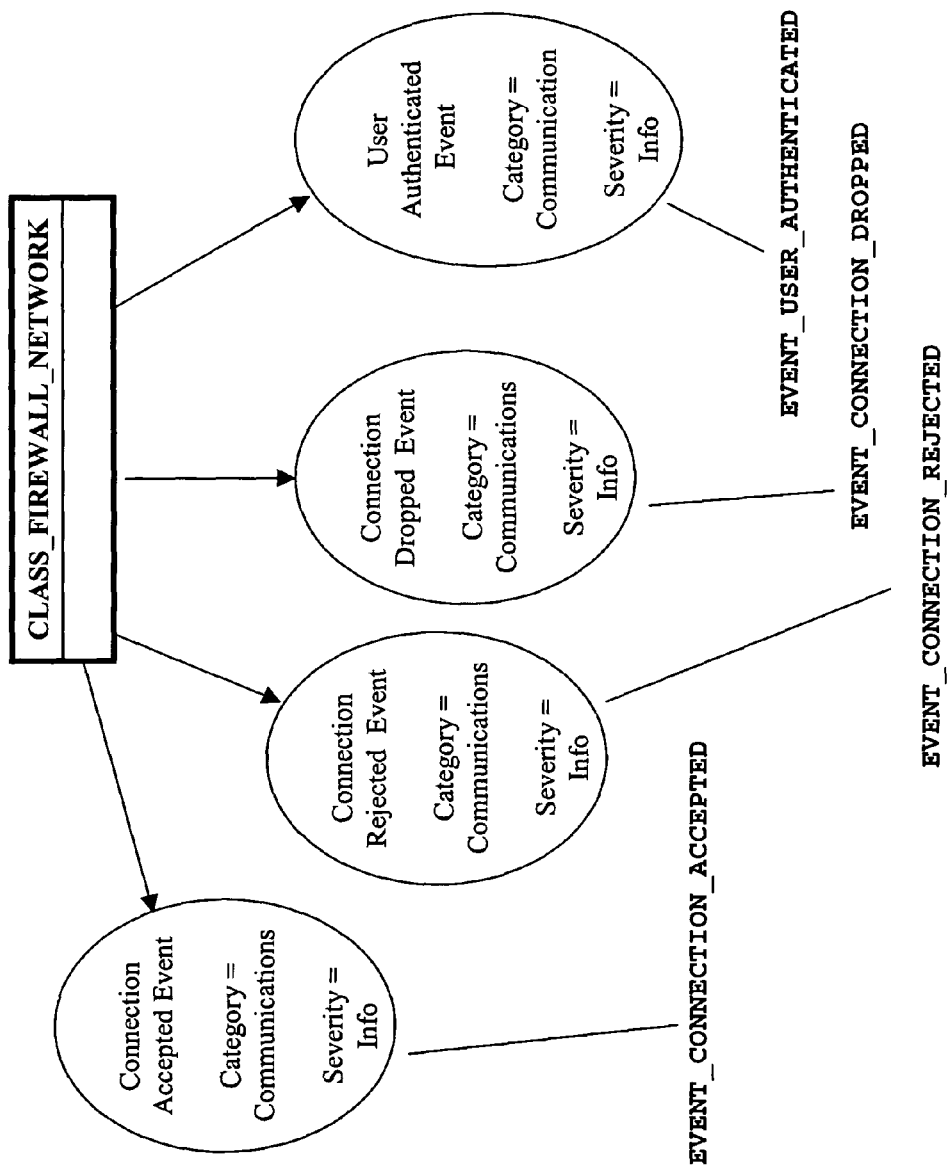
FIGS. 26A and 26B are an illustration of objects that are instantiations of the firewall network event class of FIG. 25 according to one embodiment of the present invention.
Figure 26B:
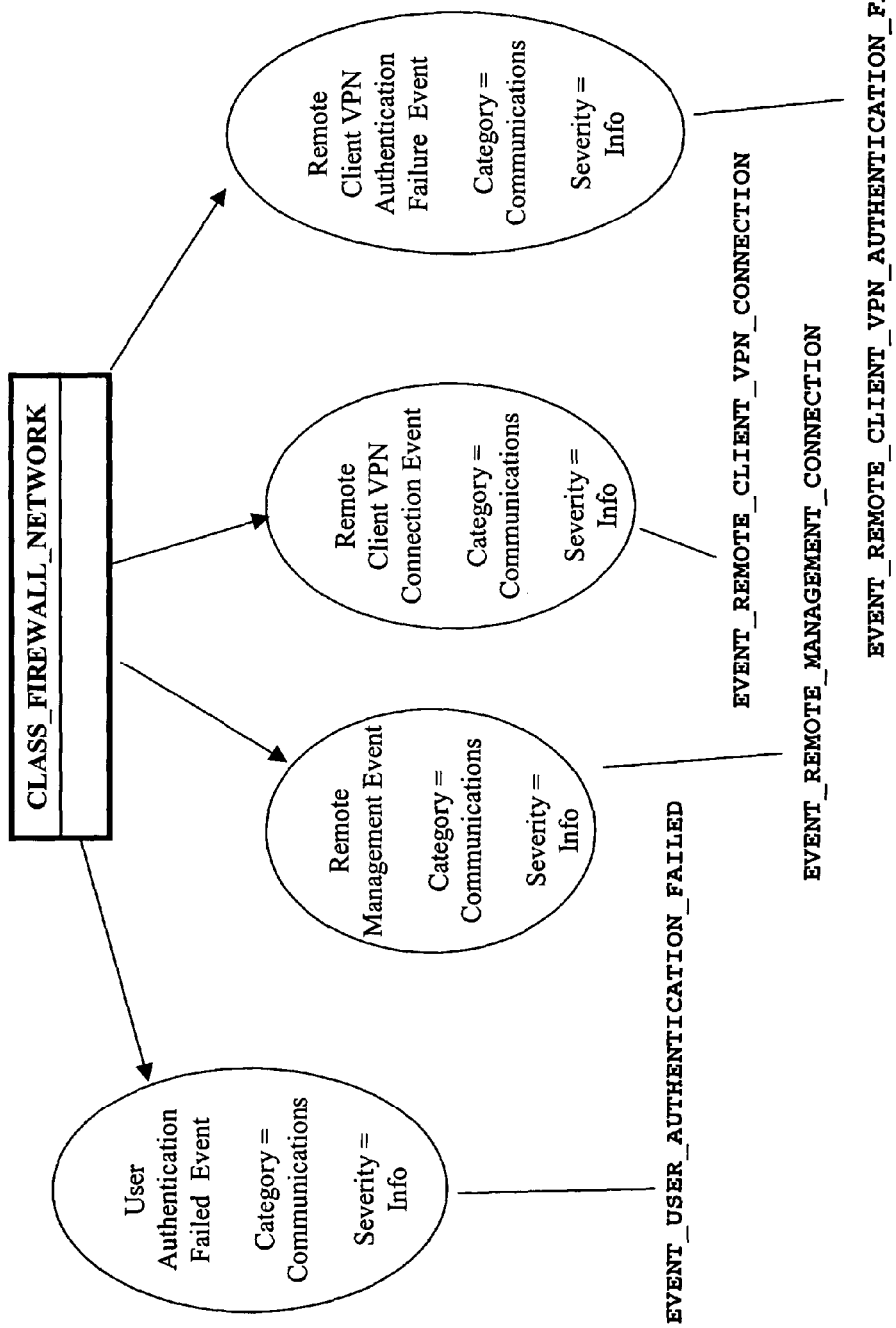

Event objects, that are instantiations of firewall network class CLASS_FIREWALL_NETWORK include: event EVENT_CONNECTION_ACCEPTED (FIG. 26A), a connection through the firewall was accepted by the firewall event; event EVENT_CONNECTION_REJECTED, an attempted connection was rejected by the firewall event; event EVENT_CONNECTION_DROPPED, a connection through the firewall was dropped for other than a rule violation or failed authentication event; event EVENT_USER_AUTHENTICATED, a user authenticated to the firewall successfully event; event EVENT_USER_AUTHENTICATION_FAILED (FIG. 26B), a user failed in an attempt to authenticate to the firewall event; event EVENT_REMOTE_MANAGEMENT_CONNECTION, a remote host connected to firewall management console event; event EVENT_REMOTE_CLIENT_VPN_CONNECTION, a remote client VPN connection has been established through the firewall event; and event EVENT_REMOTE_CLIENT_VPN_AUTHENTICATION_FAILURE, a remote client VPN connection through the firewall failed due to authentication failure event.

For all these events, the event category is category CAT_COMMUNICATIONS. The event severity is severity SEV_INFORMATIONAL.

In addition to fields 15500 (FIG. 26C_1) for security base event class CLASS_BASE and fields 19500 for network event class CLASS_NETWORK, firewall network class CLASS_FIREWALL_NETWORK (FIGS. 25, 26A and 26B) adds fields 26500 that are presented in TABLE 24 to a firewall event 26600.

FIGS. 26C_1 and 26C_2 illustrate a firewall network event memory structure 26600 stored in memory 26100. Memory structure 26600 is illustrative only and is not intended to represent that the structure is stored in any particular way in memory 26100.

TABLE 24

| Field Name | Field Type |
| --- | --- |
| FIELD_SOURCE_HOST_NAME | info |
| FIELD_DESTINATION_HOST_NAME | info |
| FIELD_SOURCE_SERVICE_NAME | info |
| FIELD_DESTINATION_SERVICE_NAME | info |
| FIELD_NETWORK_DIRECTION_ID | id |
| FIELD_USER_ID | info |
| FIELD_RULE | info |
| FIELD_TARGET_RESOURCE | info |
| FIELD_TARGET_DIRECTION_ID | id |
| FIELD_INTERFACE_NAME | info |
| FIELD_NW_PROTOCOL_ID | id |

A host name of the node initiating a connection to or through the firewall is stored in a source host name field FIELD_SOURCE_HOST_NAME. The value in this field may be null.

A host name of the target node for a connection through the firewall is stored in a destination host name field FIELD_DESTINATION_HOST_NAME. The value in this field may be null.

A service/application/protocol name associated with the port or protocol in use by the source node is stored in a source service name field FIELD_SOURCE_SERVICE_NAME. The value in this field may be null.

A service/application/protocol name associated with the port or protocol in use at the destination node, e.g., FTP, HTTP, etc., is stored in a destination service name field FIELD_DESTINATION_SERVICE_NAME. This field typically contains the application-level protocol. The value in this field may be null.

A value stored in network direction ID field FIELD_NETWORK_DIRECTION_ID identifies whether the connection through the firewall was initiated from an outside interface/node to an inside interface/node (INBOUND) or from an inside interface/node to an outside interface/node (OUTBOUND). For example, a computer inside the firewall initiating an HTTP connection to a server outside the firewall would be establishing an OUTBOUND connection. The value in this field may be null.

An ID used by a user for operations that require user authentication is stored in a user ID field FIELD_USER_ID. This field may be null.

A firewall rule associated with the event being logged is stored in a rule field FIELD_RULE. Generally, this field is only used in cases where a firewall rule being triggered caused the event to be logged, or possibly subsequent related events. Thus, the value in this field may be null.

An identifier of a file/server being accessed, when appropriate, is stored in a target resource field FIELD_TARGET_RESOURCE. This identifier is the URL for an HTTP or possibly FTP connection, or just a file name or server name in other cases. The value in this field may be null.

A value in target direction ID field FIELD_TARGET_DIRECTION_ID Identifies the direction of data flow when a specific resource is being accessed. This value identifies HTTP or FTP GET vs. PUT operations. Other protocols use this field in a corresponding manner. The value in this field may be null.

A name, as known by the firewall software, of the interface on which the connection came into the firewall is stored in interface name field FIELD_INTERFACE_NAME. The value in this field may be null, but normally is not null.

A transport protocol number used in a connection is stored in a network protocol ID field FIELD_NW_PROTOCOL_ID. The value in this field is the actual protocol value.

Firewall Connection Statistics Class

Firewall connection statistics class CLASS_FIREWALL_CONNECTION_STATISTICS stores information in an event that provides details about a connection, for reporting on byte counts, services used, and connection durations.

Figure 27A:
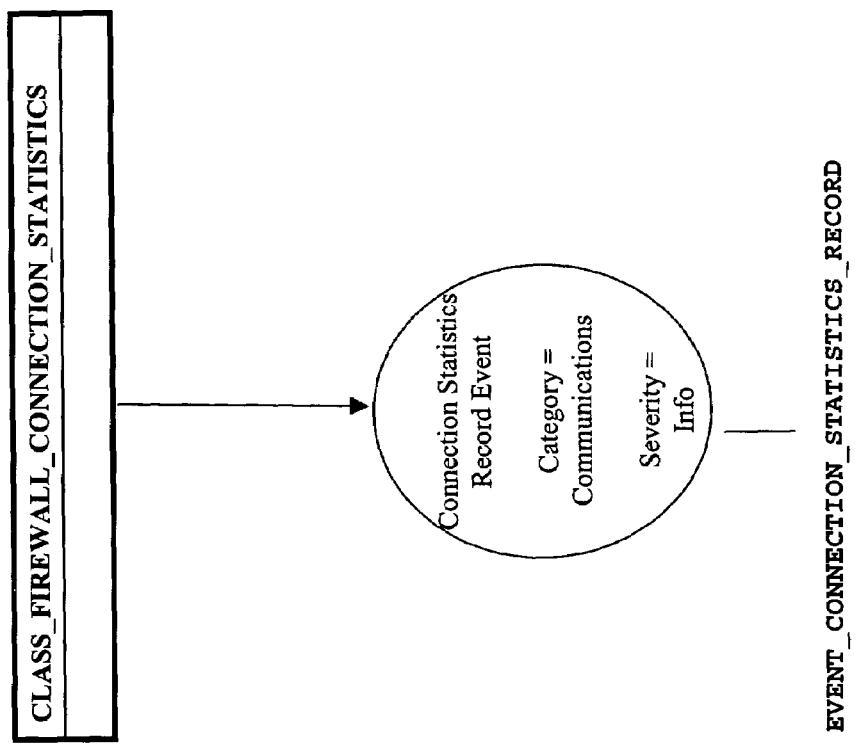
FIG. 27A is an illustration of an object that is an instantiation of the firewall connection statistics event class of FIG. 25 according to one embodiment of the present invention.

An event object that is an instantiation of firewall connection statistics class CLASS_FIREWALL_CONNECTION_STATISTICS is event EVENT_CONNECTION_STATISTICS_RECORD (FIG. 27A), a firewall connection statistics record event. For this event, the event category is category CAT_COMMUNICATIONS. The event severity is severity SEV_INFORMATIONAL.

In addition to fields 15500 (FIG. 27B_1) for security base event class CLASS_BASE, fields 19500 for network event class CLASS_NETWORK, and fields 26500 (FIG. 27B_2) class CLASS_FIREWALL_NETWORK, firewall connection statistics class CLASS_FIREWALL_CONNECTION_STATISTICS (FIGS. 25 and 27A) adds fields 27500 (FIGS. 27B_2 and 27B_3) that are presented in TABLE 25 to a firewall connection statistics record event 27600.

FIGS. 27B_1 27B_2 and 27B_3 illustrate a firewall connection statistics record event memory structure 27600 stored in memory 27100. Memory structure 27600 is illustrative only and is not intended to represent that the structure is stored in any particular way in memory 27100.

TABLE 25

| Field Name | Field Type |
|---|---|
| FIELD_START_TIME | date |
| FIELD_ELAPSED_TIME | count |
| FIELD_PACKETS | count |
| FIELD_BYTES | count |
| FIELD_CLIENT_INBOUND_PACKETS | count |
| FIELD_CLIENT_OUTBOUND_PACKETS | count |
| FIELD_SERVER_INBOUND_PACKETS | count |
| FIELD_SERVER_OUTBOUND_PACKETS | count |
| FIELD_CLIENT_INBOUND_BYTES | count |
| FIELD_CLIENT_OUTBOUND_BYTES | count |
| FIELD_SERVER_INBOUND_BYTES | count |
| FIELD_SERVER_OUTBOUND_BYTES | count |
| FIELD_CLIENT_INBOUND_INTERFACE | info |
| FIELD_CLIENT_OUTBOUND_INTERFACE | info |
| FIELD_SERVER_INBOUND_INTERFACE | info |
| FIELD_SERVER_OUTBOUND_INTERFACE | info |

A timestamp of when a connection through the firewall was initiated is stored in a firewall connection start time field FIELD_START_TIME. A duration of the connection, in seconds in one embodiment, through the firewall is stored in a firewall connection elapsed time field FIELD_ELAPSED_TIME.

A number of packets transferred during this firewall connection is stored in a firewall packets transferred field FIELD_PACKETS. A number of bytes transferred during this firewall connection is stored in a firewall bytes transferred field FIELD_BYTES.

A number of packets received from a client during this firewall connection is stored in a firewall client inbound packets field FIELD_CLIENT_INBOUND_PACKETS. A number of packets sent to the client during this firewall connection is stored in a firewall client outbound packets field FIELD_CLIENT_OUTBOUND_PACKETS.

A number of packets received from a server during this firewall connection is stored in a firewall server inbound packets field FIELD_SERVER_INBOUND_PACKETS. A number of packets sent to the server during this firewall connection is stored in a firewall server outbound packets field FIELD_SERVER_OUTBOUND_PACKETS.

A number of bytes received from the client during this firewall connection is stored in a firewall client inbound bytes field FIELD_CLIENT_INBOUND_BYTES. A number of bytes sent to the client during this firewall connection is stored in a firewall client outbound bytes field FIELD_CLIENT_OUTBOUND_BYTES.

A number of bytes received from the server during this firewall connection is stored in a firewall server inbound bytes field FIELD_SERVER_INBOUND_BYTES. A number of bytes sent to the server during this firewall connection is stored in a firewall server outbound bytes field FIELD_SERVER_OUTBOUND_BYTES.

A name of a network interface on which data from the client was received during this firewall connection is stored in a firewall client inbound interface field FIELD_CLIENT_INBOUND_INTERFACE. A name of a network interface through which data was transmitted to the client during this firewall connection is stored a in a firewall client outbound interface field FIELD_CLIENT_OUTBOUND_INTERFACE.

A name of a network interface on which data from the server was received during this firewall connection is stored in a firewall server inbound interface field FIELD_SERVER_INBOUND_INTERFACE. A name of a network interface through which data was transmitted to the server during this firewall connection is stored in a firewall server outbound interface field FIELD_SERVER_OUTBOUND_INTERFACE.

Scan Event Package

Figure 28:
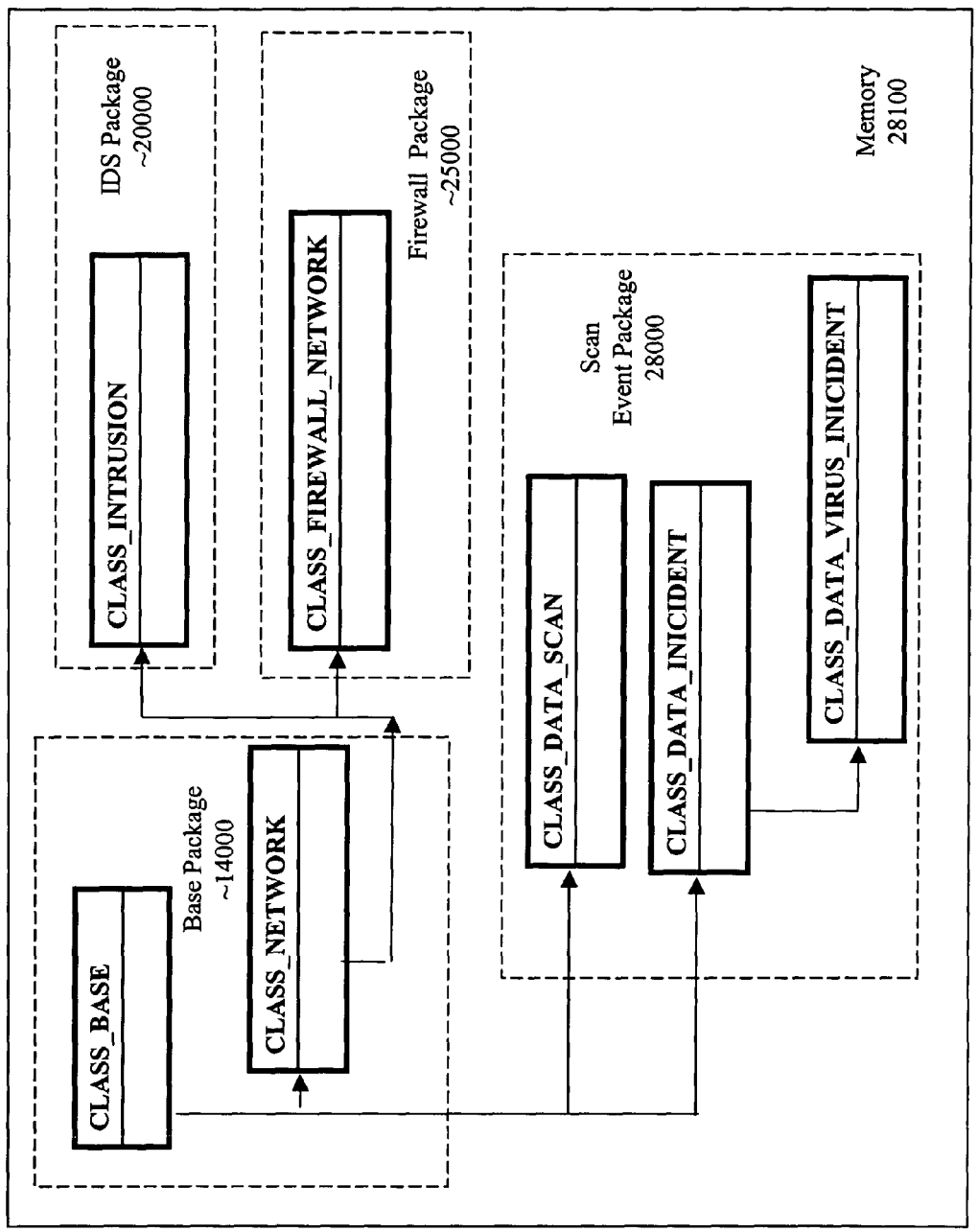
FIG. 28 is a diagram of a scan event package memory structure that includes a plurality of predefined hierarchical class structures according to one embodiment of the present invention.

One group of managed products includes antivirus and content filtering products. Scan event package 28000 (FIG. 28) provides events with a schema design, described more completely below, for these managed products.

While the term scan may refer to the examination of a single data object, scan usually refers to the examination of a specific collection of data objects. Traditionally, antivirus products had three kinds of scans. A manual scan examined preexisting data, such as all files in a particular folder, when the user clicks a button in a graphic user interface (GUI). A scheduled scan was like a manual scan that was configured to run at particular times. An auto-protect scan, also called a real-time or automatic scan, examined data objects that were detected in real time, such as emails arriving at a server or disk files accessed by programs. This breakdown of the term scan can be applied to non-antivirus products as well.

This schema design allows the creation of a report showing all started (or completed) scans, and a report showing all the incidents found by a particular scan. A first report is useful for verifying that scheduled scans are running as expected either by an administrator or by security feedback and control manager 260A. A second report is useful for determining the effectiveness of different scans. In addition, this schema design facilitates the operation of security feedback and control system 155.

The schema includes events and a class to identify the start and end of each scan. A managed product 210_j generates a new GUID number for each scan and includes the GUID number in every event related to the scan. All scans are considered to be general-purpose that is, a scan is not an antivirus scan or a content filtering scan, but just a scan that may uncover incidents of any type.

Incidents

An incident is triggering of a rule with a condition and an action in a managed product 210_j. Examples of rules are "if a file contains a virus, repair the file," or "if repair is not possible, delete the file" and "if an incoming email has a subject header with a DDR score (using the Spam dictionary) greater than or equal to 20, drop the email."

Data Objects

A data object is anything that can be scanned (examined) to determine if the scan of the data object triggers one or more incident rules of the managed product 210_j. Examples of data objects are files, email messages, and boot records.

Matters are complicated by the fact that some data objects contain other data objects. An example is a Zip file that contains other files. Another example is an email message that contains several zip files, each of which contains several zip files.

Incidents can be found in any of these data objects and need to be logged individually, e.g., an event sent to security management system 150. Yet, scanning applications have a notion of a top-level object. These are the objects whose fates are determined based on their parts, but independently from each other. For example, a file scanner determines if the Zip file in the first example is free of viruses or not, and quarantines the whole Zip file or not. An email scanner determines if the email message is free of viruses or not, and delivers it or not.

Scan Event Package Data-Incident Events

As explained more completely below, the schema includes classes and event IDs for logging an incident in a top-level data object or one of its subcomponents. The single event describes the top-level data object, the subcomponent name (if applicable), the incident rule that was triggered, why the incident rule was triggered, and the status of the top-level data object and the subcomponent (if applicable).

If an application's scan finds multiple incidents in a single top-level data object, the application must log multiple data incident events, each of which describes the same data object but a different incident and perhaps a different subcomponent.

Scan Event Package Incident Event Types

The schema's event IDs describe the type of incident that occurred in general terms. This level of event categorization is intended for grouping events into families for determining what kind of end user view the events (antivirus administrator, spam/content manager, human resources representative, etc.)

Scan Event Package Class Hierarchy

TABLE 26 shows one embodiment of a scan package class hierarchy and event IDs used with each class in this embodiment of scan event package. The class structure is described more completely below. Each class inherits from security base event class CLASS_BASE (TABLE 2 and FIG. 14).

TABLE 26

| Event Class | Event IDs |
| --- | --- |
| CLASS_DATA_SCAN | EVENT_DATA_SCAN_START |
| | EVENT_DATA_SCAN_END |
| | EVENT_DATA_SCAN_PAUSE |
| | EVENT_DATA_SCAN_RESUME |
| | EVENT_DATA_SCAN_CANCEL |
| CLASS_DATA_INCIDENT | EVENT_DATA_GENERIC_CONTENT |
| | EVENT_DATA_MALWARE_CONTENT |
| | EVENT_DATA_SENSITIVE_CONTENT |
| | EVENT_DATA_SPAM_CONTENT |
| | EVENT_DATA_UNSCANNABLE |
| CLASS_DATA_VIRUS_INCIDENT | EVENT_DATA_VIRUS |

Data Scan Event Class

Data scan event class CLASS_DATA_SCAN (FIG. 28) inherits from security base event class CLASS_BASE. In this embodiment, data scan event class CLASS_DATA_SCAN has a predefined event class identifier.

Figure 29A:
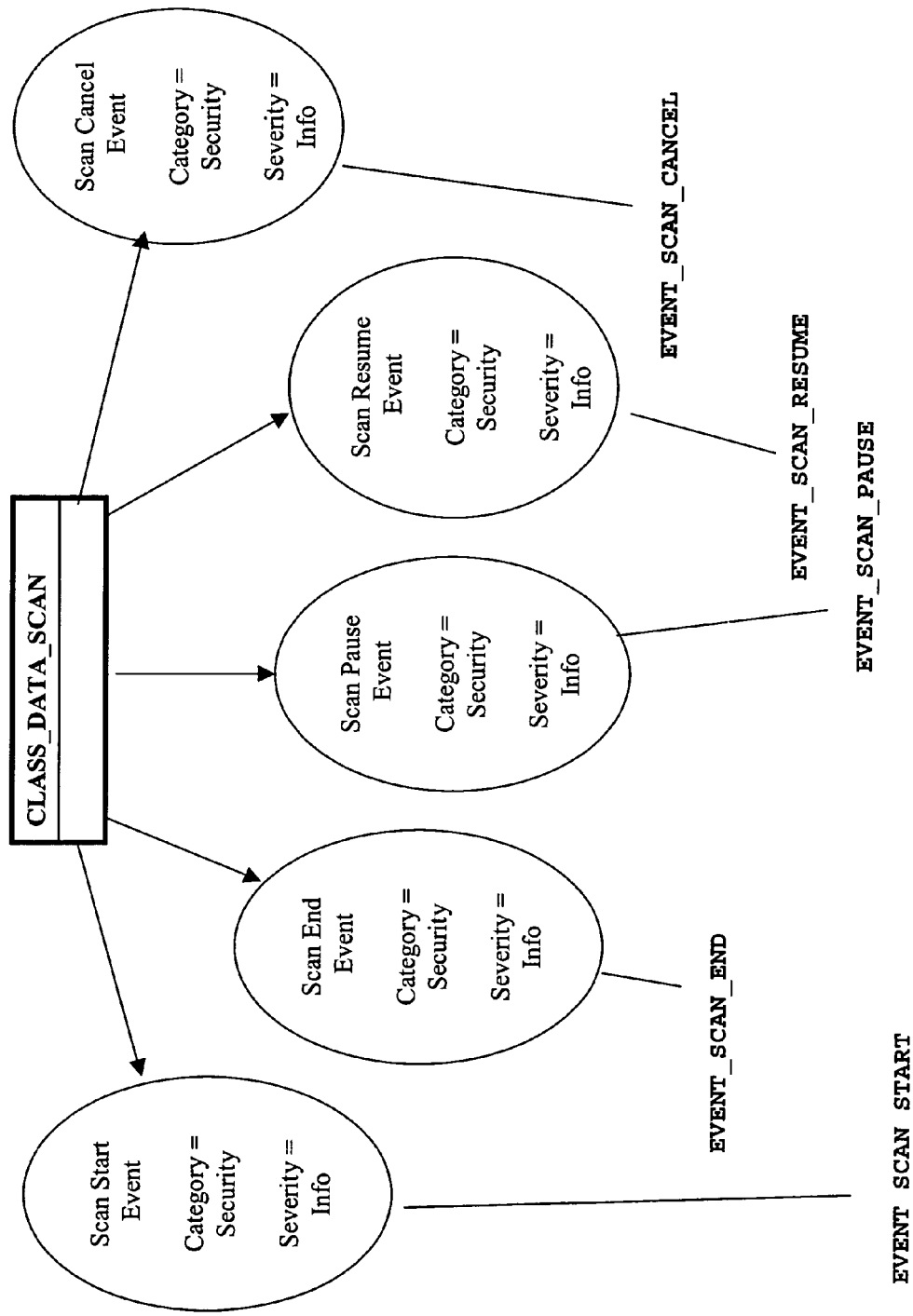
FIG. 29A is an illustration of a objects that are instantiations of the data scan event class of FIG. 28 according to one embodiment of the present invention.

Event objects, that are instantiations of data scan event class CLASS_DATA_SCAN include:

event EVENT_DATA_SCAN_START (FIG. 29A), a data scan start event that is generated when a scan is started;

event EVENT_DATA_SCAN_END, a data scan end event that is generated when the data scan is ended, typically after all selected data objects have been scanned;

event EVENT_DATA_SCAN_PAUSE, a data scan pause event that is generated when a scan is paused, either by the user or by program constraints, e.g., scans that are suspended during certain time intervals;

event EVENT_DATA_SCAN_RESUME, a data scan resume event that is generated when a suspended scan is restarted; and event EVENT_DATA_SCAN_CANCEL, a data scan cancel event that is generated when a scan is ended prematurely, i.e. prior to scanning all selected objects, due to user request or abnormal conditions.

For events EVENT_DATA_SCAN_START, EVENT_DATA_SCAN_END, EVENT_DATA_SCAN_PAUSE, EVENT_DATA_SCAN_RESUME, and EVENT_DATA_SCAN_CANCEL, the event category is category CAT_SECURITY. The event severity is severity SEV_INFORMATIONAL.

In addition to fields 15500 (FIG. 29B) that were presented in TABLE 2 for security base event class CLASS_BASE, data scan event class CLASS_DATA_SCAN (FIGS. 28 and 29A) adds four fields 29500 that are presented in TABLE 27 to the fields for security base event class CLASS_BASE. The type of each field also is presented in TABLE 27. A description of the value in each field follows TABLE 27.

Figure 29B:
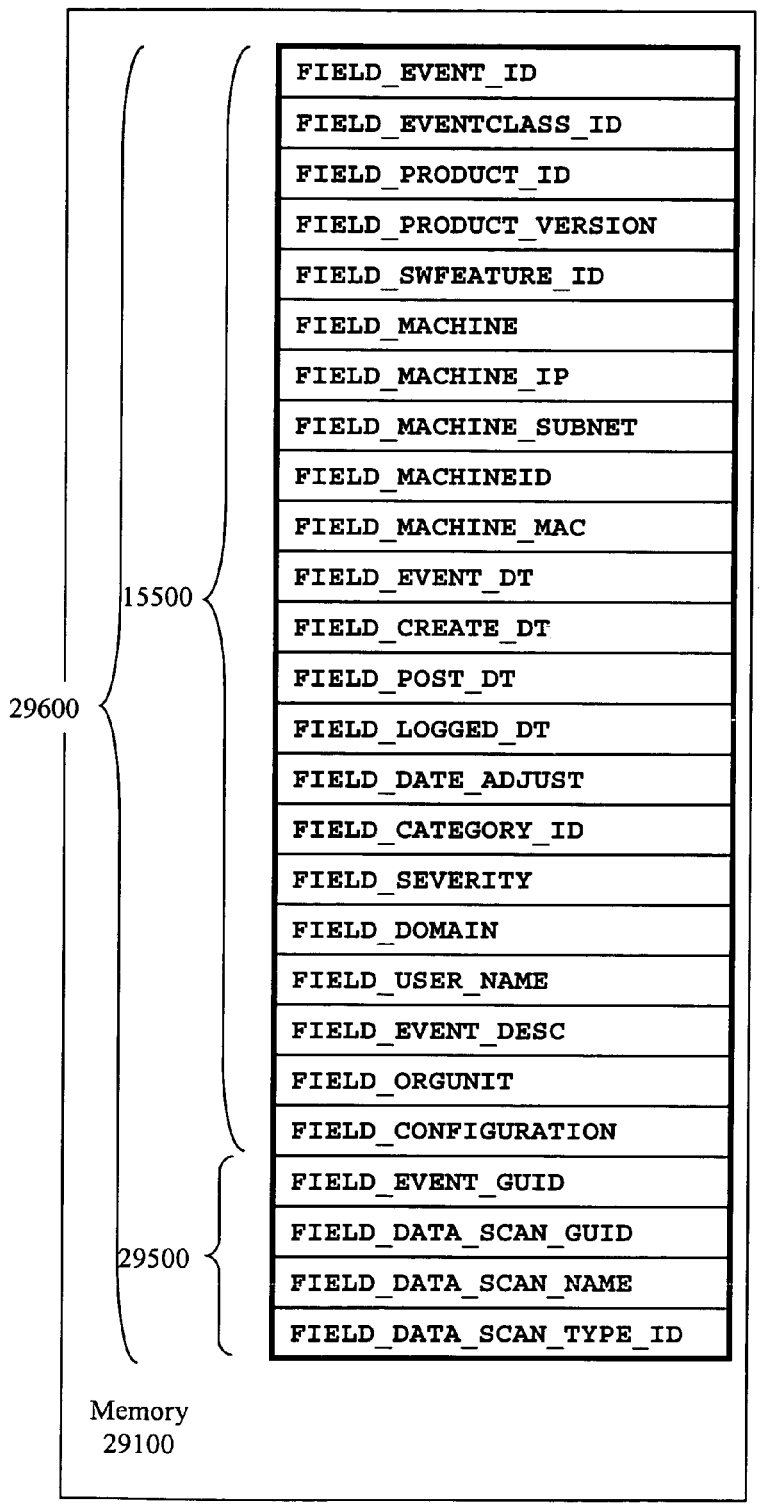
FIG. 29B is an illustration of a data scan event memory structure that is used for the objects of the data scan event class of FIG. 29A according to one embodiment of the present invention.

FIG. 29B illustrates a data scan event memory structure 29600 stored in memory 29100. Memory structure 29600 is illustrative only and is not intended to represent that the structure is stored in any particular way in memory 29100.

TABLE 27

| Field Name | Type |
|---|---|
| FIELD_EVENT_GUID | guid |
| FIELD_DATA_SCAN_GUID | guid |
| FIELD_DATA_SCAN_NAME | info |
| FIELD_DATA_SCAN_TYPE_ID | id |

An event instance ID is stored in a system data scan event ID field FIELD_EVENT_GUID. This ID is supplied by security management system 150 and is used by system 150 to join the event class tables for a particular incident.

An application-generated ID number linking all events associated with a single scan of multiple objects is stored in an application data scan ID field FIELD_DATA_SCAN_GUID.

A name of the scan is stored in a data scan name field FIELD_DATA_SCAN_NAME. The name entered in this field could be an administrator-supplied name, an application-generated summary of the scan settings, or blank. The name describes the overall purpose of the scan. The name does not try to describe every detail of the scan settings. Examples of scan names include "Home office weekly user database scan," "Scan folders for viruses," and "Full system virus scan."

A type of scan is stored in data scan type field FIELD_DATA_SCAN_TYPE_ID. In one embodiment, the value entered in this field is one of DATA_SCAN_TYPE_AUTO, DATA_SCAN_TYPE_MANUAL, and DATA_SCAN_TYPE_SCHEDULED. The value selected from this set of values is determined by whether the scan is an automatic scan, a manual scan, or a scheduled scan, respectively.

One problem with data scan events is that it is not obvious when an auto-protect scan begins and ends. One approach is to say that each real-time scan of an individual data object is a complete auto-protect scan. This is the easiest approach to implement, but it generates a large volume of scan start and stop events.

Another approach is to say that an auto-protect scan starts whenever real-time scanning is activated, e.g., at application startup, or whenever auto-protect is turned on, and ends when scanning is deactivated, e.g., at application shutdown, or whenever auto-protect is turned off. This approach generates the most meaningful events, but there is the possibility that a single scan can run for days, weeks, or even months.

A third approach is to declare that auto-protect scans are not really scans at all, and to not any log scan events for them or fill in scan IDs for the data incident events. In one embodiment, the second approach is used in system 150.

Data Incident Class

Data incident event class CLASS_DATA_INCIDENT (FIG. 28) inherits from security base event class CLASS_BASE. In this embodiment, data incident event class CLASS_DATA_INCIDENT has a predefined event class identifier.

Figure 30A:
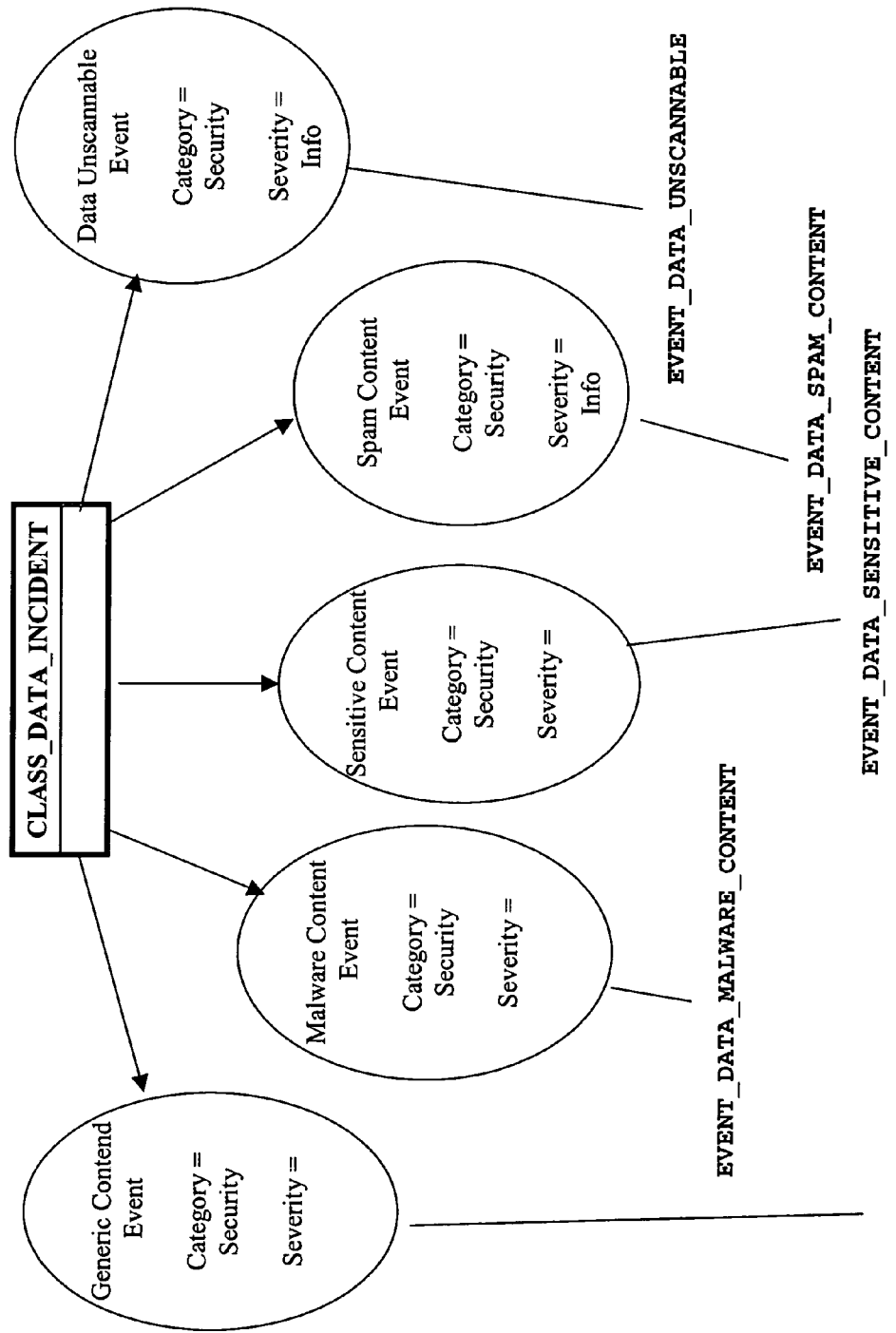
FIG. 30A is an illustration of objects that are instantiations of the data incident event class of FIG. 28 according to one embodiment of the present invention.

Event objects, that are instantiations of data incident event class CLASS_DATA_INCIDENT include:

event EVENT_DATA_GENERIC_CONTENT (FIG. 30A), a generic content event that was generated when a general-purpose content filtering rule was triggered. The application cannot more specifically characterize the incident as a malware content, sensitive content, or spam content incident. This is most likely due to a design limitation in the application. The application may lack a facility by which a user can indicate the intent of a rule constructed using a rule builder. For example, is the intent of the rule "block outgoing email whose subject contains 'blob'" to stop an outgoing worm named 'blob' (a malware content incident), or to stop outgoing descriptions of the secret project named 'blob' (a sensitive content incident);

event EVENT_DATA_MALWARE_CONTENT, a data malware content event that is generated when a rule intended to detect malicious software was triggered, e.g., a rule intended to monitor or block malware was triggered;

event EVENT_DATA_SENSITIVE_CONTENT, a data sensitive content event that is generated when a rule intended to detect, e.g., monitor or block, sensitive data was triggered. Sensitive means some sort of privacy issues may be involved, either with the data itself or with the fact that a particular person is sending or receiving the data. This could cover a range of issues from financial data to sexual material;

event EVENT_DATA_SPAM_CONTENT, a data SPAM content event that is generated when a rule designed to monitor or block SPAM or other unwanted junk material was triggered. This is a separate category from malware content because it is likely that SPAM content events do not require significant review or response and would clutter other event views; and event EVENT_DATA_UNSCANNABLE, a data unscannable event that is generated when a data object (or a part thereof) cannot be scanned.

For events EVENT_DATA_GENERIC_CONTENT, EVENT_DATA_MALWARE_CONTENT, EVENT_DATA_SENSITIVE_CONTENT, EVENT_DATA_SPAM_CONTENT, and EVENT_DATA_UNSCANNABLE, the event category is category CAT_SECURITY. In one embodiment, the event severity is for events EVENT_DATA_GENERIC_CONTENT, EVENT_DATA_MALWARE_CONTENT, EVENT_DATA_SENSITIVE_CONTENT is selected as one of SEV_WARNING, SEV_MINOR, SEV_MAJOR, and SEV_CRITICAL as defined in TABLE 4.

For event EVENT_DATA_SPAM_CONTENT, in one embodiment, the severity is SEV_INFORMATIONAL for most spam detection events. However, severity SEV_WARNING is recommended of situations where SPAM detection is not highly reliable and the event may need to be reviewed.

For event EVENT_DATA_UNSCANNABLE, in one embodiment, the severity is SEV_WARNING if the reason for the inability to scan the data object is an error, and otherwise is SEV_INFORMATIONAL.

Data incident event class CLASS_DATA_INCIDENT has fields for describing any kind of data object and incident in general terms. Subclasses provide additional fields for special data objects or incidents requiring more detail.

In addition to fields 15500 (FIG. 30B_1) that were presented in TABLE 2 for security base event class CLASS_BASE, data incident event class CLASS_DATA_INCIDENT (FIGS. 28 and 30A) adds fields 30500 that are presented in TABLE 28 to fields 15500 for security base event class CLASS_BASE. The type of each field also is presented in TABLE 28. A description of the value in each field follows TABLE 28.

FIGS. 30B_1 and 30B_2 illustrate a data incident event memory structure 30600 stored in memory 30100. Memory structure 30600 is illustrative only and is not intended to represent that the structure is stored in any particular way in memory 30100.

TABLE 28

| Field Name | Type |
| --- | --- |
| FIELD_EVENT_GUID | guid |
| FIELD_DATA_SCAN_GUID | guid |
| FIELD_DATA_TYPE_ID | id |
| FIELD_DATA_NAME | info |
| FIELD_DATA_STATUS_ID | id |
| FIELD_DATA_PART_NAME | info |
| FIELD_DATA_PART_STATUS_ID | id |
| FIELD_DATA_PERSISTENCE_ID | id |
| FIELD_DATA_DIRECTION_ID | id |
| FIELD_DATA_SOURCE_DOMAIN | info |
| FIELD_DATA_DEST_DOMAIN | info |
| FIELD_DATA_SOURCE_HOST | info |
| FIELD_DATA_DEST_HOST | info |
| FIELD_DATA_SENDER | info |
| FIELD_DATA_RECIPIENTS | info |
| FIELD_DATA_SUBJECT | info |
| FIELD_DATA_HEADERS | info |
| FIELD_DATA_INFO | info |
| FIELD_DATA_SIZE | info |
| FIELD_DATA_CREATED | dt |
| FIELD_DATA_MODIFIED | dt |
| FIELD_DATA_CREATOR | info |
| FIELD_DATA_MODIFIER | info |
| FIELD_DATA_QUARANTINE_ID | info |
| FIELD_DATA_BACKUP_ID | info |
| FIELD_DATA_RULE_DESCR | info |
| FIELD_DATA_RULE_REASON | info |
| FIELD_DATA_RULE_REASON_ID | id |
| FIELD_DATA_RULE_MODIFIED | dt |
| FIELD_DATA_SIGNATURE | info |

An event instance ID is stored in a system data scan event ID field FIELD_EVENT_GUID. This ID is supplied by security management system 150 and is used by system 150 to join the event class tables for a particular incident.

An application-generated ID number linking all events associated with a single scan of multiple objects is stored in an application data scan ID field FIELD_DATA_SCAN_GUID.

A type of the data object, as a whole, is stored in data type ID field FIELD_DATA_TYPE_ID. In one embodiment, the value of the data object type ID is selected from the values in TABLE 29.

TABLE 29

| Values for field FIELD_DATA_TYPE_ID |
| --- |
| DATA_TYPE_MEMORY |
| DATA_TYPE_BOOT_RECORD |
| DATA_TYPE_FILE |
| DATA_TYPE_HTTP |
| DATA_TYPE_HTTPS |
| DATA_TYPE_FTP |
| DATA_TYPE_POP |

TABLE 29-continued

| Values for field FIELD_DATA_TYPE_ID |
| --- |
| DATA_TYPE_SMTP |
| DATA_TYPE_GROUPWARE_EMAIL |
| DATA_TYPE_GROUPWARE_DOC |

The values listed in TABLE 29 are illustrative only and are not intended to limit the invention to the specific values presented. One of skill in the art can use less than these values, or can add different values as appropriate. See TABLE 35 below for an interpretation of the items in TABLE 29.

A human-readable name of the data object is stored in data object name field FIELD_DATA_NAME (TABLE 28). Examples of names include a fully qualified file name, a URL, and a Lotus Notes UNID. The name should allow an administrator or an automated process, e.g., a rules engine, to locate the data object (if possible), using also the machine information in security base event class CLASS_BASE. Examples of names that could be used in this field include "Memory," "Drive C: boot record," "c:\file.doc," "\\server\volume\file.doc," "/home/username/file.doc," "http://www.badsite.com/reallybadpage.html," "M200120122242507013," and "Notes://USSM-MAIL01-1/8825677C006EA261/38D46BF5E8F08834852564B500129B2C/D6B9A2082044889A88256A1E006EEAD4.

A status of the data object as a whole is stored in data object status identifier field FIELD_DATA_STATUS_ID. In one embodiment, this is the status after all parts of the whole data object that have been scanned. This implies an application should delay logging any events for a data object until the object has been completely processed.

In one embodiment, the value of the data object status identifier is selected from the values in TABLE 30.

TABLE 30

| Values for field FIELD_DATA_STATUS_ID |
| --- |
| DATA_STATUS_CORRECTED |
| DATA_STATUS_PARTIALLY_CORRECTED |
| DATA_STATUS_UNCORRECTED |
| DATA_STATUS_INFECTED |
| DATA_STATUS_BLOCKED |
| DATA_STATUS_BOUNCED |
| DATA_STATUS_DELAYED |
| DATA_STATUS_DELETED |
| DATA_STATUS_QUARANTINED |

The quarantined status in TABLE 30 refers to a managed product's local quarantine area and not to a quarantine server. The values listed in TABLE 30 are illustrative only and are not intended to limit the invention to the specific values presented. One of skill in the art can use less than these values, or can add different values as appropriate. See TABLE 35 below for an interpretation of the items in TABLE 30.

A human-readable name of the part of the data object where the incident was detected is stored in a data part name field FIELD_DATA_PART_NAME. The value entered is the name or relative pathname of a subcomponent of the data object, such as a file attachment or header within a mail message, or a file within an archive (such as a zip file). Examples of values found in this field include "attachment1.doc," "attachment2.zip/bad.doc," "part.mime/part.cab/part.uue/part.doc," "Subject:," and "<script>." This field is blank if the problem was with the entire data object, e.g., a virus in a simple *.COM file.

A status of the part of the data object where the incident was detected is stored in a data object part status identifier field FIELD_DATA_PART_STATUS_ID. In one embodiment, the value of the data object part status identifier is selected from the values in TABLE 31.

TABLE 31

Values for field
FIELD_DATA_PART_STATUS_ID

DATA_STATUS_CORRECTED
DATA_STATUS_UNCORRECTED
DATA_STATUS_INFECTED
DATA_STATUS_DELETED

In TABLE 31, a status of infected has the same meaning as a status of uncorrected. A status of infected is merely an alternative wording of the same condition that is used for virus scanning events. The values listed in TABLE 31 are illustrative only and are not intended to limit the invention to the specific values presented. One of skill in the art can use less than these values, or can add different values as appropriate. See TABLE 35 below for an interpretation of the items in TABLE 31. This field may be blank if the problem was with the entire data object, e.g., a virus in a simple *.COM file.

A permanence of the data object is stored in a data object persistence identifier field FIELD_DATA_PERSISTENCE_ID. In one embodiment, the value in field FIELD_DATA_PERSISTENCE_ID is one of DATA_PERSISTENCE_FIXED and DATA_PERSISTENCE_TRANSIENT.

A fixed data object is stored in a semi-permanent storage location and is scanned at that location. Examples of fixed data objects include a file on disk or an email message in an inbox. A transient data object is scanned as the data object passes through a scanning system. Examples of transient data objects include email in transit. The defining characteristic of a transient data object is that an attempt to locate the data object after the data object has been scanned most likely fails because the data object has moved to a new location or no longer exists The direction of the data transfer relative to the scanning host or to the organization is stored in a data object direction identifier field FIELD_DATA_DIRECTION_ID. This field may be blank, or in one embodiment includes one of DATA_DIRECTION_INBOUND and DATA_DIRECTION_OUTBOUND. Email scanned at an Internet gateway might be characterized as inbound to the organization (from the internet) or outbound from the organization (to the internet). Email scanned at a workstation might be characterized as inbound to or outbound from the workstation A domain from which the data object originated is stored in a data object source domain field FIELD_DATA_SOURCE_DOMAIN. This field may be blank. This information may already be present in the uniform resource identifier in field FIELD_DATA_NAME that was described above, but the information is stored separately here for reporting purposes.

A domain to which the data object is being transmitted is stored in a data object destination domain field FIELD_DATA_DEST_DOMAIN. This field may be blank. This information may already be present in the uniform resource identifier in field FIELD_DATA_NAME that was described above, but the information is stored separately here for reporting purposes.

A host from which the data object originated is stored in a data object source host field FIELD_DATA_SOURCE_HOST. This field may be blank, text, or an IP address in one embodiment. This information may already be present in the uniform resource identifier in field FIELD_DATA_NAME that was described above, but the information is stored separately here for reporting purposes.

A host to which the data object is being transmitted is stored in a data object destination host field FIELD_DATA_DEST_HOST. This field nay be blank, text, or an IP address in one embodiment. This information may already be present in the uniform resource identifier in field FIELD_DATA_NAME that was described above, but the information is stored separately here for reporting purposes.

A name of the user sending the data object is stored in a data object sender field FIELD_DATA_SENDER. This field may be blank.

Name(s) of the user(s) receiving the data object, separated by comas, is stored in data object recipients field FIELD_DATA_RECIPIENTS. If the string in this field is too long for this field, the application may truncate the string at any point and append ellipses (" . . . "). This information is only a helpful hint for human beings and may not be reliable for automated processing. This field may be blank.

A subject or title of the data object as a whole is stored in data object subject field FIELD_DATA_SUBJECT. This field may be blank.

Header information from the data object is stored in a data object header field FIELD_DATA_HEADERS. This field contains a sequence of header lines separated by carriage return/linefeed. The information is this field is intended for mail or HTTP headers of the form <Name>: <Value>. If the string is too long to fit within this field, the application may truncate the string at any point and append ellipses (" . . . "). The application may also omit uninteresting header lines. Note that the email subject may appear within this field even thought it is also recorded in a separate field. This field may be blank. An example of header information is:

From you@earth.solar.net Sat May 9 12:40:45 1998\r\nReceived: from jupiter.solar.net (jupiter.solar.net [1.4.4.7]) by pluto.solar.net (8.8.7/8.8.7) with SMTP id KAB00332 for <chrism@pluto.solar.net>; Sat, 9 May 1998 12:40:45-06000\r\nRecieved: from earth.solar.net (earth.solar.net [1.4.4.4]) by jupiter.solar.net (8.8.8/8.8.8) with SMTP id MAA00395 for <chris@jupiter.solar.net>; Sat, 9 May 1998 12:40:40-0600\r\nDate: Sat, 9 May 1998 12:40:30-0600\r\nFrom: <you@earth.solar.net>\r\nTo: Chris <chris@jupiter.solar.net>\r\nSubject: concert data\r\nMessage-Id: <19980509124030.0113@earth.solar.net>\r\nX-Mailer: QUALCOM Windows Eudora Pro Version 4.0\r\nLines: 113\r\n.

Additional information about the data object is stored in an data object information field FIELD_DATA_INFO. This field may be blank A size of the data object as a whole in bytes is stored in a data object size field FIELD_DATA_SIZE. In one embodiment, the size is specified as a full byte number with no punctuation; for example, to log 30 MB, use 30270000. This field may be blank.

A time when the data object was created is stored in a data object created field FIELD_DATA_CREATED. This field may be blank.

A time when the data object was last modified is stored in a data object modified field FIELD_DATA_MODIFIED. This field may be blank.

A name of the user that created the data object is stored in a data object creator field FIELD_DATA_CREATOR. This field may be blank.

A name of the user that last modified the data object is stored in a data object modifier field FIELD_DATA_MODIFIED. This field may be blank.

If the data object as a whole was quarantined, the unique identifier of the quarantined copy is stored in a data quarantined identifier field FIELD_DATA_QUARANTINE_ID. Otherwise, this field is blank. The nature of this identifier entered in this field is application specific.

If a backup or archival copy of the data object as a whole was created, the unique identifier of the copy is stored in a data object backup identifier field FIELD_DATA_BACKUP_ID. If a backup or archival copy was not created, this field is blank. The nature of this identifier is application specific. Some applications can create a backup copy before attempting repairs. Others can create an archive copy (e.g. of mail messages) after performing repairs.

A name of the rule that was triggered that results in generation of the event is stored in a data rule description field FIELD_DATA_RULE_DESCR. This field may be blank, but this is not recommended. The name of the rule could be an administrator-supplied name, or an application-generated summary of the rule. The name describes the overall purpose of the rule; it does not try to describe every detail of the rule conditions. Examples of rule names include a) "Block outbound emails containing the word 'ProjectX'," b) "Block emails containing phrases from dictionary 'Spam'," c) "Block spam," d) "Detect viruses," e) "Repair or delete viruses," f) "Browse local sites only," g) "Browse approved sites," and h) "Log and categorize web access."

A full or partial description of the conditions that triggered the rule in field FIELD_DATA_RULE_DESCR is entered in a data rule reason field FIELD_DATA_RULE_REASON. This field may be blank, but this is not recommended. The description entered in this field typically includes details such as words found, word categories used, blocked addresses detected, heuristic scores computed, threshold values exceeded, virus found, etc. The description should minimize use of embedded English, instead relying on administrator-assigned labels and data values. Examples, corresponding to the rule descriptions above for field FIELD_DATA_RULE_DESCR, are respectively, a) "ProjectX," b) "GET RICH QUICK," c) "Known Spammers: 111.222.333.444" or "Spam: 95%" (heuristic detection), d) "W32.Nimda.A@mm," e) "Unknown virus" (heuristic detection), f) "http://www.externalsite.com," g) "Militancy: 23" (heuristic detection using DDR dictionaries), and h) "sex" (category for http://www.playboy.com)

A reason for a scan failure is stored in an event EVENT_DATA_UNSCANNABLE is stored in a FIELD_DATA_RULE_REASON_ID. If this field is used, field FIELD_DATA_RULE_REASON is left blank. In one embodiment, the value of the reason for the scan failure is selected from the values in TABLE 32.

TABLE 32

Values for field FIELD_DATA_RULE_REASON_ID
DATA_UNSCANNABLE_EXCLUDED
DATA_UNSCANNABLE_PERMISSION
DATA_UNSCANNABLE_SIGNED
DATA_UNSCANNABLE_ENCRYPTED
DATA_UNSCANNABLE_ERROR The values listed in TABLE 32 are illustrative only and are not intended to limit the invention to the specific values presented. One of skill in the art can use less than these values, or can add different values as appropriate. See TABLE 35 below for an interpretation of the items in TABLE 32.

A time when the rule was last modified is stored in a data rule modified field FIELD_DATA_RULE_MODIFIED. If the application does not track the modification time of each rule, the time of the configuration containing the rules instead is used. This field allows an administrator to determine if a rule has been modified but not renamed after it was triggered (or in other words, if the current version of the rule is the one used for this event). The need for this field has been reduced by the configuration history tracking system, which can reconstruct a configuration based on the configuration name and event time as described in copending, commonly filed and commonly assigned U.S. patent application Ser. No. 10/660,422, entitled "Configuration System and Methods Including Configuration Inheritance and Revisioning," of Paul M. Agbabian and David R. Hertel, which is incorporated herein by reference in its entirety.

Field FIELD_DATA_SIGNATURE is a reserved field in this embodiment, and may be blank.

This embodiment, as described above, uses two non-translatable text fields to describe the incident rule and why the was triggered: fields FIELD_DATA_RULE_DESCR and FIELD_DATA_RULE_REASON. These fields provide a predictable and maintainable way to convey problems to administrators at a high level without specifying too many details on how the problems were detected Data Virus Incident Class Data virus incident event class CLASS_DATA_VIRUS_INCIDENT represents a known virus, unknown virus, worm, Trojan horse, or other type of malware detected by a virus scanner. The virus name as reported by the scanning engine should be recorded in field FIELD_DATA_RULE_REASON of the superclass.

Figure 31A:
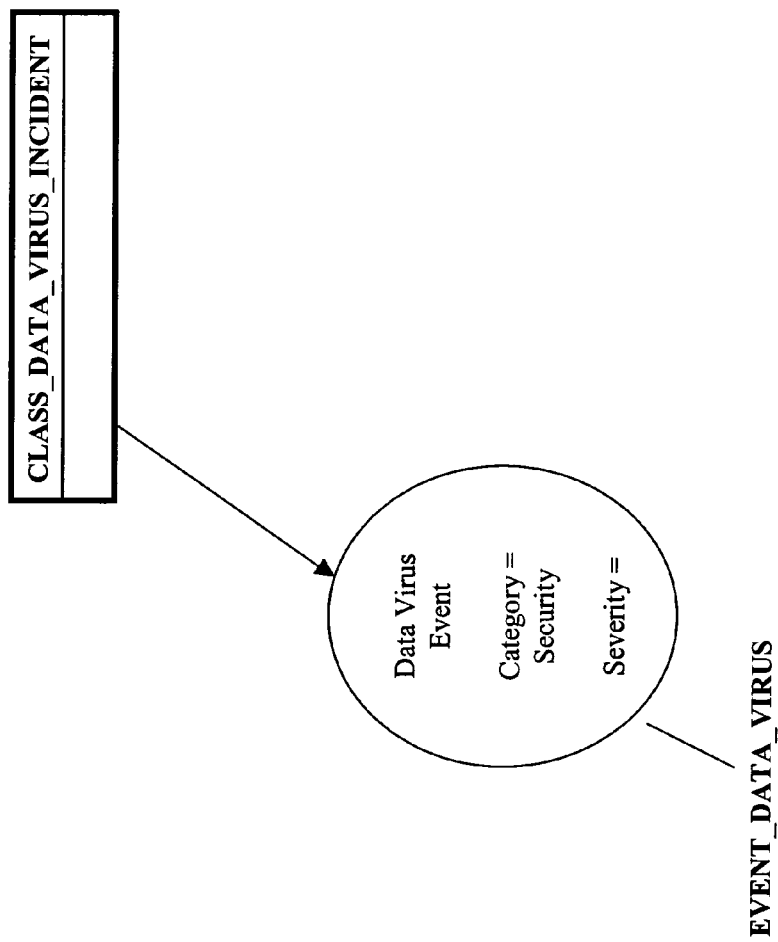
FIG. 31A is an illustration of an object that is an instantiation of the data virus incident event class of FIG. 28 according to one embodiment of the present invention.

Data virus incident event class CLASS_DATA_VIRUS_INCIDENT (FIG. 31A) inherits from security base event class CLASS_BASE and from data incident event class CLASS_DATA_INCIDENT. In this embodiment, data virus incident event class CLASS_DATA_VIRUS_INCIDENT has a predefined event class identifier.

Event objects, that are instantiations of data virus incident event class CLASS_DATA_VIRUS_INCIDENT, include event EVENT_DATA_VIRUS (FIG. 31A), a data virus event that is generated when a virus is detected by a virus scanning engine.

For event EVENT_DATA_VIRUS, the event category is category CAT_SECURITY. The event severity is severity SEV_WARNING, when a infected data object is corrected and the virus removed. The event severity is severity SEV_MINOR, when a virus is quarantined. The event severity is severity SEV_MAJOR, when a virus is uncorrected.

In addition to the fields presented in TABLE 2 for security base event class CLASS_BASE and the fields presented in TABLE 28 for data incident class CLASS_DATA_INCIDENT, data virus incident event class CLASS_DATA_VIRUS_INCIDENT (FIG. 28) adds the fields presented in TABLE 33 to the fields for security base event class CLASS_BASE. The type of each field also is presented in TABLE 33. A description of the value in each field follows TABLE 33.

FIGS. 31B_1 and 31B_2 illustrate a data incident event memory structure 31600 stored in memory 31100. Memory structure 31600 is illustrative only and is not intended to represent that the structure is stored in any particular way in memory 31100.

TABLE 33

| Field Name | Type |
|---|---|
| FIELD_EVENT_GUID | guid |
| FIELD_VIRUS_NUMBER | info |
| FIELD_VIRUS_TYPE_ID | Id |
| FIELD_VIRUS_DEFINITIONS | info |
| FIELD_VIRUS_QS_NAME | info |
| FIELD_VIRUS_QS_UUID | guid |

An event instance ID is stored in a system data scan event ID field FIELD_EVENT_GUID. This ID is supplied by security management system 150 and is used by system 150 to join the event class tables for a particular incident.

A virus identification number as reported by a virus scanning engine is stored in a virus number field FIELD_VIRUS_NUMBER. This field may be blank.

Field FIELD_VIRUS_TYPE_ID is a reserved field and so is blank. In another embodiment, this field stores a virus type identifier.

A version of the virus definition files used by the virus scanning engine at the time of detection of the virus is stored in a virus definitions field FIELD_VIRUS_DEFINITIONS. In one embodiment, the version has a format of the form YYYYMMDD.RRR, where YYYY is the year, MM is the month, DD is the day and RRR is the number of the current version of the virus definitions.

If a virus host was submitted to a quarantine server, an identity of the quarantine server is stored in a quarantine server name field FIELD_VIRUS_QS_NAME. Otherwise, this field is blank.

Figure 32:
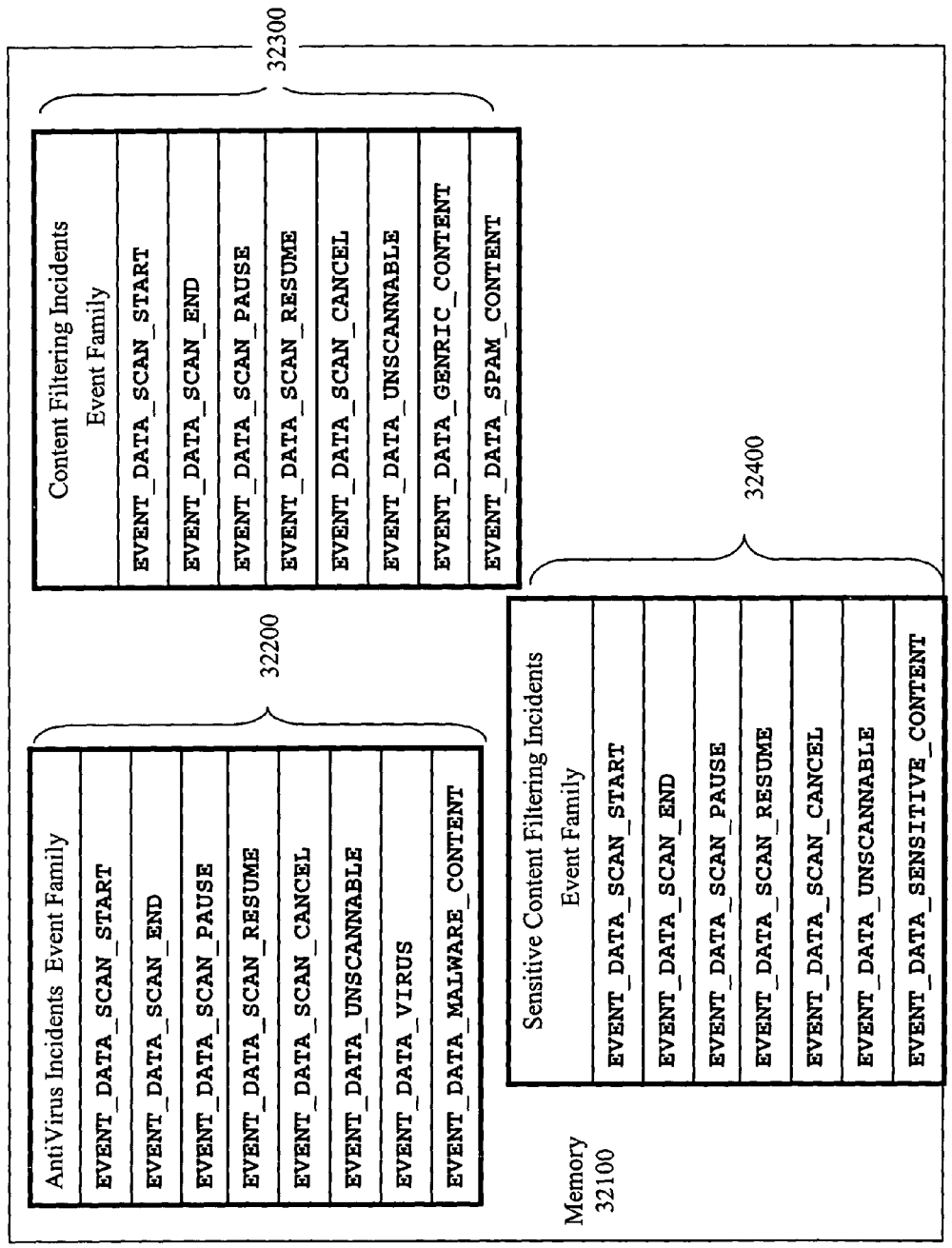
FIG. 32 is an illustration of event family memory structures that include the event memory structures of FIGS. 29B, 30_B1, 30_B2 and/or FIGS. 31B_1 and 31B_2 according to one embodiment of the present invention.

If the virus host was submitted to a quarantine server, an identifier of the submission, e.g., the universal unique identifier (UUID), is stored in a quarantine server submission identifier field FIELD_VIRUS_QS_UUID. Otherwise, this field is blank In one embodiment, as illustrated in FIG. 32, three event families based upon the scan events are defined. Antivirus incident event family 32200 includes the events listed below in TABLE 34. Content Filtering Incidents family 32300 includes the event listed below in TABLE 34. Finally, TABLE 34 presents the events in sensitive content incident events family 32400. Families 32220, 32300, and 32400 are memory structures in memory 32100. In FIG. 32, the event ID is used as reference numeral to represent the event memory structure having that event ID as described above, and incorporated herein by reference. These families may also include other intrusion events that are defined from the classes described above, or from classes that are added.

TABLE 34

| Event Family | Event IDs |
|---|---|
| Antivirus Incidents | EVENT_DATA_SCAN_START |
|  | EVENT_DATA_SCAN_END |
|  | EVENT_DATA_SCAN_PAUSE |
|  | EVENT_DATA_SCAN_RESUME |
|  | EVENT_DATA_SCAN_CANCEL |
|  | EVENT_DATA_UNSCANNABLE |
|  | EVENT_DATA_VIRUS |
|  | EVENT_DATA_MALWARE_CONTENT |
| Content Filtering Incidents | EVENT_DATA_SCAN_START |
|  | EVENT_DATA_SCAN_END |
|  | EVENT_DATA_SCAN_PAUSE |
|  | EVENT_DATA_SCAN_RESUME |
|  | EVENT_DATA_SCAN_CANCEL |
|  | EVENT_DATA_UNSCANNABLE |
|  | EVENT_DATA_GENERIC_CONTENT |
|  | EVENT_DATA_SPAM_CONTENT |
| Sensitive Content Filtering Incidents | EVENT_DATA_SCAN_START |
|  | EVENT_DATA_SCAN_END |
|  | EVENT_DATA_SCAN_PAUSE |
|  | EVENT_DATA_SCAN_RESUME |
|  | EVENT_DATA_SCAN_CANCEL |
|  | EVENT_DATA_UNSCANNABLE |
|  | EVENT_DATA_SENSITIVE_CONTENT |

TABLE 35 gives the English translation of all event IDs and event field string value IDs used in the scan event package classes.

TABLE 35

| Event/Value ID | English Translation |
|---|---|
| EVENT_DATA_SCAN_START | scan started |
| EVENT_DATA_SCAN_END | scan ended |
| EVENT_DATA_SCAN_PAUSE | scan paused |
| EVENT_DATA_SCAN_RESUME | scan resumed |
| EVENT_DATA_SCAN_CANCEL | scan canceled |
| EVENT_DATA_UNSCANNABLE | unscannable item |
| EVENT_DATA_VIRUS | Virus |
| EVENT_DATA_GENERIC_CONTENT | content violation |
| EVENT_DATA_MALWARE_CONTENT | malware content |
| EVENT_DATA_SENSITIVE_CONTENT | sensitive content violation |
| EVENT_DATA_SPAM_CONTENT | Spam |
| DATA_SCAN_TYPE_AUTO | Automatic |
| DATA_SCAN_TYPE_MANUAL | Manual |
| DATA_SCAN_TYPE_SCHEDULED | Scheduled |
| DATA_TYPE_MEMORY | Memory |
| DATA_TYPE_BOOT_RECORD | boot record |
| DATA_TYPE_FILE | File |
| DATA_TYPE_HTTP | HTTP |
| DATA_TYPE_HTTPS | HTTPS |
| DATA_TYPE_FTP | FTP |
| DATA_TYPE_POP | POP mail |
| DATA_TYPE_SMTP | SMTP mail |
| DATA_TYPE_GROUPWARE_EMAIL | Groupware mail |
| DATA_TYPE_GROUPWARE_DOC | Groupware doc |
| DATA_STATUS_CORRECTED | Corrected |
| DATA_STATUS_PARTIALLY_CORRECTED | Partially corrected |
| DATA_STATUS_UNCORRECTED | uncorrected |
| DATA_STATUS_INFECTED | Infected |
| DATA_STATUS_BLOCKED | Blocked |
| DATA_STATUS_BOUNCED | Bounced |
| DATA_STATUS_DELAYED | Delayed |
| DATA_STATUS_DELETED | Deleted |
| DATA_STATUS_QUARANTINED | quarantined |
| DATA_DIRECTION_INBOUND | Inbound |
| DATA_DIRECTION_OUTBOUND | Outbound |
| DATA_PERSISTENCE_TRANSIENT | Transient |
| DATA_PERSISTENCE_FIXED | Fixed |
| DATA_UNSCANNABLE_EXCLUDED | excluded from scan |
| DATA_UNSCANNABLE_PERMISSION | insufficient permissions to scan |
| DATA_UNSCANNABLE_SIGNED | cannot modify signed data |
| DATA_UNSCANNABLE_ENCRYPTED | cannot scan encrypted data |
| DATA_UNSCANNABLE_ERROR | error scanning |

Figure 33:
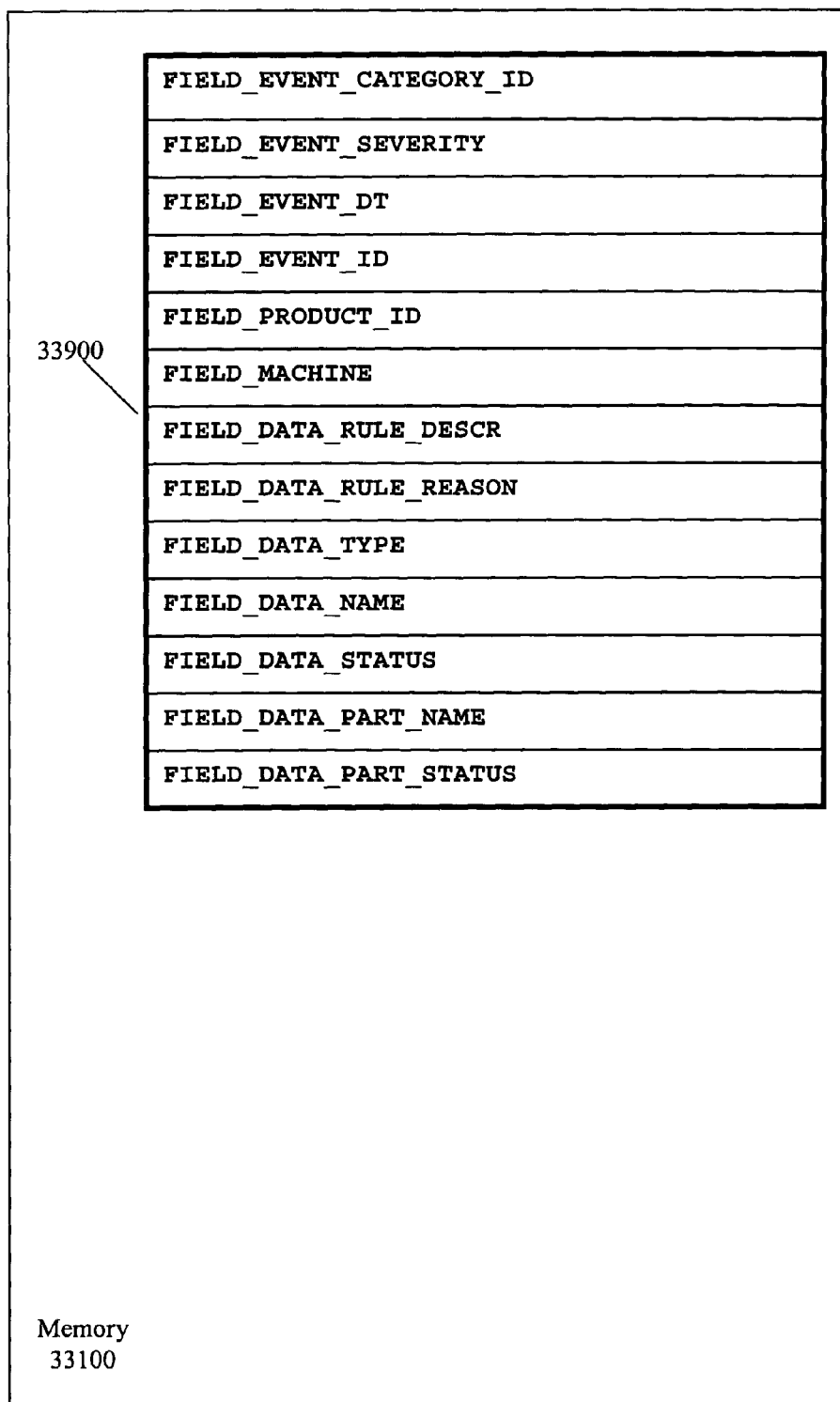
FIG. 33 is an illustration of a first data scan event class view object for a database according to one embodiment of the present invention.

TABLE 36 is a view 33900 (FIG. 33) for one event EVENT_DATA_VIRUS for an EXE file. The information retrieved from one event EVENT_DATA_VIRUS for an EXE file using view 33900 may be formatted for printing of a list report, for display, or for further processing, for example, by security feedback and control system 155. As explained above, a view is a database object that is defined for an event class by a managed product 201_j, as described more completely below. View 33900 is stored in memory 33100.

TABLE 36

| Field Name | Sample Display Value |
| --- | --- |
| FIELD_CATEGORY_ID | Security |
| FIELD_SEVERITY | 2 |
| FIELD_EVENT_DT | Mar. 11, 2003, 1:20:23 PM |
| FIELD_EVENT_ID | Virus |
| FIELD_PRODUCT_ID | SAV |
| FIELD_MACHINE | bluegill |
| FIELD_DATA_RULE_DESCR | Repair or delete viruses |
| FIELD_DATA_RULE_REASON | W32.MEANVIRUS.1234 |
| FIELD_DATA_TYPE_ID | file |
| FIELD_DATA_NAME | c:\infected.exe |
| FIELD_DATA_STATUS | Fixed |
| FIELD_DATA_PART_NAME | |
| FIELD_DATA_PART_STATUS_ID | |

TABLE 37 is another example of a view similar to view 33900 (FIG. 33) for an event EVENT_DATA_VIRUS for an unrepaired EXE File. The information retrieved may be formatted for printing of a list report, for display, or for further processing, for example, by security feedback and control system 155. In the displayed or printed report, the field Name may be replaced by the English equivalent, or not included in the report.

TABLE 37

| Field Name | Sample Display Value |
| --- | --- |
| FIELD_CATEGORY_ID | Security |
| FIELD_SEVERITY | 4 |
| FIELD_EVENT_DT | Mar. 11, 2003, 1:20:23 PM |
| FIELD_EVENT_ID | Virus |
| FIELD_PRODUCT_ID | SAV |
| FIELD_MACHINE | bluegill |
| FIELD_DATA_RULE_DESCR | Detect viruses |
| FIELD_DATA_RULE_REASON | 32.MEANVIRUS.1234 |
| FIELD_DATA_TYPE_ID | file |
| FIELD_DATA_NAME | c:\infected.exe |
| FIELD_DATA_STATUS | Infected |
| FIELD_DATA_PART_NAME | |
| FIELD_DATA_PART_STATUS_ID | |

TABLE 38 is still another example of a view similar to view 33900 (FIG. 33) for an event EVENT_DATA_VIRUS for a ZIP file. The information retrieved may be formatted for printing of a list report, for display, or for further processing, for example, by security feedback and control system 155. In the displayed or printed report, the field Name may be replaced by the English equivalent, or not included in the report.

TABLE 38

| Field Name | Sample Display Value |
| --- | --- |
| FIELD_CATEGORY_ID | Security |
| FIELD_SEVERITY | 2 |
| FIELD_EVENT_DT | Mar. 11, 2003, 1:20:23 PM |
| FIELD_EVENT_ID | Virus |
| FIELD_PRODUCT_ID | SAV |
| FIELD_MACHINE | bluegill |
| FIELD_DATA_RULE_DESCR | Repair or delete viruses |
| FIELD_DATA_RULE_REASON | 32.UNREPVIRUS.9999 |
| FIELD_DATA_TYPE_ID | file |
| FIELD_DATA_NAME | c:\infected.zip |
| FIELD_DATA_STATUS | Fixed |
| FIELD_DATA_PART_NAME | infected.doc |
| FIELD_DATA_PART_STATUS_ID | Deleted |

TABLE 39 is yet still yet another example of a view similar to view 33900 (FIG. 33) for an event EVENT_DATA_UNSCANNABLE for a ZIP file. The information retrieved may be formatted for printing of a list report, for display, or for further processing, for example, by security feedback and control system 155. In the displayed or printed report, the field Name may be replaced by the English equivalent, or not included in the report.

TABLE 39

| Field Name | Sample Display Value |
| --- | --- |
| FIELD_CATEGORY_ID | Security |
| FIELD_SEVERITY | 2 |
| FIELD_EVENT_DT | Mar. 11, 2003, 1:20:23 PM |
| FIELD_EVENT_ID | Unscannable item |
| FIELD_PRODUCT_ID | SAV |
| FIELD_MACHINE | bluegill |
| FIELD_DATA_RULE_DESCR | Repair or delete viruses |
| FIELD_DATA_RULE_REASON | Insufficient permissions to scan |
| FIELD_DATA_TYPE_ID | file |
| FIELD_DATA_NAME | c:\infected.zip |
| FIELD_DATA_STATUS | Uncorrected |
| FIELD_DATA_PART_NAME | |
| FIELD_DATA_PART_STATUS_ID | |

Figure 34:
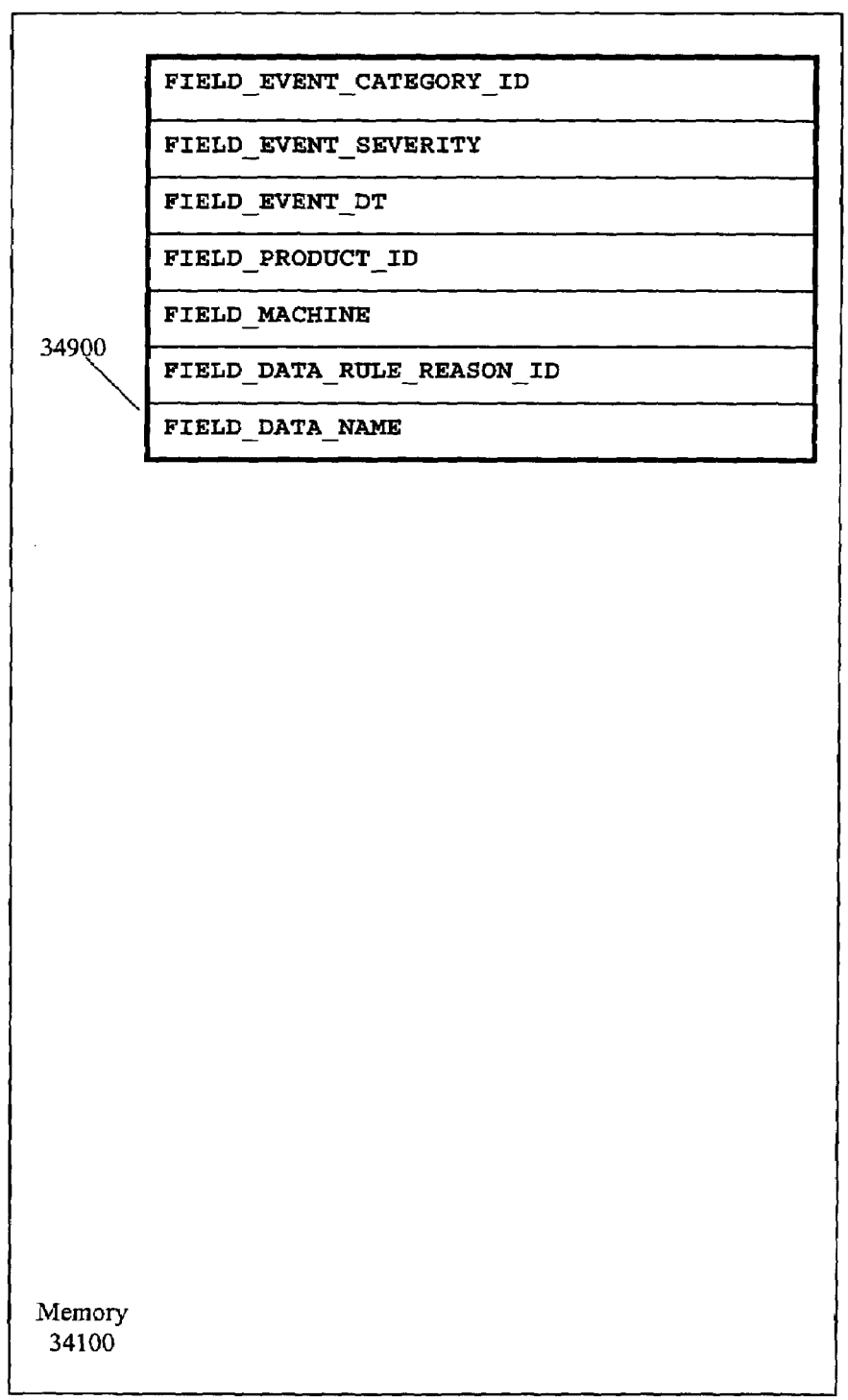
FIG. 34 is an illustration of a second data scan event class view object for a database according to one embodiment of the present invention.

TABLE 40 is a view 34900 (FIG. 34) for event EVENT_DATA_UNSCANNABLE for a ZIP file. The information retrieved from event EVENT_DATA_UNSCANNABLE for a ZIP file using view 34900 may be formatted for printing of a list report, for display, or for further processing, for example, by security feedback and control system 155. As explained above, a view is a database object that is defined for an event class by a managed product 201_j, as described more completely below. View 34900 is stored in memory 34100.

TABLE 40

| Field Name | Sample Display Value |
| --- | --- |
| FIELD_CATEGORY_ID | Security |
| FIELD_SEVERITY | 2 |
| FIELD_EVENT_DT | Mar. 11, 2003, 1:20:23 PM |
| FIELD_PRODUCT_ID | SAV |
| FIELD_MACHINE | bluegill |
| FIELD_DATA_RULE_REASON_ID | Insufficient permissions to scan |
| FIELD_DATA_NAME | c:\infected.zip |

Figure 35:
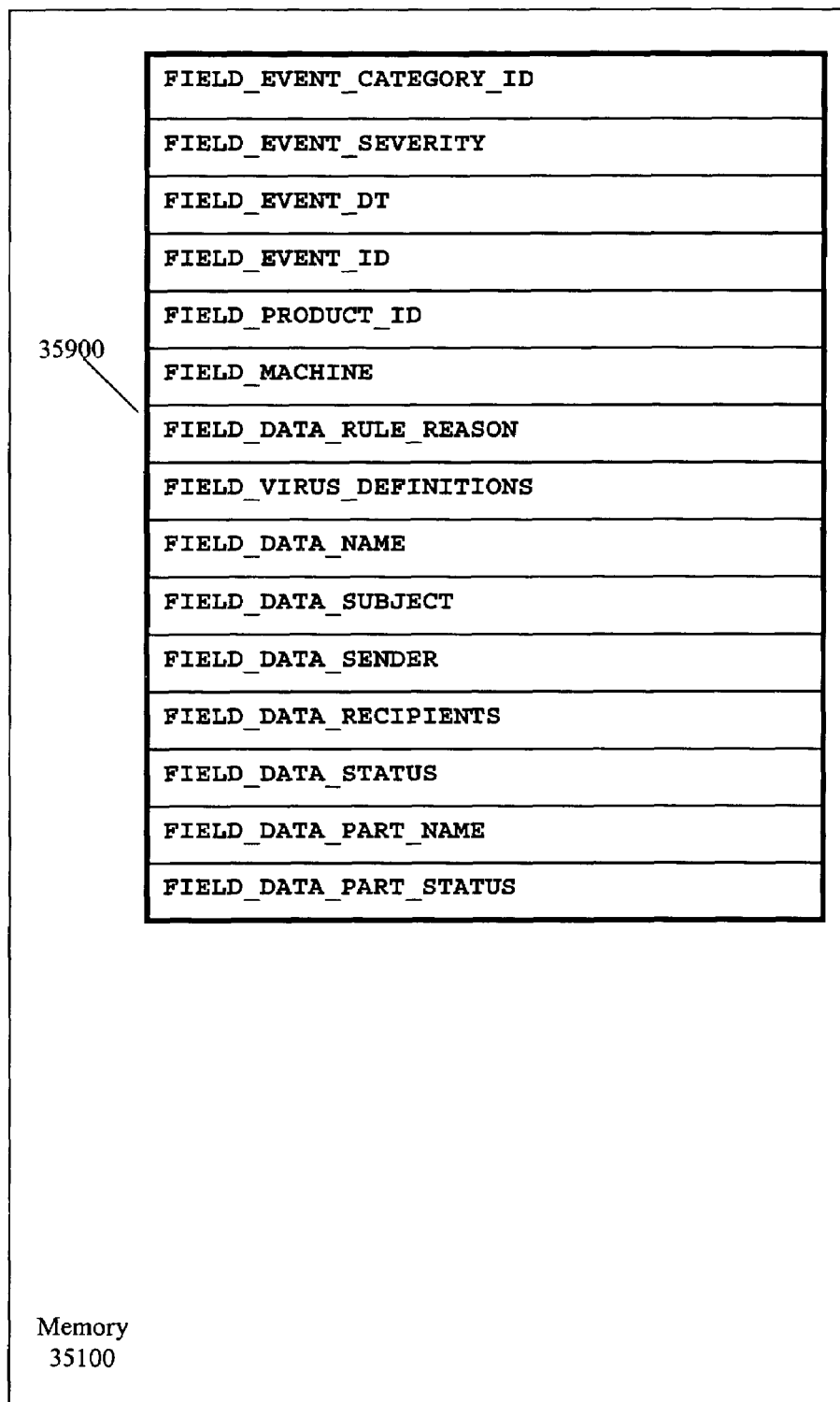
FIG. 35 is an illustration of a third data scan event class view object for a database according to one embodiment of the present invention.

TABLE 41 is a view 35900 (FIG. 35) for event EVENT_DATA_VIRUS for a Notes email. The information retrieved from event EVENT_DATA_VIRUS for a Notes email using view 35900 may be formatted for printing of a list report, for display, or for further processing, for example, by security feedback and control system 155. As explained above, a view is a database object that is defined for an event class by a managed product 201_j, as described more completely below. View 35900 is stored in memory 35100.

TABLE 41

| Field Name | Sample Display Value |
| --- | --- |
| FIELD_CATEGORY_ID | Security |
| FIELD_SEVERITY | 2 |
| FIELD_EVENT_DT | Mar. 11, 2003, 1:20:23 PM |
| FIELD_EVENT_ID | Virus |
| FIELD_PRODUCT_ID | SAV for Lotus Notes |
| FIELD_MACHINE | bluegill |
| FIELD_DATA_RULE_REASON | CodeRed |
| FIELD_VIRUS_DEFINITIONS | 20030131.001 |

TABLE 41-continued

| Field Name | Sample Display Value |
| --- | --- |
| FIELD_DATA_NAME | Notes://USSM-MAIL01-1/8825677C006EA261/38D46BF5E8F08834852564B500129B2C/D6B9A2082044889A88256A1E006EEAD4 |
| FIELD_DATA_SUBJECT | Free Software! |
| FIELD_DATA_SENDER | Joe Smith |
| FIELD_DATA_RECIPIENTS | John Doe |
| FIELD_DATA_STATUS | Fixed |
| FIELD_DATA_PART_NAME | screenshot.gif.exe |
| FIELD_DATA_PART_STATUS_ID | Fixed |

Figure 36:
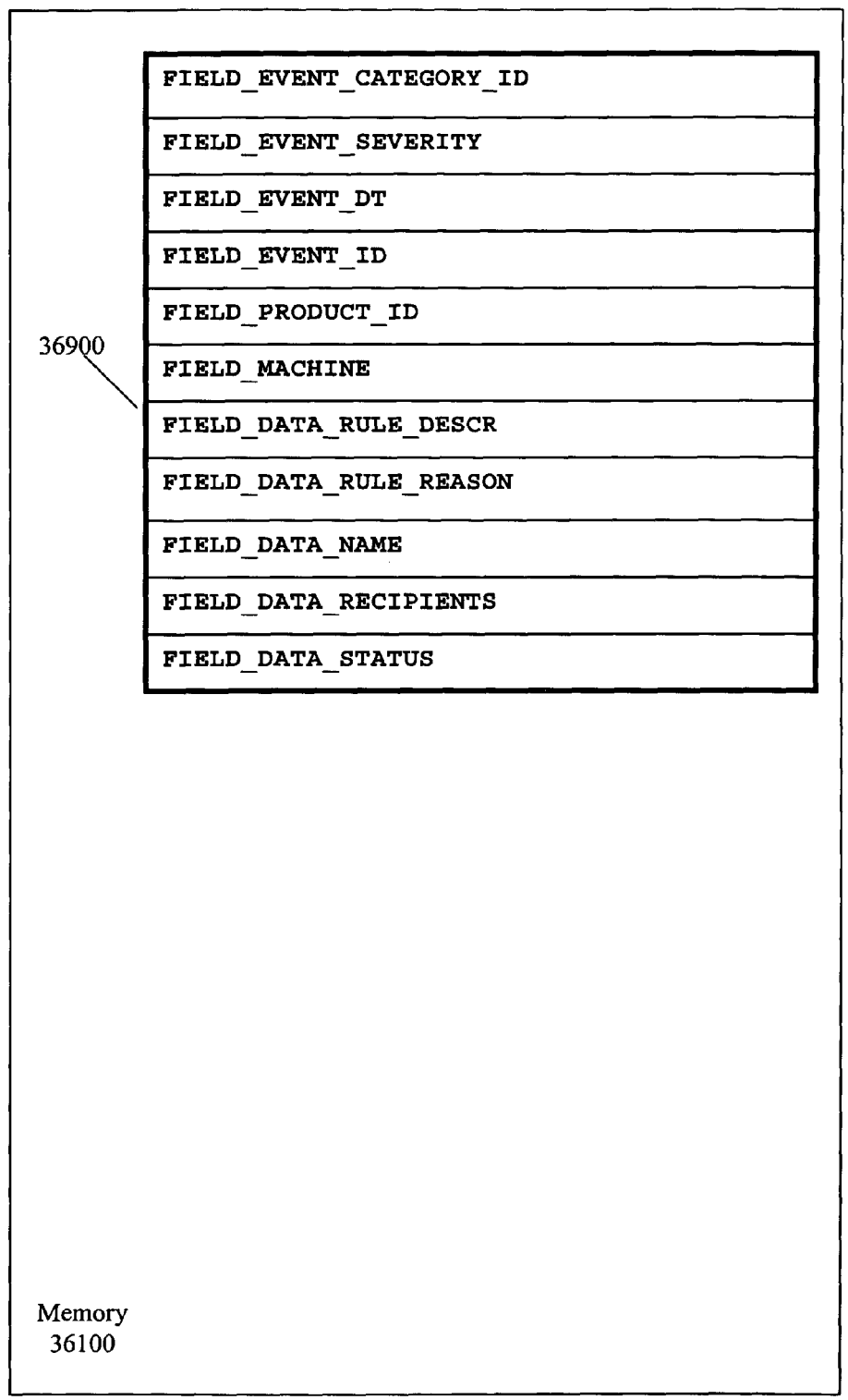
FIG. 36 is an illustration of a fourth data scan event class view object for a database according to one embodiment of the present invention.

TABLE 42 is a view 36900 (FIG. 36) for event EVENT_DATA_GENERIC_CONTENT for a blocked web page. The information retrieved from event EVENT_DATA_GENERIC_CONTENT for a blocked web page using view 36900 may be formatted for printing of a list report, for display, or for further processing, for example, by security feedback and control system 155. As explained above, a view is a database object that is defined for an event class by a managed product 201_j, as described more completely below. View 36900 is stored in memory 36100.

TABLE 42

| Field Name | Sample Display Value |
| --- | --- |
| FIELD_CATEGORY_ID | Security |
| FIELD_SEVERITY | 2 |
| FIELD_EVENT_DT | Mar. 11, 2003, 1:20:23 PM |
| FIELD_EVENT_ID | Content violation |
| FIELD_PRODUCT_ID | SCF for Gateways |
| FIELD_MACHINE | bluegill |
| FIELD_DATA_RULE_DESCR | Block known bad sites |
| FIELD_DATA_RULE_REASON | MyBlockedSites |
| FIELD_DATA_NAME | http://www.externalsite.com |
| FIELD_DATA_RECIPIENTS | John Doe |
| FIELD_DATA_STATUS | Blocked |

Figure 37:
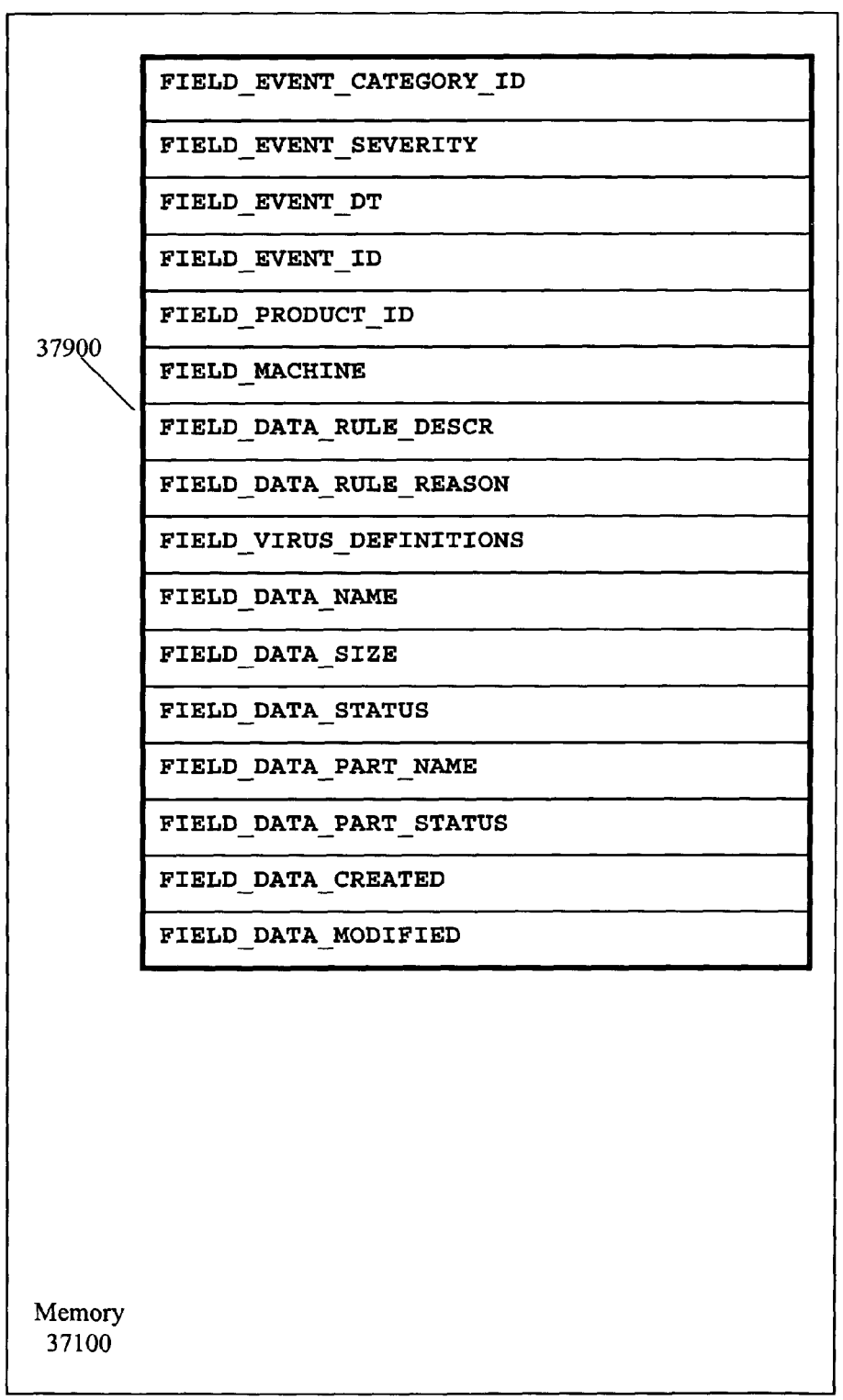
FIG. 37 is an illustration of a fifth data scan event class view object for a database according to one embodiment of the present invention.

TABLE 43 is a view 37900 (FIG. 37) for event EVENT_DATA_VIRUS for a nested ZIP file that is still infected. The information retrieved from for event EVENT_DATA_VIRUS for a nested ZIP file that is still infected using view 37900 may be formatted for printing of a list report, for display, or for further processing, for example, by security feedback and control system 155. As explained above, a view is a database object that is defined for an event class by a managed product 201_j, as described more completely below. View 37900 is stored in memory 37100.

TABLE 43

| Field Name | Sample Display Value |
| --- | --- |
| FIELD_CATEGORY_ID | Security |
| FIELD_SEVERITY | 4 |
| FIELD_EVENT_DT | Mar. 11, 2003, 1:20:23 PM |
| FIELD_EVENT_ID | Virus |
| FIELD_PRODUCT_ID | SAV for Lotus Notes |
| FIELD_MACHINE | bluegill |
| FIELD_DATA_RULE_DESCR | Repair or delete viruses |
| FIELD_DATA_RULE_REASON | BadNews |
| FIELD_VIRUS_DEFINITIONS | 20030131.001 |
| FIELD_DATA_NAME | c:\file1.zip |
| FIELD_DATA_SIZE | 24678000 |
| FIELD_DATA_STATUS | Infected |
| FIELD_DATA_PART_NAME | nested.zip/bad.doc |

TABLE 43-continued

| Field Name | Sample Display Value |
| --- | --- |
| FIELD_DATA_PART_STATUS_ID | Infected |
| FIELD_DATA_CREATED | Dec. 25, 1993 11:45:52.403 |
| FIELD_DATA_MODIFIED | Dec. 25, 2001 11:45:52.403 |

Threat Event Package

Threat event package 38000 (FIG. 38) includes event classes that deal with threats for all managed products to use. Threat event package 38000 provides an event hierarchy generic enough that managed products, e.g., applications, are able to record various types of threats to the system. In one embodiment, these event classes are the starting point for intrusion detection, firewall, gateway, groupware and virus type threats.

This set of classes is used for notifications of a more serious nature than routine activity. For example, assume an email gateway running an antivirus managed product detects an incoming virus. A single virus detection event would not be a threat but could result in several events being generated as described above. However, if the managed product detects 100 virus detection events in 10 minutes, the combination of events is a threat to the email system, and recorded as such. The same rational is applied to a firewall managed product. A single port scan or event should be recorded, but might not be considered a threat. Continuous scans of all ports would be considered a threat. The firewall managed product would then take action to deal with the threat.

Also, alert notification manager 13600 or security feedback and control system 155C can uses events in this class to notify system administrators of threats to a particular subnet or other network portion. In additions security feedback and control system 155C could take action to isolate the subnet or to reconfigure managed products to deal with the threat.

In the following description, the following definitions are used:
Threat: a high potential for widespread or great harm to a system;
Threat Advisory: a communication intended to convey a threat exists to a system even though no harmful activity is currently detected;
Threat Activity: harmful activity has been detected in great enough quantity to qualify as a threat;
Malicious Software: any type of software that causes damage to a system, referred to herein as malware. This could be a virus, a worm, VB scripts, etc.;
Outbreak: an outbreak is severe harmful activity of malicious software;
Outbreak Warning: a notification that an outbreak is occurring. The notification can be based on discovered activity, or come from an outside source as a warning of potential harm;
System: A system definition as used in this document is based on the context and focus of the managed product being discussed. For example, the system for a firewall managed product is the firewall system. For an enterprise antivirus engine, the system is the enterprise protected focused toward malware protection;
OWLS: Outbreak Warning Link Server. This is a component of an Outbreak Management System.
OWL Client: Outbreak Warning Link Client. A component, such as security management system 150, that retrieves Outbreak Warnings from a centralized security resource center and creates notifications.

Figure 38:
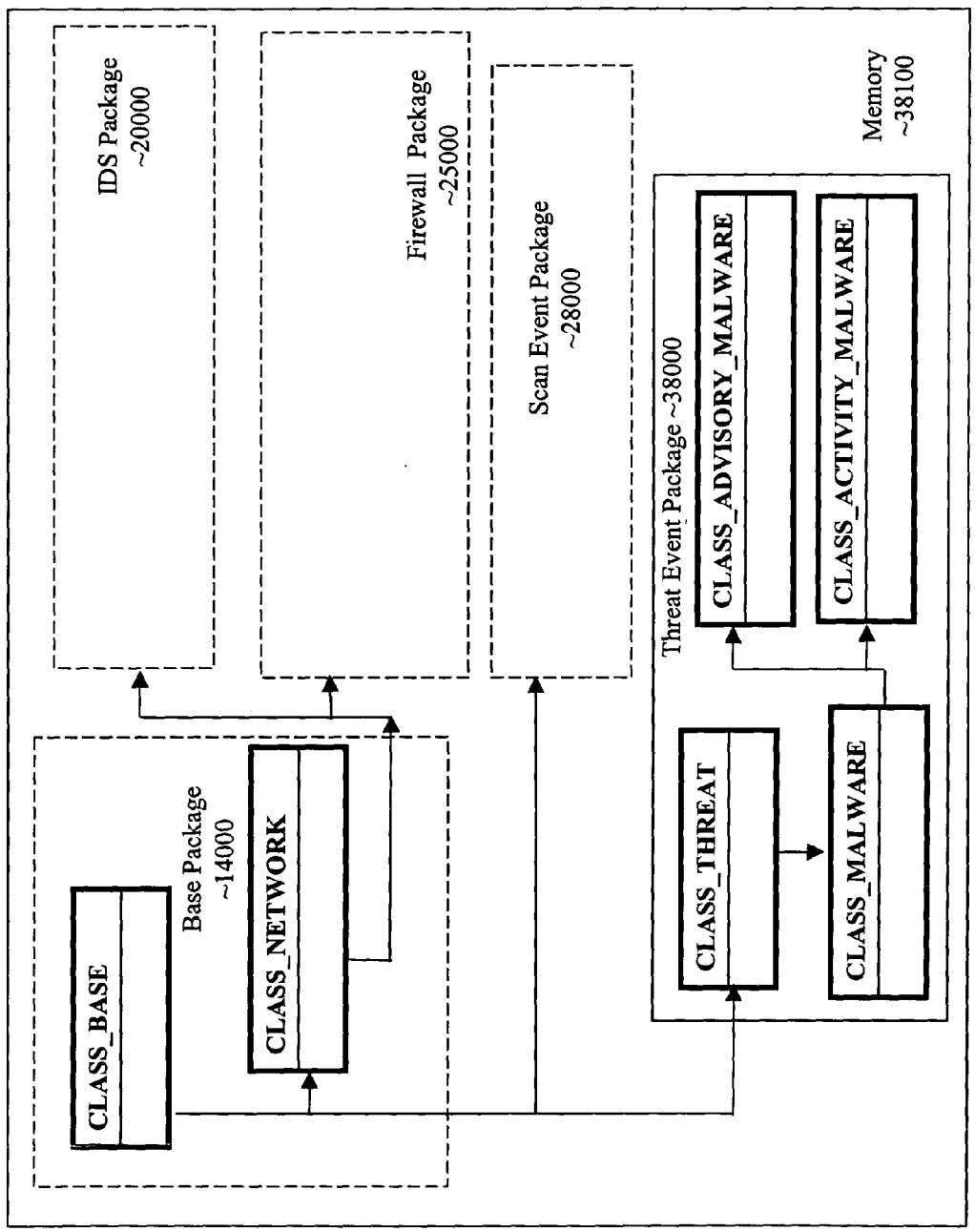
FIG. 38 is a diagram of a threat event package memory structure that includes a plurality of predefined hierarchical class structures according to one embodiment of the present invention.

FIG. 38 illustrates the over view of the threat event hierarchy and its defined events. Threat class CLASS_THREAT derives directly from the security base event class CLASS_BASE, but is an abstract class. Threat class CLASS_THREAT is intended to have no events defined based on this class. Other classes are derived from threat class CLASS_THREAT. In this embodiment, malware class CLASS_MALWARE extends threat class CLASS_THREAT. In this embodiment, two classes, malware advisory class CLASS_ADVISORY_MALWARE and malware activity class CLASS_ACTIVITY_MALWARE that deal with outbreak of malware type threats, extend malware class CLASS_MALWARE.

Threat Event Package Class Hierarchy

TABLE 44 shows one embodiment of a threat event package class hierarchy and event IDs used with each class in this embodiment of threat event package 38000. The class structure is described more completely below. Each class inherits from security base event class CLASS_BASE (TABLE 2 and FIG. 14).

TABLE 44

| Event Class | Event IDs |
|---|---|
| CLASS_THREAT | |
| CLASS MALWARE | |
| CLASS_ADVISORY_MALWARE | EVENT_THREAT_ADVISE_MALWARE |
| | EVENT_THREAT_UPDATE |
| | EVENT_THREAT_CERTIFIED_DEFS |
| | EVENT_THREAT_NONCERTIFIED_DEFS |
| CLASS ACTIVITY MALWARE | EVENT_THREAT_UNKNOWN_MALWARE |
| | EVENT_THREAT_KNOWN_MALWARE |

Threat Class

Threat class CLASS_THREAT allows generation of threat events in a syntactically and semantically consistent manner. Information stored in the fields of threat class CLASS_THREAT is common to all threat events.

Threat class CLASS_THREAT extends security base event class CLASS_BASE. No events are defined for threat class CLASS_THREAT, because this class is an abstract class.

In addition to the fields presented in TABLE 2 for security base event class CLASS_BASE, class threat CLASS_THREAT (FIG. 38) adds the fields presented in TABLE 45 to the fields for security base event class CLASS_BASE. The type of each field also is presented in TABLE 45. A description of the value in each field follows TABLE 45.

TABLE 45

| Field Name | Field Type |
|---|---|
| FIELD_EVENT_GUID (KEY) | guid |
| FIELD_THREAT_GUID | guid |
| FIELD_THREAT_NAME | info |
| FIELD_THREAT_KNOWN_AS | info |
| FIELD_THREAT_SUMMARY | varstr [1024] |
| FIELD_THREAT_ASSESSMENT_ID | id |
| FIELD_THREAT_TECHNICAL_INFO | varstr [1024] |
| FIELD_THREAT_RESPONSE_INFO | varstr [1024] |
| FIELD_THREAT_INFO_URL | info |

An event instance ID is stored in an event ID field FIELD_EVENT_GUID. This ID is supplied by security management system 150 and is used by system 150 to join the event class tables for a particular incident.

A threat instance ID is stored in a managed product event ID field FIELD_THREAT_GUID. This ID is supplied by a managed product, and is a correlator ID that links to disparate records together that were part of the same set of events, where one event did not capture all the activity. In one embodiment, this field is not used.

A name of the threat is stored in a threat name field FIELD_THREAT_NAME. The value stored in this field is the intrusion vulnerability, virus name, or unknown, etc.

A text list of variants or other names for the threat are stored in a threat also known as field FIELD_THREAT_KNOWN_AS.

A high level English summary of the threat is stored in a threat summary field FIELD_THREAT_SUMMARY.

An identifier used to lookup a translated string is stored in a threat assessment identifier field FIELD_THREAT_ASSESSMENT_ID. The translated string is used to indicate how severe the problem is.

A detailed description of the threat is stored in a threat technical information field FIELD_THREAT_TECHNICAL_INFO. A detailed description of how to deal with the threat, if known, is stored in a threat response information field FIELD_THREAT_RESPONSE_INFO. This field may be left blank.

A uniform resource locator (URL) to additional information concerning the threat is stored in a threat information URL field FIELD_THREAT_INFO_URL. This field may be left blank.

Malware Class

Malware class CLASS_MALWARE extends class threat CLASS_THREAT that in turn extends security base event class CLASS_BASE. No events are defined for malware class CLASS_MALWARE, because this class also is an abstract class.

In addition to the fields presented in TABLE 2 for security base event class CLASS_BASE and the field presented in TABLE 45 for class threat CLASS_THREAT, malware class CLASS_MALWARE (FIG. 38) adds the fields presented in TABLE 46 to the fields for those two classes. The type of each field also is presented in TABLE 46. A description of the value in each field follows TABLE 46.

TABLE 46

| Field Name | Field Type |
|---|---|
| FIELD_MALWARE_INFECTION_LENGTH | info |
| FIELD_MALWARE_MD5_SIG | info |
| FIELD_MALWARE_VIRUS_DEF_DT | info |
| FIELD_MALWARE_DEF_SEQ_ID | info |

An infection length is stored in infection length field FIELD_MALWARE_INFECTION_LENGTH. A MD5 hash signature of the sample that is causing the outbreak is stored in a sample signature field FIELD_MALWARE_MD5_SIG. A string that gives a definition date for the antivirus definitions required to detect the malware are stored in a virus definition date and time field FIELD_MALWARE_VIRUS_DEF_DT. A sequence number that gives a definition sequencer required to detect the malware is stored in a definition sequence identifier field FIELD_MALWARE_DEF_SEQ_ID.

Malware Advisory Class

Malware advisory class CLASS_ADVISORY_MALWARE (FIG. 38) is designed to be a warning for outbreak situations. All events based on this class are advisory and there may not be any activity found on a managed node. Since this class is designed for malicious software, its fields are oriented toward that end.

Intrusion detection and firewall applications could conceivably define custom classes at the same level as this class, i.e., derived from abstract threat class CLASS_THREAT. Information defined in these custom classes could pertain to vulnerability information. Events generated for the custom class could be vulnerability warnings that need to be recorded even when there was no activity detected. The same scenario could apply to the firewall application.

As indicated above, malware advisory class CLASS_ADVISORY_MALWARE (FIG. 38) inherits from malware class CLASS_MALWARE that in turn extends class threat CLASS_THREAT that in turn extends security base event class CLASS_BASE. In this embodiment, malware advisory class CLASS_ADVISORY_MALWARE has a predefined event class identifier.

Event objects (FIG. 39A), which are instantiations of malware advisory class CLASS_ADVISORY_MALWARE, include:
- event EVENT_THREAT_ADVISE_MALWARE, an initial advisory of a malware attack event, indicates that outbreaks of the threat are occurring. Information about the outbreak may be limited. The purpose of this event is to raise the awareness of the administrator so the administrator can watch for problems, and/or to notify security feedback and control system 155C of the outbreak;
- event EVENT_THREAT_ADVISORY_UPDATE event, an update advisory of a malware attack event, follows an event EVENT_THREAT_ADVISE_MALWARE and provides additional information about the malware attack;
- event EVENT_THREAT_CERTIFIED_DEFS, a certified definitions available for threat event, is used to notify an administrator and/or a managed product 210_j that certified definitions for a managed product are now available to address the current outbreak; and
- event EVENT_THREAT_NONCERTIFIED_DEFS, a non-certified definitions available for threat event, is used to notify an administrator and/or a managed product 210_j that non-certified definitions are now available to address the current outbreak For event EVENT_THREAT_ADVISE_MALWARE, event EVENT_THREAT_ADVISORY_UPDATE, event EVENT_THREAT_CERTIFIED_DEFS, and event EVENT_THREAT_NONCERTIFIED_DEFS, the event category is category CAT_SECURITY. In one embodiment, the event severity is for event EVENT_THREAT_ADVISE_MALWARE is major, i.e., SEV_MAJOR. In this embodiment, the event severity is for event EVENT_THREAT_ADVISORY_UPDATE is warning, i.e., SEV_WARNING. For events EVENT_THREAT_CERTIFIED_DEFS and EVENT_THREAT_NONCERTIFIED_DEFS, the event severity is SEV_INFORMATIONAL.

Figure 39A:
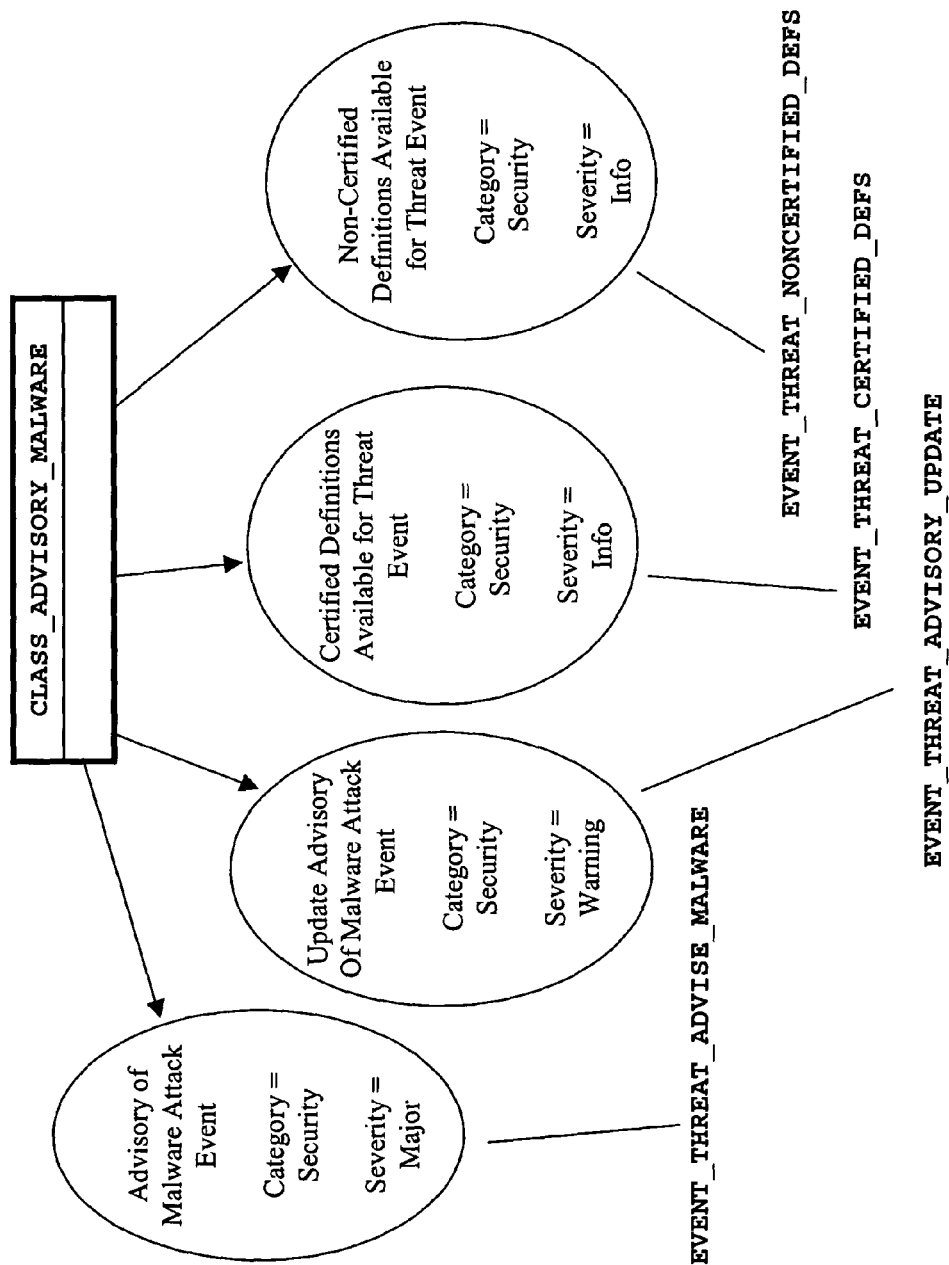
FIG. 39A is an illustration of objects that are instantiations of the malware advisory event class of FIG. 38 according to one embodiment of the present invention.

Malware advisory class CLASS_ADVISORY_MALWARE has fields geared toward distributing information on the malware infection/outbreak. In addition to fields 15500 (FIG. 39B_1) for security base event class CLASS_BASE, fields 39300 for threat event class CLASS_THREAT, and fields 39400 (FIG. 39B_2) for class CLASS_MALWARE, Malware advisory class CLASS_ADVISORY_MALWARE (FIGS. 38 and 39A) adds fields 39500 of TABLE 47 for a malware advisory event 39600. The type of each field also is presented in TABLE 47. A description of the value in each field follows TABLE 47. FIGS. 39B_1 and 39B_2 illustrate a malware advisory event memory structure 39600 stored in memory 39100. Memory structure 39600 is illustrative only and is not intended to represent that the structure is stored in any particular way in memory 39100.

TABLE 47

| Field Name | Field Type |
|---|---|
| FIELD_THREAT_DISCOVERY_DT | date |
| FIELD_THREAT_LAST_UPDATE_DT | date |
| FIELD_THREAT_ASSESSMENT_WILD_ID | id |
| FIELD_THREAT_ASSESSMENT_DAMAGE_ID | id |
| FIELD_THREAT_ASSESSMENT_DISTRIBUTION_ID | id |
| FIELD_THREAT_ASSESSMENT_DETAIL | info |
| FIELD_THREAT_ASSESSMENT_DAMAGE_DETAIL | info |
| FIELD_THREAT_ASSESSMENT_DISTRIBUTION_DETAIL | info |

A date and time of the original discovery of the malware attack is stored in a threat discovery date and time field FIELD_THREAT_DISCOVERY_DT. A date and time that information about the malware attack was last updated is stored in a last update date and time field FIELD_THREAT_LAST_UPDATE_DT. A malware attack identifier that is used to lookup a translated string is stored in threat assessment wild identifier field FIELD_THREAT_ASSESSMENT_WILD_ID. The translated string is used to indicate how extensive the threat is found in the wild.

A malware attack damage identifier that is used to lookup a translated string is stored in threat damage assessment identifier field FIELD_THREAT_ASSESSMENT_DAMAGE_ID. The translated string is used to indicate the extent of the damage. A malware attack distribution identifier that is used to lookup a translated string is stored in threat distribution assessment identifier field FIELD_THREAT_ASSESSMENT_DISTRIBUTION_ID. The translated string is used to indicate how extreme the problem is in replicating or spreading.

A detailed description of how this threat is found in the wild is stored in threat assessment detail field FIELD_THREAT_ASSESSMENT_DETAIL. A detailed description of the damaged caused by this threat is stored in a threat damage assessment detail field FIELD_THREAT_ASSESSMENT_DAMAGE_DETAIL. A detailed description of how this threat distributes itself is stored in a threat distribution assessment detail field FIELD_THREAT_ASSESSMENT_DISTRIBUTION_DETAIL.

Malware Activity Class

Malware activity class CLASS_ACTIVITY_MALWARE (FIG. 38) is designed for notifications of detected malicious software activity. Applications that detect malware type events at collection points can make use of this class and its defined events. For example, a process running on the management server 10200A (FIG. 10) can look through the virus events. When the number of virus events exceeds a threshold, a malware activity class event is generated.

Intrusion detection and firewall managed products could define a custom event class similar in nature, or semantics, but the data geared toward malicious activity in their managed product space.

As indicated above, malware activity class CLASS_ACTIVITY_MALWARE (FIG. 38) inherits from malware class CLASS_MALWARE that in turn extends class threat CLASS_THREAT that in turn extends security base event class CLASS_BASE. In this embodiment, malware activity class CLASS_ACTIVITY_MALWARE has a predefined event class identifier.

Event objects (FIG. 40A), which are instantiations of malware activity class CLASS_ACTIVITY_MALWARE, include:

event EVENT_THREAT_UNKNOWN_MALWARE, an unknown malware attack event, is used to notify of malicious software activity from unknown malware. This event could be generated by applications at collection points; and event EVENT_THREAT_KNOWN_MALWARE event, a known malware attack event, is used to notify of malicious software activity from known malware.

Because the malware is a known type of malware, the solutions are already in place at the point of detection. However, the administrator and/or security management system 150 still needs to determine why the malware infection is being repeatedly introduced.

For event EVENT_THREAT_UNKNOWN_MALWARE and event EVENT_THREAT_KNOWN_MALWARE, the event category is category CAT_SECURITY, and in one embodiment, the event severity is SEV_CRITICAL.

Figure 40A:
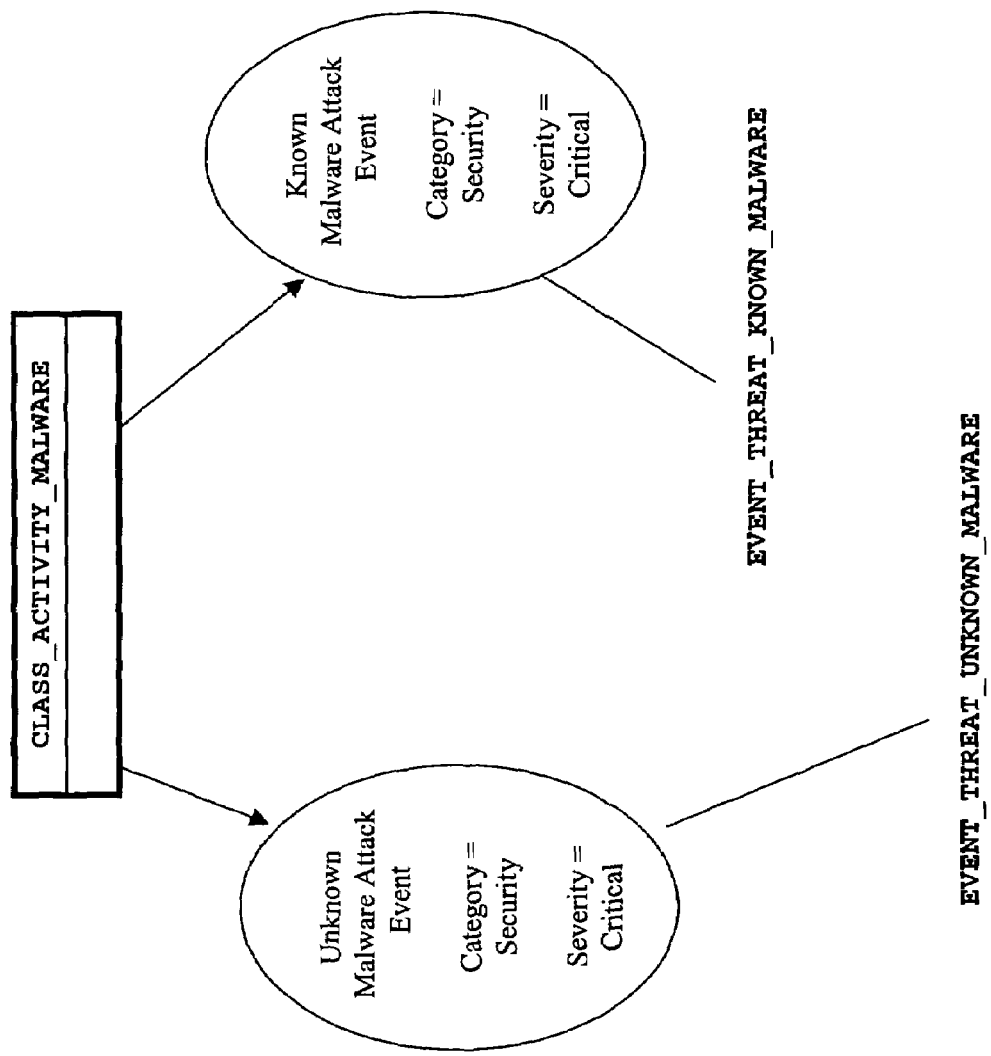
FIG. 40A is an illustration of objects that are instantiations of the malware activity event class of FIG. 38 according to one embodiment of the present invention.

Malware activity class CLASS_ACTIVITY_MALWARE has fields geared toward distributing information on the location of the malware infection/outbreak. In addition to fields 15500 (FIG. 40B_1) for security base event class CLASS_BASE, fields 39300 for threat event class CLASS_THREAT, and fields 39400 (FIG. 40B_2) for class CLASS_MALWARE, Malware advisory class CLASS_ACTIVITY_MALWARE (FIGS. 38 and 40A) adds fields 40500 of TABLE 48 for a malware activity event 40600. The type of each field also is presented in TABLE 48. A description of the value in each field follows TABLE 48. FIGS. 40B_1 and 40B_2 illustrate a malware advisory event memory structure 40600 stored in memory 40100. Memory structure 40600 is illustrative only and is not intended to represent that the structure is stored in any particular way in memory 40100.

TABLE 48

| Field Name | Field Type |
| --- | --- |
| FIELD_MALWARE_ORIG_MACHINE | info |
| FIELD_MALWARE_ORIG_MACHINE_IP | IP |
| FIELD_MALWARE_ORIG_SUBNET | info |
| FIELD_MALWARE_ORIG_USER_NAME | info |
| FIELD_MALWARE_ORIG_SITE | info |

A machine name with the unusual amount of malware activity is stored in malware originating machine field FIELD_MALWARE_ORIG_MACHINE. An IP address of the machine where the malware activity was discovered in stored in address of malware originating machine field FIELD_MALWARE_ORIG_MACHINE_IP. A subnet including the machine where the malware activity was discovered in stored in subnet of malware originating machine field FIELD_MALWARE_ORIG_SUBNET. A user identifier of where the malware activity was discovered in stored in user name of malware origination field FIELD_MALWARE_ORIG_USER_NAME. A domain of where the malware activity was discovered in stored in address of malware originating site field FIELD_MALWARE_ORIG_SITE.

Figure 41:
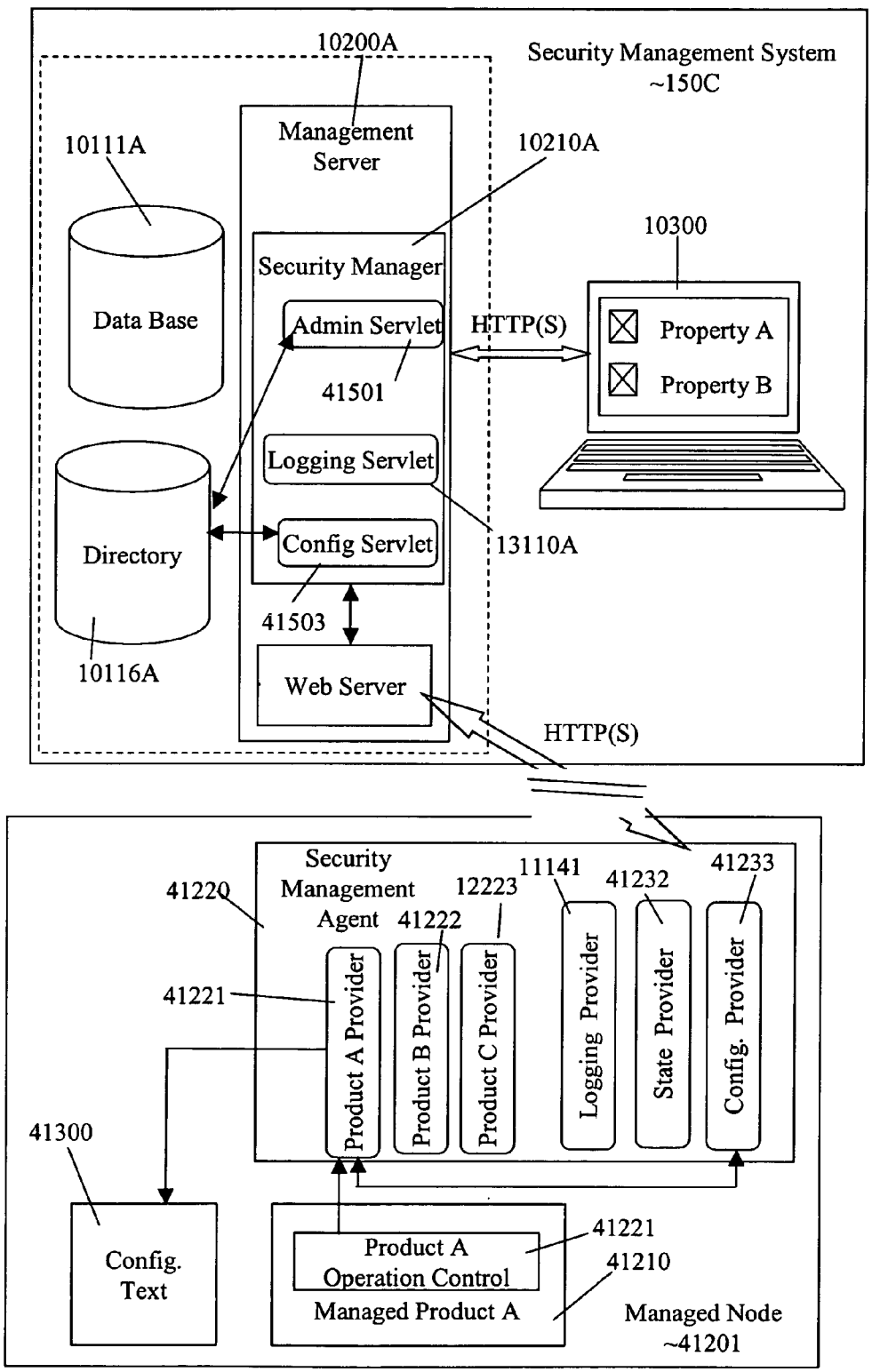
FIG. 41 is a more detailed diagram of a portion of the N-tier system of FIG. 10 that includes illustrative providers in the security management agent according to one embodiment of the present invention.

FIG. 41 is similar to FIG. 10, but only the elements of FIG. 10 needed to further describe one embodiment of a security management agent and the related features are included. FIG. 41 illustrates a security management agent 41220 that includes three managed product specific control plug-ins, product A provider 41221, product B provider 41222, and product C provider 41221. Product A 41210, product B (not shown), and product C (not shown) are managed products. Security management agent 41220 also includes the elements of security management agent 11220 (FIG. 11) that are not shown in FIG. 41.

Managed product A 41210 uses product A operation control module 41111 to communicate with product A provider 41221. Product A provider 41221 communicates with logging provider 11141, state provider 41232, and configuration provider 41233. State provider 41232 sends the operational state of managed products A, B, and C applications and managed node 41201 to security manager 10210A. Configuration provider 41233 retrieves configurations for managed products A, B, and C from security manager 10210A using configuration servlet 41503. Logging provider 11141 sends events from security management agent 41220 to logging servlet 13110A in security manager 10210A.

Security management agent 41220 also includes an inventory provider, a service notification provider, and an update provider that are not shown. The inventory provider sends information about managed products A, B, and C that are installed on managed node 41201 from security management agent 41220 to security manager 10210A. The service notification provider notifies security manager 10200A when a new configuration is available. This is a "ping," as described above, which indicates that a new configuration should be retrieved via configuration provider 41233 making a call to the configuration service, e.g., configuration servlet 41503 at management server 10200A.

For managed product A, properties that are going to be available for configuration, i.e., product integration data, are entered in a product integration XML (PIX) file. Hence, in general, a managed product uses a PIX file to register with security manager 10210A. The product integration data includes a product name, a product ID, and a software feature ID as well as settings and properties associated with the managed product.

There are two types of install. There is a server side install, adding registration entries to directory 10116A, schema extensions to database 10111A, and possible, UI extensions to console 10300. There are also agent side installs that register the actual endpoint product with agent 41220, as well as the product A install itself (which is usually independent of security management system 150C, except for the agent extensions and registration).

Security management system 150C uses configuration provider 41233 to facilitate centralized configuration distribution of application properties, i.e., configuration, to managed products. To manage the configurations of managed product 41210 from management console 10300, managed product operation control module 41221 must communicate with security management agent 41220 via product A provider 41222.

In one embodiment, configuration provider 41233 gets new configuration data for managed product A 41210 and writes the data to configuration text. Configuration provider 41233 then notifies product A provider 41221 that new configuration data is available and in turn, product A provider 41221 notifies product A operation control module 41221 that new configuration data is available. Product A operation control module 41221 retrieves and installs the new configuration data.

As described above, upon completion of the configuration data installation, product A operation control module 41221 generates an appropriate event and transmits the event to product A provider that in turn transmits the event to logging provider 11141.

Logging provider 11141 adds appropriate information as required to the event and forwards the event to logging servlet

13110A. As described above, logging servlet 13110A causes the event to be stored in database 10111A. Actually, logging servlet 13110A first caches events on the local file system, and then a background process inserts the events into the database, or can also forward selected events to event sinks or to other managers in a rollup operation. All of this is done via background threads processing the various queues on disk. Thus, security manager 10210A can also forward the event to security and feedback control system 155 or to any other event sink registered to receive the event.

In this embodiment, the product providers, e.g., product A provider 41221, are each a JAVA component, which integrates with agent module 11125 (FIG. 11) for communicating with management server 10200A. Optionally, a user interface extension, which is a JAVA component hosted at management console 10300, presents a visual interface for manipulating the properties that are distributed to managed product A 41210. The user interface extension allows greater flexibility in the presentation and management of configuration data for managed product A 41221. The configuration properties also can be managed using a generic user interface panel.

In embodiment, a product team for managed product A 41210 decides which properties are going to be available for configuration via security manager 10210A. These properties are described in an XML file that is used to register managed product 41221 and its properties with security manager 10210A, when files from managed product A are installed by security manager 10210A.

In selecting properties, any state property that must be made available to other modules of security manager 10210A needs to be modeled as a special case. For this information to be propagated from managed node 41201 back up to directory 10116A as state information, this information needs to be modeled as a property of product A provider 41221. The properties set by provider 41221 are automatically queried periodically and updated in directory 10116A. Provider 41221 can also manually call a method updatestate( ) in state provider 41232 via a CIMClient.invokeMethod( ) API to immediately update its state.

In this embodiment, properties that are going to be available for configuration, i.e., product integration data, are entered in a product integration XML (PIX) file. Hence, in general, a managed product uses a PIX file to register with security manager 10210A. As indicated above, the product integration data includes a product name, a product ID, and a software feature ID as well as settings and properties associated with the managed product.

The setting and properties includes information about the data type, key, description and initial value. A sample PIX file 42000 that registers a managed product for event logging integration is presented in FIG. 42.

First, the XML script is identified as a product integration XML file by file identification portion 42001. Specifically, after a standard XML declaration <?xml . . . >, a required tag <SesaIntegrationData> is added to encompass all elements in file 42000. General information tags like tag <Version> and tag <Author> follow.

Next, the details of the managed product required for registering with security manager 10210A are provided in a product details section 42002. A pre-assigned product ID for this managed product must be included. The language identifiers are also predefined. Tag <DisplayName> provides a product name that is displayed throughout security management system 150C and in console 10300. Software Feature IDs are within a range determined by the pre-assigned product ID. In the example of FIG. 42, data definition portion 43003 defines a software feature with an software ID of 30010101.

Each managed product, in one embodiment, must have at least one software feature defined for logging and configuration purposes. When an event is logged, both product and software feature IDs are recorded. In console 10300, configurations are managed by software feature—distinct software feature IDs need to be assigned to product components, which can be configured separately.

While it is not shown in FIG. 42, one or more of the event packages could be identified for registration in this file. The property names listed in the PIX file are internal names. These names need to be translated for display in console 10300. If these properties are to be edited with the console's generic settings editor, the display names are defined in a resource bundle properties file, which is registered with console 10300. This file is registered with console 10300 via a plugin entry in the product's PIX file. The plugin type for the resource bundle file is called "gse_translations."

TABLE 49 is an example of additional XML that would be included in the PIX file for additional software features and in particular a user interface extension for console 10300 that was mentioned above.

Properties are associated with tag <Settings>, which are logical divisions properties that can be associated with different pages within the console's extensible UI. Tag <Settings> has a tag <Caption> with a value of "Generic" and a tag <Name> with a value of "Generic Settings" for a software feature with an software Id of 30020101. The "Generic Settings" is part of a tag <Configuration>, which has tag <Caption> with a value of "Default." This, means that the default configuration contains a tab called "Generic."

TABLE 49 defines one software feature called "UIExtensions" with an Id of 30020103. This software feature has tag <Settings> called "Generic," which is a plugin entry for gse_translations. Note that the plugin tag has an attribute settingName with a value set to "Generic." Attribute settingName links this plugin entry with the "Generic" Settings caption tag of the software feature, 30020101. In other words, it sets the value of "settingName" to be the caption of its associated settings.

TABLE 49

```
<SoftwareFeature Id="30020101">
    <Caption>Advanced Sample Application Software
        Feature</Caption>
    <Description>Software feature for the application
        </Description>
    <Name>30020101</Name>
    <DisplayName LangId="10001">Advanced Sample
        Application Software Feature</DisplayName>
    <Settings>
        <Caption>Generic</Caption>
        <Description>Generic</Description>
        <Name>Generic Settings</Name>
        <SettingType>Main</SettingType>
        <!-- Put the setting from a file -->
        <SettingFile
            Name="sip/pix/setting/AdvSampleApp__1__0__GenericSett
            ing.xml" DataType="text/xml"/>
    </Settings>
. . .
    <Configuration>
        <Caption>Default</Caption>
        <Description>The default Advanced Application
            configuration.</Description>
        <Name>Default</Name>
        <SettingsName>Generic Settings</SettingsName>
        <SettingsName>Application Settings1</SettingsName>
```

TABLE 49-continued

```
        <SettingsName>Application Settings2</SettingsName>
    </Configuration>
    <FeatureRole>SESA_LOGGING</FeatureRole>
    <FeatureRole>SESA_CONFIGURING</FeatureRole>
</SoftwareFeature>
...
<SoftwareFeature Id="30020103" Virtual="true">
    <Caption>UIExtensions</Caption>
    <Description>UIExtensions</Description>
    <Name>30020103</Name>
    <DisplayName
        LangId="10001">UIExtensions</DisplayName>
    <Settings>
        <Caption>Generic</Caption>
        <Description>Provides translation for generic
            settings.</Description>
        <Name>TranslationResource - Application -
            Generic</Name>
        <SettingType>Directory</SettingType>
        <SettingText>
           <uiSettings>
              <plugin type="gse_translations"
                 jarFiles="/advsample/AdvSamplePluglets_res.jar"
                 resourcePath="sdk/AdvSampleApp/pluglets/resourc
              es/Application_Generic"
                 settingName="Generic"
                 softwareFeatureName="30020101"
              >
              </plugin>
           </uiSettings>
        </SettingText>
    </Settings>
...
</SoftwareFeature>
``` and has a base name of Application_Generic. The resource lookup process generates and uses the following suffix:

[locale].properties

Assuming a locale of es_PR (Spanish/Puerto Rico), the resulting path plus filename would be sdk/AdvSampleApp/pluglets/resources/Application_Generic_es_PR.properties This file would be located in the jar file listed in attribute jarFiles within the resource bundle file, the code expects the following:

tab label text is designated by ids_page_label;
tab description text is designated by ids_page_description;
tooltip translations are designated by ids_description; and
property name translations are designated by ids_key.

The following entries in a properties file (See TABLE 52 below.) for the advanced sample of TABLE 49 are used for providing the translatable values for the various translatable display items mentioned above.

ids_page_label.Generic=Sample Application Generic Settings
ids_page_description.Generic=Use this page to set the generic application settings.

TABLE 50 is an example that indicates how a property is listed in the PIX file:

TABLE 50

```
<Property>
    <Key>PollTime</Key>
    <Type subtype="duration"
        storageunits="seconds">Integer</Type>
    <Value>60</Value>
</Property>
```

TABLE 51 presents corresponding entries in the resource bundle file for the property of TABLE 50.

TABLE 51

```
ids_key.PollTime=Poll time
ids_description.PollTime=Example setting 1
```

TABLE 52 is an example of a resources bundle file for the advanced sample application PIX file of TABLE 49.

TABLE 52

```
# Resource Bundle properties file for the Advanced
    Sample Application Generic Settings
ids_page_label.Generic=Sample Application Generic
    Settings
ids_page_description.Generic=Use this page to set the
    generic application settings.
ids_key.PollTime=Poll time
ids_key.DummySetting2=DummySetting2
ids_key.TextWithAMinOf2Chars=Text with a 2 character
    min
ids_key.TextWithAMaxOf6Chars=Text with a 6 character
    max
ids_key.TextLimitedTo2Chars=Text with a 2 character
    limit
ids_key.AHexString=A hex string
ids_key.AlphaOnlyText=Text with only letters
ids_key.IPAddress=IP address
ids_key.HostName=Host name
ids_key.IPPort=IP port
ids_key.TrueOrFalse=True or false
ids_key.DateTimeStringFormat=Date/Time default format
ids_key.DateTimeFormattedBySpec=Date/Time specified
    format
ids_key.DateTimeMillisFormat=Date/Time stored in
    milliseconds
ids_key.Password=Password
ids_key.AnyNumber=Any number
ids_key.DurationInMinutes=Duration in minutes
ids_key.DurationInSeconds=Duration in seconds
ids_key.DurationInMinutesStoredAsSeconds=Duration in
    minutes/Stored as seconds
ids_key.SizeInKb=Size in Kb
ids_key.SizeInMb=Size in Mb
ids_key.EmailAddress=Email address
ids_key.DropDownList=Drop-down list
ids_description.PollTime=Example setting 1
ids_description.DummySetting2=Example setting2: plain
    text
ids_description.TextWithAMinOf2Chars=A minimum of 2
    characters
ids_description.TextWithAMaxOf6Chars=A maximum of 6
    characters
ids_description.TextLimitedTo2Chars=A minimum of 2 and
    a maximum of 2 characters
ids_description.AHexString=Only certain characters
    allowed
ids_description.AlphaOnlyText=Example of excluded
    characters
ids_description.IPAddress=IP Address
ids_description.HostName=Host name
ids_description.IPPort=IP port number
ids_description.TrueOrFalse=A boolean item
ids_description.DateTimeStringFormat=Initially a
    datetime in mmm dd, yyyy hh:mm:ss format
ids_description.DateTimeFormattedBySpec=A datetime
    specifically formatted to be like 2001-12-31 23:59
ids_description.DateTimeMillisFormat=Initially a
    datetime in millisecond format
ids_description.Password=Example of a password for an
    account
ids_description.AnyNumber=Number
ids_description.DurationInMinutes=Length of time stored
    in minutes
ids_description.DurationInSeconds=Length of time stored
    in seconds
```

TABLE 52-continued

```
ids_description.DurationInMinutesStoredAsSeconds=Length
    of time stored in seconds displayed to the user in
    minutes
ids_description.SizeInKb=Size in kb
ids_description.SizeInMb=Size in mb
ids_description.EmailAddress=Email Address
ids_description.DropDownList=A drop-list of selections,
    not editable
ids_help_context=ADVSamp
ids_help_topic=IDH_Samp_Generic
```

After the PIX file and any supporting files are prepared, the PIX file is installed and registered with security manager 10210A. After registration with security manager 10210A, a new node is presented in console 10300 in the management tab under the products folder. In one embodiment, the settings appear in a generic settings tab with a simple Property/Value pair tabular interface.

When a user logs onto console 10300, the user can modify the properties presented on the screen. Upon applying the changes, the JAVA code for the console user interface writes these settings to directory 10116A. In this embodiment, an administration servlet 41501 writes the information to directory 10116A. Security manager 10210A recognizes that settings have been changed and notifies the appropriate security management agent, e.g., security management agent 41220 via its configuration provider 41233.

Configuration provider 41233 makes a call to the product provider, e.g., product A provider 41221 to notify provider 41221 that there is a new configuration to be used. Product provider 41221 is responsible for extracting the properties it is interested in from the entire set and using these properties as appropriate; for instance, persisting the properties in a local config.txt file 41300.

A provider, in this embodiment, utilizes a JAVA CIMOM Provider Architecture. Specifically, in one embodiment, the JAVA CIMON provider extends a class SESAProvider interface. TABLE 53 provides an example of information included in Class SESAProvider.

TABLE 53

```
public abstract class SESAProvider{
    public abstract void initialize(CIMOMHandle
        ch)throws CIMException;
    public abstract void cleanup( ) throws
        CIMException;
    public abstract invokeMethod(CIMObject Path
        op, String name, Vector in, Vector out)
        throws CIMException;
    public abstract SymcObject getService( );
    public abstract int getProductId( );
    public abstract int getSoftwareFeatureId( );
    public abstract String getName( );
    public abstract void applyConfig(HashMap
        newConfig);
    public abstract void sendMessage(String
        sMessage);
}
```

At a minimum, a provider implements a plurality of abstract methods described as follows. An initialization method initialize( ) is called once when agent 11125 (FIG. 11), the CIMOM, initializes. The provider is expected to create any resources that the provider requires during this call. A cleanup method cleanup( ) is called when agent 11125 is shutting down and the provider is expected to release any resources that the provider is using during this call, allowing agent 11125 to shutdown. If, during method initialize( ), the provider creates any threads these should be created as daemon threads so that the CIMOM server, agent 11125, can shutdown easily in case there are problems freeing thread resources for the provider during the call to method cleanup( ).

An invoke method invokeMethod( ) is called by agent 11125 when a CIM method call is made to a specific provider in security management agent 41220. The specific method name and what actions the method is to perform depend on the individual provider.

Method getService( ) is used to load the contents of the Service Definition File (described below) and populate the properties of a service derived CIM object. The inventory provider (not shown) and state provider 41232 use this object to update information about the service in directory 10116A.

Methods getProductId( ) and getSoftwareFeatureId( ) return the provider's product identification code and software feature identification code, respectively.

Method getName( ) returns a string representing the Service—derived class name of a provider. This is typically the name of a provider's class that is declared in the MOF file.

Method sendMessage( ) is used if two or more providers need to communicate with each other without using a CIMOM method call. Method sendmessage( ) is used for a simple Java method call.

Method applyConfig( ) is called within a provider by configuration provider 41233 when a new set of configuration data is available for the managed product. The implementation of this method recognizes the properties described in configuration settings for the managed product and deals with them appropriately. This is also where any of the State-related Provider properties are set by calling method setProperty( ) on the CIMInstance object. State provider 41232 reports these back to directory 10116A automatically.

Properties CurrentConfigName and CurrentConfigVersion are defined in a class Service, which is inherited by all providers. Property CurrentConfigName can be set in the CIM properties of the provider and is automatically updated by security management system 150C. Property CurrentConfigName in not declared in the MOF file because this property is inherited by all providers. It is important that every time a new configuration is obtained, property CurrentConfigVersion is set so its state is correctly reported to security manager 10210A. To do this a call similar to the following is made:

m_cimClient.setProperty(
m_cimPath, "CurrentConfigversion", new CIMValue(configVersion));

where m_cimClient is a cached CIMClient object and m_cimPath is the cached CIMObjectPath to the provider.

FIGS. 43A to 43I are an example of a provider written in the JAVA program language. This example is illustrative only and is not intended to limit the invention to this particular embodiment.

A MOF file is required to define to agent 11125, the CIMOM, what data and methods are available. Again, instance properties are defined explicitly. The data and methods available are decided upon and specified by the developers of the provider. In this particular case, Example Provider (FIGS. 43A to 43I) exposes a data property ProviderPollTime and a method called getConfigPropertyString( ). Whatever methods and data are described in the MOF file are available to calling applications through the CIMOM client interfaces.

A sample declaration for the Example Provider is presented in TABLE 54.

TABLE 54

```
[Provider("SymcProviders")]
class ExampleProvider : Service
{
    [
        Description("This is the operational state
            value updated " "by the provider")
    ]
    uint32 ProviderPollTime;
    [
        Description("Method to get a config")
    ]
    string  getConfigData( );
    [
        Description("Get a single config property's
            value")
    ]
    string  getConfigProperty(string propName);
};
```

There are a number of definition files that are used to supply information to the SymcProviders interface (See TABLE 53) to fill in properties of various CIM classes. Some of these files are required and others are optional, depending on whether the provider requires these features. The files are JAVA properties files, which are a collection of key—value pairs.

A file myprovider.feat is a required software feature declaration file. In general a file with extension ".feat" is named with the name of the software feature and have an extension of ".feat", for example, "myfeature.feat". A separate file is required for each software feature installed.

File myfeature.feat is used to declare a software feature object. These software feature objects are associated with the managed product objects and service objects by an inventory provider to describe the sum of the managed products and software features installed on the machine. An example of the software feature file for configuration provider is presented in TABLE 55.

Table 55 name=30000123
identifyingnumber=3000
productname=SESA
vendor=Symantec Corporation
version=1.0
caption=SESA Agent Configuration Provider
description=Retrieves configurations for SESA-enabled applications from the SESA Manager
status=OK
installdate=20011022120000.000000+000

A file myprovider.prod is a required managed product declaration file. This file should be named with the name of the managed product and have an extension of ".prod", for example, "myproduct.prod".

The managed product declaration file is used to declare a managed product object. The managed product objects are used in collecting inventory and state information regarding the managed products and features installed on a machine.

As an example, a managed product declaration file for a Symantec Antivirus Product is presented in TABLE 56.

TABLE 56 name=Symantec AntiVirus Corporate Edition
identifyingnumber=12
vendor=Symantec Corporation

TABLE 56-continued version=8.0
caption=NAVCorp
description=AntiVirus for desktops and file/print server A file myprovider.svc is a required service declaration file. The service declaration file associates a service with a software identifier. An example of the configuration provider service declaration file is presented in TABLE 57A. The file is used to declare a service object. These objects are used in collecting inventory and state information for directory 10116A.

TABLE 57A

\# Service.Name must start with the Software.Name
    (which is really a "Software Feature ID")
\# where "start with" is meant in the context of
    java.lang.String.startsWith( )
name=30000123.configprovider
systemcreationclassname=ComputerSystem
systemname=localhost
creationclassname=Service
caption=SESA Agent Configuration Provider Service
description=SESA Agent's Configuration Provider
    Service for Symantec managed computers
installdate=20011022120000.000000+000
status=OK
startmode=Automatic An example provider's service definition file is presented in TABLE 57B.

TABLE 57B creationclassname=Service
name=30020101
systemname=localhost
systemcreationclassname=ComputerSystem
caption=SES Sample Provider
description=The example provider
installdate=20011022120000.000000+000
status=OK
startmode=Automatic
opstatenames=CurrentConfigName, CurrentConfigVersion, ProviderPollTime A service access point file is named with a software feature and has an extension of ".sap", for example, "myprovider.sap". This file is optional.

The file is used to declare a service access point object. This is only needed if a provider defines a service access point for other processes to communication with it outside of the CIMOM environment. Log provider 11141 declares one of these instances because provider 11141 is contacted to perform logging functions.

TABLE 58 is an example of a log provider's service access point file.

TABLE 58 creationclassname=ServiceAccessPoint
name=30000186
systemcreationclassname=ComputerSystem
systemname=localhost
Software File "myproduct.soft" is named with a software product and has an extension of ".soft.," This file is optional. The file is used to declare a software object. These objects are used in collecting inventory and state information for directory 10116A.

The software object file for log provider 11141 is presented in TABLE 59.

TABLE 59

```
name=Symantec Enterprise Security Management
version=1.0
targetoperatingsystem=18
othertargetos=
manufacturer=Symantec Corporation
buildnumber=85
serialnumber=1010101
codeset=
indentificationcode=sku
languageedition=en
productidentifyingnumber=30000186
productname=SESA
productvendor=Symantec Corporation
productversion=1.0
installdate=20011022120000.000000+000
description=Symantec Enterprise Security
    Management
```

All of the instance definition files should be installed in the same directory as security management agent 41220

There are a number of properties in the instance definition files, described above, which are described more completely below.

creationclassname is the name of the class that is the parent of the class being created. For example, in the LogProvider class, the value of this should be "Service" since that is the parent class. This is used to determine the class hierarchy within the CIMOM.

identificationcode is used in the Software class and should be filled in with the SKU for a product.

identifyingnumber is the Software Feature Identification code. The identifying number and name properties are used to build associations between various CIM classes. Where these associations are needed, the values of these properties should match.

installdate is a date, in the form of YYYYMMDDH-HmmSS.uuuuuu+zzz where YYYY is the year, MM is the month, DD is the date, HH is the hour, mm is the minute, SS is the seconds, uuuuuu is the number of milliseconds and zzz is the time zone adjustment. A provider installer should update installdate. For an event sink, this date is automatically updated when the servlet's object is created in directory 10116A. Event sinks do not need to update this value.

buildnumber—use a build script to automatically update the build number.

nameThis is, in most cases, the value of the software feature identification code assigned to a managed product. The value of this key is used to create associations between the Service and SoftwareFeature classes. The Product class uses this value to describe the name of the product installed.

opstatenames—the state provider tracks the current operational state of the services installed. The state provider uses the value of this property to build a list of the operational state values that should be updated in directory 10116A.

productidentifyingnumber is used in the Software class and is the Software Feature Identification code assigned to a managed product.

systemcreationclassname describes the derived CIM_ComputerSystem class that the object in question should be scoped within. Since all the providers need to have their objects scoped within the ComputerSystem class, this value should be used wherever this key is required.

systemame is the host name of the machine that the instance resides on. This should be set to localhost.

targetoperatingsystem is an enumerated list of values describing various operating systems.

Custom Event Package

A custom event package can be defined by a managed product by including the events in the PIX file or in a custom event package XML (EPX). It is necessary to reserve a globally unique event package identifier for the custom event package. An example of an EPX is presented in TABLE 60. This example defines a new event class with two custom events. The new event class is derived from the application update class (FIGS. 14 and 16A.)

TABLE 60

```
<?xml version="1.0" encoding="UTF-8"?>
<SesaIntegrationData xmlns:xsi =
"http://www.w3.org/2001/XMLSchema-instance"
xsi:noNamespaceSchemaLocation = "NabooBase.xsd">
  <SesaEvent Package>
    <Version>1.00</Version>
    <Author>abc</Author>
    <Revision>0.01</Revision>
    <RevDate>Feb 19 2004</RevDate>
    <!-- Description of id ranges for the Advanced Sample
event package with a root id of 8
    ID Range Use In Use
    =======================================
    80000-80100    Event families
    80101-80999    Software Feature IDs
    81000-81999    Event Class IDs 81000
    82000-84999    Event IDs 82000-82001
    85000-86999    Report IDs 85000
    87000-88999    String IDs 87000-87004
    89000-89999    Other
    -->
    <Event Package Id="8">
      <EventFamilyMembership Id="90000"/>
Create the Event Class for this Advanced Sample.
Derive the adv_sample_update_class from the Security
base event Class app_update_class, ID Number 91001.
      <TableDefinitions>
        <!--
        * this table stores the descriptions used in the
          update_type_id
        * (field in adv_sample_update_class). It is needed
          to support filtering in the UI on that field.
        *
        * update_type_id: the ID of the string that
          describes the update type.
        -->
        <Table Name="adv_sample_update_type_def"
          TableSpace="SESA32KUSERDEF">
          <Column Name="update_type_id" Type="id"
          Nullable="false"/>
          <PrimaryKey Col="update_type_id"/>
        </Table>
      </TableDefinitions>
      <!--
      * create the event class for Advanced Sample
      * derive it from the predefined app update event
        class
      * ID Range: 81,000-81,999
      -->
      <EventClassDefinitions>
        <EventClass Name="adv_sample_update_class"
          Id="81000" Parent="91001"
          ViewName="adv_sample_update_view">
          <Member Name="privilege" Type="info"
          StringId="87000">
            <DisplayName
          LangId="10001">Privilege</DisplayName>
          </Member>
          <Member Name="update_type_id" Type="id"
          StringId="87001"
          ValueTable="adv_sample_update_type_def">
            <DisplayName LangId="10001">Update
```

TABLE 60-continued

```
        Type</DisplayName>
          <TranslateColName StringId="87002"
    InternalName="update_type_name">
            <DisplayName LangId="10001">Update Type
    Name</DisplayName>
          </TranslateColName>
        </Member>
        <DisplayName LangId="10001">Advanced Sample App
    Update</DisplayName>
      </EventClass>
  </EventClassDefinitions>
  <!--
  * create the events that would apply to the event
    class created above
  * ID Range: 82,000-84,999
  -->
  <EventDefinitions>
      <Event Id="82000" EventClassId="81000">
        <DisplayName LangId="10001">Advanced Sample App
    Update Event1</DisplayName>
      </Event>
      <Event Id="82001" EventClassId="81000">
        <DisplayName LangId="10001">Advanced Sample App
    Update Event2</DisplayName>
      </Event>
  </EventDefinitions>
  <ViewDefinitions>
      <!--
      * create a detail view for the event class created
        above
      * NOTE: a.event_guid is referred in the
        JoinCondition, since
      * event_guid is added to all event tables by
        default
      -->
      <!--
      * Also need to pick up the parent event class
        fields
      -->
      <View Name="adv_sample_update_view">
        <EvtClass Name="adv_sample_update_class"
    Alias="a">
          <JoinCondition>
            a.event_guid = base.event_guid
          </JoinCondition>
          <ViewItem Name="privilege"/>
          <ViewItem Name="update_type_id"/>
        </EvtClass>
        <EvtClass Name="app_update_class" Alias="b">
          <JoinCondition>
            b.event_guid = base.event_guid
          </JoinCondition>
          <ViewItem Name="prev_version"/>
          <ViewItem Name="curr_version"/>
        </EvtClass>
      </View>
  </ViewDefinitions>
  <ReportDefinitions>
      <!--
      * create the default report (85000)
      * ID Range: 85,000-86,999
      -->
      <Report Id="85000" Detail="0" Type="view">
        <DisplayName LangId="10001">Advanced Sample App
    Update</DisplayName>
        <Select>
          <Field MapTo="event_dt"/>
          <Field MapTo="update_type_id" Translate="yes"/>
          <Field MapTo="privilege"/>
          <Field MapTo="prev_version"/>
          <Field MapTo="curr_version"/>
          <Field MapTo="machine"/>
          <Field MapTo="machine_ip"/>
          <Field MapTo="user_name"/>
          <From Name="adv_sample_update_view"/>
        </Select>
      </Report>
  </ReportDefinitions>
  <StringDefinitions>
      <!--
      * create the advanced app translate update type
        strings
      -->
      <String LangId="10001"
          StringId="87003">Auto</String>
      <String LangId="10001"
          StringId="87004">Manual</String>
  </StringDefinitions>
  <DataEntry>
      <SQLInsert Table="adv_sample_update_type_def">
        <DataColumn
          Name="update_type_id">87003</DataColumn>
      </SQLInsert>
      <SQLInsert Table="adv_sample_update_type_def">
        <DataColumn
          Name="update_type_id">87004</DataColumn>
      </SQLInsert>
  </DataEntry>
    </EventPackage>
  </SesaEventPackage>
</SesaIntegrationData>
```

In one embodiment, security feedback and control system 155 is stored in a non-volatile memory of security management system 150 and moved from non-volatile memory to volatile memory as necessary for use with security management system 150. Suitable hardware configurations for utilizing security management system 150 include a personal computer, a workstation, a portable device such as a cellular telephone or a personal digital assistant, an Internet appliance, or any other device that includes components that can include a managed product and a security management agent in accordance with at least one of the embodiments as described herein.

In view of this disclosure, security management system 150, security feedback and control system 155, feedback and control manager 260A in accordance with one embodiment of present invention can be implemented in a wide variety of computer system configurations. In addition, the various elements could be stored as different modules in memories of different devices. For example, security feedback and control system 155 could initially be stored in a first server system, and then as necessary, a portion of rules 1130 could be transferred to a second computer system and executed on the second computer system. In view of this disclosure, those of skill in the art can implement various embodiments of the present invention in a wide-variety of physical hardware configurations and network configurations.

As used herein, a computer memory refers to a volatile memory, a non-volatile memory, or a combination of the two. Herein, a computer program product comprises a medium configured to store or transport computer readable code for any one, all or any combination of the methods and structures described herein. The computer readable code could be for all or any part of the various embodiments of security management system 150. Some examples of computer program products are CD-ROM discs, DVDs, ROM cards, floppy discs, magnetic tapes, computer hard drives, servers on a network and signals transmitted over a network representing computer readable code.

The medium may belong to the computer system itself. However, the medium also may be removed from the computer system. This could be accomplished in a client-server system, or alternatively via a connection to another computer via modems and analog lines, or digital interfaces and a digital carrier line.

In particular, in one embodiment, a computer-program product includes a computer-readable medium containing computer program code for a method including:
- receiving events from managed products by a network security feedback and control system; and
- using information in the events by the network feedback and control system in dynamically implementing a predefined security policy.

In another embodiment, a computer-program product includes a computer-readable medium containing computer program code for a method including:
- collecting events, from a plurality of managed products in a first tier, in a second tier object;
- forwarding the events to a third tier object; and
- routing the events to an event sink in the third tier object for processing.

In yet another embodiment, a computer-program product includes a computer-readable medium containing computer program code for a method including:
- collecting security events having predefined structures from a plurality of managed products by a security management agent;
- forwarding the security events to a security management system upon a connection to the security management system being available; and
- forwarding the security events to a network management application upon the connection to the security management system being unavailable.

In still yet another embodiment, a computer-program product includes a computer-readable medium containing computer program code for a method including:
- issuing a command for a security managed product wherein the issuing the command is performed on a first computer system;
- pinging a security management agent following the issuing the command wherein the security management agent is executing on a second computer system coupled to the first computer system; and
- downloading the command securely by the security management agent following the pinging the security management agent.

In a further embodiment, a computer-program product includes a computer-readable medium containing computer program code for a method including:
- specifying a plurality of hierarchical security event structures for use by heterogeneous security managed products; and
- including in the plurality of hierarchical event structures information for security management of the heterogeneous security managed products.

In a still further embodiment, a computer-program product includes a computer-readable medium containing computer program code for a method comprising:
- collecting security events having predefined structures from a plurality of managed products by a security management agent; and
- queuing the security events by the security management agent.

Also, the various computer systems, networks, communication links, computer program code, storage devices, memory structures etc taken together in appropriate combinations are means for achieving the functionality described herein. For example, in one embodiment, a structure includes:
- means for receiving events from managed products by a network security feedback and control system; and
- means using information in the events by the network feedback and control system in dynamically implementing a predefined security policy.

In another embodiment, a structure includes:
- means for collecting events, from a plurality of managed products in a first tier, in a second tier object;
- means for forwarding the events to a third tier object; and
- means for routing the events to an event sink in the third tier object for processing.

In yet another embodiment, a structure includes:
- means for collecting security events having predefined structures from a plurality of managed products by a security management agent;
- means for forwarding the security events to a security management system upon a connection to the security management system being available; and
- means for forwarding the security events to a network management application upon the connection to the security management system being unavailable.

In still yet another embodiment, a structure includes:
- means for issuing a command for a security managed product wherein the issuing the command is performed on a first computer system;
- means for pinging a security management agent following the issuing the command wherein the security management agent is executing on a second computer system coupled to the first computer system; and
- means for downloading the command securely by the security management agent following the pinging the security management agent.

In a still further embodiment, a structure includes:
- means for specifying a plurality of hierarchical security event structures for use by heterogeneous security managed products; and
- means for including in the plurality of hierarchical event structures information for security management of the heterogeneous security managed products.

In a still yet further embodiment, a structure includes:
- means for collecting security events having predefined structures from a plurality of managed products by a security management agent; and
- means for queuing the security events by the security management agent.

This disclosure provides exemplary embodiments of the present invention. The scope of the present invention is not limited by these exemplary embodiments. Numerous variations, whether explicitly provided for by the specification or implied by the specification or not, may be implemented by one of skill in the art in view of this disclosure.

For example, the security management agent described above need not be a separate entity. The security management agent describes functionality that can be implement in a variety of ways. For example, an embedded product may build in the agent functionality. What is necessary is that the product communicates with the management services, such as the logging service, and can receive commands from the command service. An agent simply acts as a broker for multiple applications running on the same host, or it provides the functionality such that a standalone product does not have to implement the service client functionality. Accordingly, the embodiments described above are only one means for achieving the functionality described.

Moreover, the services described herein are illustrative only of one embodiment of a service orientated architecture and are not intended to limit the invention to the specific services described. The service oriented architecture can include, but is not limited to a service oriented architecture that includes a bootstrap service, an inventory service, an operational state service, a configuration service, a logging service, an alerting service, a command service, a notification service, and/or a heartbeat service.

Finally, when it was stated above that an element took some action, those of skill in the art will understand that the action is the result of a computer instructions or computer instructions being executed on a processor and possibly other actions being taken by hardware and/or automated hardware in response to the execution by hardware. Alternatively, combinations of hardware, automated hardware and/or a processor excuting instructions can be used to implement the various elements described above.

I claim:

1. A system comprising:
   a security management system comprising:
      a processor; and
      a memory coupled to said processor, said memory having stored therein a network security feedback and control system; wherein said network security feedback and control system receives a plurality of normalized events and issues at least one normalized command in response to a predefined event in said plurality of normalized events;
   a security management agent coupled to said security management system wherein said security management agent collects normalized events generated by one or more managed products and forwards said normalized events to said security management system, further wherein said security management agent receives normalized commands from said security management system and forwards said normalized commands to at least one managed product; and
   at least one managed product coupled to said security management agent wherein said at least one managed product generates and transfers at least one normalized event to said security management agent.

2. The system of claim 1 wherein said network security feedback and control system comprises:
   a feedback and control manager wherein said feedback and control manager processes said at least one normalized event and generates said at least one normalized command.

3. The security management system of claim 2 wherein said feedback and control manager includes at least one rules engine wherein said rules engine includes a rule having a condition object that uses information from said at least one normalized event.

4. The system of claim 1 further comprising:
   a managed node coupled to said security management system.

5. The system of claim 4 wherein said managed node further comprises:
   said security management agent executing on said managed node.

6. The system of claim 5 wherein said at least one managed product receives normalized commands from said security management agent.

7. A system comprising:
   a processor; and
   a memory coupled to said processor, said memory having stored therein an event subscription filter and a feedback and control manager coupled to said event subscription filter;
   wherein said event subscription filter receives a plurality of normalized events, generated by one or more managed products, from a security management agent and passes normalized events, for which said system is registered, to said feedback and control manager; and
   wherein said feedback and control manager processes at least one normalized event received from said event subscription filter and issues at least one normalized command to at least one security management agent for passing to at least one of said one or more managed products for use in dynamically implementing a predefined security policy.

8. The system of claim 7 further comprising:
   a knowledge database coupled to said feedback and control manager.

9. The system of claim 7 further comprising:
   a directory coupled to said feedback and control manager.

10. The system of claim 9 further comprising:
    a configuration adapter connected between said feedback and control manager and said directory.

11. The system of claim 7 wherein said feedback and control system further comprises a rules engine coupled to said event subscription filter.

12. The system of claim 7 further comprising:
    a security management agent coupled to said event subscription filter.

13. The system of claim 12 further comprising:
    at least one managed product coupled to said security management agent.

14. A method comprising:
    receiving a plurality of normalized events generated by managed products by a network security feedback and control system from a security management agent; and
    using information in said plurality of normalized events by said network feedback and control system in dynamically implementing a predefined security policy by issuing at least one normalized command in response to a predefined event in said plurality of normalized events to a security management agent for passing to at least one managed product.

15. A computer-program product comprising a tangible computer-readable medium configured to store computer program code for a method comprising:
    receiving a plurality of normalized events generated by managed products by a network security feedback and control system from a security management agent; and
    using information in said plurality of normalized events by said network feedback and control system in dynamically implementing a predefined security policy by issuing at least one normalized command in response to a predefined event in said plurality of normalized events to a security management agent for passing to at least one managed product.

16. A computer system: comprising:
    a processor; and
    a memory coupled to said processor, said memory having stored therein a security management system, said security management system comprising:
       means for receiving a plurality of normalized events generated by managed products by a network security feedback and control system from a security management agent; and
       means for using information in said plurality of normalized events by said network feedback and control system in dynamically implementing a predefined security policy by issuing at least one normalized command in response to a predefined event in said plurality of normalized events to a security management agent for passing to at least one managed: product.

* * * * *

UNITED STATES PATENT AND TRADEMARK OFFICE
CERTIFICATE OF CORRECTION

| | |
|---|---|
| PATENT NO. | : 7,472,422 B1 |
| APPLICATION NO. | : 10/660225 |
| DATED | : December 30, 2008 |
| INVENTOR(S) | : Paul M. Agbabian |

It is certified that error appears in the above-identified patent and that said Letters Patent is hereby corrected as shown below:

In Column 94, Line 51, Claim 16, between "system" and "comprising", delete ":";
In Column 94, Lines 66-67, Claim 16, between "managed" and "product.", delete ":".

Signed and Sealed this

Twenty-sixth Day of May, 2009

JOHN DOLL
*Acting Director of the United States Patent and Trademark Office*